(12) United States Patent  
Fuse et al.

(10) Patent No.: US 7,907,731 B2  
(45) Date of Patent: Mar. 15, 2011

(54) DATA COMMUNICATION SYSTEM

(75) Inventors: Masaru Fuse, Osaka (JP); Satoshi Furusawa, Osaka (JP); Tsuyoshi Ikushima, Nara (JP); Toru Shiozaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 1005 days.

(21) Appl. No.: 11/664,521

(22) PCT Filed: Oct. 5, 2005

(86) PCT No.: PCT/JP2005/018471  
§ 371 (c)(1),  
(2), (4) Date: Apr. 3, 2007

(87) PCT Pub. No.: WO2006/038660  
PCT Pub. Date: Apr. 13, 2006

(65) Prior Publication Data  
US 2008/0025511 A1    Jan. 31, 2008

(30) Foreign Application Priority Data

| Oct. 6, 2004 | (JP) | 2004-294113 |
| Oct. 29, 2004 | (JP) | 2004-317186 |
| Oct. 29, 2004 | (JP) | 2004-317187 |
| Nov. 15, 2004 | (JP) | 2004-330980 |
| Jan. 17, 2005 | (JP) | 2005-009559 |
| Feb. 24, 2005 | (JP) | 2005-049460 |
| Mar. 29, 2005 | (JP) | 2005-095794 |

(51) Int. Cl.  
*H04L 9/12* (2006.01)
(52) U.S. Cl. .................. 380/256; 455/108; 332/149
(58) Field of Classification Search .............. 380/35, 380/263, 287  
See application file for complete search history.

(56) References Cited

U.S. PATENT DOCUMENTS 4,573,205 A * 2/1986 Nash ................ 380/252  
5,086,467 A * 2/1992 Malek ............... 380/252

(Continued)

FOREIGN PATENT DOCUMENTS

JP    06-104793    4/1994

(Continued)

OTHER PUBLICATIONS

U.S. Patent Office Action mailed Jan. 27, 2010 in corresponding U.S. Appl. No. 11/665,684.

(Continued)

*Primary Examiner* — Matthew B Smithers  
(74) *Attorney, Agent, or Firm* — Wenderoth, Lind & Ponack, L.L.P.

(57) ABSTRACT

A data communication system that enhances concealment by significantly increasing the time required for a wiretapper to decrypt a cipher text. The data communication system is constituted by connecting a data transmitting apparatus (13105) to a data receiving apparatus (11201) via a transmission path (110). In the data transmitting apparatus (13105), a multilevel encoding part (111) receives a predetermined first initial value (key information) and information data and generates a multilevel signal that varies in level substantially in a random number manner. A dummy signal superimposing part (118) superimposes a dummy signal on the multilevel signal. A modulating part (112) converts the multilevel signal to a modulated signal of a predetermined modulation form and transmits the modulated signal. The data receiving apparatus (11201) demodulates the modulated signal to output the multilevel signal, and receives a predetermined second initial value (key information) and the multilevel signal to reproduce the information data.

75 Claims, 64 Drawing Sheets

U.S. PATENT DOCUMENTS

| | | |
|---|---|---|
| 6,577,684 B1 | 6/2003 | Hirano et al. |
| 7,333,611 B1 | 2/2008 | Yuen et al. |
| 7,359,513 B2 * | 4/2008 | Gisin et al. .................... 380/256 |
| 2001/0014944 A1 * | 8/2001 | Ibi et al. ........................ 713/183 |
| 2002/0025041 A1 * | 2/2002 | Tomita .......................... 380/256 |
| 2003/0223762 A1 | 12/2003 | Ho et al. |
| 2005/0041981 A1 | 2/2005 | Gill et al. |
| 2005/0047601 A1 | 3/2005 | Shields et al. |
| 2005/0141716 A1 * | 6/2005 | Kumar et al. ................. 380/255 |

FOREIGN PATENT DOCUMENTS

| | | |
|---|---|---|
| JP | 09-205420 | 8/1997 |

OTHER PUBLICATIONS

Osamu Hirota et al., "Quantum Stream Ciper Based on Optical Communications", arXiv: quant-ph/0407062v1, Jul. 8, 2001, http://xxx.gov/list/quant-ph/0407.

Tsuyoshi Nishioka et al., "Hikari Tsushin Ryoshi Ango no Anzensei", 2004 Nen Ango to Joho Security Symposium Yokoshu, vol. 1 of 2, Jan. 27, 2004, pp. 237 to 242.

Office Action issued Aug. 4, 2010 in connection with related U.S. Appl. No. 11/665,684.

Office Action issued Jul. 26, 2010 in connection with related U.S. Appl. No. 11/661,313.

* cited by examiner

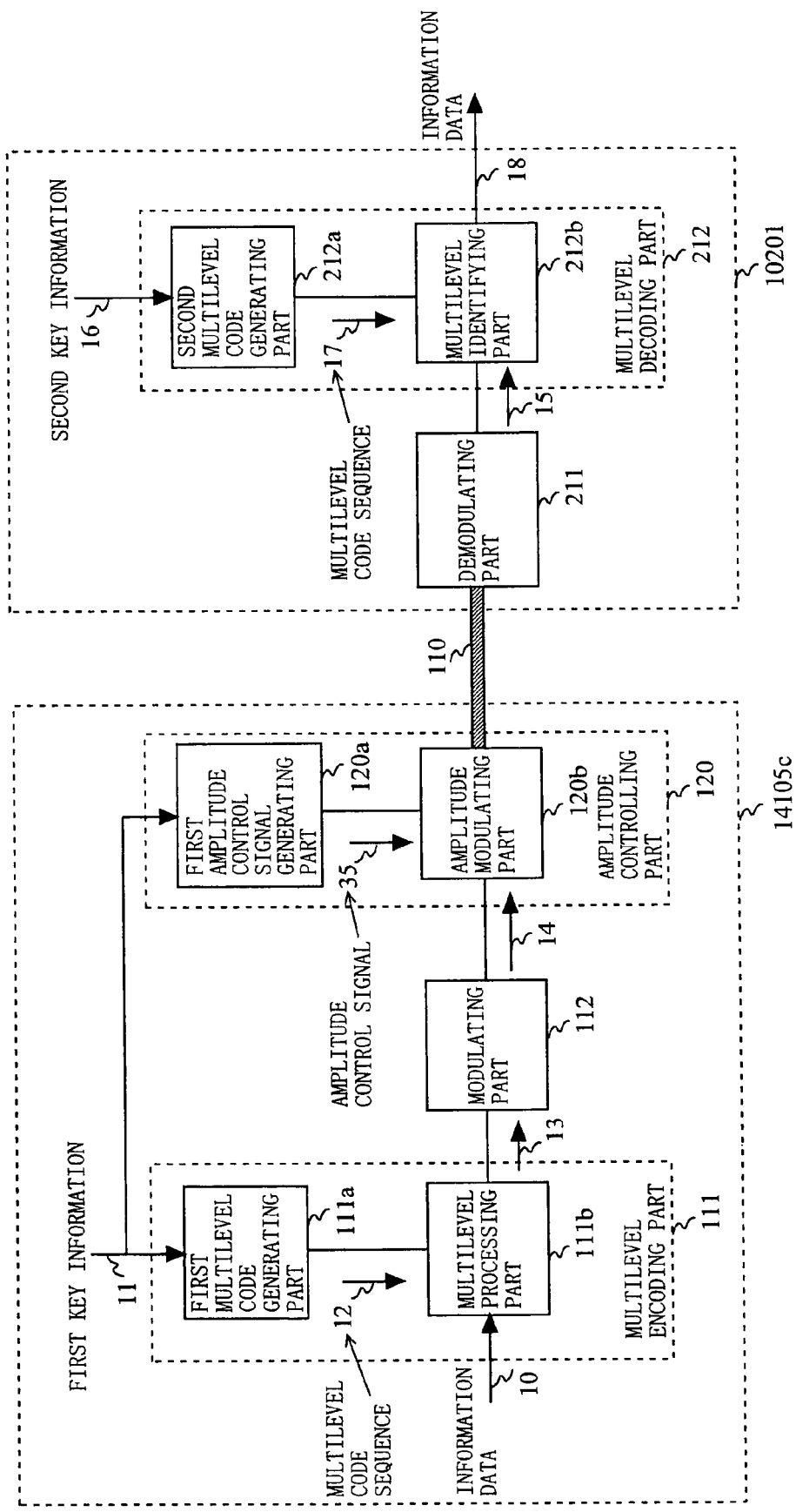
F I G. 44

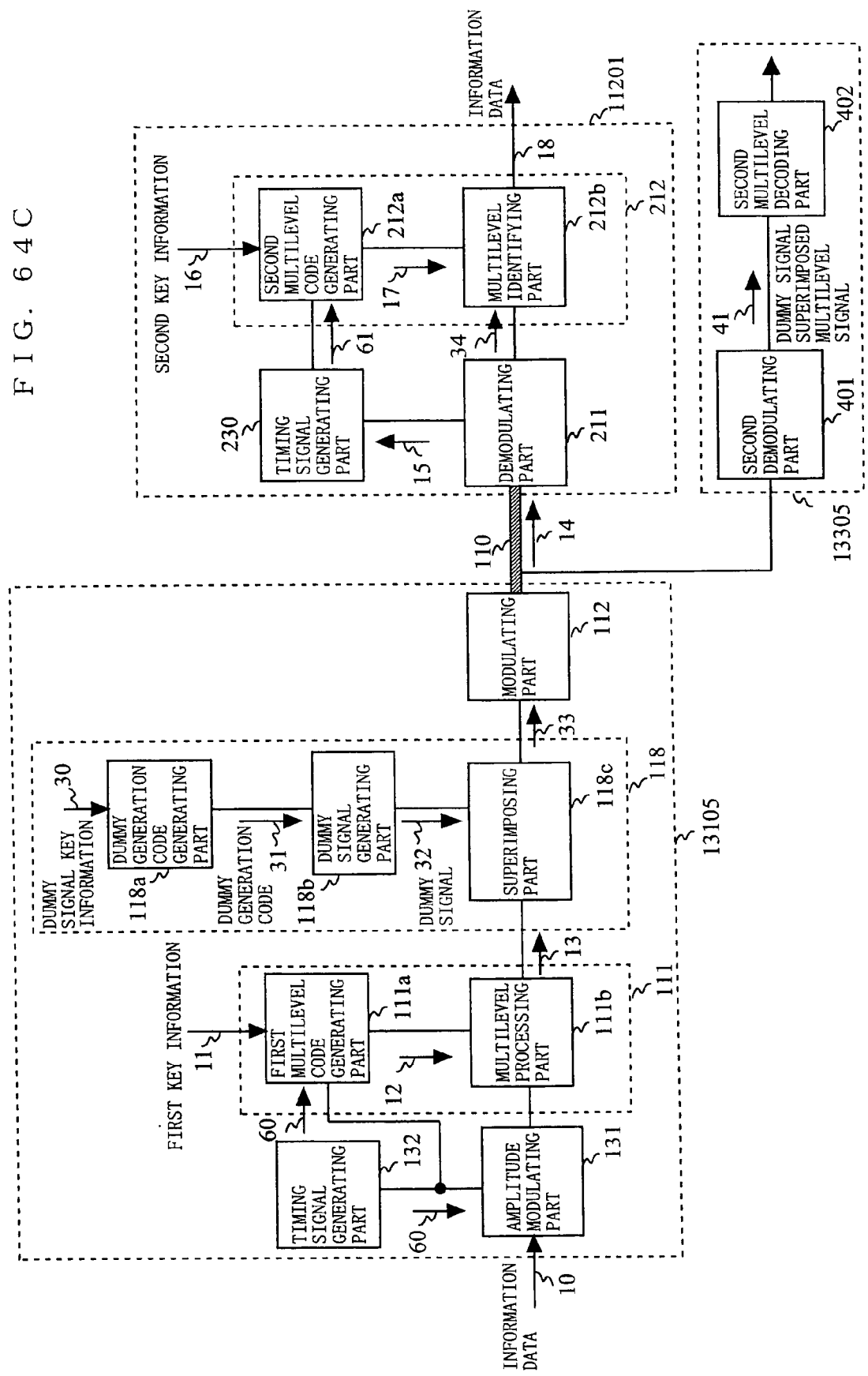

DATA COMMUNICATION SYSTEM

TECHNICAL FIELD

The present invention relates to an apparatus for performing concealed communication that avoids unauthorized wiretapping and interception by a third person. More specifically, the present invention relates to an apparatus performing data communication in a state that a particular encoding/decoding (modulation/demodulation) method is selected and set up between authorized transmitting and receiving persons.

BACKGROUND ART

In the conventional art, in order that communication should be performed between specified persons, a method is adopted in which key information for coding/decoding is shared in transmitting and receiving and in which on the basis of the key information, mathematical arithmetic operation and inverse operation are performed on the information data (plain text) to be transmitted so that concealed communication is achieved FIG. 65 is a block diagram showing a configuration of a conventional data transmitting apparatus according to this method. In FIG. 65, the conventional data communication system has a configuration that a data transmitting apparatus 90001 is connected to a data receiving apparatus 90002 via a transmission path 913. The data transmitting apparatus 90001 comprises an encoding part 911 and a modulating part 912. The data receiving apparatus 90002 comprises a demodulating part 914 and a decoding part 915. In the conventional data communication system, when information data 90 and first key information 91 are inputted to the encoding part 911 while second key information 96 is inputted to the decoding part 915, information data 98 is outputted from the decoding part 915. The operation of the conventional data communication system is described below with reference to FIG. 65.

In the data transmitting apparatus 90001, the encoding part 911 encodes information data 90 (encryption) on the basis of the first key information 91. The modulating part 912 modulates in a predetermined modulation form the information data encoded by the encoding part 911, and transmits as a modulated signal 94 to the data receiving apparatus 90002 via the transmission path 913. In the data receiving apparatus 90002, the demodulating part 914 demodulates by a predetermined demodulation method the modulated signal 94 transmitted via the transmission path 913, and outputs it. The decoding part 915 decodes the signal demodulated by the demodulating part 914 (decryption) on the basis of the second key information 96 shared with the encoding part 911, and reproduces the original information data 98.

A wiretapping action by a third person is described below with reference to a wiretapper data receiving apparatus 90003. In FIG. 65, the wiretapper data receiving apparatus 90003 comprises a wiretapper demodulating part 916 and a wiretapper decoding part 917. The wiretapper demodulating part 916 wiretaps the modulated signal (information data) transmitted between the data transmitting apparatus 90001 and the data receiving apparatus 90002, and demodulates by a predetermined demodulation method the wiretapped modulated signal. On the basis of third key information 99, the wiretapper decoding part 917 tries decoding of the signal demodulated by the wiretapper demodulating part 916. Here, since the wiretapper decoding part 917 does not share the key information with the encoding parts 911, the decoding of the signal demodulated by the wiretapper demodulating part 916 is tried on the basis of the third key information 99 different from the first key information 91. Thus, the wiretapper decoding part 917 cannot correctly decode the signal demodulated by the wiretapper demodulating part 916, and cannot reproduce the original information data.

Such a mathematical encryption technique based on mathematical arithmetic operations (also referred to as calculation encryption or software encryption) can be applied to access systems and the like as described, for example, in Patent Document 1. That is, in a PON (Passive Optical Network) configuration in which an optical signal transmitted from one optical transmitter is branched by an optical coupler and then distributed individually to optical receivers of a plurality of optical subscribers' homes, signals directed to another subscriber other than a desired optical signal are inputted to each optical receiver. Thus, information data for each subscriber is encrypted using mutually different key information, so that mutual leakage and wiretapping of the information are avoided, so that security data communication is realized.

[Patent Document 1] Japanese Laid-Open Patent Publication No. H9-205420

DISCLOSURE OF THE INVENTION

Problems to be Solved by the Invention

Nevertheless, in the conventional data communication system based on the mathematical encryption technique, even in the case that the key information is not shared, the wiretapper can decrypt in principle when arithmetic operations using key information of all the possible combinations are tried (a brute force attack) on the cipher text (modulated signal or encrypted information data) or alternatively when a special analytic algorithm is applied on it. In particular, since improvement in the processing speed of computers in recent years is remarkable, there has been a problem that when a computer employing new principles such as quantum computers could be realized in the future, the cipher text would be wiretapped within a limited time.

Thus, an object of the present invention is to provide a data communication system having high concealment in which the time required for a wiretapper to analyze a cipher text is increased significantly so that an astronomical amount of computation is caused.

Solution to the Problems

The present invention addresses a data transmitting apparatus for performing encrypted communication. Then, in order to achieve the above-mentioned object, the data transmitting apparatus of the present invention comprises a multilevel encoding part, a modulating part and a dummy signal superimposing part. The multilevel encoding part receives predetermined key information defined in advance and information data, and generates a multilevel signal that varies in a signal level substantially in a random number manner. The modulating part generates a modulated signal of a predetermined modulation form on the basis of the multilevel signal. the dummy signal superimposing part superimposes a dummy signal on any one of the information data, the multilevel signal and the modulated signal. Specifically, the multilevel encoding part includes a multilevel code generating part and a multilevel processing part. The multilevel code generating part generates from the key information a multilevel code sequence that varies in a signal level substantially in a random number manner. The multilevel processing part combines the multilevel code sequence and the information data in accordance with predetermined processing, and generates a multilevel signal having a level corresponding to the combination of both signal levels.

Preferably, the dummy signal superimposing part is connected between the multilevel processing part and the modulating part, and superimposes on the multilevel signal a dummy signal that causes difficulty in level determination of the multilevel signal by a third person. Further, the dummy signal varies continuously in the amplitude within the duration of one time slot of the multilevel signal.

The dummy signal superimposing part holds a plurality of signals having an amplitude change pattern different from each other and superimposes on the multilevel signal any one of the plurality of signals as the dummy signal at each time slot of the multilevel signal.

The dummy signal superimposing part includes: a dummy signal generating part for generating a dummy signal; and a superimposing part for combining the dummy signal and the multilevel signal. Further, the dummy signal superimposing part may further include a dummy generation code generating part for outputting a dummy generation code serving as a random number on the basis of a predetermined initial value. In this case, the dummy signal generating part holds a plurality of signals having an amplitude change pattern different from each other and outputs any one of the plurality of signals as a dummy signal on the basis of the dummy generation code at each time slot of the multilevel signal.

Preferably, the amplitude of the dummy signal is larger than any one of the differences between an arbitrary level of the multilevel signal and a level adjacent to the arbitrary level, and is smaller than the amplitude of the information data. Further, the dummy generation code is a natural random number sequence.

Further, the dummy signal superimposing part may be a noise controlling part that is connected to a preceding stage of the multilevel encoding part and that outputs, to the multilevel encoding part, noise superimposed information data in which predetermined noise is superimposed on the information data.

Further, the dummy signal superimposing part may be a noise controlling part that is connected between the multilevel code generating part and the multilevel processing part and that outputs, to the multilevel processing part, noise superimposed multilevel code sequence in which predetermined noise is superimposed on the multilevel code sequence.

Further, the dummy signal superimposing part may be a noise controlling part that is connected to the subsequent stage of the modulating part and that generates a noise superimposed modulated signal in which predetermined noise is superimposed on the modulated signal.

Further, the data transmitting apparatus may include a multilevel encoding part described below and a modulating part. The multilevel encoding part receives predetermined key information defined in advance and information data, and generates a multilevel signal that varies in a signal level substantially in a random number manner. The modulating part generates a modulated signal of a predetermined modulation form on the basis of the multilevel signal. Specifically, the multilevel encoding part includes a multilevel code generating part and a multilevel processing part. The multilevel code generating part generates from the key information a multilevel code sequence that varies in a signal level substantially in a random number manner. The multilevel processing part combines the multilevel code sequence and the information data in accordance with predetermined processing, and generates a multilevel signal having a level corresponding to the combination of both signal levels. When generating the modulated signal of a predetermined modulation form, the modulating part imparts a predetermined noise component to the modulated signal on the basis of the multilevel signal.

Preferably, the modulating part is a light modulating part that includes a light source and modulates the multilevel signal into a light modulated signal. In this case, the light source may employ a semiconductor laser.

Further, the data transmitting apparatus may further comprise an optical noise controlling section for controlling a signal-power-to-noise ratio of the light modulated signal. In this case, the optical noise controlling part includes: an optical noise generating part for generating a predetermined optical noise signal; and a light combining part for superimposing the optical noise signal on the light modulated signal outputted from the light modulating part. Further, the optical noise controlling part may be an optical fiber amplifier. Further, the optical noise controlling part may be an optical interference part that divides the light modulated signal into a plurality and that causes the light modulated signals divided into the plurality to interfere mutually.

Further, the optical noise controlling part may be an optical multi-reflecting part that has a plurality of reflection points and that causes multi-reflection in the light modulated signal. Further, the optical noise controlling part may inject a part of the light modulated signal into the light modulating part. Further, the optical noise controlling part may reflect and inject a part of the light modulated signal into the light modulating part. Further, the optical noise controlling part may inject a predetermined optical signal into the light modulating part.

The optical noise controlling part includes: a noise generating part for generating a predetermined noise signal; and an injection light generating part for converting the noise signal into an optical noise signal and injecting the optical noise signal into the light modulating part. Preferably, the light modulated signal outputted from the light modulating part is multimode light composed of light of a plurality of wavelengths. In this case, the optical noise controlling part changes relative amplitude relation or phase relation of light of each wavelength of the multimode light and thereby generates noise in the light modulated signal.

Preferably, the light modulated signal outputted from the light modulating part is multimode light composed of light of a plurality of wavelengths. In this case, the optical noise controlling part removes light of at least one particular wavelength from the multimode light and thereby generates noise in the light modulated signal.

Further, the dummy signal superimposing part may be a synchronizing part connected between the multilevel processing part and the modulating part. In this case, the synchronizing part includes: a signal synchronizing part for multiplexing an inputted synchronization signal onto the multilevel signal and generating a synchronized multilevel signal; a noise synchronizing part for generating noise in such a manner that a signal-to-noise ratio of the synchronization signal should become higher than a signal-to-noise ratio of the multilevel signal, and outputting noise as a synchronized noise signal; and a noise combining part for combining the synchronized multilevel signal and the synchronized noise signal.

Preferably, the noise generated by the noise synchronizing part is noise having an amplitude distribution of approximately Gaussian distribution. Further, the maximum amplitude of the synchronization signal is larger than the maximum amplitude of the multilevel signal. Further, the ratio between the maximum amplitude of the synchronization signal and the maximum amplitude of the multilevel signal is constant.

Preferably, the signal synchronizing part performs time division multiplexing of the multilevel signal and the synchronization signal. Further, the signal synchronizing part may perform frequency division multiplexing of the multilevel signal and the synchronization signal. Further, the signal synchronizing part may perform space division multiplexing of the multilevel signal and the synchronization signal. Further, the signal synchronizing part may perform code division multiplexing of the multilevel signal and the synchronization signal.

Further, the data transmitting apparatus may further comprise: a timing signal generating part for generating a timing signal of a predetermined period; and an amplitude modulating part for performing amplitude modulation or level fluctuation by the timing signal on any one of the information data, the multilevel code sequence and the multilevel signal. In this case, the multilevel code generating part generates a multilevel code sequence in synchronization with the timing signal.

Preferably, the amplitude modulating part is connected to a preceding stage of the multilevel encoding part and imparts predetermined amplitude fluctuation or level fluctuation to the information data on the basis of the timing signal so as to output it to the multilevel encoding part.

Alternatively, the amplitude modulating part may be inserted between the multilevel code generating part and the multilevel processing part, and may impart predetermined amplitude fluctuation or level fluctuation to the multilevel code sequence on the basis of the timing signal so as to output it to the multilevel processing part.

Alternatively, the amplitude modulating part may be inserted between the multilevel encoding part and the modulating part, and may impart predetermined amplitude fluctuation or level fluctuation to the multilevel signal on the basis of the timing signal so as to output it to the modulating part.

Alternatively, the amplitude modulating part may be connected to the subsequent stage of the modulating part and may perform amplitude modulation of a predetermined form on the modulated signal on the basis of the timing signal.

Preferably, the amplitude modulating part imparts amplitude fluctuation or level fluctuation larger than the amplitude of the information data to the information data on the basis of the timing signal. Further, the amplitude modulating part imparts amplitude fluctuation or level fluctuation larger than the maximum amplitude of the multilevel code sequence to the multilevel code sequence on the basis of the timing signal. Further, the amplitude modulating part imparts amplitude fluctuation or level fluctuation larger than the maximum amplitude of the multilevel signal to the multilevel signal on the basis of the timing signal. Further, the amplitude modulating part imparts amplitude fluctuation or level fluctuation larger than the maximum amplitude of the modulated signal to the modulated signal on the basis of the timing signal.

Preferably, the information data is at a fixed level in a predetermined duration defined in advance. Preferably, the multilevel code sequence is at a fixed level in a predetermined duration defined in advance. Preferably, the multilevel signal is at a fixed level in a predetermined duration defined in advance. Preferably, the modulated signal is at a fixed level in a predetermined duration defined in advance.

Preferably, the timing signal is a clock in synchronization with the information data, the multilevel code sequence, or the multilevel signal. Preferably, the predetermined modulation form in the amplitude modulating part is different from the modulation form in the modulating part.

Preferably, as for the modulation form in the modulating part and the modulation form in the amplitude modulating part, any one is intensity modulation or amplitude modulation while the other is angle modulation.

Further, the data transmitting apparatus may further comprise: an amplitude control signal generating part for generating an amplitude control signal that varies in a value substantially in a random number manner, from predetermined amplitude control key information defined in advance; and an amplitude modulating part that is connected to a preceding stage of the multilevel encoding part and that performs amplitude modulation on the information data on the basis of the amplitude control signal so as to output it to the multilevel encoding part.

Further, the data transmitting apparatus may further comprise: an amplitude control signal generating part for generating an amplitude control signal that varies in a value substantially in a random number manner, from predetermined amplitude control key information defined in advance; and an amplitude modulating part that is inserted between the multilevel encoding part and the modulating part and that performs amplitude modulation on the multilevel signal on the basis of the amplitude control signal so as to output it to the modulating part.

Further, the data transmitting apparatus may further comprise: an amplitude control signal generating part for generating an amplitude control signal that varies in a value substantially in a random number manner, from predetermined amplitude control key information defined in advance; and an amplitude modulating part that is connected to a subsequent stage of the modulating part and that performs modulation of a predetermined form on the modulated signal on the basis of the amplitude control signal so as to output it.

Preferably, the amplitude modulating part performs amplitude modulation or intensity modulation on the modulated signal.

Further, the data transmitting apparatus may comprise: a multilevel code generating part for generating a multilevel code sequence that varies in a value substantially in a random number manner, from predetermined key information defined in advance; a first modulating part for generating a first modulated signal of a predetermined modulation form on the basis of the multilevel code sequence; a second modulating part for receiving information data and generating a second modulated signal of a predetermined modulation form; and a wave mixing part for wave-mixing the first modulated signal and the second modulated signal.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the second modulating part and that performs amplitude modulation on the information data on the basis of the amplitude control signal so as to output it.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the first modulating part and that performs amplitude modulation on the multilevel code sequence on the basis of the amplitude control signal so as to output it.

Further, the data transmitting apparatus may comprise: a multilevel code generating part for generating a multilevel code sequence that varies in a signal level substantially in a random number manner, from predetermined key information defined in advance; a first modulating part for generating a first modulated signal of a predetermined modulation form on the basis of the multilevel code sequence; and a second modulating part for receiving information data and modulating the first modulated signal with the information data so as to generate a second modulated signal of a predetermined modulation form.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the second modulating part and that performs amplitude modulation on the information data on the basis of the amplitude control signal so as to output it.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the first modulating part and that performs amplitude modulation on the multilevel code sequence on the basis of the amplitude control signal so as to output it.

Preferably, the data transmitting apparatus further comprises an N-adic encoding part that is connected to a preceding stage of the multilevel encoding part and that encodes an information data group consisting of the plurality of information data into an arbitrary-adic number in accordance with predetermined processing so as to output it as an N-adic encoded signal to the multilevel encoding part.

When encoding the information data group into an arbitrary-adic number, the N-adic encoding part causes fluctuation in the multi valued level of the N-adic encoded signal by combining of logic by the plurality of information data. The N-adic encoding part outputs the N-adic encoded signal from the information data group on the basis of key information. The N-adic encoding part outputs the N-adic encoded signal from the information data group on the basis of key information different from the key information.

Preferably, at each predetermined duration defined in advance, the multilevel encoding part generates a multilevel signal of a multi valued number of any one of a plurality of multi valued numbers defined in advance.

Further, the data transmitting apparatus further comprises: a synchronization signal generating part for outputting a predetermined synchronization signal corresponding to the multilevel signal; and a multilevel processing controlling part for outputting, on the basis of the synchronization signal, a multilevel processing control signal that instructs a multi valued number.

Preferably, the multilevel encoding part outputs a binary multilevel signal at least at any one of the predetermined durations. Preferably, the multilevel encoding part outputs the binary multilevel signal, in a state that the binary multilevel signal has an amplitude greater than the amplitude of the multilevel signal of the maximum multi valued number among a plurality of multi valued numbers. Preferably, the multilevel encoding part outputs the information data as a binary multilevel signal.

Preferably, in response to the multi valued number, the data transmitting apparatus changes the transfer rate of the information data, the multilevel code sequence or the multilevel signal. In the data transmitting apparatus, when the multi valued number decreases, the transfer rate of the information data, the multilevel code sequence, or the multilevel signal is increased.

Further, the present invention addresses also a data receiving apparatus for performing encrypted communication. Then, in order to achieve the above-mentioned object, the data receiving apparatus of the present invention comprises: a demodulating part for demodulating a modulated signal of a predetermined modulation form and outputting it as a multilevel signal; and a multilevel decoding part for receiving predetermined key information defined in advance and the multilevel signal and outputting information data. Specifically, the multilevel decoding part includes: a multilevel code generating part for generating from the key information a multilevel code sequence that varies in a signal level substantially in a random number manner; and a multilevel identifying part for identifying the multilevel signal on the basis of the multilevel code sequence, and outputting information data.

Preferably, the data receiving apparatus further comprises a dummy signal canceling part that is connected between the demodulating part and the multilevel decoding part and that generates a dummy signal capable of canceling a dummy signal component which is contained in the multilevel signal and which causes difficulty in level determination of the multilevel signal by a third person, so as to cancel the dummy signal component with the dummy signal. Further, the dummy signal varies continuously in the amplitude within the duration of one time slot of the multilevel signal.

Preferably, the dummy signal canceling part holds a plurality of signals having an amplitude change pattern different from each other and cancels with the dummy signal component any one of the plurality of signals as the dummy signal at each time slot of the multilevel signal.

Preferably, the dummy signal canceling part includes: a dummy signal generating part for generating a dummy signal; and a canceling part for canceling the dummy signal with the dummy signal component.

Preferably, the dummy signal canceling part further includes a dummy generation code generating part for outputting a dummy generation code serving as a random number on the basis of a predetermined initial value. In this case, the dummy signal generating part holds a plurality of signals having an amplitude change pattern different from each other and cancels with the dummy signal component any one of the plurality of signals as a dummy signal on the basis of the dummy generation code at each time slot of the multilevel signal.

Preferably, the multilevel signal contains a synchronization signal component for establishing synchronization and a multilevel signal component obtained by encrypting the information data with the key information. In this case, the maximum amplitude of the synchronization signal component is a value larger than the maximum amplitude of the multilevel signal component. Further, the multilevel decoding part further comprises: an amplitude controlling part for controlling the maximum amplitude of the multilevel signal into a predetermined value on the basis of an amplitude detection value indicating an amplitude of the multilevel signal; a detecting part for detecting the amplitude of the multilevel signal outputted from the amplitude controlling part and outputting the detected amplitude as the amplitude detection value to the amplitude controlling part; and a synchronization extracting part that identifies on the basis of a threshold the multilevel signal outputted from the amplitude controlling part and that determines as the synchronization signal component a signal having an amplitude larger than the threshold so as to extract the synchronization signal component as a synchronization signal. The multilevel code generating part generates a multilevel code sequence on the basis of the synchronization signal.

Preferably, the multilevel signal contains a synchronization signal component for establishing synchronization and a multilevel signal component obtained by encrypting the information data with the key information. In this case, the maximum amplitude of the synchronization signal component is a value larger than the maximum amplitude of the multilevel signal component. Further, the multilevel decoding part further comprises: a detecting part for detecting an amplitude of the multilevel signal and outputting the detected amplitude as an amplitude detection value; a synchronization extracting part that sets up a threshold on the basis of the amplitude detection value and that determines as the synchronization signal component a signal component having an amplitude larger than the threshold so as to extract the synchronization signal component as a synchronization signal; and an amplitude controlling part for controlling the maximum amplitude of the multilevel code sequence on the basis of the amplitude detection value. The multilevel code generating part generates a multilevel code sequence on the basis of the synchronization signal.

Preferably, the detecting part adopts the maximum amplitude of the multilevel signal as the amplitude detection value. Further, the detecting part may adopt the average of the amplitude of the multilevel signal as the amplitude detection value.

Preferably, the synchronization extracting part holds in advance the ratio between the maximum amplitude of the synchronization signal component and the maximum amplitude of the multilevel signal component, and determines the threshold by using the amplitude detection value and the ratio.

Further, the data receiving apparatus may further comprise a timing signal reproducing part for receiving a multilevel signal outputted from the demodulating part and reproducing the timing signal. In this case, the multilevel code generating part outputs the multilevel code sequence in synchronization with the timing signal.

Further, the data receiving apparatus may further comprise: a branching part that branches the modulated signal and that outputs one of them to the demodulating part and branch-outputs the other; a second demodulating part for demodulating and outputting the other modulated signal outputted from the branching part; and a timing signal reproducing part for reproducing the timing signal from the electric signal outputted from the second demodulating part. In this case, the multilevel code generating part outputs the multilevel code sequence in synchronization with the timing signal.

Preferably, the timing signal reproducing part is a passing part for passing a frequency band corresponding to the timing signal.

Preferably, the timing signal reproducing part comprises: a passing part for passing a frequency band corresponding to the timing signal; and a synchronizing part for generating a timing signal in synchronization with an output signal from the passing part.

Preferably, the multilevel decoding part further includes an amplitude control signal generating part for generating an amplitude control signal that varies in a value substantially in a random number manner, from predetermined amplitude control key information defined in advance. The multilevel identifying part identifies the multilevel signal on the basis of the multilevel code sequence and the amplitude control signal, and outputs the information data.

Preferably, the multilevel identifying part switches a threshold for identifying the multilevel signal on the basis of the multi valued number of the multilevel signal inputted in a predetermined duration defined in advance.

Further, the data receiving apparatus may further comprise: a synchronization signal generating part for reproducing a predetermined synchronization signal corresponding to the multilevel signal; and a multilevel identification controlling part for outputting, on the basis of the synchronization signal, a multilevel identification control signal for changing the threshold in the multilevel identifying part.

Preferably, the multilevel decoding part performs identification of a binary multilevel signal at least at any one of the predetermined durations.

Further, the present invention addresses also a data communication system in which a data transmitting apparatus and a data receiving apparatus perform encrypted communication. Then, in order to achieve the above-mentioned object, the data transmitting apparatus of the present invention comprises a multilevel encoding part, a modulating part and a dummy signal superimposing part. The multilevel encoding part receives predetermined key information defined in advance and information data, and generates a multilevel signal that varies in a signal level substantially in a random number manner. The modulating part generates a modulated signal of a predetermined modulation form on the basis of the multilevel signal. the dummy signal superimposing part superimposes a dummy signal on any one of the information data, the multilevel signal and the modulated signal. Specifically, the multilevel encoding part includes a multilevel code generating part and a multilevel processing part. The multilevel code generating part generates from the key information a multilevel code sequence that varies in a signal level substantially in a random number manner. The multilevel processing part combines the multilevel code sequence and the information data in accordance with predetermined processing, and generates a multilevel signal having a level corresponding to the combination of both signal levels.

Further, the data receiving apparatus comprises: a demodulating part for demodulating a modulated signal of a predetermined modulation form and outputting it as a multilevel signal; and a multilevel decoding part for receiving predetermined key information defined in advance and the multilevel signal and outputting information data. Specifically, the multilevel decoding part includes: a multilevel code generating part for generating from the key information a multilevel code sequence that varies in a signal level substantially in a random number manner; and a multilevel identifying part for identifying the multilevel signal on the basis of the multilevel code sequence, and outputting information data.

Preferably, the dummy signal superimposing part is connected between the multilevel processing part and the modulating part, and superimposes on the multilevel signal a dummy signal that causes difficulty in level determination of the multilevel signal by a third person. Further, the dummy signal varies continuously in the amplitude within the duration of one time slot of the multilevel signal.

The dummy signal superimposing part holds a plurality of signals having an amplitude change pattern different from each other and superimposes on the multilevel signal any one of the plurality of signals as the dummy signal at each time slot of the multilevel signal.

The dummy signal superimposing part includes: a dummy signal generating part for generating a dummy signal; and a superimposing part for combining the dummy signal and the multilevel signal. Further, the dummy signal superimposing part may further include a dummy generation code generating part for outputting a dummy generation code serving as a random number on the basis of a predetermined initial value.

In this case, the dummy signal generating part holds a plurality of signals having an amplitude change pattern different from each other and outputs any one of the plurality of signals as a dummy signal on the basis of the dummy generation code at each time slot of the multilevel signal.

Preferably, the amplitude of the dummy signal is larger than any one of the differences between an arbitrary level of the multilevel signal and a level adjacent to the arbitrary level, and is smaller than the amplitude of the information data. Further, the dummy generation code is a natural random number sequence.

Further, the dummy signal superimposing part may be a noise controlling part that is connected to a preceding stage of the multilevel encoding part and that outputs, to the multilevel encoding part, noise superimposed information data in which predetermined noise is superimposed on the information data.

Further, the dummy signal superimposing part may be a noise controlling part that is connected between the multilevel code generating part and the multilevel processing part and that outputs, to the multilevel processing part, noise superimposed multilevel code sequence in which predetermined noise is superimposed on the multilevel code sequence.

Further, the dummy signal superimposing part may be a noise controlling part that is connected to the subsequent stage of the modulating part and that generates a noise superimposed modulated signal in which predetermined noise is superimposed on the modulated signal.

Further, the data transmitting apparatus may include a multilevel encoding part described below and a modulating part. The multilevel encoding part receives predetermined key information defined in advance and information data, and generates a multilevel signal that varies in a signal level substantially in a random number manner. The modulating part generates a modulated signal of a predetermined modulation form on the basis of the multilevel signal. Specifically, the multilevel encoding part includes a multilevel code generating part and a multilevel processing part. The multilevel code generating part generates from the key information a multilevel code sequence that varies in a signal level substantially in a random number manner. The multilevel processing part combines the multilevel code sequence and the information data in accordance with predetermined processing, and generates a multilevel signal having a level corresponding to the combination of both signal levels. When generating the modulated signal of a predetermined modulation form, the modulating part imparts a predetermined noise component to the modulated signal on the basis of the multilevel signal.

Preferably, the modulating part is a light modulating part that includes a light source and modulates the multilevel signal into a light modulated signal. In this case, the light source may employ a semiconductor laser.

Further, the data transmitting apparatus may further comprise an optical noise controlling section for controlling a signal-power-to-noise ratio of the light modulated signal. In this case, the optical noise controlling part includes: an optical noise generating part for generating a predetermined optical noise signal; and a light combining part for superimposing the optical noise signal on the light modulated signal outputted from the light modulating part. Further, the optical noise controlling part may be an optical fiber amplifier. Further, the optical noise controlling part may be an optical interference part that divides the light modulated signal into a plurality and that causes the light modulated signals divided into the plurality to interfere mutually.

Further, the optical noise controlling part may be an optical multi-reflecting part that has a plurality of reflection points and that causes multi-reflection in the light modulated signal. Further, the optical noise controlling part may inject a part of the light modulated signal into the light modulating part. Further, the optical noise controlling part may reflect and inject a part of the light modulated signal into the light modulating part. Further, the optical noise controlling part may inject a predetermined optical signal into the light modulating part.

The optical noise controlling part includes: a noise generating part for generating a predetermined noise signal; and an injection light generating part for converting the noise signal into an optical noise signal and injecting the optical noise signal into the light modulating part. Preferably, the light modulated signal outputted from the light modulating part is multimode light composed of light of a plurality of wavelengths. In this case, the optical noise controlling part changes relative amplitude relation or phase relation of light of each wavelength of the multimode light and thereby generates noise in the light modulated signal.

Preferably, the light modulated signal outputted from the light modulating part is multimode light composed of light of a plurality of wavelengths. In this case, the optical noise controlling part removes light of at least one particular wavelength from the multimode light and thereby generates noise in the light modulated signal.

Further, the dummy signal superimposing part may be a synchronizing part connected between the multilevel processing part and the modulating part. In this case, the synchronizing part includes: a signal synchronizing part for multiplexing an inputted synchronization signal onto the multilevel signal and generating a synchronized multilevel signal; a noise synchronizing part for generating noise in such a manner that a signal-to-noise ratio of the synchronization signal should become higher than a signal-to-noise ratio of the multilevel signal, and outputting noise as a synchronized noise signal; and a noise combining part for combining the synchronized multilevel signal and the synchronized noise signal.

Preferably, the noise generated by the noise synchronizing part is noise having an amplitude distribution of approximately Gaussian distribution. Further, the maximum amplitude of the synchronization signal is larger than the maximum amplitude of the multilevel signal. Further, the ratio between the maximum amplitude of the synchronization signal and the maximum amplitude of the multilevel signal is constant.

Preferably, the signal synchronizing part performs time division multiplexing of the multilevel signal and the synchronization signal. Further, the signal synchronizing part may perform frequency division multiplexing of the multilevel signal and the synchronization signal. Further, the signal synchronizing part may perform space division multiplexing of the multilevel signal and the synchronization signal. Further, the signal synchronizing part may perform code division multiplexing of the multilevel signal and the synchronization signal.

Further, the data transmitting apparatus may further comprise: a timing signal generating part for generating a timing signal of a predetermined period; and an amplitude modulating part for performing amplitude modulation or level fluctuation by the timing signal on any one of the information data, the multilevel code sequence and the multilevel signal. In this case, the multilevel code generating part generates a multilevel code sequence in synchronization with the timing signal.

Preferably, the amplitude modulating part is connected to a preceding stage of the multilevel encoding part and imparts predetermined amplitude fluctuation or level fluctuation to the information data on the basis of the timing signal so as to output it to the multilevel encoding part.

Alternatively, the amplitude modulating part may be inserted between the multilevel code generating part and the multilevel processing part, and may impart predetermined amplitude fluctuation or level fluctuation to the multilevel code sequence on the basis of the timing signal so as to output it to the multilevel processing part.

Alternatively, the amplitude modulating part may be inserted between the multilevel encoding part and the modulating part, and may impart predetermined amplitude fluctuation or level fluctuation to the multilevel signal on the basis of the timing signal so as to output it to the modulating part.

Alternatively, the amplitude modulating part may be connected to the subsequent stage of the modulating part and may perform amplitude modulation of a predetermined form on the modulated signal on the basis of the timing signal.

Preferably, the amplitude modulating part imparts amplitude fluctuation or level fluctuation larger than the amplitude of the information data to the information data on the basis of the timing signal. Further, the amplitude modulating part imparts amplitude fluctuation or level fluctuation larger than the maximum amplitude of the multilevel code sequence to the multilevel code sequence on the basis of the timing signal. Further, the amplitude modulating part imparts amplitude fluctuation or level fluctuation larger than the maximum amplitude of the multilevel signal to the multilevel signal on the basis of the timing signal. Further, the amplitude modulating part imparts amplitude fluctuation or level fluctuation larger than the maximum amplitude of the modulated signal to the modulated signal on the basis of the timing signal.

Preferably, the information data is at a fixed level in a predetermined duration defined in advance. Preferably, the multilevel code sequence is at a fixed level in a predetermined duration defined in advance. Preferably, the multilevel signal is at a fixed level in a predetermined duration defined in advance. Preferably, the modulated signal is at a fixed level in a predetermined duration defined in advance.

Preferably, the timing signal is a clock in synchronization with the information data, the multilevel code sequence, or the multilevel signal. Preferably, the predetermined modulation form in the amplitude modulating part is different from the modulation form in the modulating part.

Preferably, as for the modulation form in the modulating part and the modulation form in the amplitude modulating part, any one is intensity modulation or amplitude modulation while the other is angle modulation.

Further, the data transmitting apparatus may further comprise: an amplitude control signal generating part for generating an amplitude control signal that varies in a value substantially in a random number manner, from predetermined amplitude control key information defined in advance; and an amplitude modulating part that is connected to a preceding stage of the multilevel encoding part and that performs amplitude modulation on the information data on the basis of the amplitude control signal so as to output it to the multilevel encoding part.

Further, the data transmitting apparatus may further comprise: an amplitude control signal generating part for generating an amplitude control signal that varies in a value substantially in a random number manner, from predetermined amplitude control key information defined in advance; and an amplitude modulating part that is inserted between the multilevel encoding part and the modulating part and that performs amplitude modulation on the multilevel signal on the basis of the amplitude control signal so as to output it to the modulating part.

Further, the data transmitting apparatus may further comprise: an amplitude control signal generating part for generating an amplitude control signal that varies in a value substantially in a random number manner, from predetermined amplitude control key information defined in advance; and an amplitude modulating part that is connected to a subsequent stage of the modulating part and that performs modulation of a predetermined form on the modulated signal on the basis of the amplitude control signal so as to output it.

Preferably, the amplitude modulating part performs amplitude modulation or intensity modulation on the modulated signal.

Further, the data transmitting apparatus may comprise: a multilevel code generating part for generating a multilevel code sequence that varies in a value substantially in a random number manner, from predetermined key information defined in advance; a first modulating part for generating a first modulated signal of a predetermined modulation form on the basis of the multilevel code sequence; a second modulating part for receiving information data and generating a second modulated signal of a predetermined modulation form; and a wave mixing part for wave-mixing the first modulated signal and the second modulated signal.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the second modulating part and that performs amplitude modulation on the information data on the basis of the amplitude control signal so as to output it.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the first modulating part and that performs amplitude modulation on the multilevel code sequence on the basis of the amplitude control signal so as to output it.

Further, the data transmitting apparatus may comprise: a multilevel code generating part for generating a multilevel code sequence that varies in a signal level substantially in a random number manner, from predetermined key information defined in advance; a first modulating part for generating a first modulated signal of a predetermined modulation form on the basis of the multilevel code sequence; and a second modulating part for receiving information data and modulating the first modulated signal with the information data so as to generate a second modulated signal of a predetermined modulation form.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the second modulating part and that performs amplitude modulation on the information data on the basis of the amplitude control signal so as to output it.

Preferably, the data transmitting apparatus may further comprise: an amplitude control signal generating part for generating an amplitude control signal that varies in a value substantially in a random number manner, from predetermined amplitude control key information defined in advance; and an amplitude modulating part that is inserted to a preceding stage of the first modulating part and that performs amplitude modulation on the multilevel code sequence on the basis of the amplitude control signal so as to output it.

Preferably, the data transmitting apparatus further comprises an N-adic encoding part that is connected to a preceding stage of the multilevel encoding part and that encodes an information data group consisting of the plurality of information data into an arbitrary-adic number in accordance with predetermined processing so as to output it as an N-adic encoded signal to the multilevel encoding part.

When encoding the information data group into an arbitrary-adic number, the N-adic encoding part causes fluctuation in the multi valued level of the N-adic encoded signal by combining of logic by the plurality of information data. The N-adic encoding part outputs the N-adic encoded signal from the information data group on the basis of key information. The N-adic encoding part outputs the N-adic encoded signal from the information data group on the basis of key information different from the key information.

Preferably, at each predetermined duration defined in advance, the multilevel encoding part generates a multilevel signal of a multi valued number of any one of a plurality of multi valued numbers defined in advance.

Further, the data transmitting apparatus further comprises: a synchronization signal generating part for outputting a predetermined synchronization signal corresponding to the multilevel signal; and a multilevel processing controlling part for outputting, on the basis of the synchronization signal, a multilevel processing control signal that instructs a multi valued number.

Preferably, the multilevel encoding part outputs a binary multilevel signal at least at any one of the predetermined durations. Preferably, the multilevel encoding part outputs the binary multilevel signal, in a state that the binary multilevel signal has an amplitude greater than the amplitude of the multilevel signal of the maximum multi valued number among a plurality of multi valued numbers. Preferably, the multilevel encoding part outputs the information data as a binary multilevel signal.

Preferably, in response to the multi valued number, the data transmitting apparatus changes the transfer rate of the information data, the multilevel code sequence or the multilevel signal. In the data transmitting apparatus, when the multi valued number decreases, the transfer rate of the information data, the multilevel code sequence, or the multilevel signal is increased.

EFFECT OF THE INVENTION

According to the data transmitting apparatus of the present invention, the dummy signal superimposing part superimposes a dummy signal that causes difficulty in the level determination of the multilevel signal by a third person, onto any one of the information data, the multilevel signal or the modulated signal. As such, the data transmitting apparatus can impart critical degradation to the received signal quality at the time of wiretapping by a third person, and cause difficulty in decryption and decoding of the multilevel signal by the third person so as to achieve security-improved data communication.

Further, when the dummy signal superimposing part is a noise controlling part, the noise controlling part appropriately imparts level fluctuation by noise onto any one of the information data, the multilevel signal or the modulated signal in such a manner that wiretapping by a third person should become impossible. As such, the data transmitting apparatus can impart critical degradation to the received signal quality at the time of wiretapping by a third person, and cause further difficulty in decryption and decoding of the multilevel signal by the third person so as to achieve security-improved data communication.

Further, in place of the noise controlling part, the data transmitting apparatus encodes as a multilevel signal the information data to be transmitted and transmits the encoded multilevel signal as a light modulated signal so as to impart, to the multilevel signal, quantum noise which is unremovable because of the physical property. Furthermore, the data transmitting apparatus may further impart predetermined noise to the light modulated signal. Further, the data transmitting apparatus may convert the multilevel signal into a light modulated signal oscillated at a plurality of wavelengths, so as to impart, to the multilevel signal, fluctuation which is unremovable because of the physical property. As such, the data transmitting apparatus can impart critical degradation to the received signal quality at the time of wiretapping by a third person, and cause yet further difficulty in decryption and decoding of the multilevel signal by the third person so as to achieve security-improved data communication.

According to the data communication system of the present invention, information data to the multilevel signal is encoded and modulated into a multilevel signal on the basis of key information. Then, the signal is transmitted. The received multilevel signal is demodulated and decoded on the basis of the same key information, so that the signal-to-noise power ratio of the multilevel signal is brought into an appropriate value. Thus, in the data communication system permits high concealment data communication in which the time required for a wiretapper to analyze a cipher text is increased significantly so that an astronomical amount of computation is caused.

BRIEF DESCRIPTION OF THE DRAWINGS

FIG. 44 is a block diagram showing a third exemplary configuration of a data communication system according to a fifteenth embodiment of the present invention.

FIG. 64C is a block diagram showing an example of a configuration of a data communication system in which features of embodiments of the present invention are combined.

DESCRIPTION OF THE REFERENCE CHARACTERS

| | |
|---|---|
| 10, 18 | information data |
| 11, 16, 91, 96, 99 | key information |
| 12, 17 | multilevel code sequence |
| 13, 15 | multilevel signal |
| 14, 94 | modulated signal |
| 110 | transmission path |
| 111 | multilevel encoding part |
| 111a | first multilevel code generating part |
| 111b | multilevel processing part |
| 112, 122, 123, 912 | modulating part |
| 113 | first data inverting part |
| 114 | noise controlling part |
| 114a | noise generating part |
| 114b | combining part |
| 118 | dummy signal superimposing part |
| 118a | dummy generation code generating part |
| 118b | dummy signal generating part |
| 118c | superimposing part |
| 122 | first modulating part |
| 123 | second modulating part |
| 120 | amplitude controlling part |
| 120a | first amplitude signal generating part |
| 120b | amplitude modulating part |
| 124 | wave mixing part |
| 125, 127 | light modulating part |
| 127a | light source |
| 127b | external light modulating part |
| 128, 129, 130 | optical noise controlling part |
| 128a | optical noise generating part |
| 128b | light combining part |
| 129a | noise generating part |
| 129b | injection light generating part |
| 131, 132 | N-adic encoding part |
| 134 | synchronization signal generating part |
| 135 | multilevel processing controlling part |
| 211, 914, 916 | demodulating part |
| 212, 218 | multilevel decoding part |
| 212a | second multilevel code generating part |
| 212b | multilevel identifying part |
| 212c | second amplitude signal generating part |
| 213 | second data inverting part |
| 214 | dummy signal canceling part |
| 214a | dummy generation code generating part |
| 214b | dummy signal generating part |
| 214c | canceling part |
| 219 | light demodulating part |
| 220, 221 | N-adic decoding part |
| 233 | synchronization signal reproducing part |
| 234 | multilevel identification controlling part |
| 236 | sub demodulating part |
| 237 | identifying part |
| 240 | detecting part |
| 241 | amplitude controlling part |
| 242 | synchronization extracting part |
| 914 | encoding part |
| 915, 917 | decoding part |
| 10101-19108 | data transmitting apparatus |
| 10201-19207 | data receiving apparatus |

BEST MODE FOR CARRYING OUT THE INVENTION

First Embodiment

Figure 1:
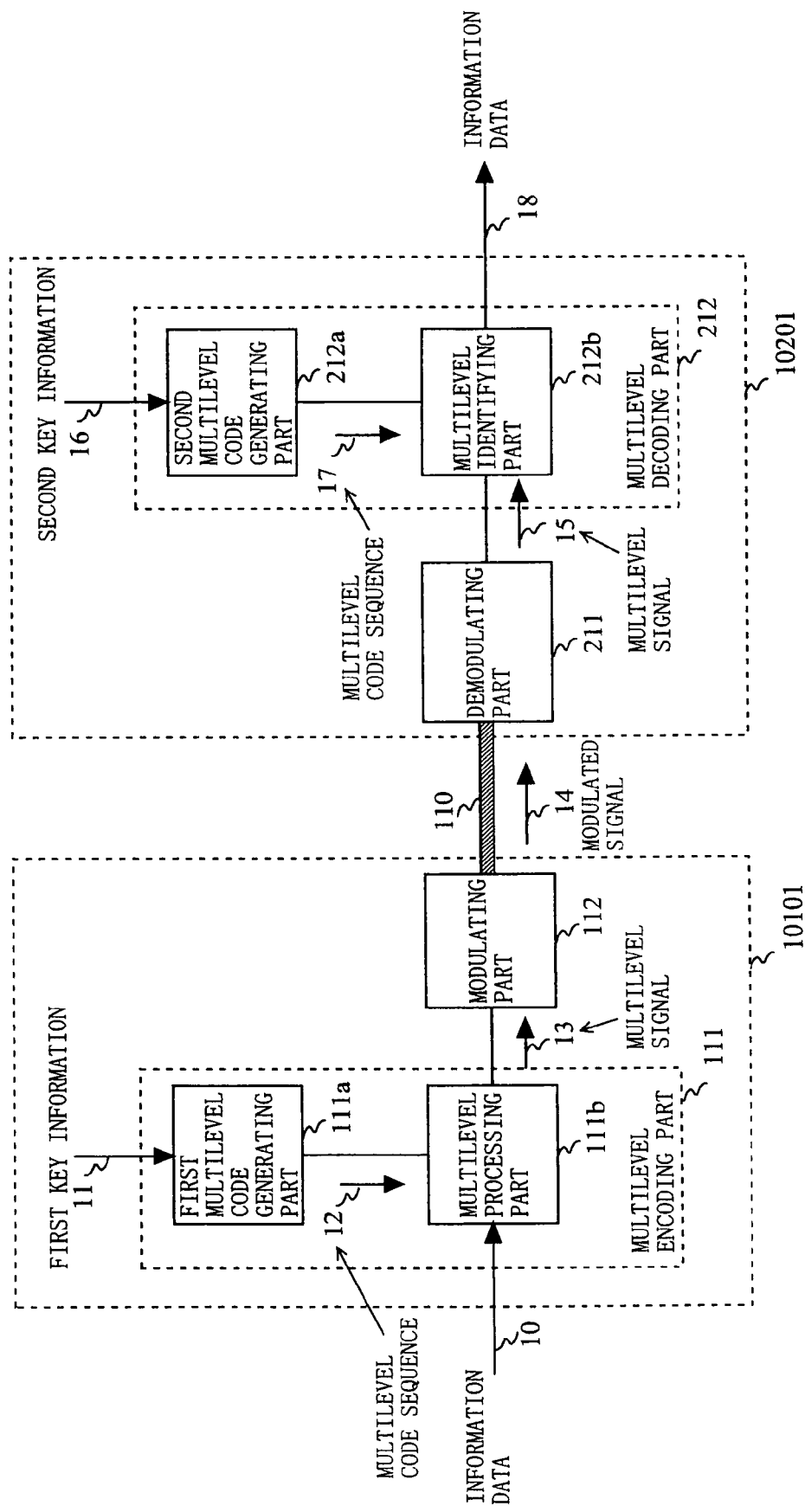
FIG. 1 is a block diagram showing a configuration of a data communication system according to a first embodiment of the present invention.

FIG. 1 is a block diagram showing a configuration of a data communication system according to a first embodiment of the present invention. In FIG. 1, the data communication system according to the first embodiment has a configuration that a data transmitting apparatus 10101 is connected to a data receiving apparatus 10201 via a transmission path 110. The data transmitting apparatus 10101 comprises a multilevel encoding part 111 and a modulating part 112. The multilevel encoding part 111 includes a first multilevel code generating part 111a and a multilevel processing part 111b. The data receiving apparatus 10201 comprises a demodulating part 211 and a multilevel decoding part 212. The multilevel decoding part 212 includes a second multilevel code generating part 212a and a multilevel identifying part 212b. The transmission path 110 may employ a metal line such as a LAN cable and a coaxial cable or alternatively an optical waveguide such as a fiber optical cable. Further, the transmission path 110 is not restricted to a wire cable such as a LAN cable, and may be a free space through which a radio signal can propagate.

Figure 2:
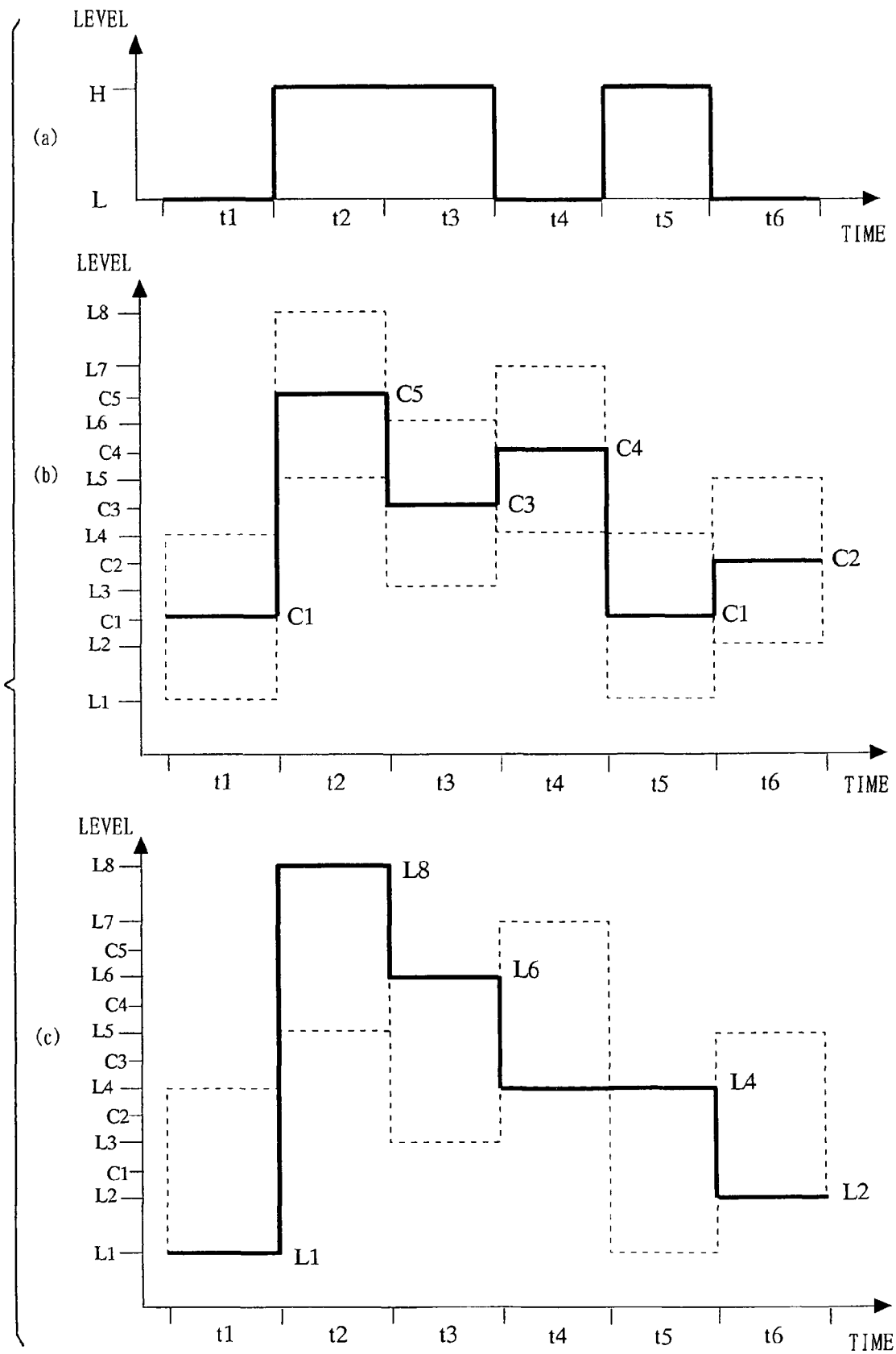
FIG. 2 is a schematic diagram describing a waveform of a transmission signal of a data communication system according to a first embodiment of the present invention.
Figure 3:
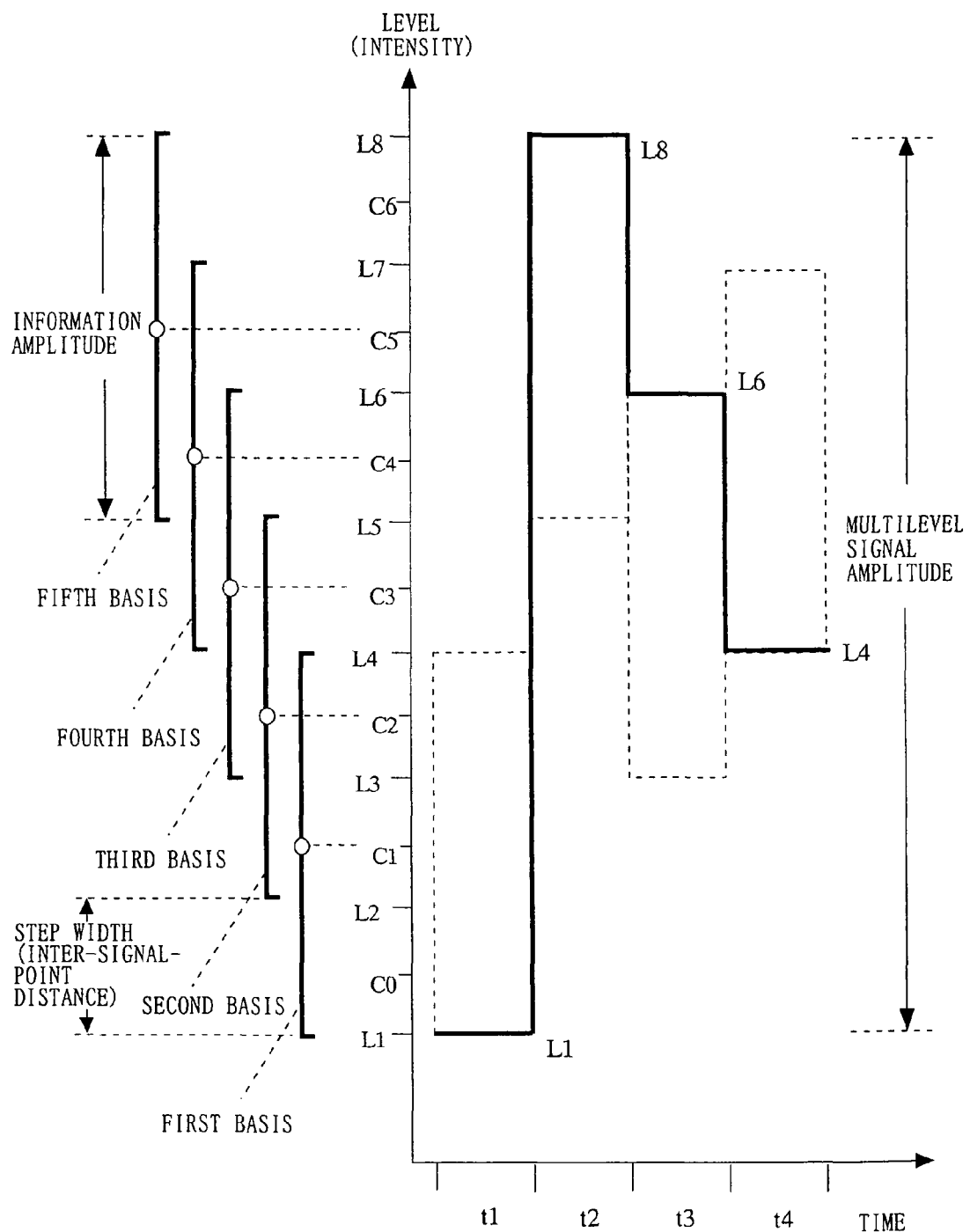
FIG. 3 is a schematic diagram describing a waveform of a transmission signal of a data communication system according to a first embodiment of the present invention.

FIGS. 2 and 3 are schematic diagrams describing the waveform of a modulated signal outputted from the modulating part 112. The operation of the data communication system according to the first embodiment is described below with reference to FIGS. 1 to 3.

On the basis of first predetermined key information 11 defined in advance, the first multilevel code generating part 111a generates a multilevel code sequence 12 (FIG. 2(*b*)) that varies in the signal level substantially in a random number manner. The multilevel processing part 111b receives the multilevel code sequence 12 (FIG. 2(*b*)) and information data 10 (FIG. 2(*a*)), and combines both signals in accordance with a predetermined procedure so as to generate a multilevel signal 13 (FIG. 2(c)) having a level uniquely corresponding to the combination of both signal levels. For example, when the level of the multilevel code sequence 12 varies like c1/c5/c3/c4 for time slots t1/t2/t3/t4, the multilevel processing part 111b adds the information data 10 with adopting this multilevel code sequence 12 as a bias level, so as to generate the multilevel signal 13 that varies in the level like L1/L8/L6/L4.

Here, as shown in FIG. 3, the amplitude of the information data 10 is referred to as the "information amplitude". The total amplitude of the multilevel signal 13 is referred to as the "multilevel signal amplitude". The sets (L1, L4)/(L2, L5)/(L3, L6)/(L4, L7)/(L5, L8) of the levels that can be taken by the multilevel signal 13 in correspondence to the levels c1/c2/c3/c4/c5 of the multilevel code sequence 12 are referred to as the first to the fifth "bases", respectively. The minimum inter-signal-point distance of the multilevel signal 13 is referred to as the "step width".

The modulating part 112 modulates the multilevel signal 13 in a predetermined modulation form, and transmits it as a modulated signal 14 to the transmission path 110. The demodulating part 211 demodulates the modulated signal 14 transmitted via the transmission path 110, and reproduces the multilevel signal 15. The second multilevel code generating part 212a shares, in advance, second key information 16 which is the same as the first key information 11. Then, on the basis of the second key information 16, the second multilevel code generating part 212a generates a multilevel code sequence 17 corresponding to the multilevel code sequence 12. With adopting the multilevel code sequence 17 as the thresholds, the multilevel identifying part 212b performs identification (binary determination) of the multilevel signal 15 and reproduces the information data 18. Here, the modulated signal 14 of a predetermined modulation form transmitted and received between the modulating part 112 and the demodulating part 211 via the transmission path 110 is obtained when electromagnetic waves (electromagnetic field) or light waves are modulated by the multilevel signal 13.

Here, as described above, in addition to the method of generating the multilevel signal 13 by addition processing between the multilevel code sequence 12 and the information data 10, the multilevel processing part 111b may generate the multilevel signal 13 by using any other method. For example, the multilevel processing part 111b may perform amplitude modulation on the levels of the multilevel code sequence 12 on the basis of the information data 10 so as to generate the multilevel signal 13. Alternatively, the multilevel processing part 111b may read serially the levels of the multilevel signal 13 corresponding to the combination of the information data 10 and the multilevel code sequence 12 from a memory storing in advance the levels of the multilevel signal 13, so as to generate the multilevel signal 13.

Further, in FIGS. 2 and 3, the levels of the multilevel signal 13 are represented as eight steps. However, the levels of the multilevel signal 13 are is not limited to this representation. Further, the information amplitude is represented as three times or an integer multiple of the step width of the multilevel signal 13. However, the information amplitude is not limited to this representation. The information amplitude may be any integer multiple of the step width of the multilevel signal 13, and need not be an integer multiple. Further, in relation to this, in FIGS. 2 and 3, each level of the multilevel code sequence 12 is arranged approximately at the center between the levels of the multilevel signal 13. However, each level of the multilevel code sequence 12 is not limited to this arrangement. For example, each level of the multilevel code sequence 12 need not be arranged approximately at the center between the levels of the multilevel signal 13, and may agree with each level of the multilevel signal 13. Further, in the description given above, it is premised that the multilevel code sequence 12 and the information data 10 have the same change rate with each other and are in a synchronized relation. However, the change rate of one of them may be faster (or slower) than the change rate of the other. Further, they may be asynchronous.

Wiretapping operation for the modulated signal 14 by a third person is described next. A third person serving as a wiretapper is expected to decrypt the modulated signal 14 by using a configuration similar to that of the data receiving apparatus 10201 owned by the authenticated receiving person or alternatively a data receiving apparatus of yet higher performance (a wiretapper data receiving apparatus). The wiretapper data receiving apparatus demodulates the modulated signal 14 and thereby reproduces the multilevel signal 15. However, the wiretapper data receiving apparatus does not share the key information with the data transmitting apparatus 10101, and hence cannot generate the multilevel code sequence 17 from the key information like in the data receiving apparatus 10201. Thus, the wiretapper data receiving apparatus cannot perform binary determination of the multilevel signal 15 on the basis of the multilevel code sequence 17.

Wiretapping operation adoptable in such a case is a method that identification is performed simultaneously on the entire levels of the multilevel signal 15 (referred to as a "brute force attack" in general). That is, the wiretapper data receiving apparatus prepares thresholds between all signal points that the multilevel signal 15 can take, then performs simultaneous determination of the multilevel signal 15, and analyzes the determination result so as to try to extract correct key information or information data. For example, the wiretapper data receiving apparatus adopts as the thresholds the levels c0/c1/c2/c3/c4/c5/c6 of the multilevel code sequence 12 shown in FIG. 2, and performs multilevel determination of the multilevel signal 15 so as to try to extract correct key information or information data.

Figure 4:
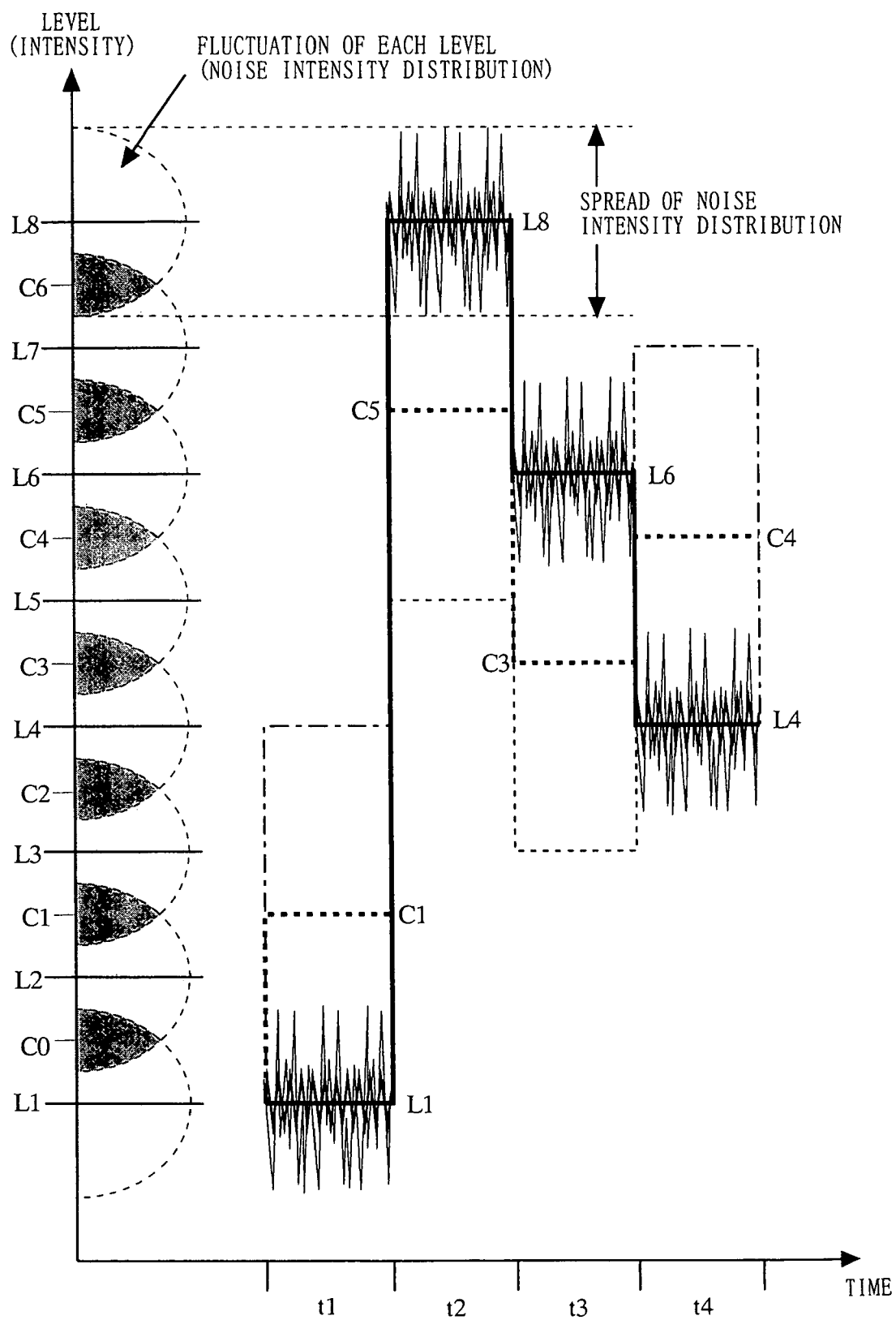
FIG. 4 is a schematic diagram describing transmission signal quality of a data communication system according to a first embodiment of the present invention.

Nevertheless, in the actual transmission system, noise occurs owing to various factors. Then, this noise is superimposed on the modulated signal 14, so that the levels of the multilevel signal 15 vary in time and instantaneously as shown in FIG. 4. In such a case, the SN ratio (signal-to-noise intensity ratio) of the to-be-determined signal (multilevel signal 15) to be determined by the authenticated receiving person (data receiving apparatus 10201) is determined by the ratio between the information amplitude and the noise amount of the multilevel signal 15. In contrast, the SN ratio of the to-be-determined signal (multilevel signal 15) to be determined by the wiretapper data receiving apparatus is determined by the ratio between the step width and the noise amount of the multilevel signal 15.

Thus, on condition that the noise level in the to-be-determined signal is the same, the SN ratio of the to-be-determined signal becomes smaller in the wiretapper data receiving apparatus than in the data receiving apparatus. That is, the transmission characteristics (error rate) degrades. Accordingly, using this characteristics, the data communication system can induce identification errors in the brute force attack using all thresholds by a third person, and thereby cause difficulty in the wiretapping. In particular, when the step width of the multilevel signal 15 is set up in the same order or smaller in comparison with the noise amplitude (spread of noise intensity distribution), the data communication system can bring the multilevel determination by the third person to be practically impossible, and can achieve ideal wiretapping prevention.

Here, when the modulated signal 14 is electromagnetic waves such as a radio signal, the noise superimposed on the to-be-determined signal (multilevel signal 15 or modulated signal 14) may be thermal noise (Gaussian noise) present in the space field, electronic parts and the like. When light waves are used, fluctuation (quantum noise) in the number of photons at the time of photon generation may be employed in addition to the thermal noise. In particular, a signal using quantum noise cannot be treated by signal processing such as recording and duplication. Thus, when the data communication system sets up the step width of the multilevel signal 15 with reference to the noise amount, wiretapping by a third person becomes impossible so that absolute security is ensured in the data communication.

As described above, according to the present embodiment, when the information data to be transmitted is encoded as a multilevel signal, the inter-signal-point distances of the multilevel signal are appropriately set up relative to the noise amount in such a manner that wiretapping by a third person should become impossible. As such, a security-improved data transmitting apparatus can be provided that imparts critical degradation to the received signal quality at the time of wiretapping by a third person, and causes difficulty in decryption and decoding of the multilevel signal by the third person.

Second Embodiment

Figure 5:
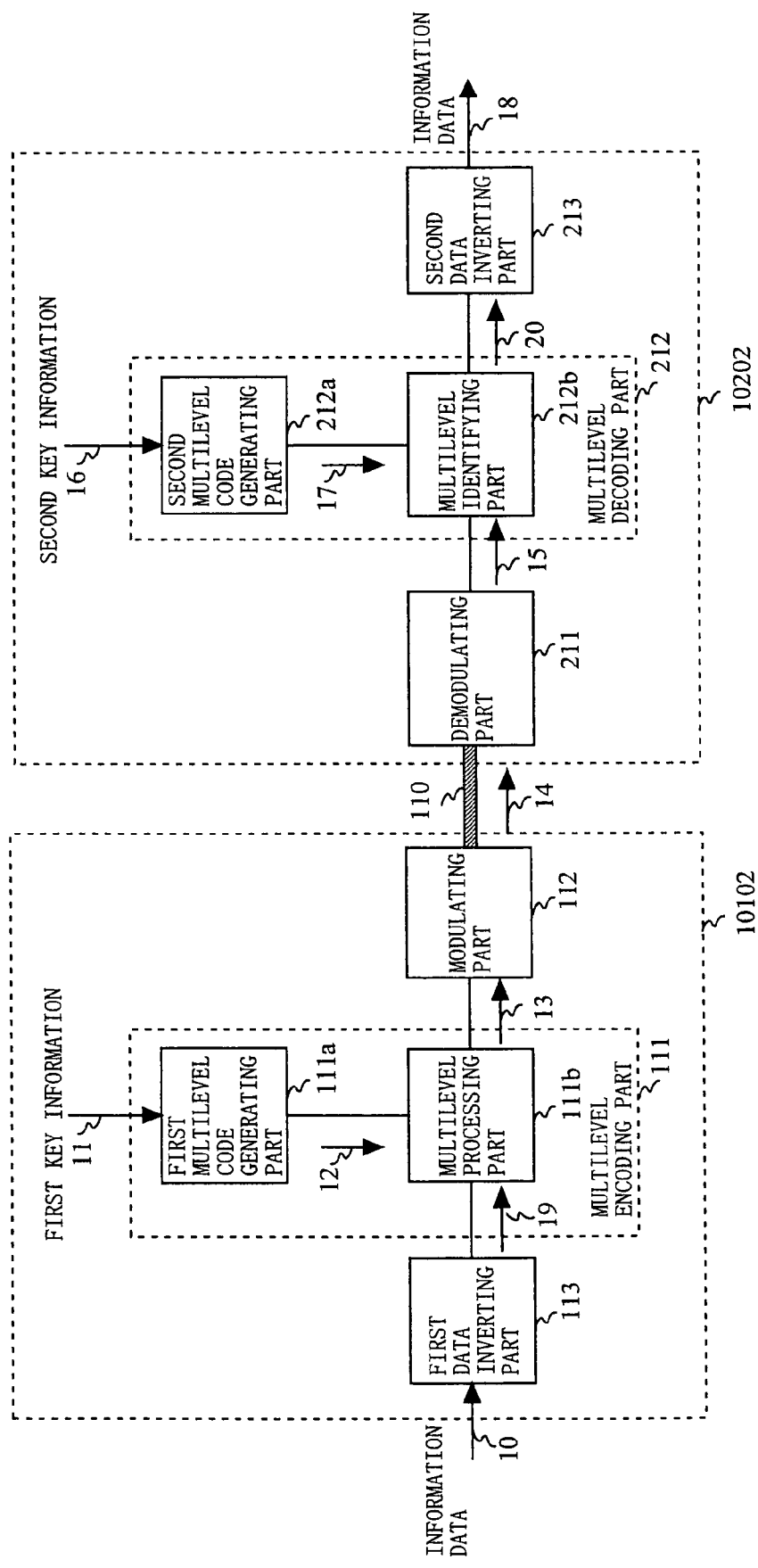
FIG. 5 is a block diagram showing a configuration of a data communication system according to a second embodiment of the present invention.

FIG. 5 is a block diagram showing a configuration of a data communication system according to a second embodiment of the present invention. In FIG. 5, in comparison with the data communication system (FIG. 1) according to the first embodiment, in the data communication system according to the second embodiment, the data transmitting apparatus 10102 further comprises a first data inverting part 113 while the data receiving apparatus 10202 further comprises a second data inverting part 213. The data communication system according to the second embodiment is described below. Here, the configuration of the present embodiment is similar to that of the first embodiment (FIG. 1). Thus, blocks that perform the same operation as the first embodiment are designated by the same reference numerals, and their description is omitted.

The first data inverting part 113 does not fix the correspondence relation between "0/1" in the information data 10 shown in FIG. 2(a) and "Low/High", and changes the correspondence relation approximately at random by a predetermined procedure. For example, similarly to the multilevel encoding part 111, the first data inverting part 113 performs arithmetic operation of exclusive logical sum (Exclusive OR) between a random number sequence (pseudo-random number sequence) generated on the basis of a predetermined initial value and the information data 10, and outputs the arithmetic operation result to the multilevel encoding part 111. For the data outputted from the multilevel decoding part 212, the second data inverting part 213 changes the correspondence relation between "0/1" and "Low/High" by a procedure inverse to that of the first data inverting part 113. For example, the second data inverting part 213 shares the same initial value as the initial value owned by the first data inverting part 113, and performs arithmetic operation of exclusive logical sum between a random bit flipping sequence generated on the basis of this and the data outputted from the multilevel decoding part 212, so as to reproduce the arithmetic operation result as the information data 18.

As described above, according to the present embodiment, the information data to be transmitted is reversed approximately at random, so that complexity as encryption in the multilevel signal is increased. This causes further difficulty in decryption and decoding of the multilevel signal by a third person, so that a security data communication system can be provided.

Third Embodiment

Figure 6:
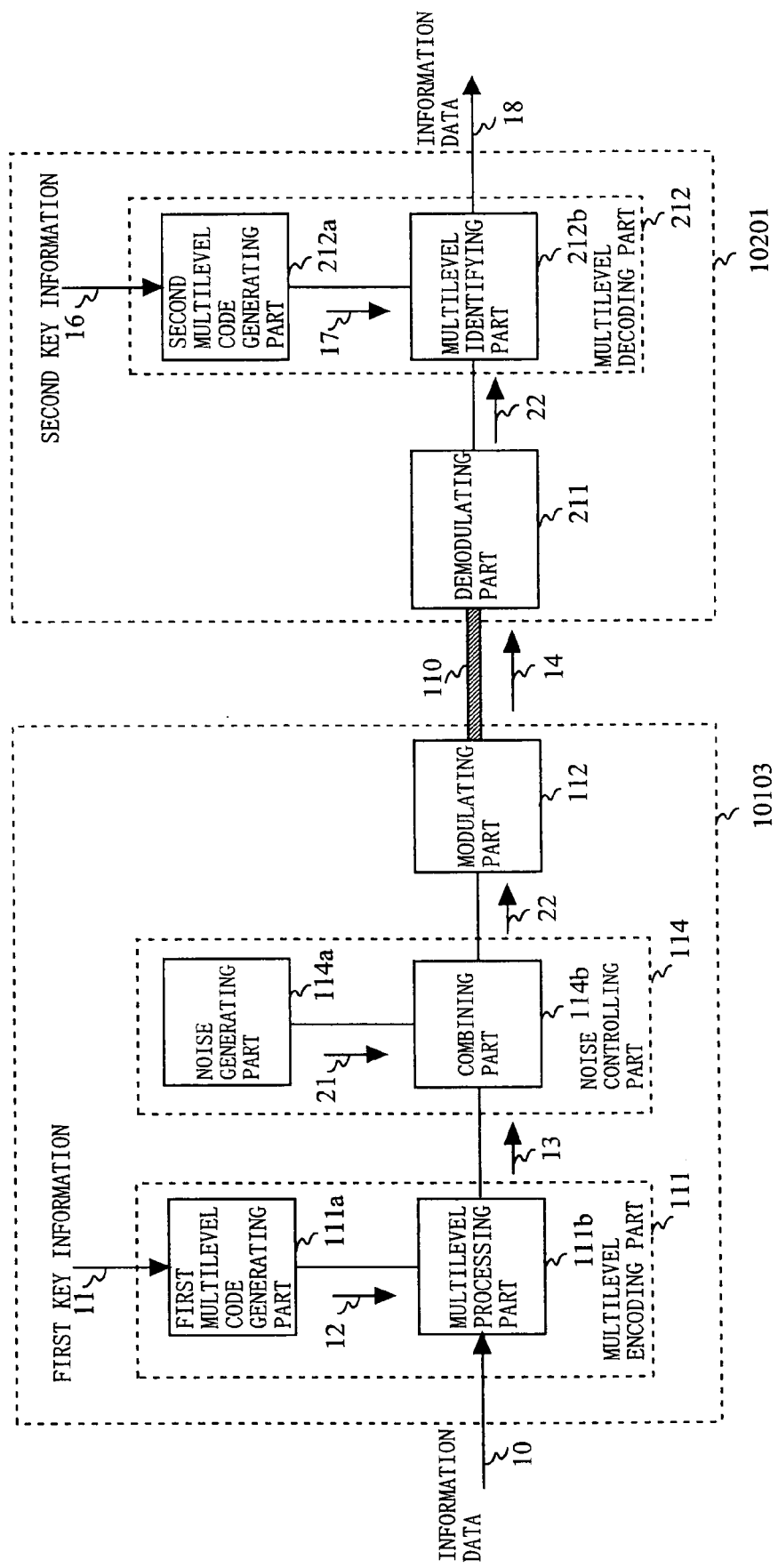
FIG. 6 is a block diagram showing a configuration of a data communication system according to a third embodiment of the present invention.

FIG. 6 is a block diagram showing a configuration of a data communication system according to a third embodiment of the present invention. In FIG. 6, in comparison with the data communication system (FIG. 1) according to the first embodiment, in the data communication system according to the third embodiment, the data communication system 10103 further comprises a noise controlling part 114. The noise controlling part 114 includes a noise generating part 114a and a combining part 114b. The data communication system according to the third embodiment is described below. Here, the configuration of the present embodiment is similar to that of the first embodiment (FIG. 1). Thus, blocks that perform the same operation as the first embodiment are designated by the same reference numerals, and their description is omitted.

The noise generating part 114a generates predetermined noise. The combining part 114b combines the multilevel signal 13 and noise, and outputs it to the modulating part 112. That is, the noise controlling part 114 intentionally generates level fluctuation in the multilevel signal 13 described with reference to FIG. 4, and controls the SN ratio of the multilevel signal 13 into an arbitrary value. Here, as described above, the noise generated by the noise generating part 114a is thermal noise, quantum noise, or the like. Further, the multilevel signal in which noise is combined (superimposed) is referred to as a noise superimposed multilevel signal.

As described above, according to the present embodiment, information data to be transmitted is encoded as a multilevel signal, and the SN ratio of the encoded multilevel signal is controlled arbitrarily. As such, a security-improved data transmitting apparatus can be provided that imparts critical degradation to the received signal quality at the time of wiretapping by a third person, and causes yet further difficulty in decryption and decoding of the multilevel signal by the third person.

Fourth Embodiment

Figure 7:
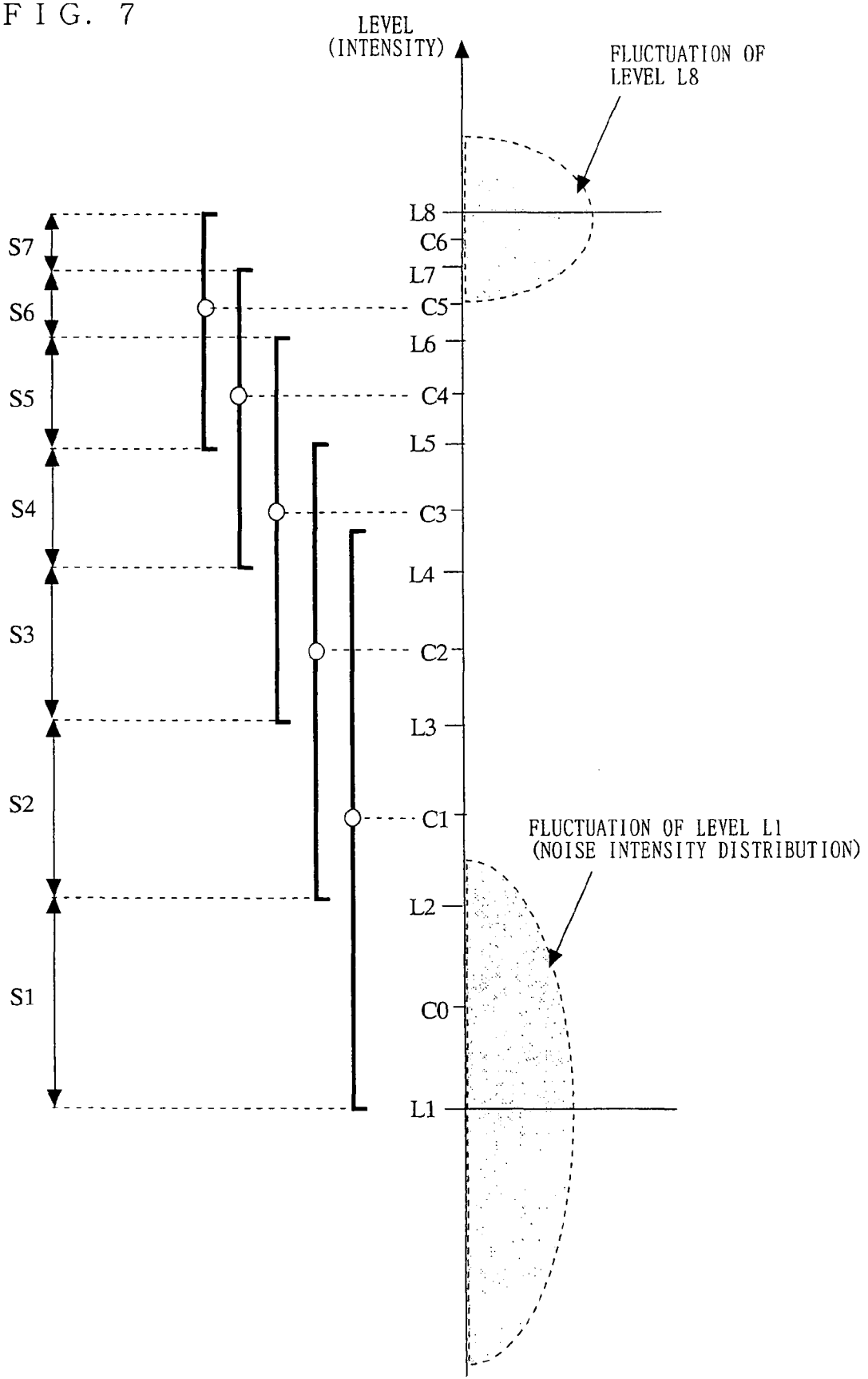
FIG. 7 is a schematic diagram describing a transmission signal parameter of a data communication system according to a fourth embodiment of the present invention.

FIG. 7 is a schematic diagram describing a transmission signal parameter of a data communication system according to a fourth embodiment of the present invention. The data communication system according to the fourth embodiment has a configuration similar to that of the first embodiment (FIG. 1) or the third embodiment (FIG. 6). The data communication system according to the fourth embodiment of the present invention is described below with reference to FIG. 7.

Referring to FIG. 1 or 6, the multilevel encoding part 111 sets up each step width (S1 to S7) of the multilevel signal 13 in accordance with the fluctuation amount of each level (that is, noise intensity distribution superimposed on each level) as shown in FIG. 7. Specifically, the multilevel encoding part 111 distributes the inter-signal-point distances in such a manner that the SN ratios between two adjacent signal points of the to-be-determined signal (that is, the multilevel signal 15) inputted to the multilevel identifying part 212b should be approximately homogeneous. Here, when the noise amount superimposed on each level of the multilevel signal 15 is the same, the multilevel encoding part 111 sets up each step width to be the same.

In general, as for the modulated signal 14 outputted from the modulating part 112, when a light intensity modulated signal is assumed to be obtained when a semiconductor laser (LD) is employed as the light source, the fluctuation width (noise amount) of the modulated signal 14 varies depending on the levels of the multilevel signal 13 inputted to the LD. This is because the LD emits light on the basis of the principle of induced emission using spontaneous emission light as "seed light". The noise amount is defined as the relative ratio of the amount of spontaneous emission light to the amount of induced emission light. Here, with increasing excitation rate (corresponding to the bias current injected into the LD), the ratio of the amount of induced emission light increases so that the noise amount decreases. On the contrary, with decreasing excitation rate, the ratio of the amount of spontaneous emission light increases so that the noise amount increases. Thus, as shown in FIG. 7, the multilevel encoding part 111 sets up the step width to be large in a region where the level of the multilevel signal is small, and sets up the step width to be small in a region where the level of the multilevel signal is large (that is, nonlinearly). As a result, the SN ratios between adjacent signal points of the to-be-determined signal are set up to be approximately homogeneous.

Further, also when a light modulated signal is used as the modulated signal 14, on condition that the above-mentioned noise by spontaneous emission light and the thermal noise used in the optical receiver are sufficiently small, the SN ratio of the received signal is determined mainly by shot noise. With this condition, the noise amount contained in the multilevel signal increases with increasing levels of the multilevel signal. Thus, on the contrary to the case of FIG. 7, the multilevel encoding part 111 sets up the step width to be small in a region where the level of the multilevel signal is small, and sets up the step width to be large in a region where the level of the multilevel signal is large. As a result, the SN ratios between adjacent signal points of the to-be-determined signal are set up to be approximately homogeneous.

As described above, according to the present embodiment, when the information data to be transmitted is encoded as a multilevel signal, the inter-signal-point distances of the multilevel signal are set up in such a manner that the SN ratios between adjacent signal points of the to-be-determined signal should be approximately homogeneous. As such, a security-improved data transmitting apparatus can be provided that imparts critical degradation to the received signal quality at the time of wiretapping by a third person, and causes yet further difficulty in decryption and decoding of the multilevel signal by the third person.

Fifth Embodiment

Figure 8:
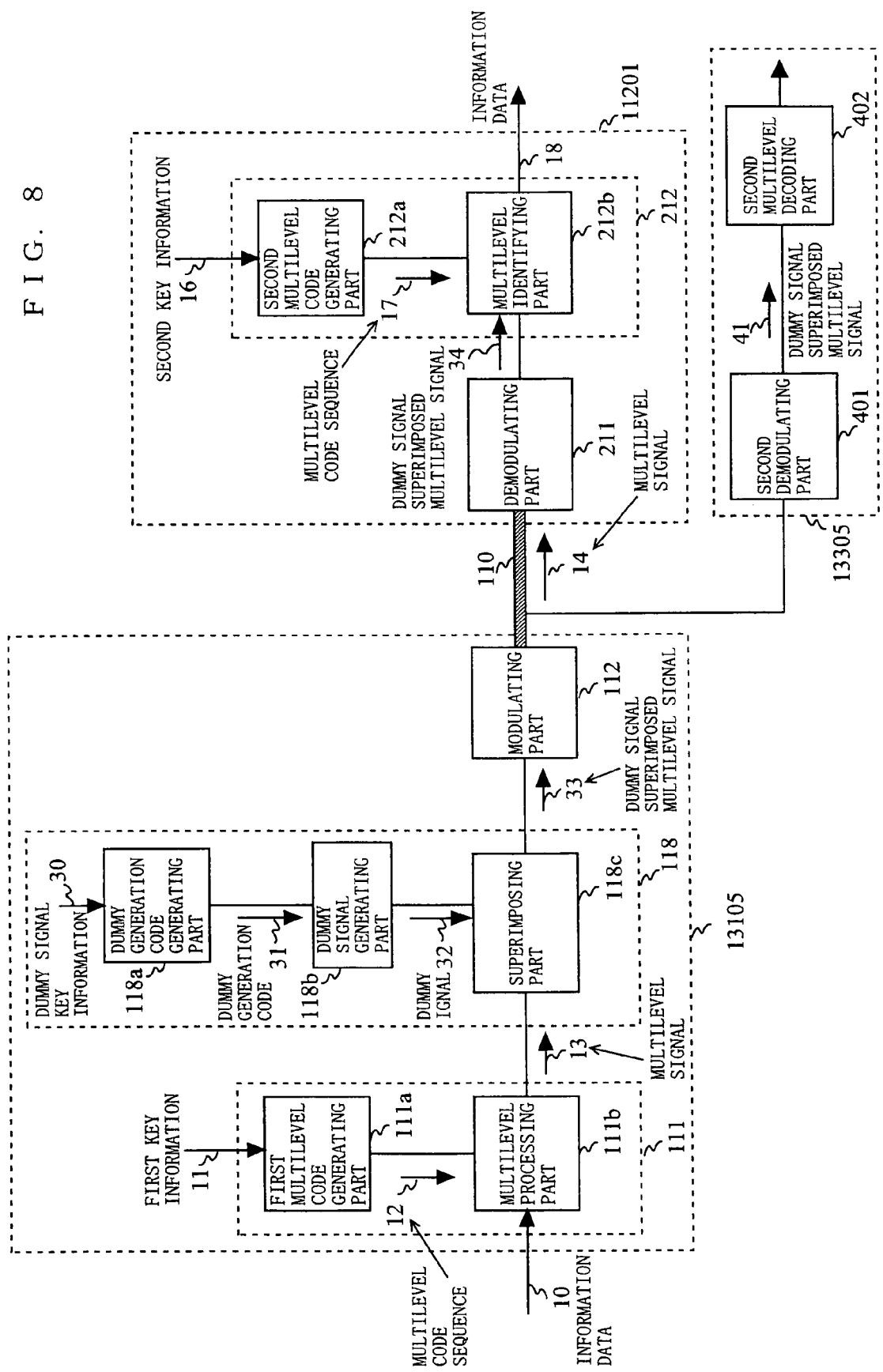
FIG. 8 is a block diagram showing a configuration of a data communication system according to a fifth embodiment of the present invention.

FIG. 8 is a block diagram showing a configuration of a data communication system according to a fifth embodiment of the present invention. In FIG. 8, in comparison with the data communication system (FIG. 1) according to the first embodiment, in the data communication system according to the fifth embodiment, the data communication system 13105 further comprises a dummy signal superimposing part 118. The dummy signal superimposing part 118 includes a dummy generation code generating part 118a, a dummy signal generating part 118b and a superimposing part 118c. Here, the configuration of the present embodiment is similar to that of the first embodiment (FIG. 1). Thus, blocks that perform the same operation as the first embodiment are designated by the same reference numerals, and their description is omitted. In the following description, the "inter-signal-point distance" indicates a level difference between an arbitrary signal level possible in the multilevel signal or the multilevel code sequence and its adjacent signal level.

Further, in FIG. 8, shows a second data receiving apparatus 13305 for the purpose of describing wiretapping operation by a third person. The second data receiving apparatus 13305 comprises a second demodulating part 401 and a second multilevel decoding part 402. However, the second data receiving apparatus 13305 is a configuration necessary for describing the wiretapping operation by a third person, and is not a configuration necessary in the data communication system of the present invention.

The dummy signal superimposing part 118 superimposes a dummy signal 32 on a multilevel signal 13 inputted from the multilevel processing part 111b. The dummy signal is a signal superimposed on the multilevel signal 13 in order that difficulty should be caused in determination of the levels of the multilevel signal 13 by a third person. In the dummy signal superimposing part 118, dummy signal key information 30 is inputted to the dummy generation code generating part 118a. The dummy generation code generating part 118a generates a dummy generation code 31 from the dummy signal key information 30, and outputs it to the dummy signal generating part 118b. The dummy signal generating part 118b outputs a dummy signal 32 corresponding to the value of the dummy generation code 31. The superimposing part 118c superimposes the multilevel signal 13 and the dummy signal 32, and outputs a dummy signal superimposed multilevel signal 33 to the modulating part 112.

Figure 9:
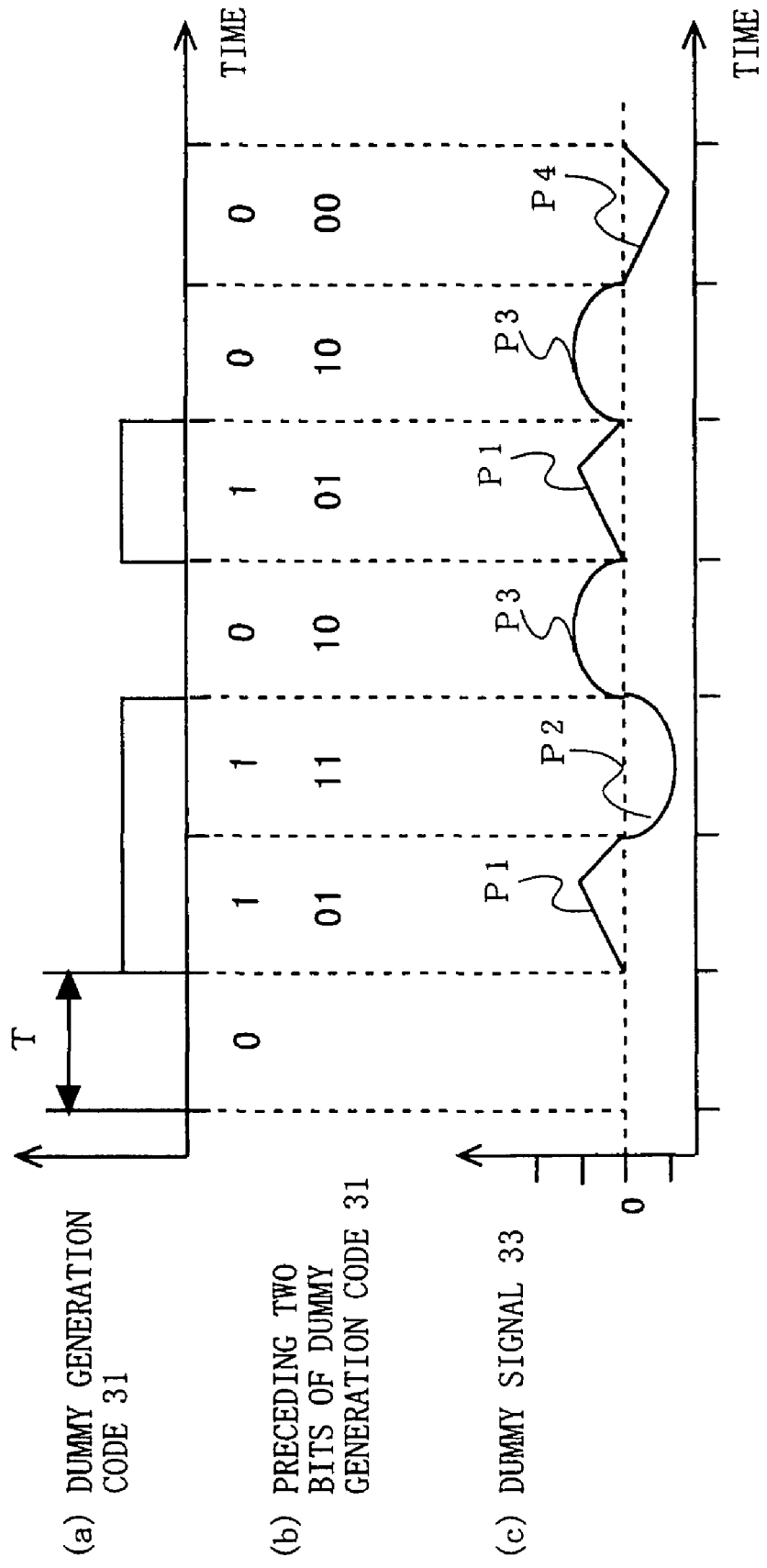
FIG. 9 is a diagram describing detailed operation of a dummy signal superimposing part 118.

An example of operation of the dummy signal superimposing part 118 is described below with reference to FIG. 9. FIG. 9(a) is a diagram showing an example of a dummy generation code 31 outputted from the dummy generation code generating part 118a. The dummy generation code generating part 118a generates a dummy generation code 31 as shown in FIG. 9(a) from the inputted dummy signal key information 30, and outputs the dummy generation codes 31 to the dummy signal generating part 118b in a bit-by-bit manner in synchronization with one time slot T of the multilevel signal 13.

The dummy signal generating part 118b holds a plurality of signals (each referred to as a "hold signal", hereinafter) having a different amplitude change pattern corresponding to the length of one time slot of the multilevel signal 13. The hold signal continuously varies in the amplitude. Further, the amplitude of each hold signal is assumed to be larger than the inter-signal-point distance of the multilevel signal 13 and sufficiently smaller than the information amplitude of the multilevel signal 13. Further, the average level of the amplitude of a hold signal has a value mutually different from the average level of the other signals. In the present embodiment, the number of amplitude change patterns of the hold signal are four, that is, P1 to P4 shown in FIG. 9(c). Here, the number of amplitude change patterns of the hold signal need not be four.

The dummy signal generating part 118b outputs a dummy signal corresponding to the value of the inputted dummy generation code 31. The dummy signal generating part 118b establishes correspondence between a 2-bit signal value and the hold signal. The dummy signal generating part 118b outputs as the dummy signal 32 a hold signal corresponding to the preceding 2-bit value of the inputted dummy generation code 31. For example, when the preceding 2-bit value of the dummy generation code 31 of FIG. 9(b) is "01", the dummy signal generating part 118b outputs as the dummy signal 32 the hold signal P1 shown in FIG. 9(c). Here, in the dummy signal 32, in order that a third person should be prevented from decrypting the appearance pattern of the dummy signal 32, it is preferable that the dummy generation code 31 is pseudo-random numbers, natural random numbers or the like. Further, the correspondence relation between the dummy generation code 31 and the hold signal need not be the relation shown in FIG. 9. The superimposing part 118c superimposes the dummy signal 32 on the inputted multilevel signal 13, and outputs a multilevel signal 33.

Figure 10:
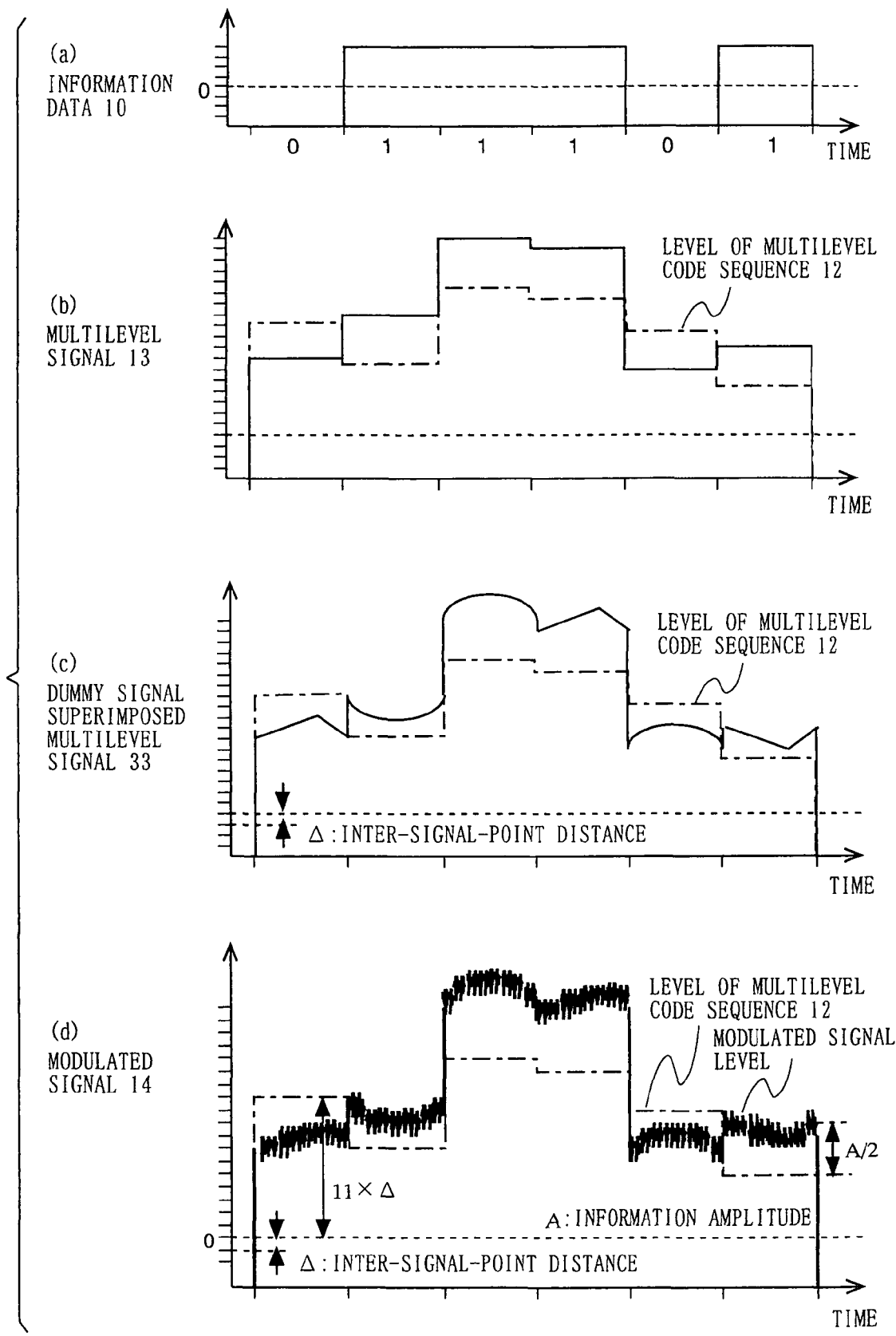
FIG. 10 is a diagram showing correspondence relation between information data 10, a multilevel signal 13 and a modulated signal 14 in a data communication system according to a fifth embodiment of the present invention.

FIG. 10 is a diagram showing the correspondence relation between the information data 10, the multilevel signal 13, the dummy signal superimposed multilevel signal 33 and the modulated signal 14 in the data transmitting apparatus 13105. FIG. 10(a) is a diagram showing an example of information data 10 inputted to the multilevel processing part 111b. FIG. 10(b) is a diagram showing a multilevel signal 13 outputted from the multilevel processing part 111b. FIG. 10(c) is a diagram showing a dummy signal superimposed multilevel signal 33. FIG. 10(d) is a diagram showing a modulated signal 14.

The multilevel processing part 111b performs addition processing between the information data 10 shown in FIG. 10(a) and the multilevel code sequence 12, and outputs the multilevel signal 13 shown in FIG. 10(b). Here, the multilevel processing part 111b may perform addition processing between information data 10 generated by reversing the code of the information data 10 and the multilevel code sequence 12. Further, after the amplitude of the information data 10 is adjusted, addition processing may be performed with the multilevel code sequence 12. In the dummy signal superimposing part 118, the superimposing part 118c superimposes the multilevel signal 13 and the dummy signal 32, and outputs the dummy signal superimposed multilevel signal 33 as shown in FIG. 10(c) to the modulating part 112.

The modulating part 112 converts the dummy signal superimposed multilevel signal 33 into a signal form appropriate for the transmission path 110, and transmits the modulated signal 14 to the transmission path 110. For example, when the transmission path 110 is an optical transmission path, the modulating part 112 converts the dummy signal superimposed multilevel signal 33 into an optical signal. In the modulating part 112, when the dummy signal superimposed multilevel signal 33 is modulated into the modulated signal 14, a noise signal such as thermal noise and quantum noise is further superimposed on the modulated signal 14. Thus, the modulated signal 14 has a waveform as shown in FIG. 10(d).

The operation of the data receiving apparatus 11201 is described below. The modulated signal 14 inputted via the transmission path 110 is demodulated into a dummy signal superimposed multilevel signal 34 by the demodulating part 211. The dummy signal superimposed multilevel signal 34 is inputted to the multilevel identifying part 212b. As shown in FIG. 10(d), the amplitude of the dummy signal component in the dummy signal superimposed multilevel signal 34 is sufficiently smaller than the information amplitude of the multilevel signal 15, and does not exceed the multilevel identification level (the level of the multilevel code sequence 12) of the multilevel signal 15. Thus, almost without influence of the dummy signal component, the multilevel identifying part 212b can perform binary determination of the dummy signal superimposed multilevel signal 34 and decode it into the information data 18. Thus, in the data receiving apparatus 11201, the dummy signal component need not be removed from the dummy signal superimposed multilevel signal 34. The multilevel identifying part 212b can perform binary determination of the dummy signal superimposed multilevel signal 34 in a state that the dummy signal component is superimposed. Thus, in addition to a pseudo-random number sequence which can be generated artificially, the dummy signal key information 30 may be natural random numbers which are perfect random numbers which cannot be generated artificially.

A situation is considered that a third person wiretaps the modulated signal 14 by using the second data receiving apparatus 13305. In the second demodulating part 401, the third person demodulates the modulated signal 14 into the dummy signal superimposed multilevel signal 33. Then, the third person tries binary determination from the dummy signal superimposed multilevel signal 41. However, the third person does not share the first key information 11 with the data transmitting apparatus 13105. Thus, the third person cannot achieve the binary determination of the multilevel signal 13 on the basis of the first key information. Thus, the third person tries multilevel determination by a method that the second multilevel decoding part 402 determines all the signal levels that can be taken by the dummy signal superimposed multilevel signal 41. When the signal levels of the multilevel signal 13 are acquired accurately, the third person can decrypt the first key information 11 by brute force attack.

Nevertheless, as shown in FIG. 10(c), in the dummy signal superimposed multilevel signal 41, a dummy signal is superimposed that has an amplitude larger than the inter-signal-point distance of the multilevel signal. Thus, the second multilevel decoding part 402 cannot achieve multilevel determination of the accurate levels of the multilevel signal 13 from the dummy signal superimposed multilevel signal 41. Thus, the third person also cannot decrypt the first key information 11, and cannot decode the information data 10 from the intercepted modulated signal 14.

As described above, according to the present embodiment, a plurality of dummy signals having an average amplitude larger than the inter-signal-point distance of the multilevel signal and having an amplitude smaller than the information amplitude of the multilevel signal are superimposed on the multilevel signal to be transmit. As such, a security-improved data transmitting apparatus can be provided that imparts critical degradation to the received signal quality at the time of wiretapping by a third person, and causes difficulty in decryption and decoding of the multilevel signal by the third person.

Here, the duration of the dummy signal may be set up longer than the one time slot of the multilevel signal 13. In this case, even when the dummy signal is a single kind, an effect similar to the above-mentioned one is obtained. In this case, the dummy generation code generating part 118a is unnecessary.

Further, the difference of the average level of the amplitude of the dummy signal 32 may be larger than the inter-signal-point distance of the multilevel signal 13. When the difference of the average level of the amplitude of the dummy signal 32 is set up larger than the inter-signal-point distance of the multilevel signal 13, the amplitude of the dummy signal 32 superimposed on the multilevel signal 13 varies at random with a value larger than the inter-signal-point distance. This increases the effect of preventing the multilevel determination by the third person.

Figure 11:
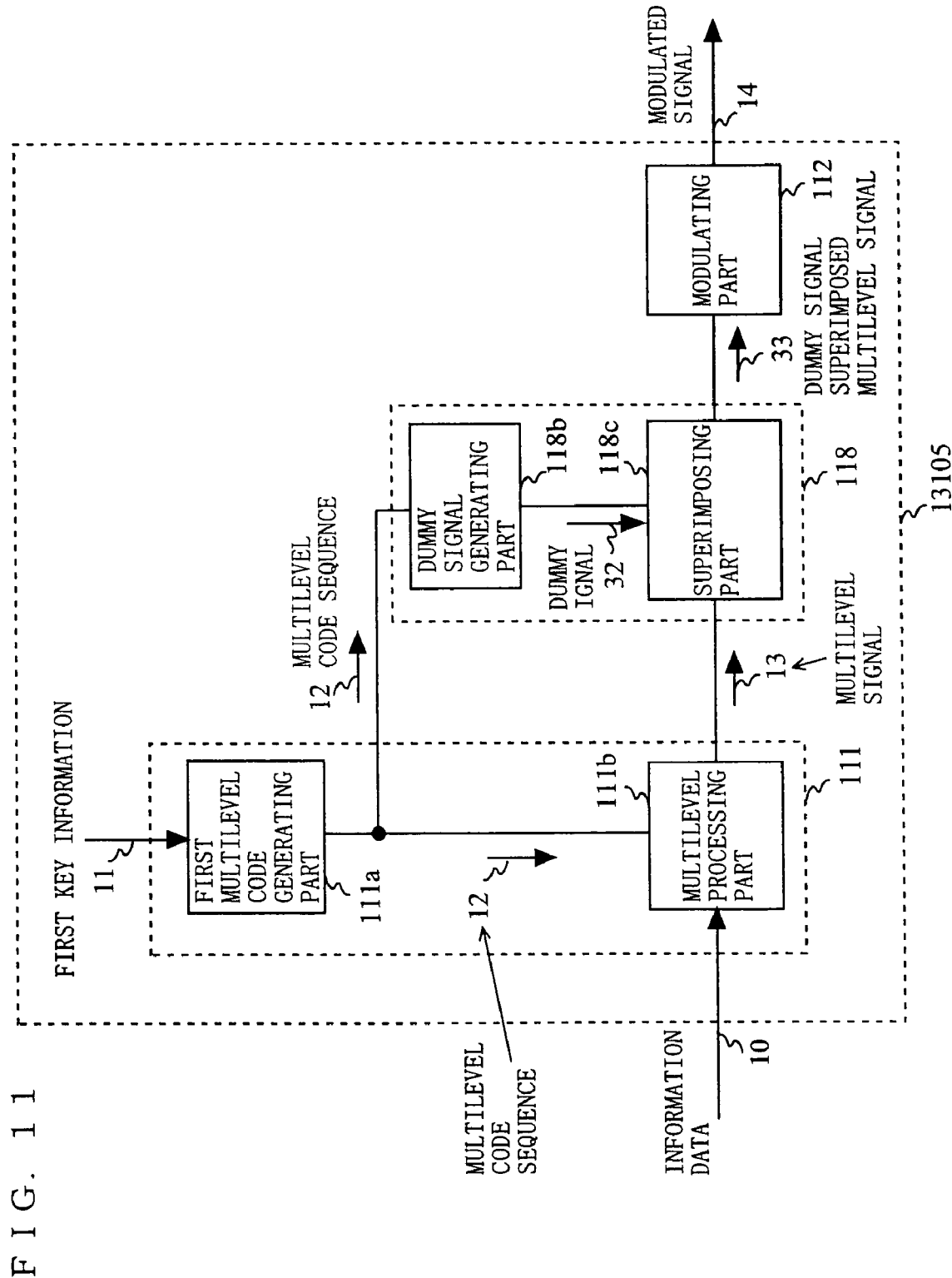
FIG. 11 is a diagram showing another configuration of a data transmitting apparatus 13105 in a data communication system according to a fifth embodiment of the present invention.

Further, as shown in FIG. 11, the dummy signal superimposing part 118 may have a configuration that the dummy generation code generating part 118a is not included. In this case, the multilevel code sequence 12 is inputted to the dummy signal generating part 118b. The dummy signal generating part 118b establishes correspondence between each value of the inputted multilevel code sequence 12 and the kind of the dummy signal, and outputs a dummy signal 32.

Figure 12:
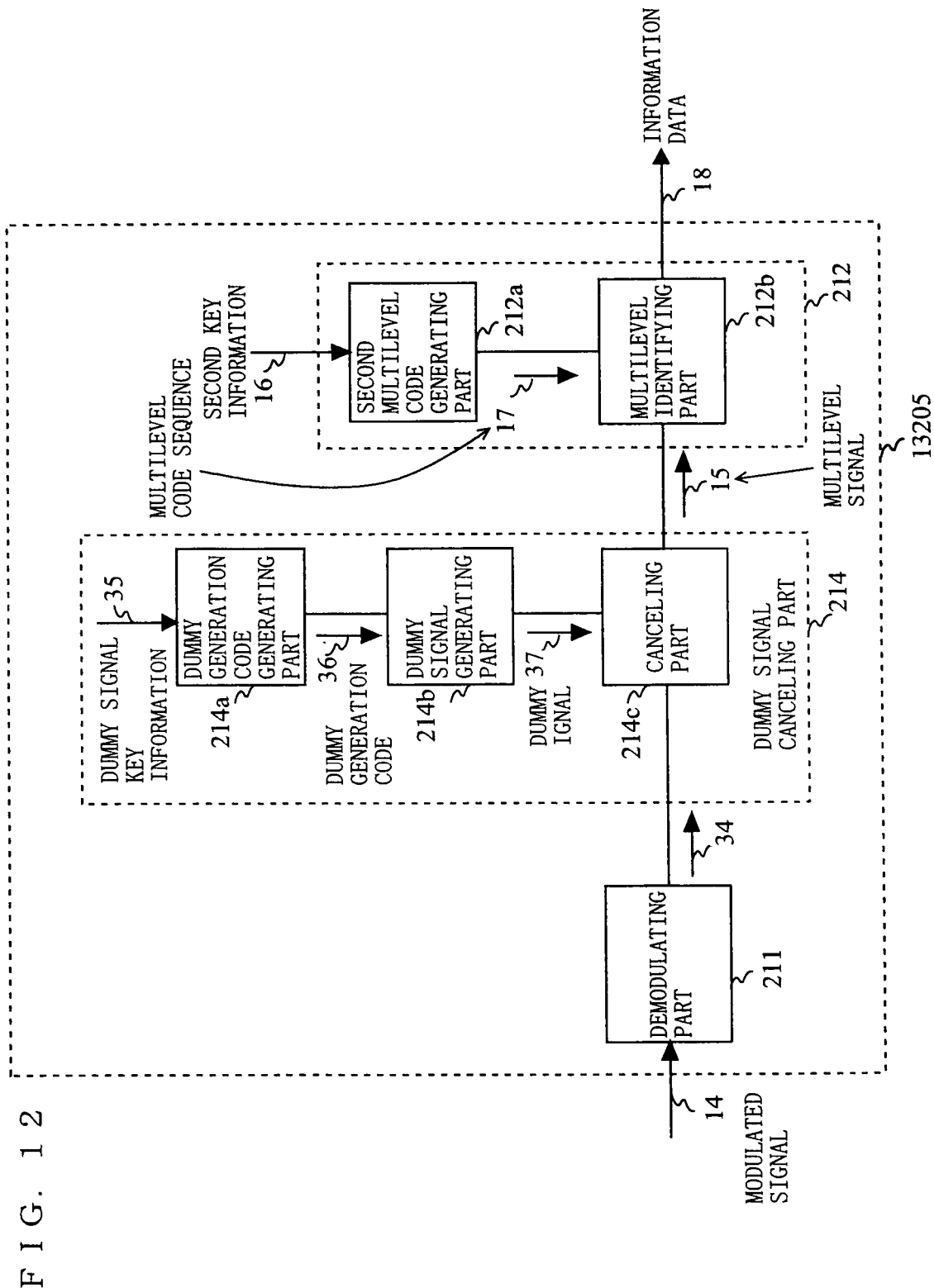
FIG. 12 is a block diagram showing a configuration of a data receiving apparatus 13205 in a data communication system according to a fifth embodiment of the present invention.

Further, the data communication system shown in FIG. 8 may employ a data receiving apparatus 13205 shown in FIG. 12 in place of the data receiving apparatus 11201. The data receiving apparatus 13205 shown in FIG. 12 has a configuration that a dummy signal canceling part 214 is further provided in the data receiving apparatus 11201 shown in FIG.

1. The dummy signal canceling part 214 is installed between the demodulating part 211 and the multilevel identifying part 212b. The dummy signal canceling part 214 includes a second dummy generation code generating part 214a, a second dummy signal generating part 214b and a canceling part 214c. The operation of the second dummy generation code generating part 214a is the same as the operation of the dummy generation code generating part 118a. Further, the operation of the second dummy signal generating part 214b is the same as the operation of the dummy signal generating part 118b. The second dummy generation code generating part 214a outputs a dummy generation code 36 on the basis of dummy signal key information 35 which is the same as the dummy signal key information 30 of the data transmitting apparatus 13105. The second dummy signal generating part 214b generates a dummy signal 37. The canceling part 214c cancels with the generated dummy signal 37 and the dummy signal component contained in the dummy signal superimposed multilevel signal 34 outputted from the demodulating part 211, and outputs a multilevel signal 15 to the multilevel identifying part 212b.

Since the dummy signal canceling part 214 cancels the dummy signal component of the dummy signal superimposed multilevel signal 34, in the data transmitting apparatus 13105, the dummy signal superimposing part 118 is allowed to superimpose a dummy signal having a large amplitude not restricted by the information amplitude of the multilevel signal 13. This increases the effect of preventing the multilevel determination by the third person. Nevertheless, when the dummy signal canceling part 214 shown in FIG. 12 is used, the dummy signal key information used in the data transmitting apparatus and the data receiving apparatus is a pseudorandom number sequence which can be generated artificially, in place of natural random numbers.

Sixth Embodiment

Figure 13:
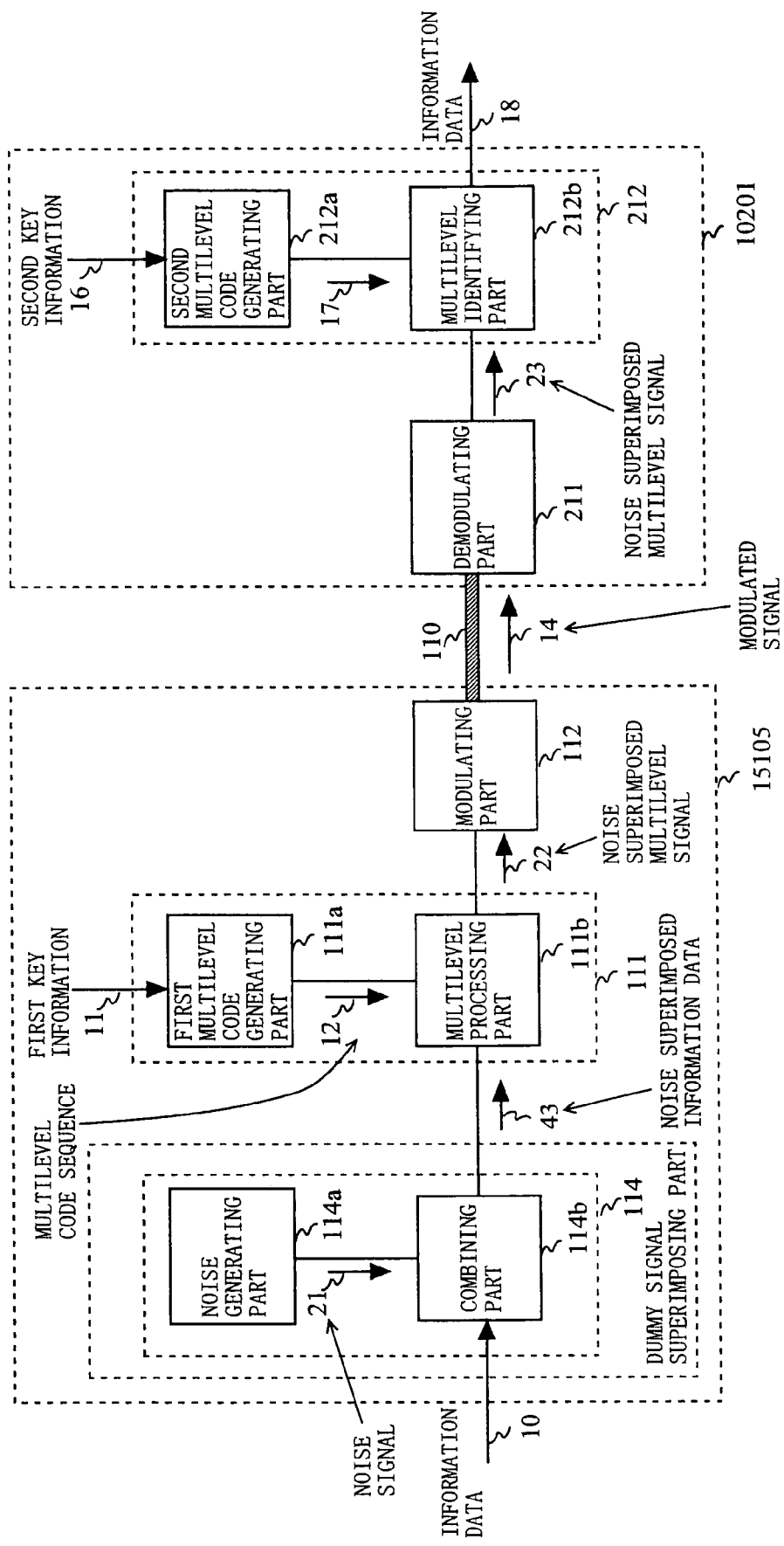
FIG. 13 is a block diagram showing a configuration of a data communication system according to a sixth embodiment of the present invention.

FIG. 13 is a block diagram showing a configuration of a data communication system according to a sixth embodiment of the present invention. In FIG. 13, in comparison with the data communication system (FIG. 6) according to the third embodiment, in the data communication system according to the sixth embodiment, the position of the noise controlling part 114 provided in the data communication system 15105 is different. The data communication system according to the sixth embodiment is described below with focusing attention on this difference. Here, the configuration of the present embodiment is similar to that of the third embodiment (FIG. 6). Thus, blocks that perform the same operation as the third embodiment are designated by the same reference numerals, and their description is omitted.

In the data transmitting apparatus 15105, the noise generating part 114a generates a noise signal 21 which is predetermined noise. The combining part 114b combines the information data 10 and the noise signal 21, and outputs a noise superposed information data 43. That is, the noise controlling part 114 imparts level fluctuation to the information data 10, and controls arbitrarily the noise amount of the information data 10. The multilevel processing part 111b generates a multilevel signal by using the noise superposed information data 43 and the multilevel code sequence 12. At that time, the multilevel signal generated by the multilevel processing part 111b becomes a noise superimposed multilevel signal 22 in which level fluctuation is generated as shown in FIG. 4. Here, the noise generated by the noise generating part 114a is thermal noise, quantum noise, or the like. The modulating part 112 transmits to the transmission path 110 the modulated signal 14 generated by modulating the noise superimposed multilevel signal 22.

In the data receiving apparatus 10201, the demodulating part 211 demodulates the modulated signal 14 transmitted via the transmission path 110, and outputs a noise superimposed multilevel signal 23. The multilevel identifying part 212b performs binary determination of the noise superimposed multilevel signal 23, and reproduces the information data 18. As such, in the present embodiment, the data transmitting apparatus 15105 generates a multilevel signal by using the noise superposed information data 43 in which the noise signal 21 is superimposed on the information data 10. By virtue of this, the data transmitting apparatus 15105 controls the SN ratio of the noise superimposed multilevel signal 23 (to-be-determined signal) inputted to the multilevel identifying part 212b in the data receiving apparatus 10201.

As described above, according to the present embodiment, level fluctuation by noise is imparted to information data to be transmitted, so that the noise amount of the information data is controlled arbitrarily. As such, a security-improved data transmitting apparatus can be provided that imparts critical degradation to the received signal quality at the time of wiretapping by a third person, and causes further difficulty in decryption and decoding of the multilevel signal by the third person.

Figure 14:
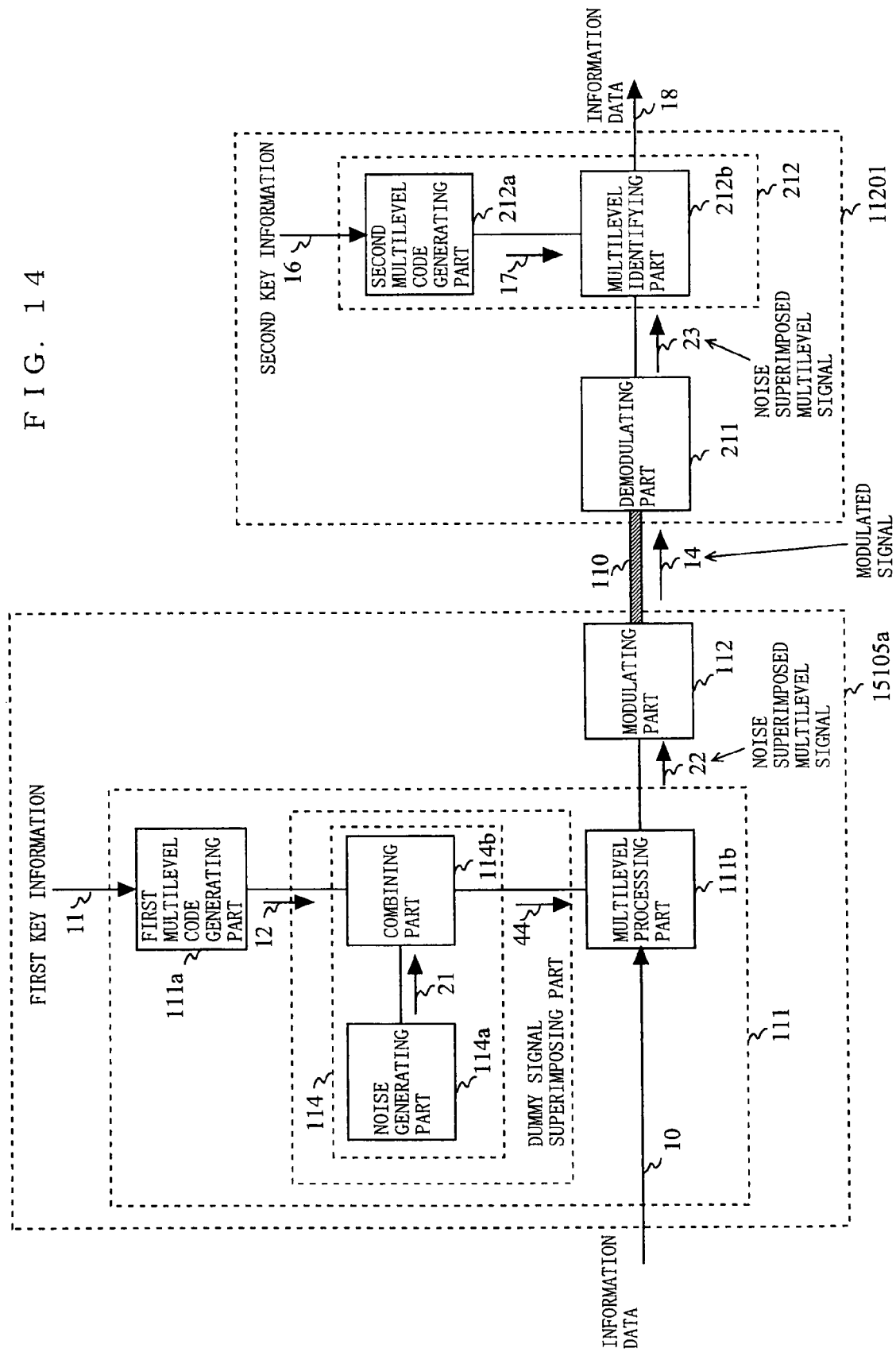
FIG. 14 is a block diagram showing another configuration of a data communication system according to a sixth embodiment of the present invention.

Here, as long as the SN ratio of the multilevel signal obtained by demodulating the modulated signal 14 can be controlled, the noise controlling part 114 may be inserted or connected to a position different from the position shown in FIG. 13. For example, like in the data transmitting apparatus 15105a shown in FIG. 14, the noise controlling part 114 may be inserted between the first multilevel code generating part 111a and the multilevel processing part 111b. In this case, the noise controlling part 114 outputs to the multilevel processing part 111b a noise superposed multilevel code sequence 44 in which a noise signal is superimposed on the multilevel code sequence. By virtue of this, the SN ratio can be controlled in the noise superimposed multilevel signal 23 inputted to the multilevel identifying part 212b in the data receiving apparatus 10201.

Figure 15:
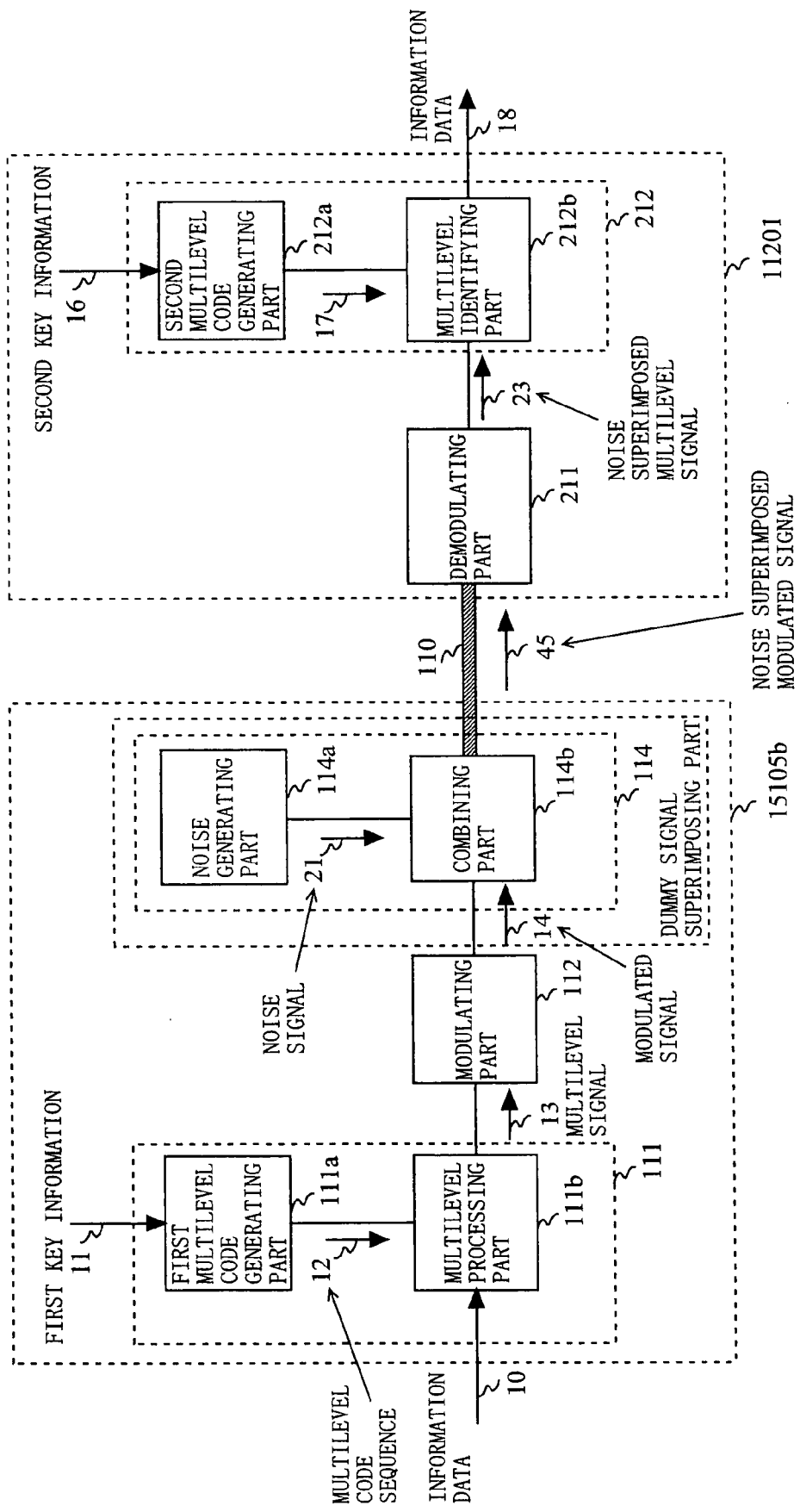
FIG. 15 is a block diagram showing another configuration of a data communication system according to a sixth embodiment of the present invention.

Further, like in the data transmitting apparatus 15105b shown in FIG. 15, the noise controlling part 114 may be connected to the subsequent stage of the modulating part 112, and may impart predetermined noise to the modulated signal 14. In this case, the noise controlling part 114 transmits to the transmission path 110 a noise superposed modulated signal 45 in which the noise signal 21 is superimposed on the modulated signal 14. By virtue of this, the SN ratio can be controlled in the noise superimposed multilevel signal 23 inputted to the multilevel identifying part 212b in the data receiving apparatus 10201.

Further, the noise signal 21 superimposed on the information data 10, the multilevel code sequence 12, or the modulated signal 14 by the noise controlling part 114 is a signal for causing difficulty in level determination of the multilevel signal by a third person, and hence can be recognized as one of the dummy signals described above. Thus, the noise controlling part 114 may be referred to as a dummy signal superimposing part.

Seventh Embodiment

Figure 16:
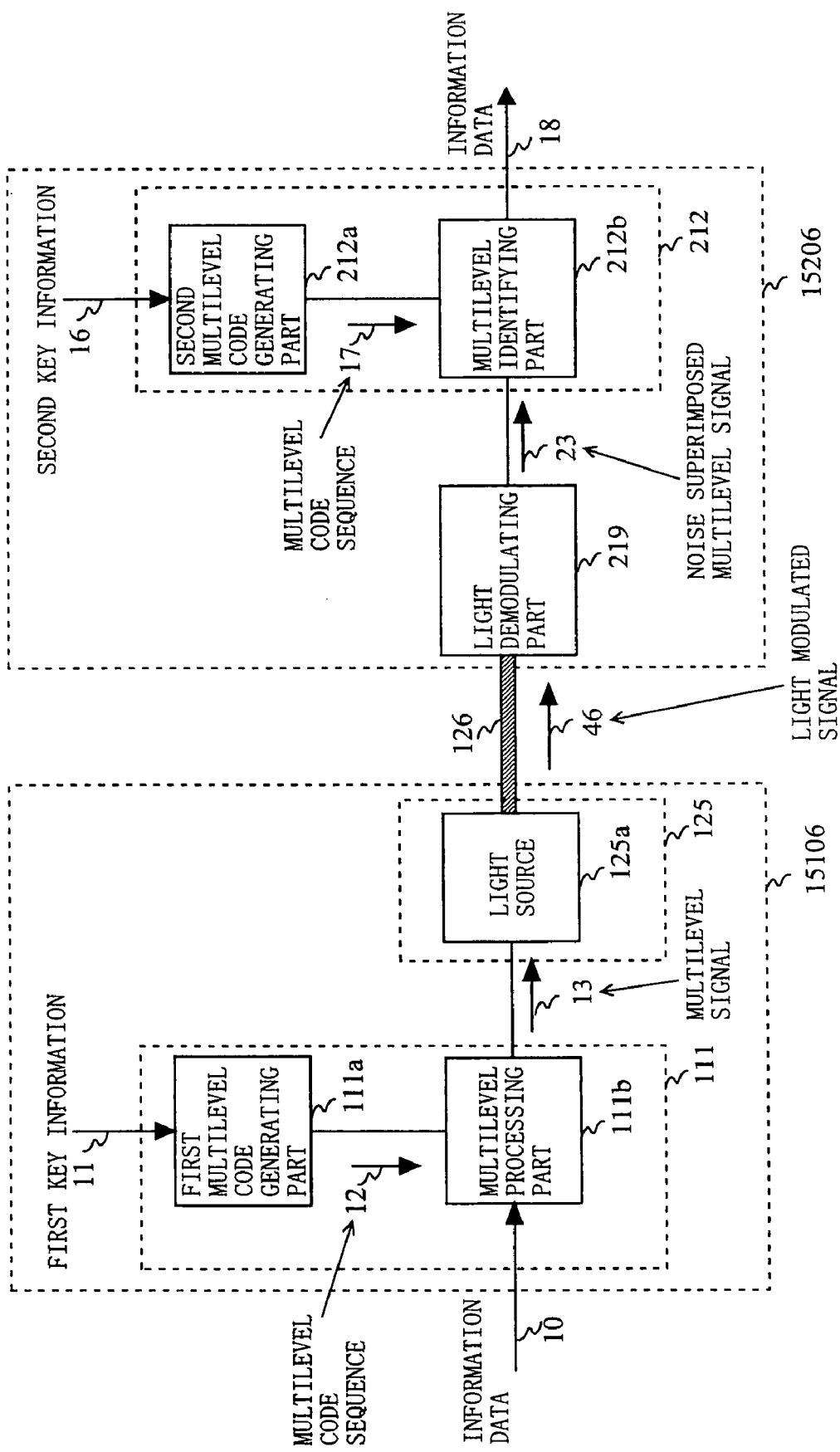
FIG. 16 is a block diagram showing a configuration of a data communication system according to a seventh embodiment of the present invention.

FIG. 16 is a block diagram showing a configuration of a data communication system according to a seventh embodiment of the present invention. In FIG. 6, the data transmitting apparatus 15106 comprises a multilevel encoding part 111 and a first light modulating part 125. The first light modulating part 125 includes a light source 125*a*. The data receiving apparatus 15206 comprises a light demodulating part 219 and a multilevel decoding part 212. The multilevel decoding part 212 includes a second multilevel code generating part 212*a* and a multilevel identifying part 212*b*. The data transmitting apparatus 15106 and the data receiving apparatus 15206 are connected via an optical transmission path 126.

As seen from FIG. 16, the data transmitting apparatus 15106 comprises the first light modulating part 125 in place of the modulating part 112 of the data transmitting apparatus 10101 shown in FIG. 1. Further, the data receiving apparatus 15206 comprises the light demodulating part 219 in place of the demodulating part 211 of the data receiving apparatus 10201 shown in FIG. 1. The data transmitting apparatus 15106 and the data receiving apparatus 15206 are connected via the optical transmission path 126 in place of the transmission path 110. In the embodiments described above, the medium of the transmission path has not been specified. However, the data communication system of the present embodiment transmits a signal by using an optical signal. The seventh embodiment is described below with focusing attention on this difference. Here, the configuration of the present embodiment is similar to that of the first embodiment (FIG. 1). Thus, blocks that perform the same operation as the first embodiment are designated by the same reference numerals, and their description is omitted.

The light source 125*a* modulates into a light modulated signal 46 the multilevel signal 13 inputted from the multilevel encoding part 111. The light source 125*a* may be of any type as long as it is an element for generating light. For example, the light source 125*a* may be a light generating element such as a semiconductor laser, a gas laser and a light emitting diode. The light modulated signal 46 outputted from the first light modulating part 125 is transmitted to the light demodulating part 219 via the optical transmission path 126. The light demodulating part 219 demodulates the light modulated signal 46 and outputs a noise superimposed multilevel signal 23.

The reason why the light demodulating part 219 outputs the noise superimposed multilevel signal 23 is described below. Even under a steady operating condition, the light generating element used in the light source 125*a* is affected by quantum-mechanical "field fluctuation" owing to the solid-state physical property. Thus, as is well known, the intensity of the optical signal outputted from the light generating element (or the number of photons generated by the light generating element) has noise (quantum noise) in association with the unavoidable field fluctuation. Thus, when the light source 125*a* modulates the multilevel signal 13 directly into the light modulated signal 46, quantum noise is imparted as a noise component to the light modulated signal 46. The quantum noise imparted to the light modulated signal 46 degrades the SN ratio of the multilevel signal. Thus, the signal outputted from the light demodulating part 219 serves as the noise superimposed multilevel signal 23. Thus, the data transmitting apparatus 15106 achieves an effect similar to that of the data transmitting apparatus 15105 shown in FIG. 13.

When the multi valued number of the multilevel signal is increased, the level difference between the multi valued level of the multilevel signal and the determination threshold decreases. When a noise signal exceeding the determination threshold of the multilevel signal is superimposed on the multilevel signal, multilevel determination of the multilevel signal becomes impossible. However, in quantum noise, noise amount is small in comparison with noise by spontaneous emission light described later. Thus, quantum noise is effective as noise to be superimposed on a multilevel signal having many multi valued numbers and a small level difference between the multi valued level of the multilevel signal and the determination threshold.

As described above, according to the present embodiment, even when the noise controlling part 114 is not provided as in the data communication system shown in FIG. 13, an effect similar to the data transmitting apparatus 15105 according to the sixth embodiment is obtained. Further, according to the present embodiment, information data to be transmitted is encoded as a multilevel signal, and then the encoded multilevel signal is transmitted as a light modulated signal, so that quantum noise which is unremovable because of the physical property is imparted to the multilevel signal. As such, a security-improved data transmitting apparatus can be provided that imparts critical degradation to the received signal quality at the time of wiretapping by a third person, and causes yet further difficulty in decryption and decoding of the multilevel signal by the third person.

Figure 17:
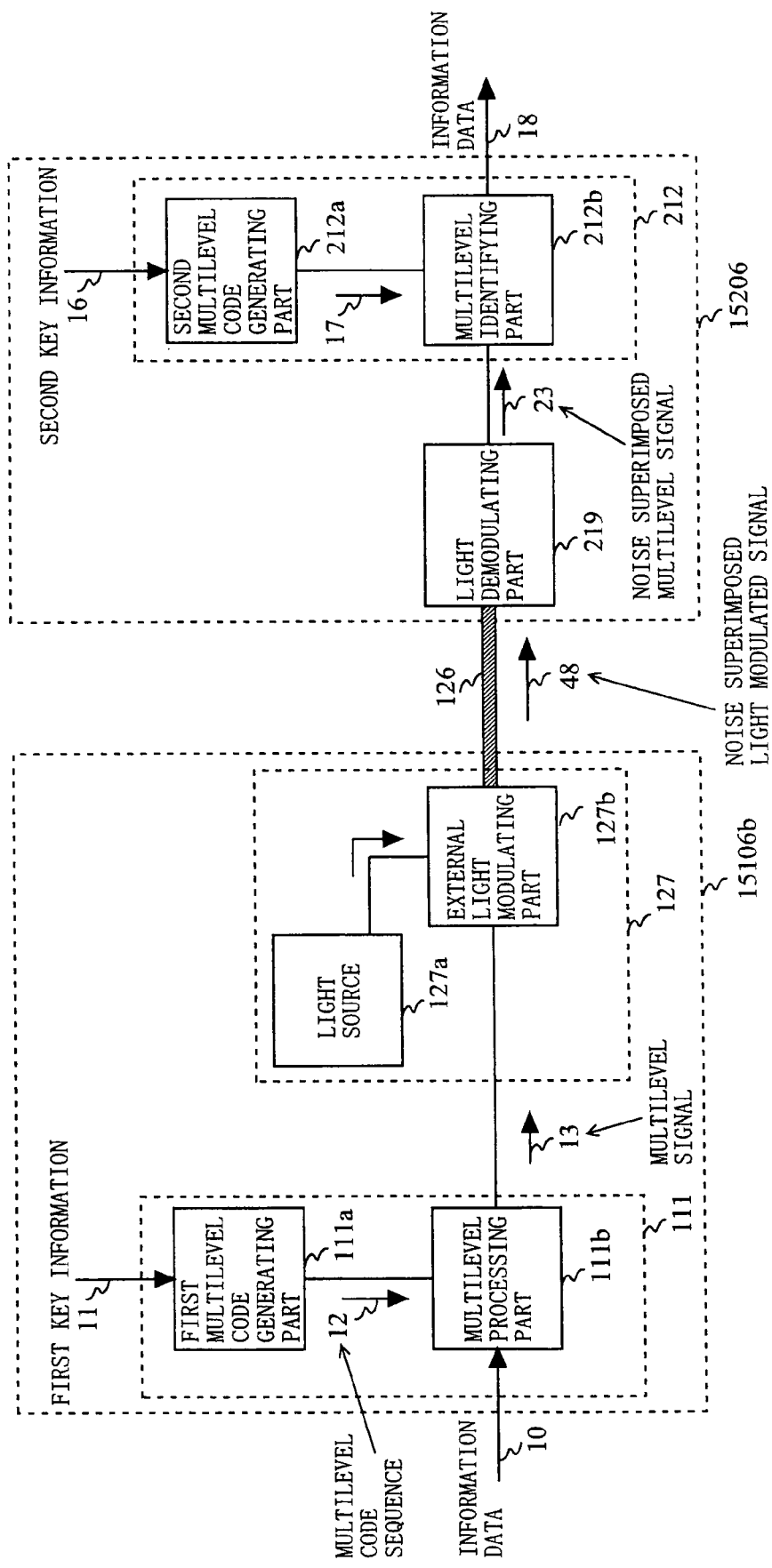
FIG. 17 is a block diagram showing another configuration of a data communication system according to a seventh embodiment of the present invention.

Here, the data transmitting apparatus 16105 may have a configuration that a second light modulating part 127 is provided in place of the first light modulating part 125 like in the data transmitting apparatus 16105*b* shown in FIG. 17. The second light modulating part 127 includes a light source 127*a* and an external light modulating part 127*b*. The external light modulating part 127*b* modulates with the multilevel signal 13 the light outputted from the light source 127*a*. The effect acquired by an external modulation method like the second light modulating part 127 is the same as that obtained when a direct modulation method is implemented by using the first light modulating part 125.

Further, in the data transmitting apparatus 15106, a noise controlling part 114 may be inserted to a position shown in FIGS. 6 and 13 to 15. By virtue of this, the first light modulating part 125 modulates into a light modulated signal 46 the noise superimposed multilevel signal 22 in which noise is superimposed on the multilevel signal 13. Thus, when the noise controlling part 114 is further provided, the data transmitting apparatus 15106 can control the SN ratio of the noise superimposed multilevel signal 23 inputted to the multilevel identifying part 212*b* in the data receiving apparatus 15206.

Figure 18:
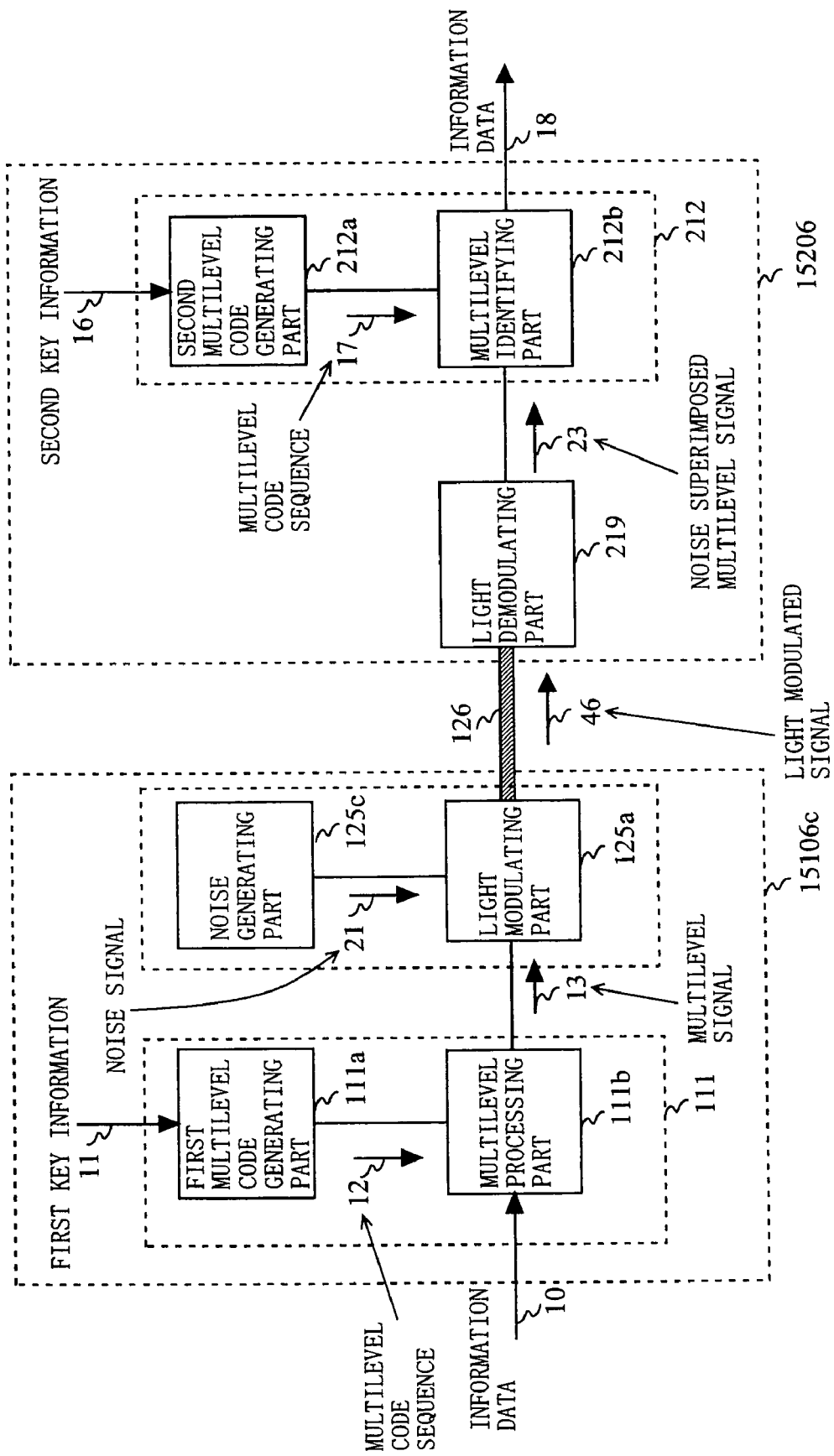
FIG. 18 is a block diagram showing another configuration of a data communication system according to a seventh embodiment of the present invention.

Further, the data transmitting apparatus 15106 may have a configuration that a noise generating part 125*c* is further provided like in the data transmitting apparatus 15106*c* shown in FIG. 18. The noise generating part 125*c* is connected directly to the light source 125*a*. In this case, the function and the effect of the data transmitting apparatus 15106*c* and the data transmitting apparatus 15105 are the same.

Eighth Embodiment

Figure 19:
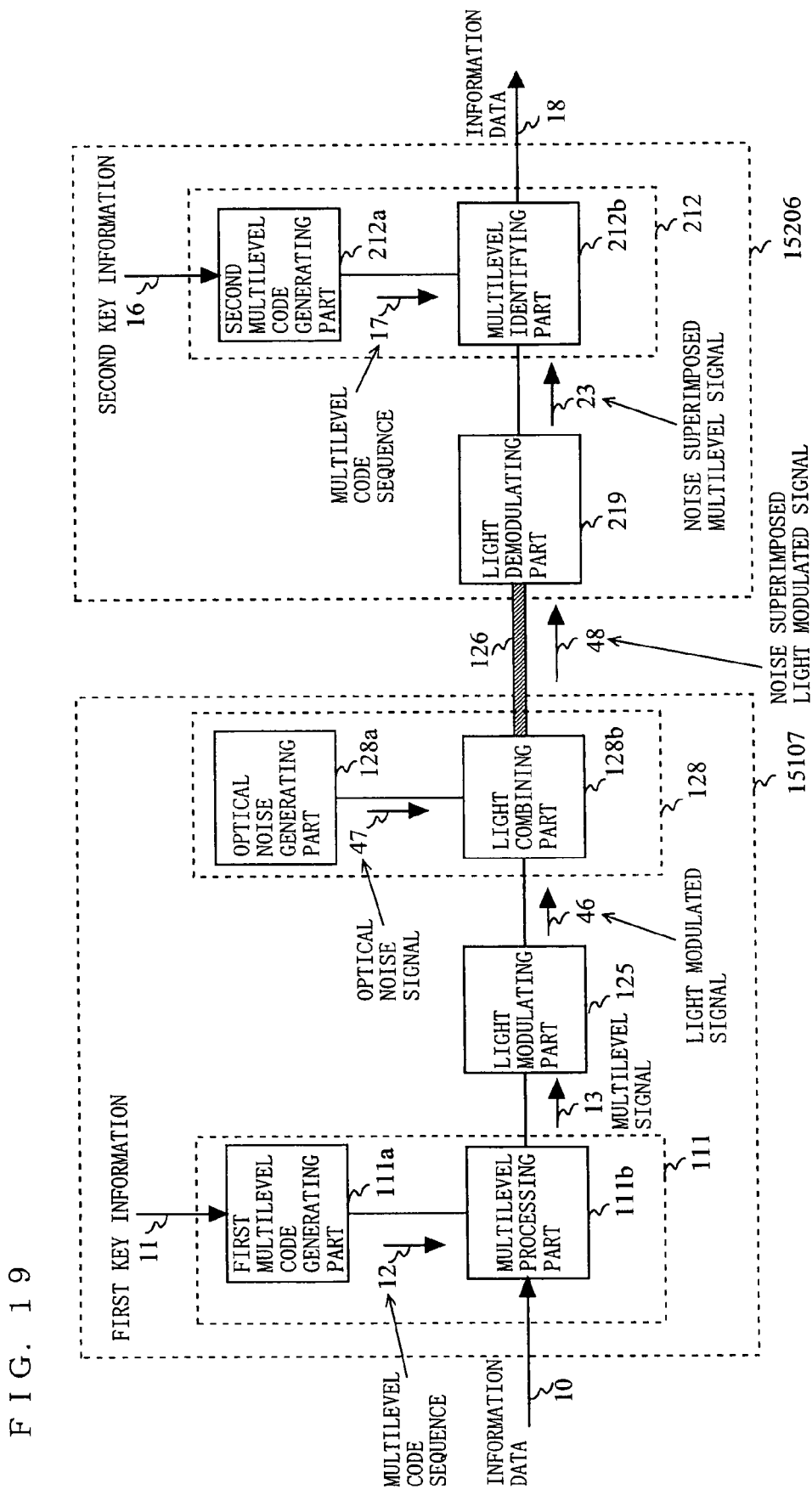
FIG. 19 is a block diagram showing a configuration of a data communication system according to an eighth embodiment of the present invention.

FIG. 19 is a block diagram showing a configuration of a data communication system according to an eighth embodiment of the present invention. In FIG. 19, the data transmitting apparatus 15107 comprises a multilevel encoding part 111, a first light modulating part 125 and a first optical noise controlling part 128. The first optical noise controlling part 128 includes an optical noise generating part 128*a* and a light combining part 128*b*. The data receiving apparatus 15206 comprises a light demodulating part 219 and a multilevel decoding part 212. The multilevel decoding part 212 includes a second multilevel code generating part 212*a* and a multilevel identifying part 212*b*. The data transmitting apparatus 15106 and the data receiving apparatus 15206 are connected via an optical transmission path 126.

As seen from FIG. 19, the data transmitting apparatus 15107 has a configuration that the data transmitting apparatus 15106 shown in FIG. 16 further comprises the first optical noise controlling part 128. The eighth embodiment is described below with focusing attention on this difference. Here, the configuration of the present embodiment is similar to that of the seventh embodiment (FIG. 16). Thus, blocks that perform the same operation as the seventh embodiment are designated by the same reference numerals, and their description is omitted.

In the first optical noise controlling part 128, the optical noise generating part 128a outputs light having a large fluctuation property such as spontaneous emission light noise as predetermined optical noise signal 47 to the light combining part 128b. Here, the optical noise generating part 128a may employ an LED or an optical fiber amplifier (EDFA). The light combining part 128b combines the light modulated signal 46 outputted from the first light modulating part 125 and the optical noise signal 47, and transmits a noise superimposed light modulated signal 48 to the optical transmission path 126. Similarly to the sixth embodiment, the first light modulating part 125 may employ either a direct modulation method or an external modulation method.

The data transmitting apparatus 15107 superimposes the optical noise signal 47 on the light modulated signal 46, and thereby controls the SN ratio of the multilevel signal 13 into an arbitrary value. As such, control is performed on the SN ratio of the to-be-determined signal (noise superimposed multilevel signal 23) inputted to the multilevel identifying part 212b. Further, as described in the seventh embodiment, the light source of the first light modulating part 125 generates quantum noise. Thus, quantum noise is superimposed on the light modulated signal 46. Accordingly, the data transmitting apparatus 15107 achieves also an effect similar to that of the data transmitting apparatus 15106 shown in FIG. 16.

Here, the first optical noise controlling part 128 may employ a principle or configuration different from the configuration shown in FIG. 19, as long as the optical noise signal 47 can be superimposed on the light modulated signal 46 or the SN ratio of the light modulated signal 46 can be controlled. Further, in the data transmitting apparatus 15107, a second light modulating part 127 may be used in place of the first light modulating part 125.

For example, the first optical noise controlling part 128 may generate excessive noise in the light modulated signal 46 by using the coherence of light. When the coherence of light is used, the first optical noise controlling part 128 may employ an optical interferometer that branches the light modulated signal 46 into a plurality, and imparts a delay difference to the branched light modulated signals 46 and wave-mixes them again. Further, the first optical noise controlling part 128 may have a configuration that a plurality of reflection points are provided on the optical transmission path 126 so that the light modulated signal 46 is multi-reflected between the reflection points.

Further, when a semiconductor laser or the like is used as the light source of the first light modulating part 125, the first optical noise controlling part 128 may generate excessive noise by a configuration that a part of the output light of the semiconductor laser re-injected into the semiconductor laser. The output light of the semiconductor laser re-injected into the semiconductor laser imparts disturbance to the oscillation parameter in the optical resonator and the like. Thus, large fluctuation is generated in the intensity and the wavelength of the light modulated signal 46.

As described above, according to the present embodiment, information data to be transmitted is encoded as a multilevel signal, and then the encoded multilevel signal is converted into a light modulated signal. Then, noise is imparted to the multilevel signal in an optical domain. As such, a security-improved data transmitting apparatus can be provided that imparts critical degradation to the received signal quality at the time of wiretapping by a third person, and causes yet further difficulty in decryption and decoding of the multilevel signal by the third person.

Ninth Embodiment

Figure 20:
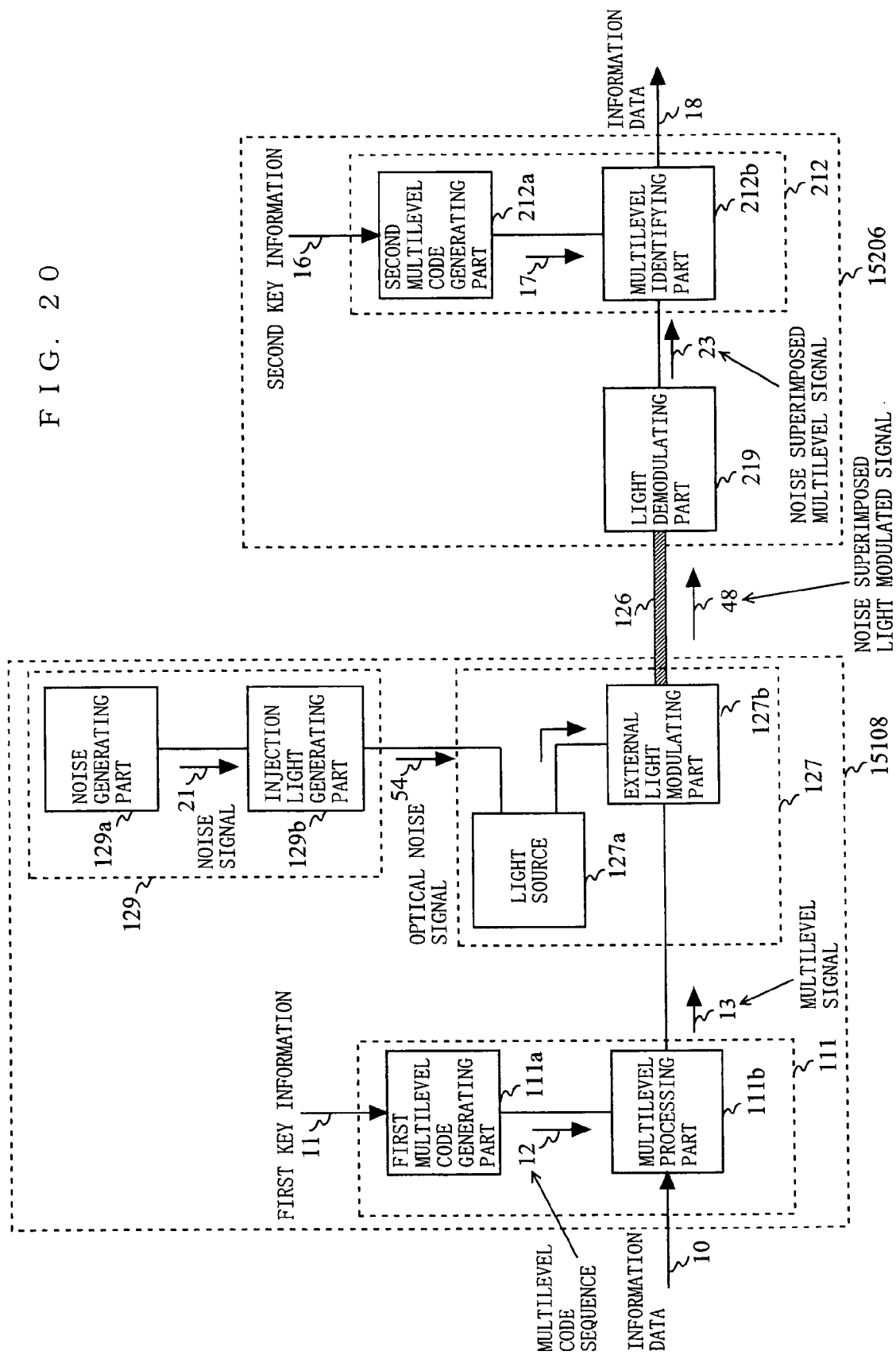
FIG. 20 is a block diagram showing a configuration of a data communication system according to a ninth embodiment of the present invention.

FIG. 20 is a block diagram showing a configuration of a data communication system according to a ninth embodiment of the present invention. In FIG. 20, the data transmitting apparatus 15108 comprises a multilevel encoding part 111, a second optical noise controlling part 129 and a second light modulating part 127. The second optical noise controlling part 129 includes an optical noise generating part 129a and an injection light generating part 129b. The second light modulating part 127 includes a light source 127a and an external light modulating part 127b. The data receiving apparatus 15206 comprises a light demodulating part 219 and a multilevel decoding part 212. The multilevel decoding part 212 includes a second multilevel code generating part 212a and a multilevel identifying part 212b. The data transmitting apparatus 15108 and the data receiving apparatus 15206 are connected via an optical transmission path 126.

As seen from FIG. 20, the data transmitting apparatus 15108 comprises the second optical noise controlling part 129 in place of the first optical noise controlling part 127 of the data transmitting apparatus 15106 shown in FIG. 16. Further, the data transmitting apparatus 15108 comprises the second light modulating part 127 in place of the first light modulating part 125. The ninth embodiment is described below with focusing attention on this difference. Here, the configuration of the present embodiment is similar to that of the seventh embodiment (FIG. 16). Thus, blocks that perform the same operation as the seventh embodiment are designated by the same reference numerals, and their description is omitted.

In the second optical noise controlling part 129, the noise generating part 129a generates a predetermined noise signal 21 such as thermal noise. The injection light generating part 129b converts into the optical noise signal 47 the noise signal 21 inputted from the noise generating part 129a. The optical noise signal 47 has large fluctuation in the parameter such as light intensity or optical frequency.

The optical noise signal 47 outputted from the injection light generating part 129b is injected into the light source 127a. In the light source 127a, the optical signal inputted from the injection light generating part 129b imparts disturbance to the oscillating condition of the light source 127a. As a result, the optical signal outputted from the light source 127a has large fluctuation. On the basis of the multilevel signal 13, the external light modulating part 127b performs light modulation on the optical signal having the large fluctuation outputted from the light source 127a, and transmits it to the optical transmission path 126. As such, the light modulated signal 46 is transmitted in a state having large fluctuation, that is, as a noise superimposed light modulated signal 48. Thus, the data transmitting apparatus 15108 according to the present embodiment achieves an effect similar to that of the data transmitting apparatus 15105 shown in FIG. 8.

As described above, according to the present embodiment, information data to be transmitted is encoded as a multilevel signal, and then the encoded multilevel signal is converted into a light modulated signal having large fluctuation. As such, a security-improved data transmitting apparatus can be provided that intentionally imparts critical degradation to the received signal quality at the time of wiretapping by a third person, and causes yet further difficulty in decryption and decoding of the multilevel signal by the third person.

Here, the second optical noise controlling part 129 may employ another configuration or a principle as long as light can be generated that imparts disturbance to the oscillating condition of the light source 127a. Further, in the present embodiment, an external light modulation configuration has been adopted in which the light source 127a that oscillates light and the external light modulating part 127b for modulating the output light from the light source 127a on the basis of the multilevel signal 13 are provided independently. However, similarly to the seventh embodiment, the data transmitting apparatus 15108 may have a direct light modulation configuration in which the multilevel signal is directly inputted to the light source and converted into the light modulated signal.

Tenth Embodiment

Figure 21:
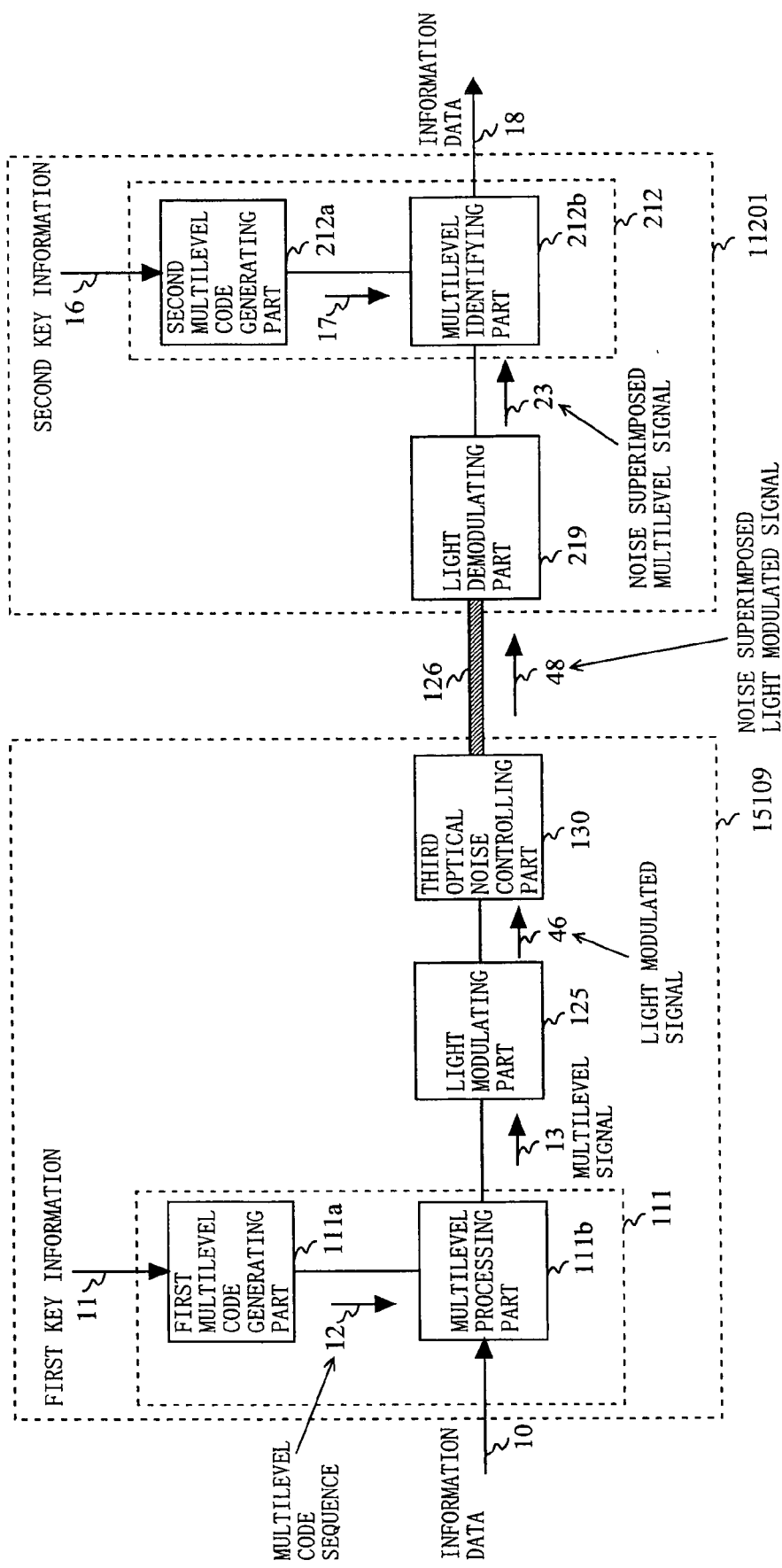
FIG. 21 is a block diagram showing a configuration of a data communication system according to a tenth embodiment of the present invention.

FIG. 21 is a block diagram showing a configuration of a data communication system according to a tenth embodiment of the present invention. In FIG. 21, the data transmitting apparatus 15109 comprises a multilevel encoding part 111, a first light modulating part 125 and a third optical noise controlling part 130. The multilevel encoding part 111 includes a first multilevel code generating part 111a and a multilevel processing part 111b. The data receiving apparatus 15206 comprises a light demodulating part 219 and a multilevel decoding part 212. The multilevel decoding part 212 includes a second multilevel code generating part 212a and a multilevel identifying part 212b. The data transmitting apparatus 15109 and the data receiving apparatus 15206 are connected via an optical transmission path 126.

As seen from FIG. 21, the data transmitting apparatus 15109 has a configuration that the data transmitting apparatus 15106 shown in FIG. 16 further comprises the third optical noise controlling part 130. The tenth embodiment is described below with focusing attention on this difference. Here, the configuration of the present embodiment is similar to that of the seventh embodiment (FIG. 16). Thus, blocks that perform the same operation as the seventh embodiment are designated by the same reference numerals, and their description is omitted.

The first light modulating part 125 modulates the inputted multilevel signal 13 directly into the light modulated signal 46. The light source 125a (not shown) of the first light modulating part 125 may employ a light emitting diode (LED), a Fabry-Perot laser or the like. The LED or the Fabry-Perot laser oscillates at a plurality of wavelengths, and hence outputs multimode light composed of light (mode light) of a plurality of wavelengths. The third optical noise controlling part 130 imparts predetermined noise to the light modulated signal 46 outputted from the first light modulating part 125, and outputs the noise superposed light modulated signal 48 to the optical transmission path 126.

Figure 22:
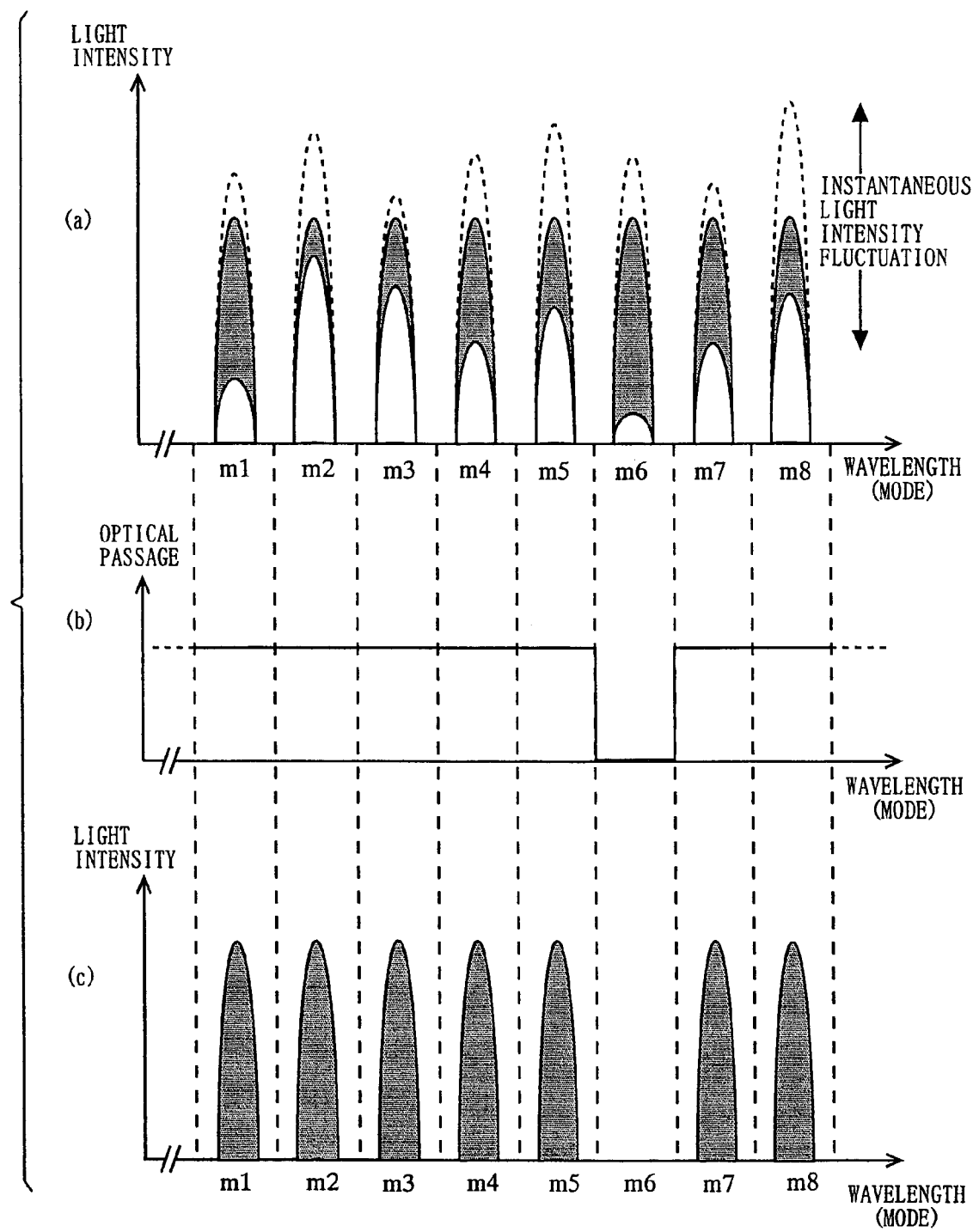
FIG. 22 is a diagram describing the operation of a third noise controlling part according to a tenth embodiment of the present invention.

A method that the data transmitting apparatus 15109 of the present embodiment imparts the noise is described below in detail. In the first light modulating part 125, since a light emitting diode or a Fabry-Perot laser is employed for the light source 125a, the light modulated signal 46 outputted from the first light modulating part 125 is multimode light composed of light of a plurality of wavelengths as shown in FIG. 22(*a*). As shown in FIG. 22(*a*), the light modulated signal 46 is assumed to be multimode light composed of mode light having eight modes m1 to m8. In the light modulated signal 46, as shown in FIG. 22(*a*), each mode light varies instantaneously in the parameters of light intensity and optical phase. Further, the fluctuation components in the light intensity and the optical phase of each oscillation mode light have mutual correlation with the fluctuation components of the light intensity and the optical phase of the other mode light. Thus, a property is obtained that the total light intensity of the mode light is approximately at constant. Thus, the light intensity of the light modulated signal 46 is also approximately at constant.

The third optical noise controlling part 130 employs an optical filter or the like. The optical filter of the third optical noise controlling part 130 cuts off at least one mode light of the light modulated signal 46. FIG. 22(*b*) is a diagram showing an example of the passage characteristics of the optical filter in the third optical noise controlling part 130. In the example shown in FIG. 22(*b*), the optical filter of the third optical noise controlling part 130 cuts off the mode light of m6, and passes the other mode light.

FIG. 22(*c*) is a diagram showing multimode light in which a part of mode light is removed by the third optical noise controlling part 130. In the multimode light, when a part of mode light is removed, correlation between the fluctuation components of the mode light is broken at the time of optical detection. Thus, a mode partition noise (mode partition noise) occurs in the light modulated signal 46. Accordingly, the noise superimposed light modulated signal 48 outputted from the third optical noise controlling part 130 is outputted to the optical transmission path 126 in a state that the mode partition noise is superimposed. As such, the third optical noise controlling part 130 increases more efficiently the noise of the noise superimposed light modulated signal 48, and imparts larger level fluctuation to the noise superimposed multilevel signal 23 so as to control the SN ratio.

As described above, according to the present embodiment, information data to be transmitted is encoded as a multilevel signal, and then the encoded multilevel signal is converted into a light modulated signal oscillated at a plurality of wavelengths so that fluctuation which is unremovable because of the physical property is imparted to the multilevel signal. As such, a security-improved data communication is provided that intentionally imparts critical degradation to the received signal quality at the time of wiretapping by a third person, and causes yet further difficulty in decryption and decoding of the multilevel signal by the third person.

Further, in the data transmitting apparatus 15109, a second light modulating part 127 may be used in place of the first light modulating part 125.

Figure 23:
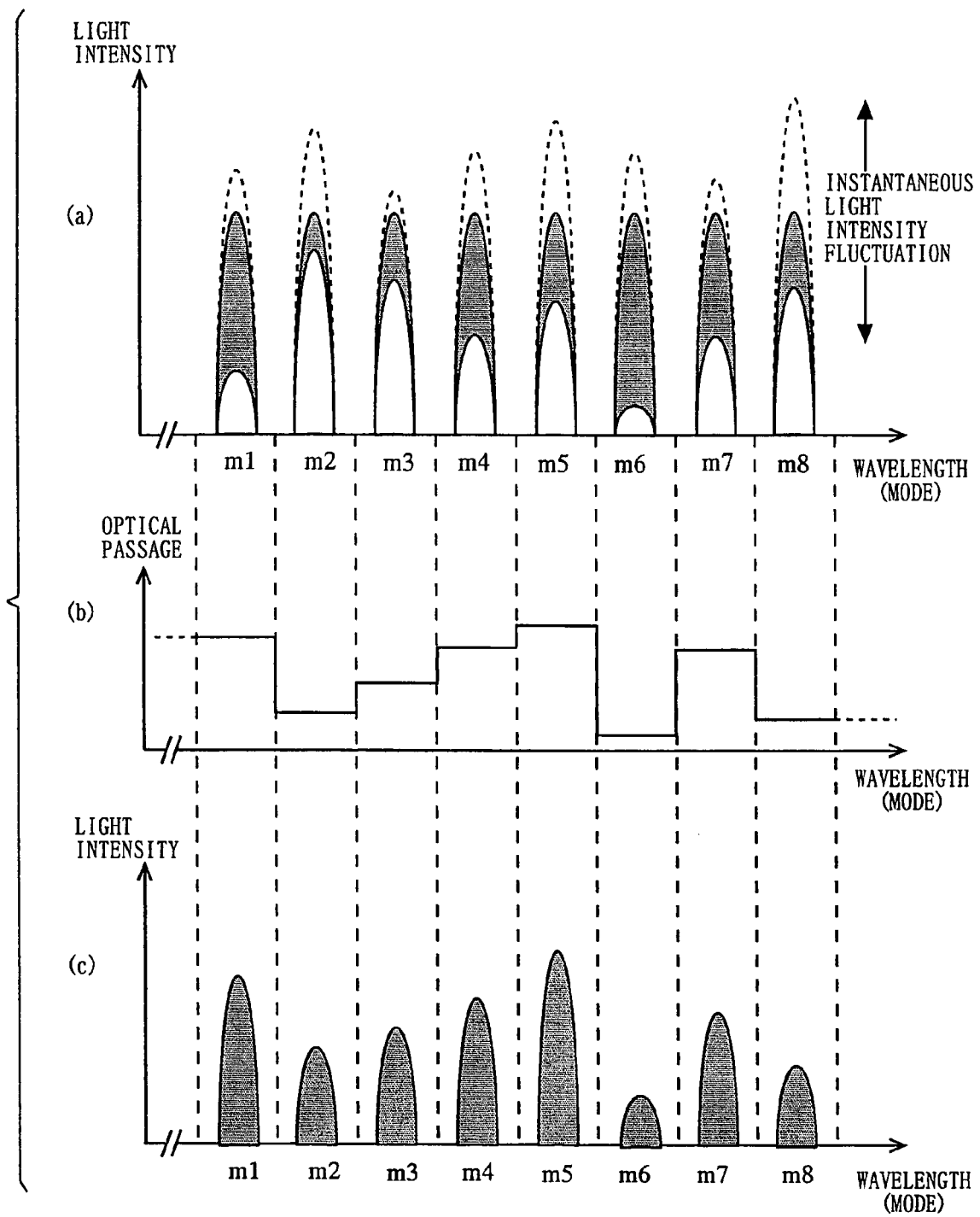
FIG. 23 is a diagram describing the operation of a third noise controlling part according to a tenth embodiment of the present invention.

Further, the third optical noise controlling part 130 may be a filter that imparts passage characteristics of a predetermined pattern to each mode light as shown in FIG. 23(*b*). Each mode light having passed through the filter having the passage characteristics shown in FIG. 23(*b*) generates a light spectrum different in each mode as shown in FIG. 23(*c*). Thus, in each mode light, the coherence as an optical signal deteriorates. Thus, in the light demodulating part 219, the multimode light generates excessive noise at the time of optical detection. By virtue of this, the SN ratio is controlled in the noise superimposed multilevel signal 23 inputted to the multilevel identifying part 212b in the data receiving apparatus 105206.

Eleventh Embodiment

Figure 24:
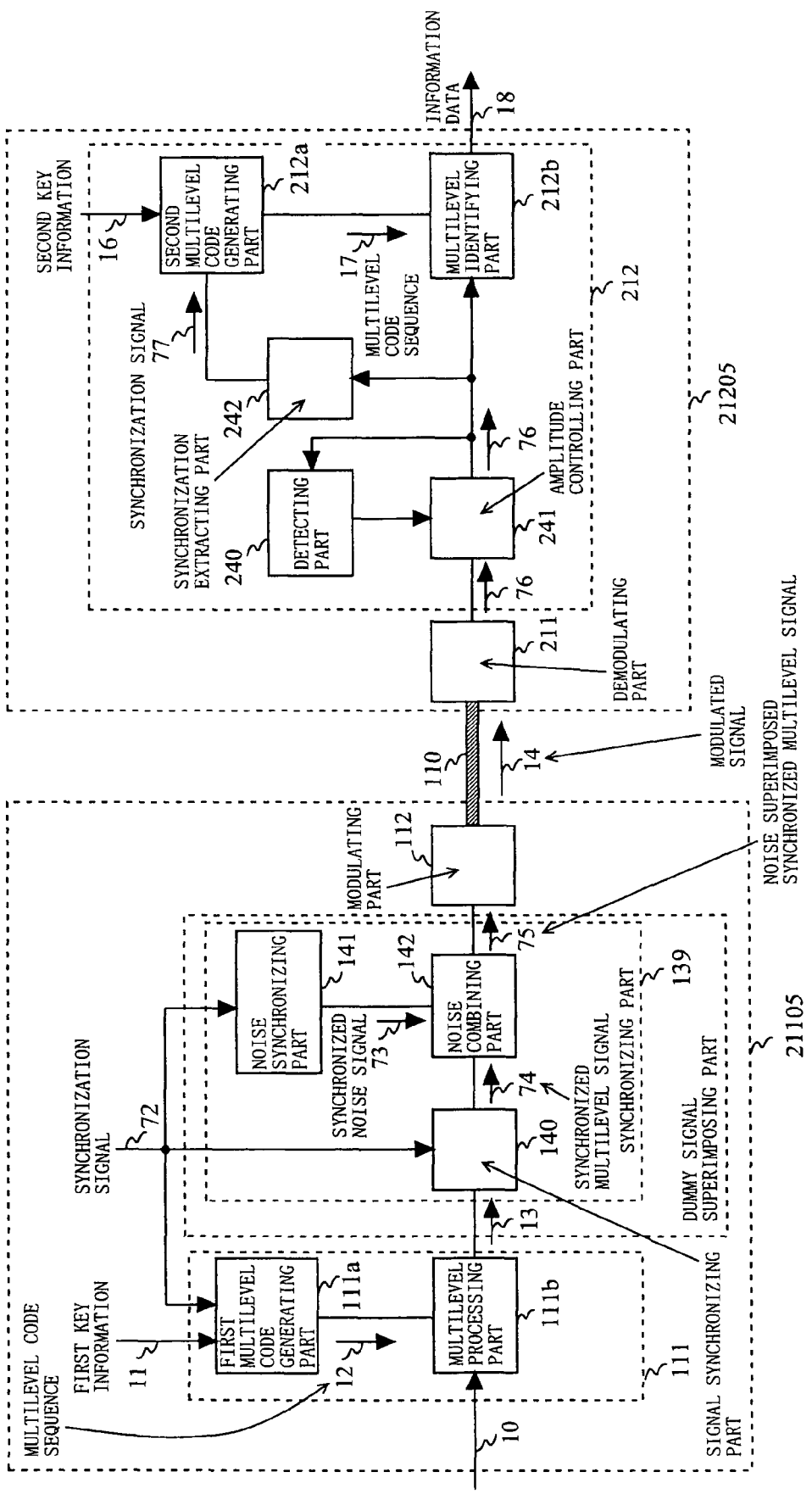
FIG. 24 is a block diagram showing a configuration of a data communication system according to an eleventh embodiment of the present invention.

FIG. 24 is a block diagram showing a configuration of a data communication system according to an eleventh embodiment of the present invention. The data transmitting apparatus 21105 shown in FIG. 24 is different from the data transmitting apparatus 10101 (FIG. 1) of the first embodiment in the point that a synchronizing part 139 is provided newly.

Further, the data receiving apparatus 21205 is different from the data receiving apparatus 10201 (FIG. 1) of the first embodiment in the point that the multilevel decoding part 212 has newly a detecting part 240, an amplitude controlling part 241, and a synchronization extracting part 242.

In the data transmitting apparatus 21105, the first multilevel code generating part 111a generates a multilevel code sequence 12 on the basis of the first key information 11 and the synchronization signal 72. The multilevel processing part 111b combines the information data 10 and the multilevel code sequence 12, and generates a multilevel signal 13. The synchronizing part 139 generates a synchronized multilevel signal 74 in which the synchronization signal 72 is multiplexed on the multilevel signal 13, and generates a noise superimposed synchronized multilevel signal 75 in which the synchronized noise signal 73 is superimposed on the synchronized multilevel signal 74. Here, detailed operation of the synchronizing part 139 is described later. The modulating part 112 converts the noise superimposed synchronized multilevel signal 75 into a modulated signal 14 of a predetermined modulation form, and transmits it to the transmission path 110.

Here, the noise superposition synchronized multilevel signal 75 generated by the synchronizing part 139 is a signal for causing difficulty in level determination of the multilevel signal by a third person, and hence can be recognized as one of the dummy signals described above. Thus, the synchronizing part 139 may be referred to as a dummy signal superimposing part.

In the data receiving apparatus 21205, the demodulating part 211 demodulates the modulated signal 14 transmitted via the transmission path 110, and reproduces the multilevel signal 15. Here, the multilevel signal 15 contains the synchronization signal component multiplexed in the data transmitting apparatus 21105. Thus, in the following description, the multilevel signal 15 is referred to as a synchronized multilevel signal 76. The detecting part 240 detects the maximum amplitude of the synchronized multilevel signal 76. On the basis of the detection result of the detecting part 240, the amplitude controlling part 241 controls the maximum amplitude of the synchronized multilevel signal 76 into a predetermined value. The synchronization extracting part 242 extracts a synchronization signal 77 from the synchronized multilevel signal 76. The second multilevel code generating part 212a generates a multilevel code sequence 17 on the basis of the second key information 16 and the synchronization signal 77. With adopting the multilevel code sequence 17 as the threshold, the multilevel identifying part 212b performs identification of the synchronized multilevel signal 76 and reproduces the information data 18.

Figure 25:
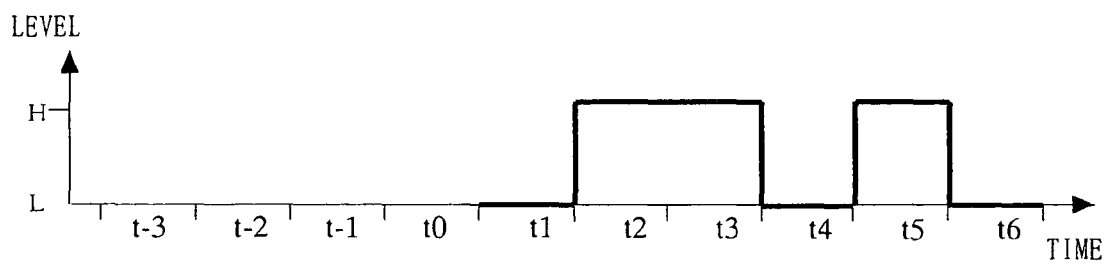
FIG. 25 is a diagram showing an example of a time waveform of information data 10.
Figure 26:
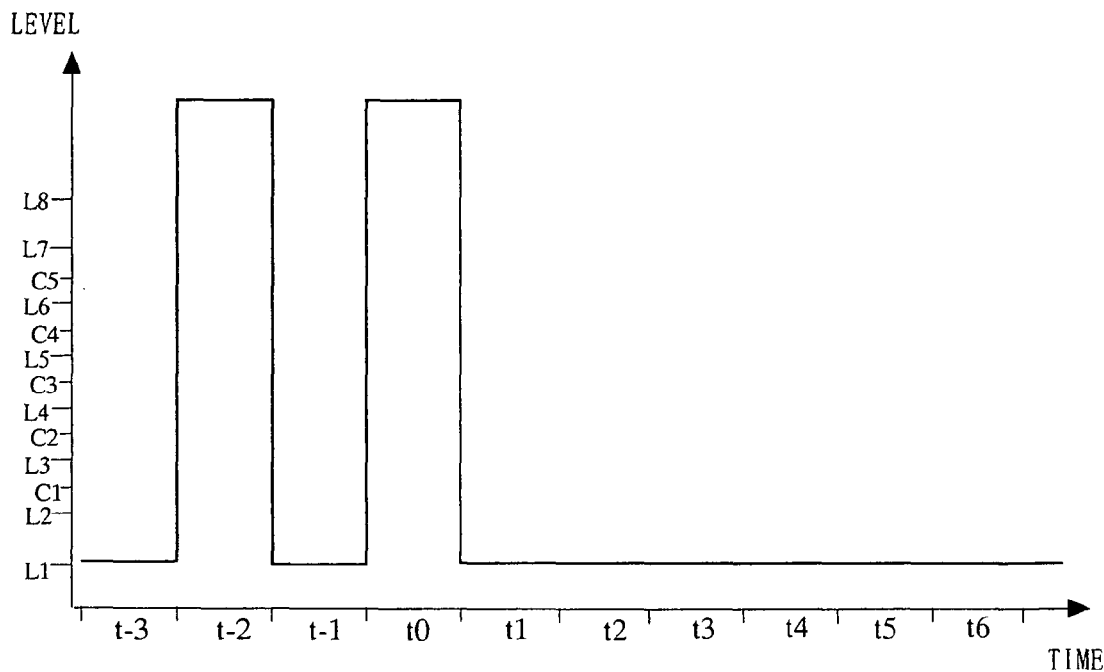
FIG. 26 is a diagram showing an example of a time waveform of a synchronization signal 72.
Figure 27:
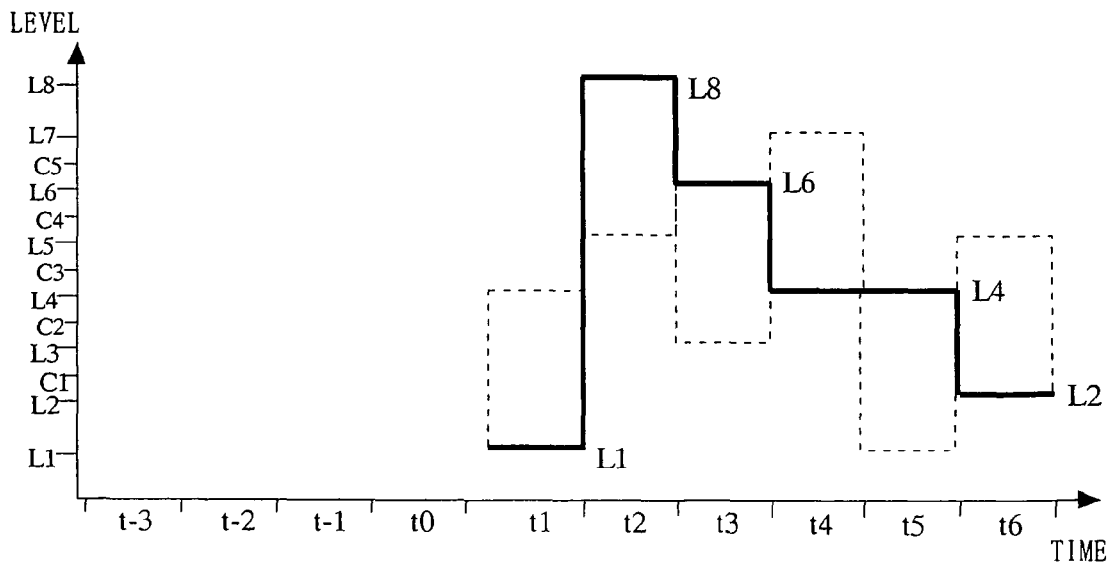
FIG. 27 is a diagram showing an example of a time waveform of a multilevel signal 13.
Figure 28:
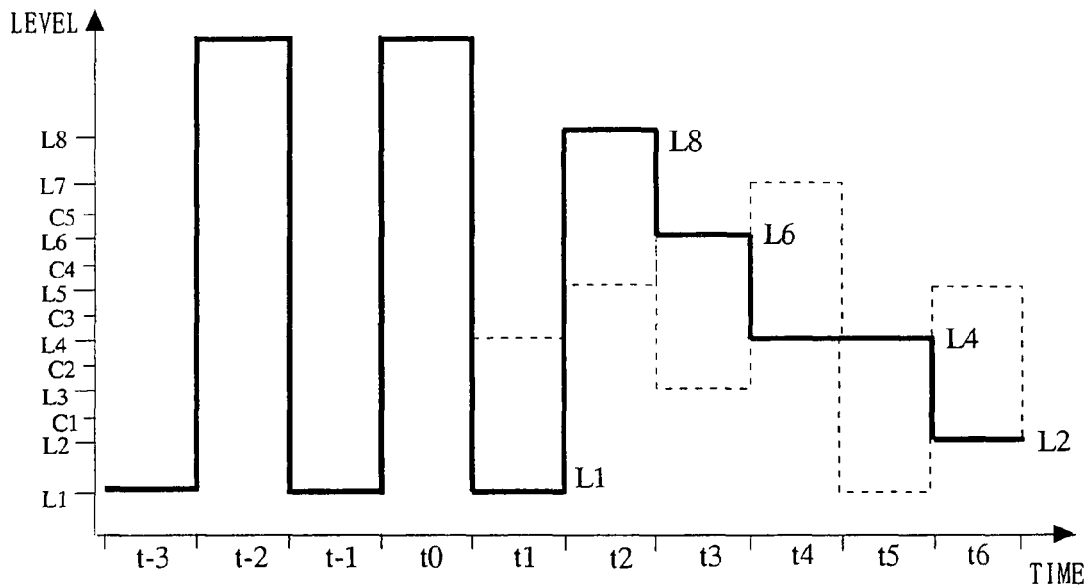
FIG. 28 is a diagram showing an example of a time waveform of a synchronized multilevel signal 74 obtained by combining a synchronization signal 72 and a multilevel signal 13.
Figure 29:
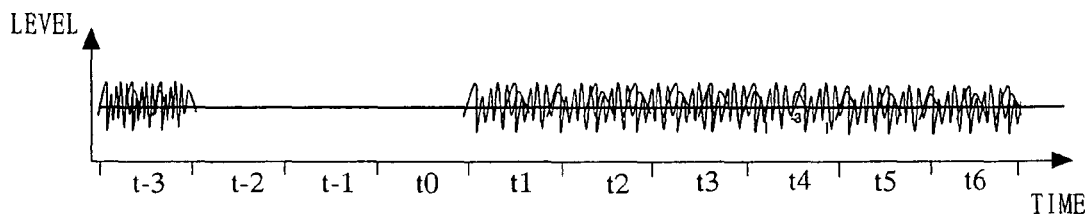
FIG. 29 is a diagram showing an example of a time waveform of a synchronized noise signal 73.
Figure 30:
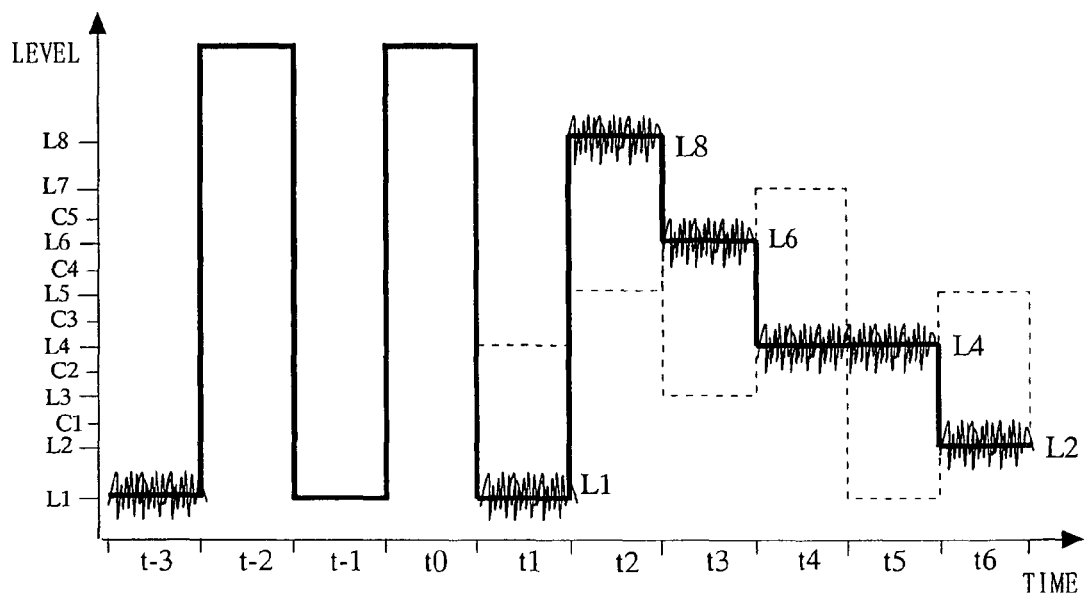
FIG. 30 is a diagram showing a time waveform of a noise superimposed synchronized multilevel signal 75.

Detailed operation of the data transmitting apparatus 21105 is described with reference to FIGS. 25 to 30. FIG. 25 is a diagram showing an example of a time waveform of information data 10. FIG. 26 is a diagram showing an example of a time waveform of a synchronization signal 72. FIG. 27 is a diagram showing a time waveform of the multilevel signal 13 shown in FIG. 25 in which the information data 10 is combined with the multilevel code sequence 17. FIG. 28 is a diagram showing an example of a time waveform of a synchronized multilevel signal 74 obtained by combining the synchronization signal 72 shown in FIG. 26 and the multilevel signal 13 shown in FIG. 27. FIG. 29 is a diagram showing an example of a time waveform of a synchronized noise signal 73 outputted from the noise synchronizing part 141. FIG. 30 is a diagram showing a time waveform of a noise superimposed synchronized multilevel signal 75 outputted from the noise combining part 142. In the following description, the multi valued number of the multilevel signal 13 is set to be 8. Here, the horizontal axis in FIGS. 25 to 30 is in the unit of time slot. The following description is given with the assumption that the time agrees with each other in FIGS. 25 to 30.

At time when the synchronization signal 72 is not inputted, the first multilevel code generating part 111a outputs the multilevel code sequence 12 generated using the first key information 11. In the case of the synchronization signal 72 shown in FIG. 26, the first multilevel code generating part 111a outputs the multilevel code sequence 12 to the multilevel processing part 111b at time t1 to t6 when the synchronization signal is not inputted.

The multilevel processing part 111b combines the information data 10 shown in FIG. 25 and the multilevel code sequence 12, and generates a multilevel signal 13. The multilevel processing part 111b generates the multilevel signal 13 on the basis of the timing that the multilevel code sequence 12 is inputted. In the example shown in FIG. 27, the multilevel processing part 111b outputs the multilevel signal 13 at time t1 to t6.

The signal synchronizing part 140 combines the synchronization signal 72 shown in FIG. 26 and the multilevel signal 13 shown in and FIG. 27, and generates the synchronized multilevel signal 74 shown in FIG. 28. The synchronization signal 72 shown in FIG. 26 is inputted to the signal synchronizing part 140 at time t-3 to t0. The multilevel signal 13 shown in FIG. 27 is inputted to the signal synchronizing part 140 at time t1 to t6. As such, the signal synchronizing part 140 combines the synchronization signal 72 and the multilevel signal 13 which are inputted at different timing, and generates the synchronized multilevel signal 74. Here, as shown in FIG. 28, the maximum amplitude of the synchronization signal 72 is larger than the maximum amplitude of the multilevel signal 13.

The noise synchronizing part 141 generates white noise or the like, and outputs the noise as the synchronized noise signal 73 at time when the synchronization signal 72 is not inputted. In the example shown in FIG. 29, the noise synchronizing part 141 does not output the synchronized noise signal 73 at time t-2 to t0 when the synchronization signal 72 is inputted. Here, on the basis of the synchronization signal 72, the noise synchronizing part 141 may output a synchronized noise signal 73 in which noise amount is changed. Specifically, the noise synchronizing part 141 may output it in such a manner that the noise amount of the synchronized noise signal 73 outputted at time when the synchronization signal 72 is inputted is reduced in comparison with the noise amount of the synchronized noise signal 73 outputted at time when the synchronization signal 72 is not inputted.

The noise combining part 142 combines the synchronized multilevel signal 74 and the synchronized noise signal 73, and generates a noise superimposed synchronized multilevel signal 75. As shown in FIG. 30, in the noise superposition synchronized multilevel signal 75, noise is not superimposed on the signal component corresponding to the synchronization signal, while noise is superimposed only on the signal component corresponding to the synchronization multilevel signal. That is, the noise combining part 142 outputs the noise superimposed synchronized multilevel signal 75 in a state that the signal-to-noise ratio of the signal component corresponding to the synchronization signal is always higher than the signal-to-noise ratio of the signal component corresponding to the multilevel signal.

Figure 31:
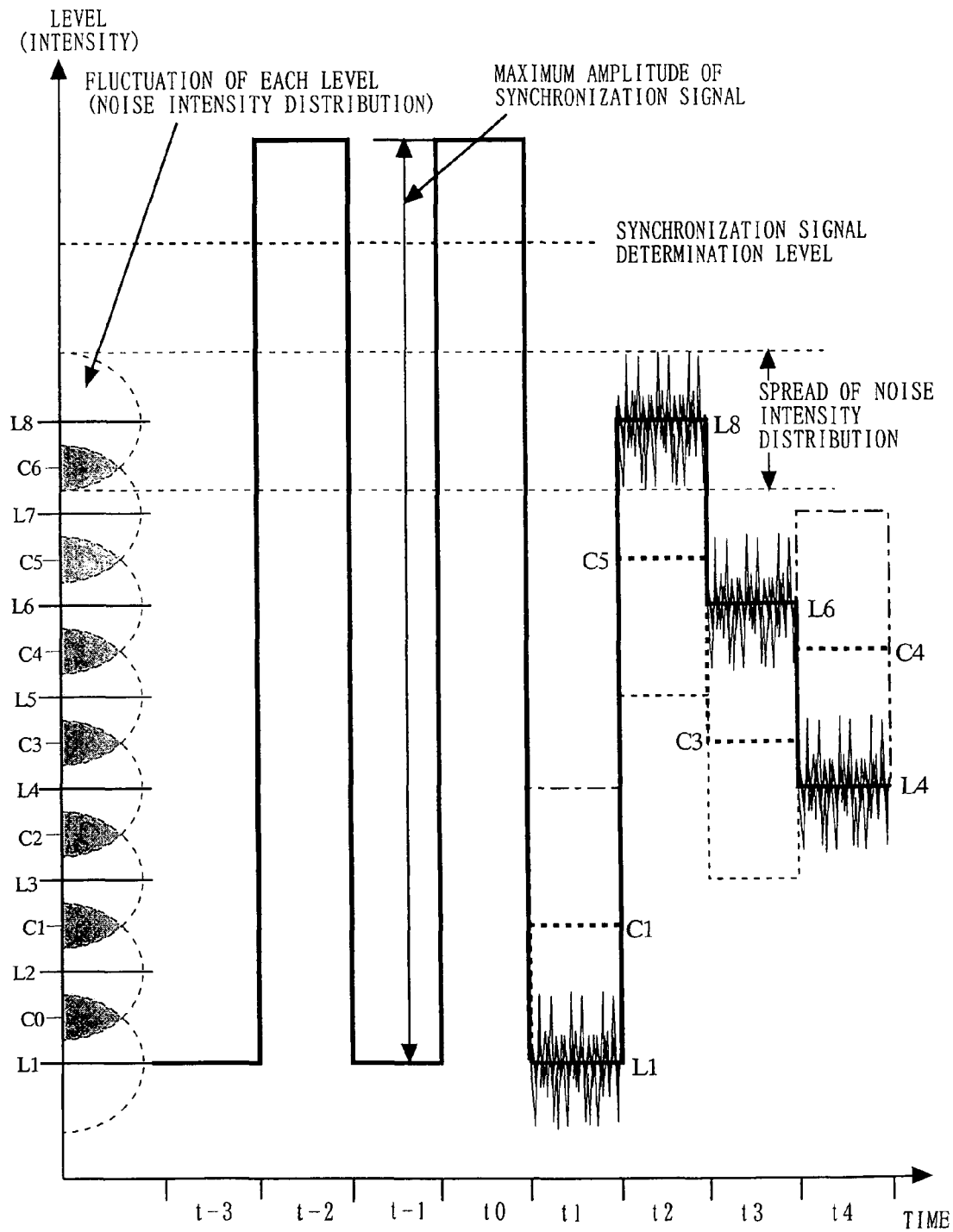
FIG. 31 is a diagram showing an example of a time waveform of a synchronized multilevel signal 76.

Detailed operation of the data receiving apparatus 21205 is described with reference to FIG. 31. FIG. 31 is a diagram showing an example of the time waveform of the synchronized multilevel signal 76 demodulated and reproduced from the modulated signal by the demodulating part 211.

The detecting part 240 detects the maximum amplitude of the synchronized multilevel signal 76, and outputs the detection result as an amplitude detection value to the amplitude controlling part 241. That is, as shown in FIG. 31, the detecting part 240 detects the signal component corresponding to the synchronization signal of the synchronized multilevel signal 76 (referred to as a synchronization signal component, hereinafter) (the signal at time t-2 to t0 in FIG. 31). Since the synchronized noise signal is not superimposed in the data transmitting apparatus 21105, the synchronization signal component has a higher signal-to-noise ratio than the signal component corresponding to the multilevel signal of the synchronized multilevel signal 76 (referred to as a multilevel signal component, hereinafter). Thus, the detecting part 240 can detect with precision the maximum amplitude of the synchronized multilevel signal 76.

On the basis of the amplitude detection value, the amplitude controlling part 241 controls the maximum amplitude of the inputted synchronized multilevel signal 76 (that is, the maximum amplitude of the synchronization signal component) into a fixed value. As such, the data receiving apparatus 21205 performs feedback control of the maximum amplitude of the synchronized multilevel signal 76 by using the detecting part 240 and the amplitude controlling part 241. Even when the level of the modulated signal 14 inputted to the data receiving apparatus 21205 fluctuates, the data receiving apparatus 21205 controls the maximum amplitude of the synchronization signal component, and thereby achieves precise reproduction of the waveform of the synchronized multilevel signal 76.

The synchronization extracting part 242 extracts as a synchronization signal 77 a signal having an amplitude exceeding the synchronization signal determination level from the synchronized multilevel signal 76 shown in FIG. 31, and outputs it to the second multilevel code generating part 212*a*. That is, the synchronization extracting part 242 extracts the synchronization signal component as a synchronization signal 77. The synchronization extracting part 242 holds in advance the maximum amplitude of the multilevel signal component, and sets up as the synchronization signal determination level a value larger than the maximum amplitude of the multilevel signal component. Thus, the synchronization extracting part 242 can easily extract the synchronization signal component.

On the basis of the timing that the synchronization signal 77 is inputted, the second multilevel code generating part 212*a* outputs the generated multilevel code sequence 17. Specifically, the multilevel code sequence 17 is outputted to the multilevel identifying part 212*b* at time t1 to t4 as shown in FIG. 31.

Using the multilevel code sequence 17, the multilevel identifying part 212*b* performs identification of the multilevel signal component inputted at the same timing as the timing that the multilevel code sequence 17 is inputted, and reproduces the information data 18. As such, since the amplitude controlling part 241 controls the maximum amplitude of the synchronized multilevel signal 76 into a fixed value in the amplitude controlling part 241, the multilevel identifying part 212*b* can identify the synchronized multilevel signal 76 with precision by using the multilevel code sequence 17 having a fixed maximum amplitude.

A situation is considered that an unspecified third person wiretaps the modulated signal 14. The third person reproduces the synchronized multilevel signal 76 from the intercepted modulated signal 14, and identifies the synchronized multilevel signal 76 so as to try reproduction of the information data. However, the third person does not share the first key information 11 with the data transmitting apparatus 21105. Thus, the third person can detect the synchronization signal component of low concealment, but cannot generate the multilevel code sequence 17 for identifying the multilevel signal component. Thus, the third person need perform simultaneous identification on all levels of the multilevel signal component so as to extract the first key information 11 or the information data.

However, since the noise combining part 142 of the data transmitting apparatus 21105 combines the synchronized multilevel signal 74 and the synchronized noise signal 73, the signal-to-noise ratio of the multilevel signal component decreases. With decreasing signal-to-noise ratio of the multilevel signal component, the precision of the determination of the levels of the multilevel signal component is restricted. Thus, the third person cannot avoid determination errors in the levels of the multilevel signal component. The third person cannot correctly determine the levels of the multilevel signal component, and hence tries decryption on the result determined incorrectly. Thus, the third person cannot correctly reproduce the information data from the multilevel signal component. Thus, the data communication system according to the eleventh embodiment achieves concealment in the information data.

As described above, according to the present embodiment, the data transmitting apparatus 21105 sets up the signal-to-noise ratio of the signal component corresponding to the synchronization signal of low concealment to be higher than the signal-to-noise ratio of the signal component corresponding to the multilevel signal. Thus, the data receiving apparatus 21205 can extract the synchronization signal with precision. Thus, the data receiving apparatus 21205 can reproduce the information data with precision. Further, the data receiving apparatus 21205 controls the maximum amplitude of the synchronized multilevel signal 76 into a predetermined value. Thus, using the multilevel code sequence 17 having a fixed maximum amplitude, the data receiving apparatus 21205 can identify the synchronized multilevel signal 76 having a fixed maximum amplitude. Accordingly, determination errors can be reduced in comparison with the identification of the synchronized multilevel signal 76 of a case that the maximum amplitude fluctuates.

Here, the eleventh embodiment has been described for the case that the multilevel encoding part 111 employs time division multiplexing when the synchronization signal 72 is multiplexed on the multilevel signal 13. Alternatively, frequency multiplexing, space division multiple, code division multiplexing or the like may be employed.

Further, in the eleventh embodiment, the synchronization signal need not be inputted into the first multilevel code generating part 111*a*. In this case, the signal synchronizing part 140 may insert the synchronization signal 72 into the multilevel signal 13 at the timing that the synchronization signal 72 is inputted. As a result, the signal synchronizing part 140 can generate the same signal as the synchronized multilevel signal 74.

Further, the eleventh embodiment has been described for the case that the data transmitting apparatus 21105 imparts noise only to the signal component corresponding to the multilevel signal of the synchronized multilevel signal 74, so that the signal-to-noise ratio of the signal component corresponding to the synchronization signal of the synchronized multilevel signal 74 may be set up higher than the signal-to-noise ratio of the signal component corresponding to the multilevel signal of the synchronized multilevel signal 74.

However, the data transmitting apparatus 21105 may set up the maximum amplitude of the synchronization signal 72 larger than the maximum amplitude of the multilevel signal 13 by a predetermined ratio, so that the signal-to-noise ratio of the signal component corresponding to the synchronization signal of the synchronized multilevel signal 74 may be set up higher than the signal-to-noise ratio of the signal component corresponding to the multilevel signal of the synchronized multilevel signal.

Further, in the eleventh embodiment, the detecting part 240 may adopt the average of the amplitude of the synchronized multilevel signal 76 as the amplitude detection value. In this case, the amplitude controlling part 241 holds in advance the maximum amplitude ratio which is the ratio between the maximum amplitude of the synchronization signal 72 and the maximum amplitude of the multilevel signal 13. Using the maximum amplitude ratio and the amplitude detection value, the amplitude controlling part 241 determines the maximum amplitude of the synchronized multilevel signal 76. In general, in the synchronized multilevel signal 74, the time when the synchronization signal 72 is assigned is shorter than the time when the multilevel signal 13 is assigned. Thus, the average of the amplitude of the synchronized multilevel signal 76 can be regarded as the average of the multilevel signal component. Thus, the amplitude controlling part 241 can control the maximum amplitude of the synchronized multilevel signal 76 in correspondence to the change in the average of the amplitude of the synchronized multilevel signal. Thus, the data receiving apparatus 21205 can be constructed in a simple configuration in comparison with the maximum amplitude of the synchronized multilevel signal 76 (maximum amplitude of the synchronization signal component) is detected.

Twelfth Embodiment

Figure 32:
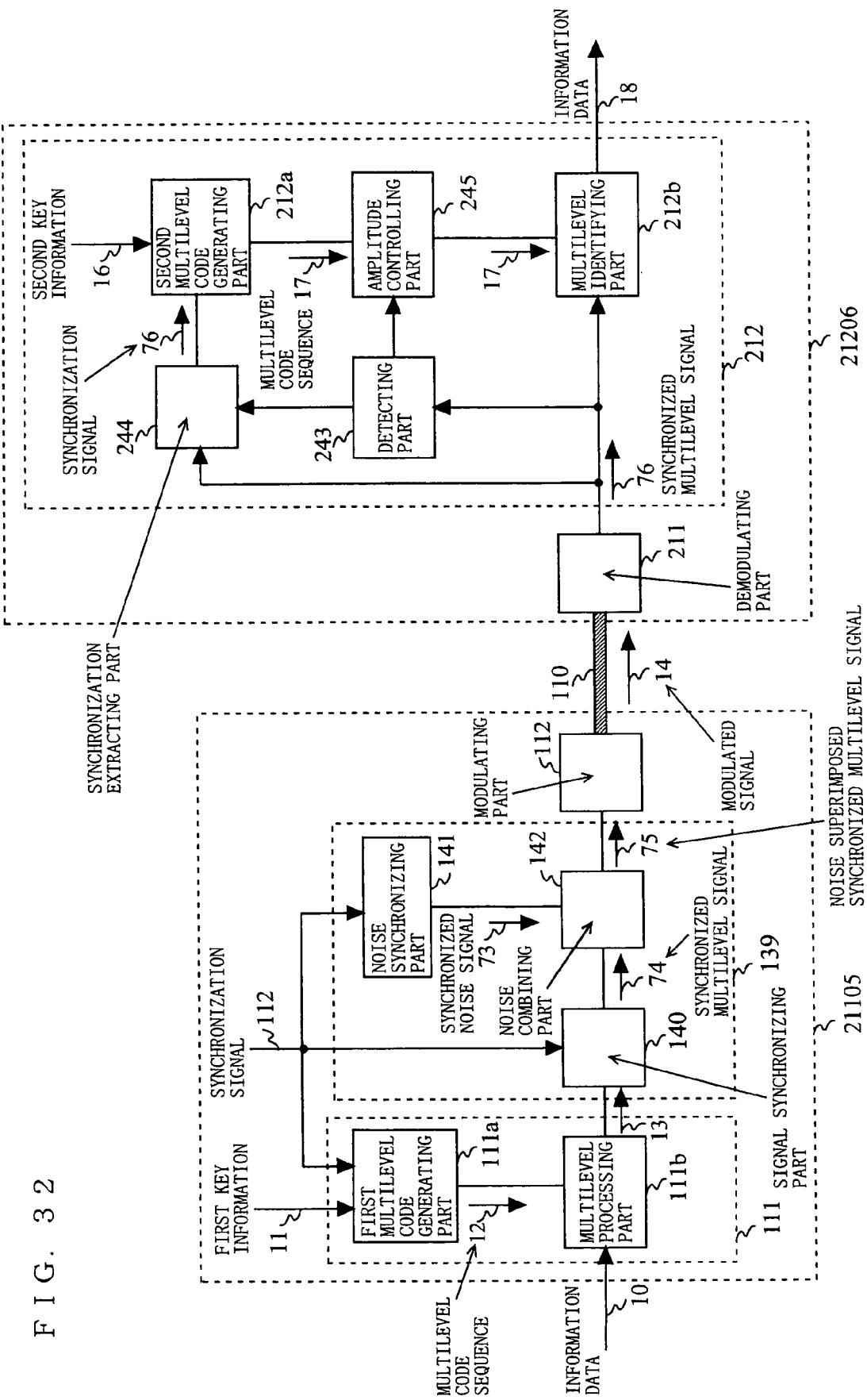
FIG. 32 is a block diagram showing a configuration of a data communication system according to a twelfth embodiment of the present invention.

FIG. 32 is a block diagram showing a configuration of a data communication system according to a twelfth embodiment of the present invention. In the data communication system shown in FIG. 32, the data receiving apparatus 21206 is solely different from the eleventh embodiment (FIG. 24). In the data receiving apparatus 21206, the multilevel decoding part 212 includes a second multilevel code generating part 212a, a multilevel identifying part 212b, a detecting part 243, a synchronization extracting part 244 and an amplitude controlling part 245. Here, the data transmitting apparatus 21105 of the present embodiment has the same configuration as the data transmitting apparatus 21105 (FIG. 24) of the eleventh embodiment, and hence its description is omitted.

In the data receiving apparatus 21206, the demodulating part 211 demodulates the modulated signal 14 transmitted via the transmission path 110, and reproduces the synchronized multilevel signal 76. The detecting part 243 detects the maximum amplitude of the synchronized multilevel signal 76.

The synchronization extracting part 244 holds in advance a first maximum amplitude ratio which is the ratio between the maximum amplitude of the synchronization signal 72 and the maximum amplitude of the multilevel signal 13. The synchronization extracting part 244 sets up a synchronization signal determination level from the maximum amplitude of the synchronized multilevel signal (that is, the maximum amplitude of the synchronization signal component) detected by the detecting part 243 and the maximum amplitude ratio. The synchronization signal determination level is set up larger than the maximum amplitude of the multilevel signal component. The synchronization extracting part 244 extracts as a synchronization signal 77 a signal having an amplitude larger than the synchronization signal determination level, and outputs it to the second multilevel code generating part 212a.

On the basis of the timing that the synchronization signal 77 is inputted, the second multilevel code generating part 212a outputs the multilevel code sequence 17. On the basis of the detection result of the detecting part 243, the amplitude controlling part 245 controls the maximum amplitude of the multilevel code sequence 17. With adopting as the threshold the multilevel code sequence 17 in which the amplitude is controlled, the multilevel identifying part 212b performs identification of the synchronized multilevel signal 76 and reproduces the information data 18.

In the eleventh embodiment, identification has been performed on the synchronized multilevel signal 76 in which the maximum amplitude is controlled. However, in the twelfth embodiment, the data receiving apparatus 21206 is different in the point that the maximum amplitude of the synchronized multilevel signal 76 is not controlled and that the maximum amplitude of the multilevel code sequence 17 is controlled on the basis of the detection result of the detecting part 243. Then, the data receiving apparatus 21206 identifies the synchronized multilevel signal 76 directly by using the multilevel code sequence 17 in which the maximum amplitude is controlled.

As described above, according to the present embodiment, on the basis of the maximum amplitude of the synchronized multilevel signal 76, the data receiving apparatus 21206 controls the maximum amplitude of the multilevel code sequence 17 for the purpose of identification of the synchronized multilevel signal 76 in correspondence to the change of the maximum amplitude of the synchronized multilevel signal 76. Further, the data receiving apparatus 21206 does not perform feedback control of the maximum amplitude of the synchronized multilevel signal 76 like in the eleventh embodiment. Thus, the data receiving apparatus 21206 can adapt the amplitude control of the synchronized multilevel signal 76 at high speed even for a rapid change in the maximum amplitude of the synchronized multilevel signal 76.

Here, similarly to the detecting part 240 according to the eleventh embodiment, in the twelfth embodiment, the detecting part 243 may adopt the average of the amplitude of the synchronized multilevel signal 76 as the amplitude detection value. In this case, the synchronization extracting part 244 holds a first maximum amplitude ratio in advance. Using the amplitude detection value, and the first maximum amplitude ratio, the synchronization extracting part 244 determines the synchronization signal determination level. Further, the amplitude controlling part 245 holds in advance a second maximum amplitude ratio which is the ratio between the maximum amplitude of the synchronization signal 72 and the maximum amplitude of the multilevel code sequence 17. Using the amplitude detection value and the second maximum amplitude ratio, the synchronization extracting part 245 determines the maximum amplitude of the multilevel code sequence 17. Also in this case, the data receiving apparatus 21206 can be constructed in a simple configuration in comparison with the case that the maximum amplitude is detected.

Thirteenth Embodiment

Figure 33:
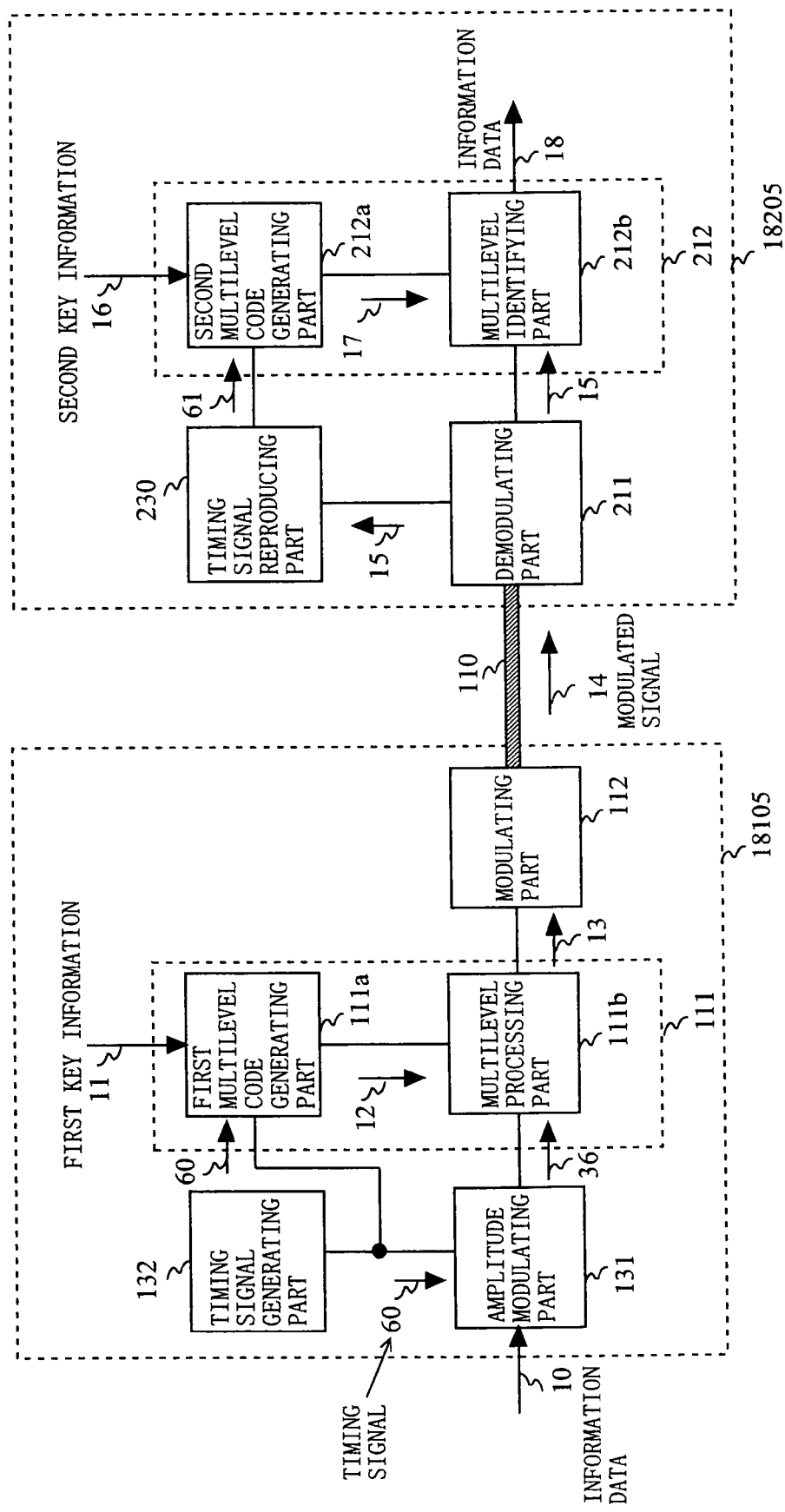
FIG. 33 is a block diagram showing a configuration of a data communication system according to a thirteenth embodiment of the present invention.

FIG. 33 is a block diagram showing a configuration of a data communication system according to a thirteenth embodiment of the present invention. In FIG. 33, the data communication system has a configuration that a data transmitting apparatus 18105 is connected to a data receiving apparatus 18205 via a transmission path 110. The data transmitting apparatus 18105 comprises a multilevel encoding part 111, a modulating part 112, a timing signal generating part 132 and an amplitude modulating part 131. The multilevel encoding part 111 includes a first multilevel code generating part 111a and a multilevel processing part 111b. The data receiving apparatus 18205 comprises a demodulating part 211, a multilevel decoding part 212 and a timing signal reproducing part 230. The multilevel decoding part 212 includes a second multilevel code generating part 212a and a multilevel identifying part 212b. That is, in comparison with the data communication system (FIG. 1) according to the first embodiment, the data communication system according to the thirteenth embodiment is different in the point that the data transmitting apparatus 18105 further comprises a timing signal generating part 132 and an amplitude modulating part 131 and that the data receiving apparatus 18205 further comprises a timing signal reproducing part 230.

Figure 34:
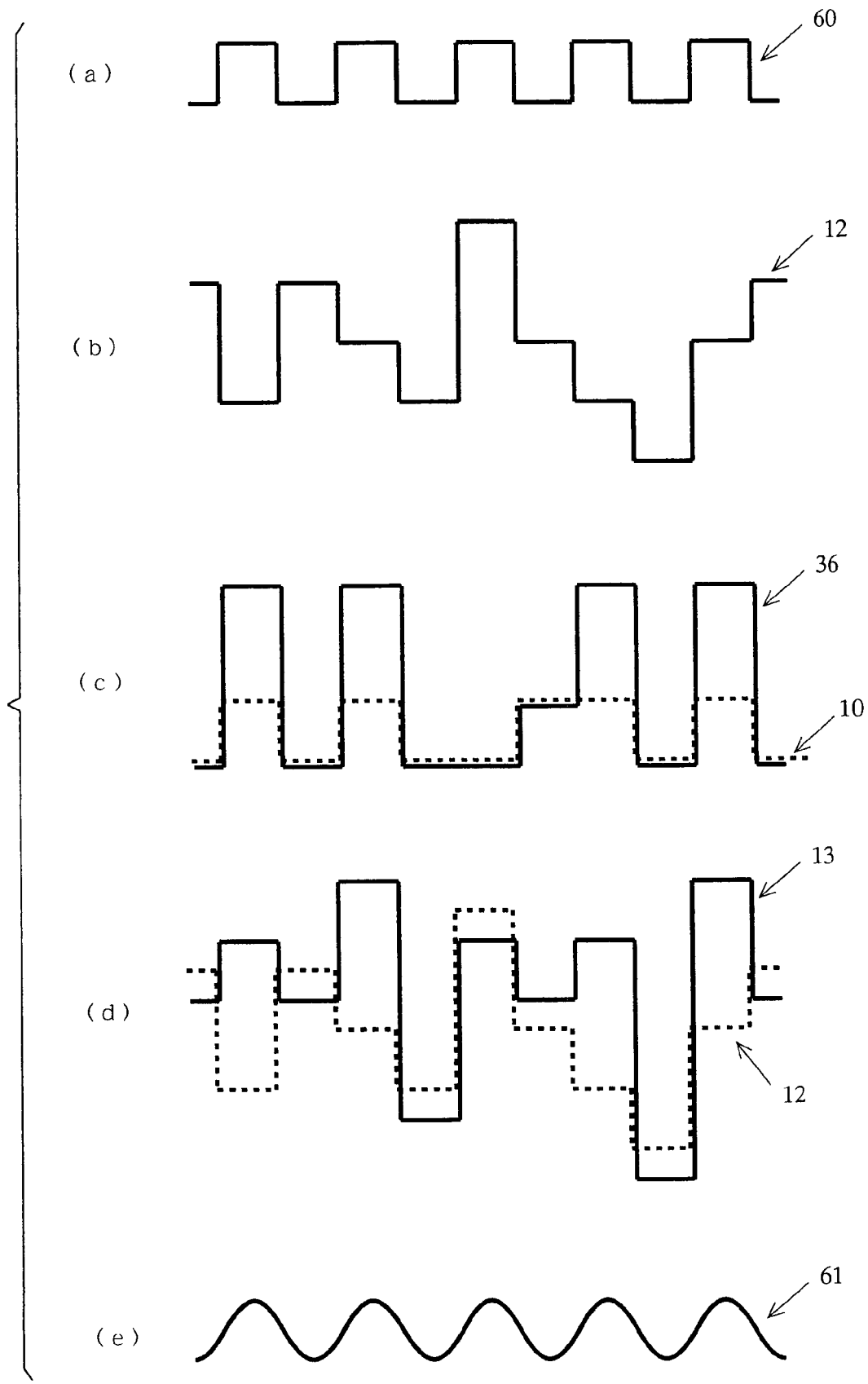
FIG. 34 is a schematic diagram describing signal waveform of a data communication system according to a thirteenth embodiment of the present invention.

FIG. 34 is a schematic diagram describing signal waveforms of various parts of a data communication system according to a thirteenth embodiment of the present invention. FIG. 34(a) shows an exemplary waveform of a timing signal 60 outputted from the timing generating part 132. FIG. 34(b) shows an exemplary waveform of a multilevel code sequence 12 outputted from the first multilevel code generating part 111a. FIG. 34(c) shows an exemplary waveform of amplitude modulated information data 36 outputted from the amplitude modulating part 131. Here, the dotted line in FIG. 34(c) indicates an exemplary waveform of information data 10 inputted to the amplitude modulating part 131. FIG. 34(d) shows an exemplary waveform of a multilevel signal 13 outputted from the multilevel processing part 111b. Here, the dotted line in FIG. 34(d) indicates an exemplary waveform of a multilevel code sequence 12 shown in FIG. 34(b). FIG. 34(e) shows an exemplary waveform of a timing signal 61 reproduce by the timing signal reproducing part 230.

The operation of the data communication system according to the thirteenth embodiment is described below with reference to FIG. 34. Here, the configuration of the present embodiment is similar to that of the first embodiment (FIG. 1). Thus, blocks that perform the same operation as the first embodiment are designated by the same reference numerals, and their description is omitted.

In the data transmitting apparatus 18105, the timing signal generating part 132 generates a timing signal 60 (FIG. 34(a)) of a predetermined period, and outputs it to the first multilevel code generating part 111a and the amplitude modulating part 131. The first multilevel code generating part 111a generates a multilevel code sequence 12 (FIG. 34(b)) in synchronization with the timing signal 60. The amplitude modulating part 131 performs amplitude modulation on the information data 10 on the basis of the timing signal 60, and outputs it as an amplitude modulated information data 36 (FIG. 34(c)) to the multilevel encoding part 111. The multilevel encoding part 111 combines the amplitude modulated information data 36 and the multilevel code sequence 12, and generates a multilevel signal 13 (FIG. 34(d)). Here, the timing signal 60 is a clock signal or a frame signal corresponding to the multilevel code sequence 12 (or the multilevel signal 13).

In the data receiving apparatus 18205, the timing signal reproducing part 230 receives the multilevel signal 15 from the demodulating part 211. The timing signal reproducing part 230 extracts a timing signal 61 (FIG. 34(e)) corresponding to the above-mentioned timing signal 60 from the multilevel signal 15, and outputs it to the second multilevel code generating part 212a. In synchronization with the timing signal 61, the second multilevel code generating part 212a generates a multilevel code sequence 17 corresponding to the multilevel code sequence 12 described above.

Here, the timing signal reproducing part 230 may have any kind of configuration as long as the timing signal 61 can be extracted from the multilevel signal 15. For example, the timing signal reproducing part 230 may be composed of a filter that passes only the frequency band corresponding to the timing signal 61, and may have a configuration that frequency synchronization is further performed on the passed signal so that a more accurate timing signal 61 should be reproduce.

Figure 36:
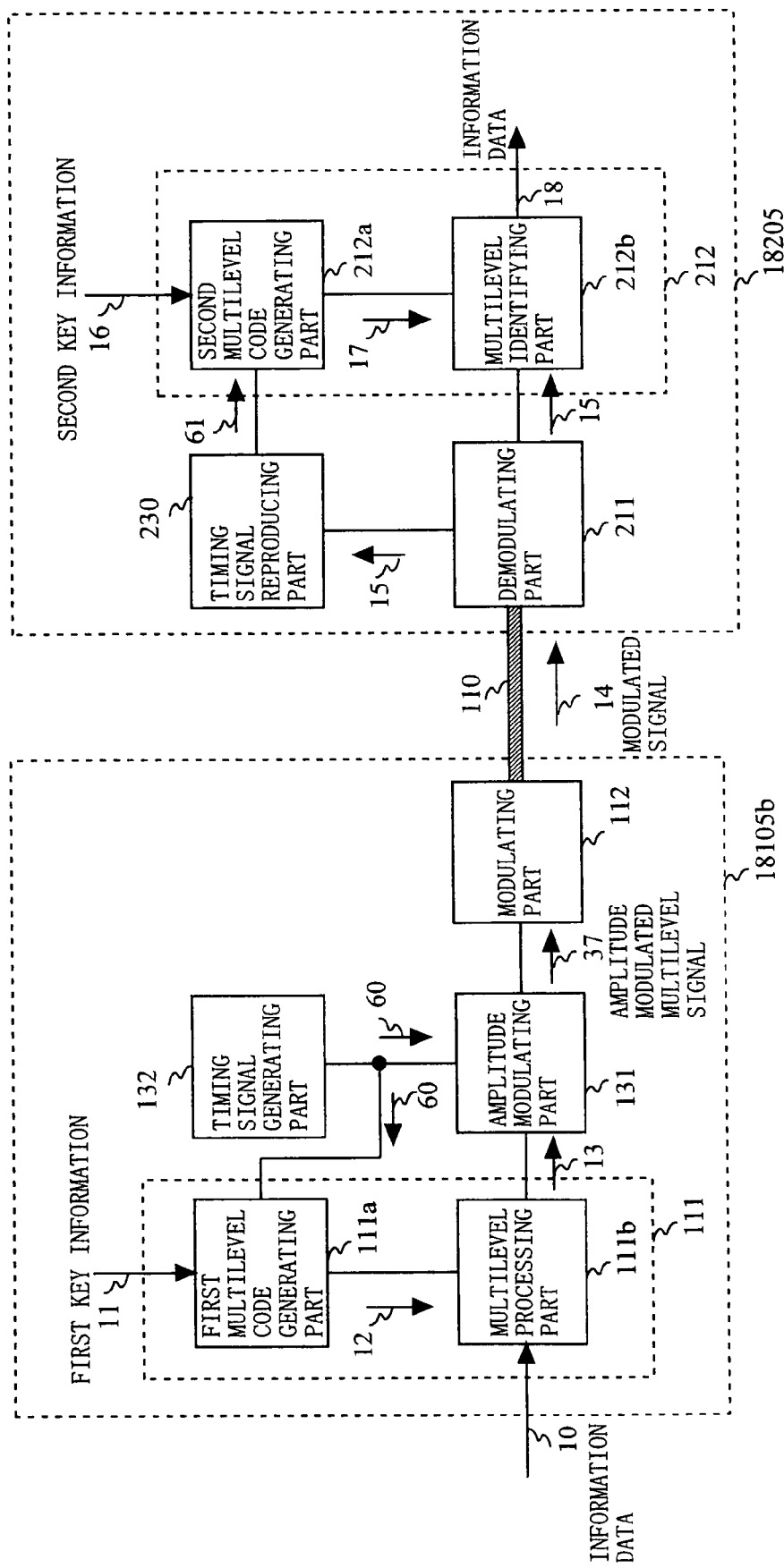
FIG. 36 is a block diagram showing a second configuration of a data communication system according to a thirteenth embodiment of the present invention.
Figure 37:
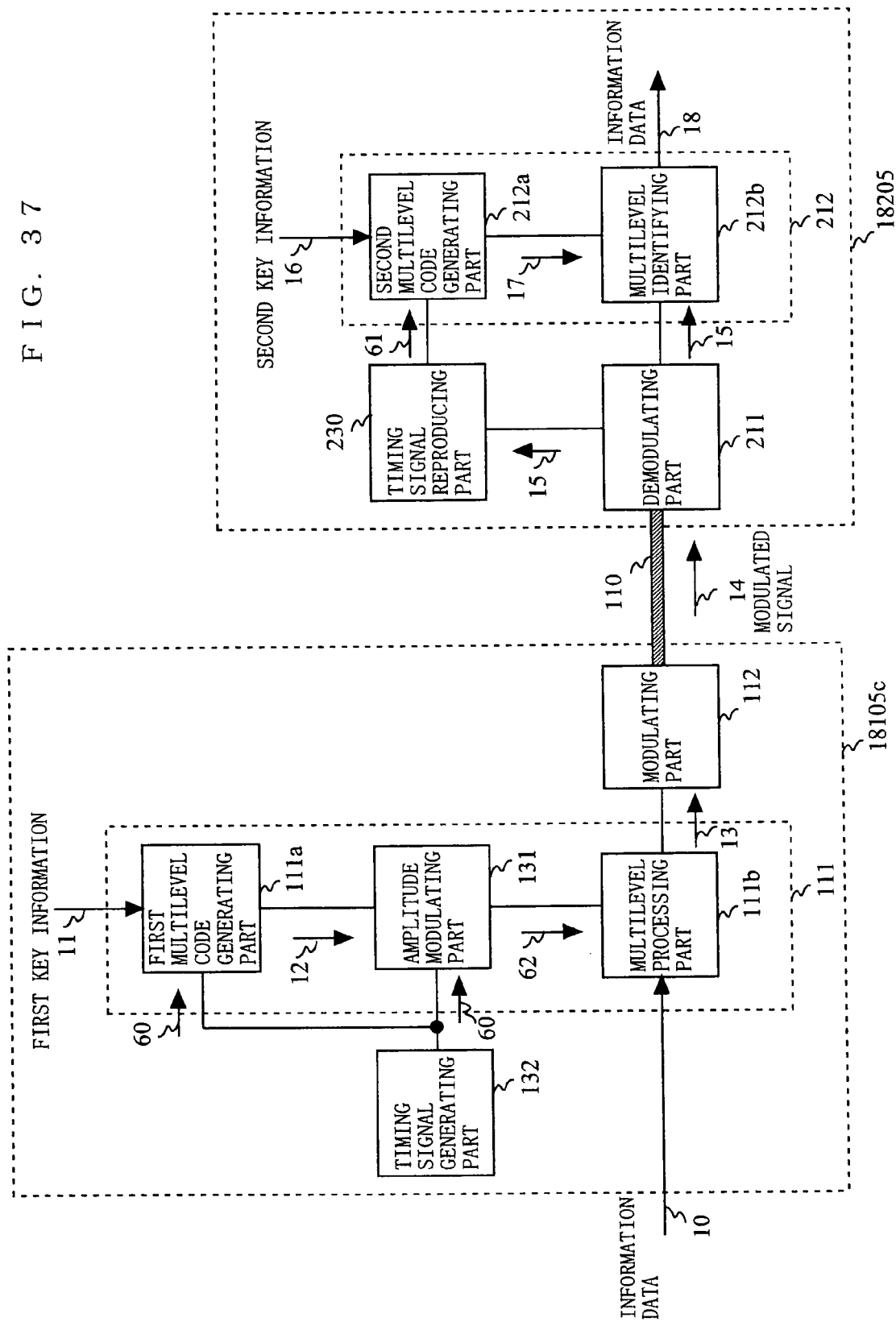
FIG. 37 is a block diagram showing a third configuration of a data communication system according to a thirteenth embodiment of the present invention.

Further, the amplitude modulating part 131 may be inserted and connected to any part different from that in FIG. 33, as long as amplitude fluctuation or level fluctuation in synchronization with the timing signal 60 can be imparted to the multilevel signal 13. For example, the amplitude modulating part 131 may be inserted between the multilevel encoding part 111 and the modulating part 112 and may perform amplitude modulation on the multilevel signal 13 (see FIG. 36). Alternatively the amplitude modulating part 131 may be inserted between the first multilevel code generating part 111a and the multilevel processing part 111b and may perform amplitude modulation on the multilevel code sequence 12 (see FIG. 37).

Figure 38:
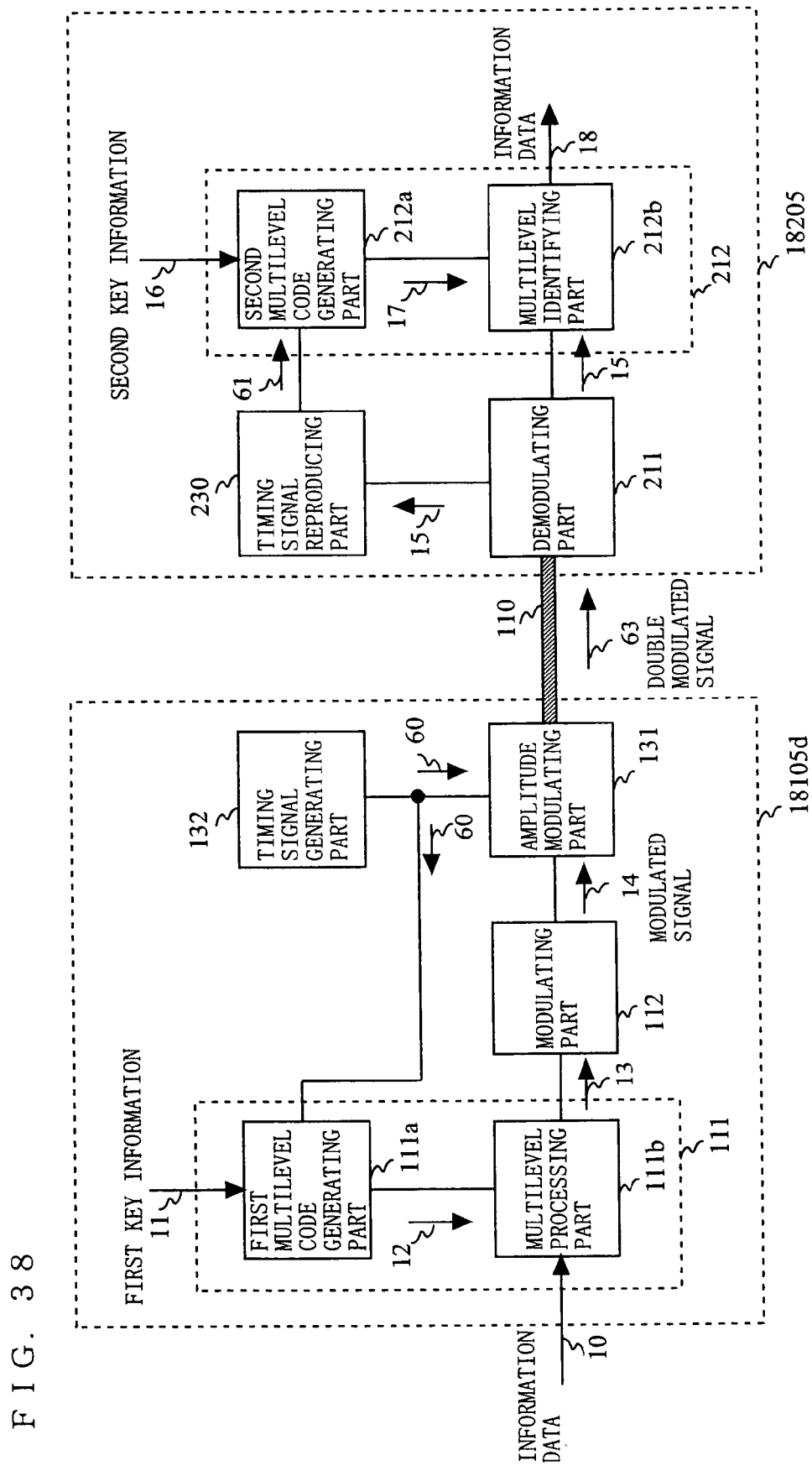
FIG. 38 is a block diagram showing a fourth configuration of a data communication system according to a thirteenth embodiment of the present invention.

Further, the amplitude modulating part 131 may be connected to a subsequent stage of the modulating part 112 and may perform amplitude modulation on the modulated signal 14 (see FIG. 38). In this case, it is preferable that the modulation form in the amplitude modulating part 131 is different from the modulation form in the modulating part 112. For example, in the data communication system, when one part adopts an intensity modulation form while the other part adopts an angle modulation form, waveform degradation by interference between the information data 10 and the timing signal 60 can be reduced so that higher quality transmission is achieved.

Further, in the amplitude modulating part 131, from the viewpoint of reproduction quality of the timing signal 61 in the timing signal reproducing part 230, it is preferable that the amplitude modulation of the input signal (information data 10, multilevel code sequence 12, multilevel signal 13 or modulated signal 14) based on the timing signal 60 is set up sufficiently large relative to the maximum amplitude of the input signal.

Figure 35:
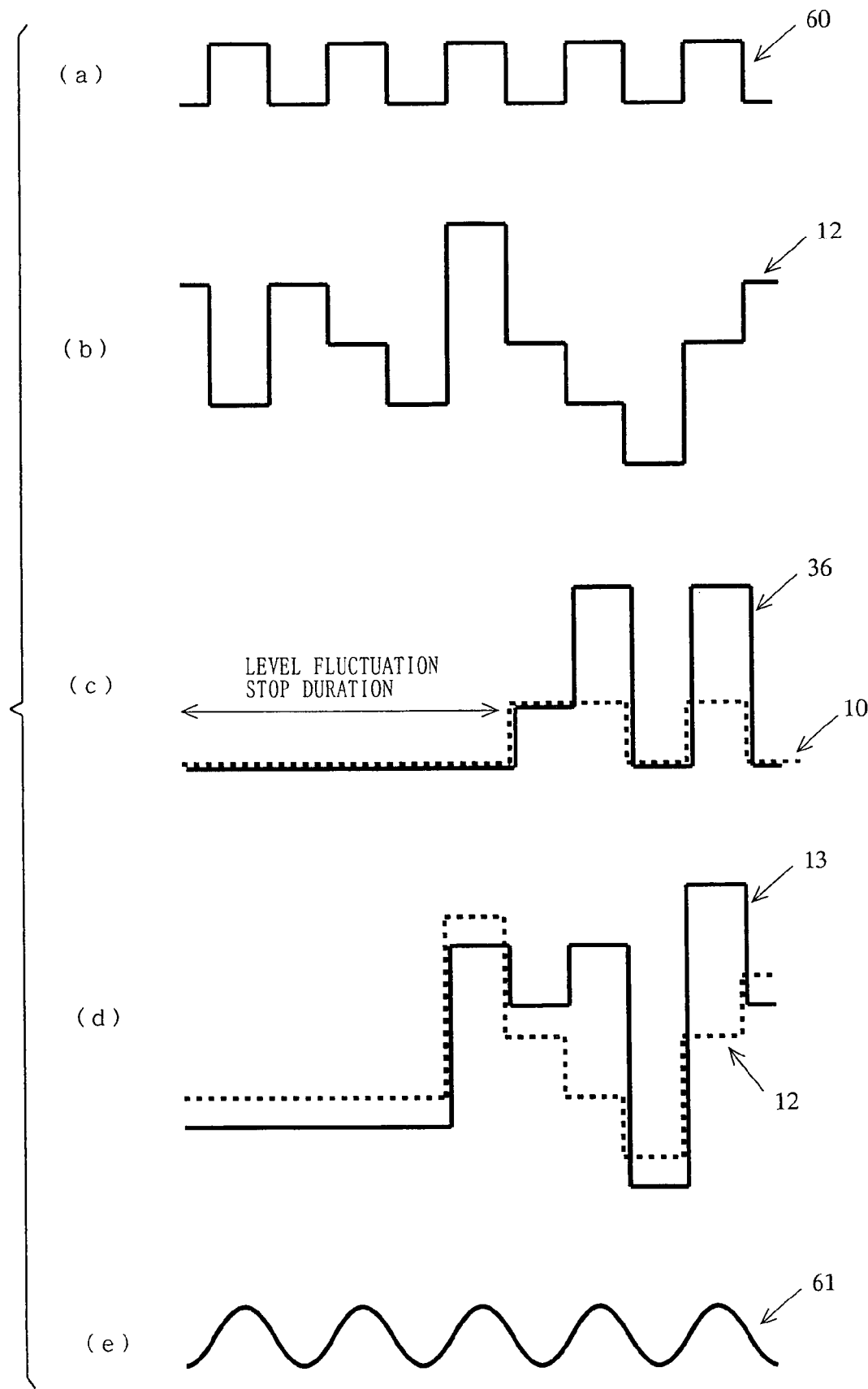
FIG. 35 is a schematic diagram describing a signal waveform of a data communication system in a case that an input signal to an amplitude modulating part 131 is maintained at a fixed level in a predetermined duration.

Further, in the data communication system, from the viewpoint of reproduction quality of the timing signal 61 in the timing signal reproducing part 230, it is preferable that the input signal (information data 10, multilevel code sequence 12, multilevel signal 13 or modulated signal 14) to the amplitude modulating part 131 is maintained at a fixed level in a predetermined duration. FIG. 35 is a schematic diagram describing a signal waveform of a data communication system in a case that an input signal to an amplitude modulating part 131 is maintained at a fixed level in a predetermined duration. Referring to FIG. 35, the data transmitting apparatus 18105 maintains the input signal to the amplitude modulating part 131 (the information data 10 in this example) at a fixed level in a predetermined duration. By virtue of this, the data receiving apparatus 18205 can reproduce a higher quality timing signal 61.

As described above, according to the present embodiment, information data to be transmitted is encoded as a multilevel signal, and then amplitude fluctuation or level fluctuation in synchronization with the timing signal is imparted to the multilevel signal so that synchronization processing at the time of demodulation of the multilevel signal can be simplified. This provides a data communication system having a simple configuration.

Fourteenth Embodiment

Figure 39:
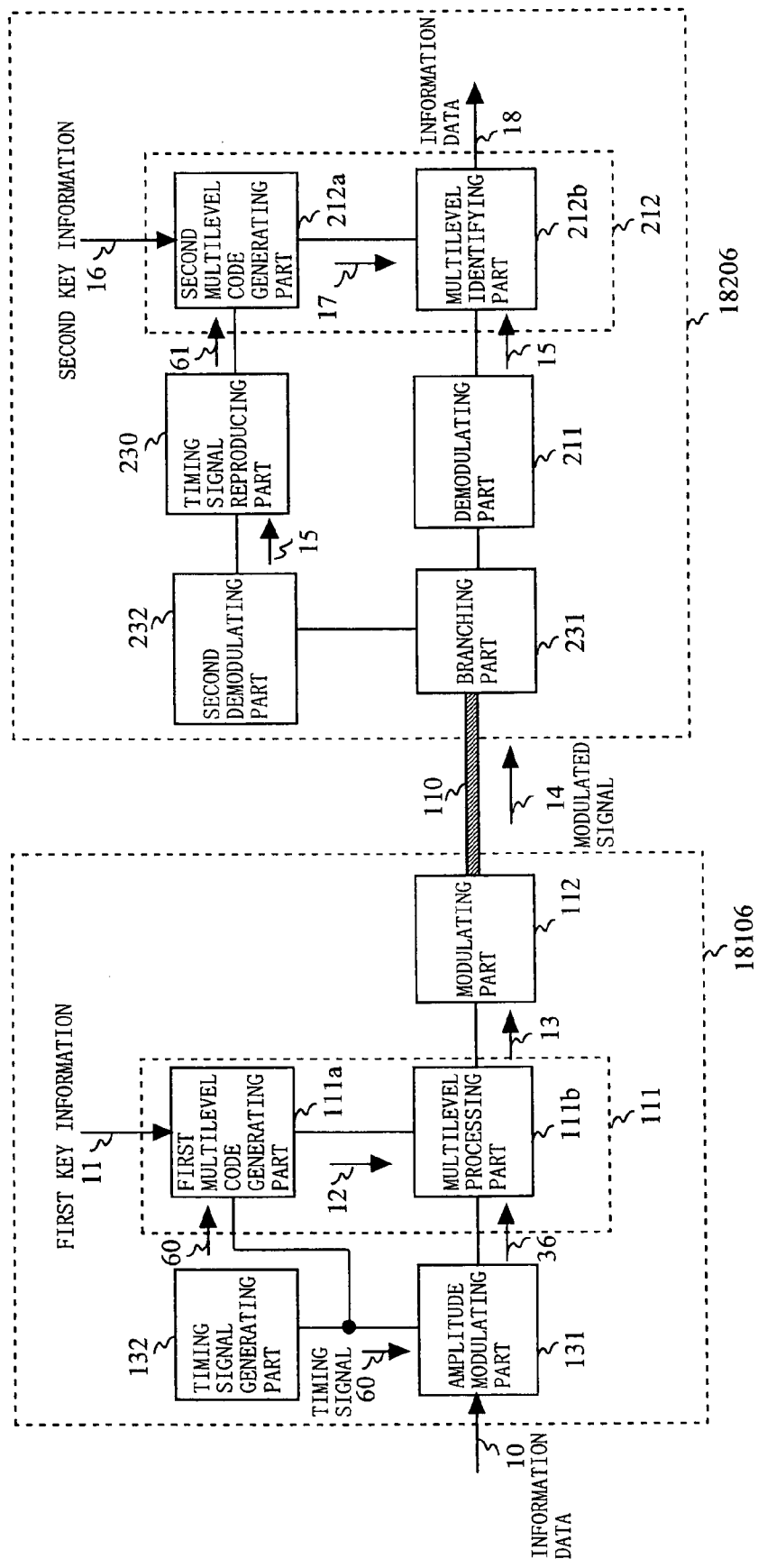
FIG. 39 is a block diagram showing a configuration of a data communication system according to a fourteenth embodiment of the present invention.

FIG. 39 is a block diagram showing a configuration of a data communication system according to a fourteenth embodiment of the present invention. In FIG. 39, the data communication system has a configuration that a data transmitting apparatus 18106 is connected to a data receiving apparatus 18206 via a transmission path 110. The data transmitting apparatus 18106 is the same as the data transmitting apparatus 18105 according to the thirteenth embodiment, and hence it description is omitted. The data receiving apparatus 18206 further comprises a branching part 231 and a second demodulating part 232 in comparison with the data receiving apparatus 18205 according to the thirteenth embodiment.

The operation of the data communication system according to the fourteenth embodiment is described below. Here, the configuration of the present embodiment is similar to that of the thirteenth embodiment (FIG. 33). Thus, blocks that perform the same operation as the thirteenth embodiment are designated by the same reference numerals, and their description is omitted.

In the data receiving apparatus 18206, the branching part 231 branches the modulated signal 14 transmitted via the transmission path 110, and outputs one of them to the demodulating part 211 and the other to the second demodulating part 232. The second demodulating part 232 demodulates the modulated signal 14 and reproduces the multilevel signal 15. The timing signal reproducing part 230 extracts a timing signal 61 corresponding to the above-mentioned timing signal 60 from the multilevel signal 15 outputted from the second demodulating part 232, and outputs it to the second multilevel code generating part 212a.

As described above, according to the present embodiment, information data to be transmitted is encoded as a multilevel signal, and then amplitude fluctuation or level fluctuation in synchronization with the timing signal is imparted to the multilevel signal so that synchronization processing at the time of demodulation of the multilevel signal can be simplified. This provides a data communication system having a simple configuration.

Fifteenth Embodiment

Figure 40:
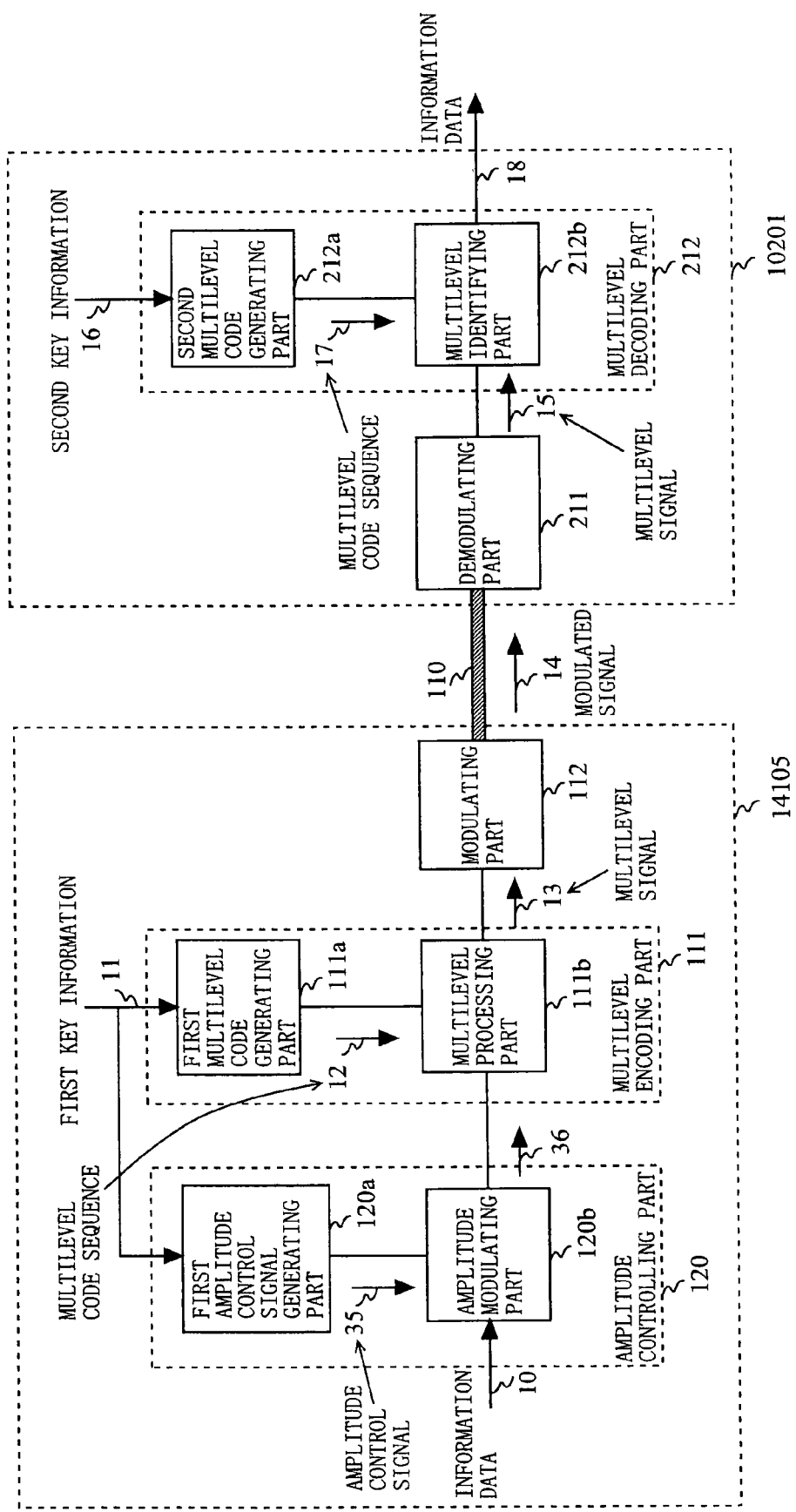
FIG. 40 is a block diagram showing an exemplary configuration of a data communication system according to a fifteenth embodiment of the present invention.

FIG. 40 is a block diagram showing an exemplary configuration of a data communication system according to a fifteenth embodiment of the present invention. In FIG. 40, in comparison with the data communication system (FIG. 1) according to the first embodiment, in the data communication system according to the fifteenth embodiment, the data transmitting apparatus 14105 further comprises an amplitude controlling part 120. The amplitude controlling part 120 includes a first amplitude control signal generating part 120a and an amplitude modulating part 120b.

Figure 41:
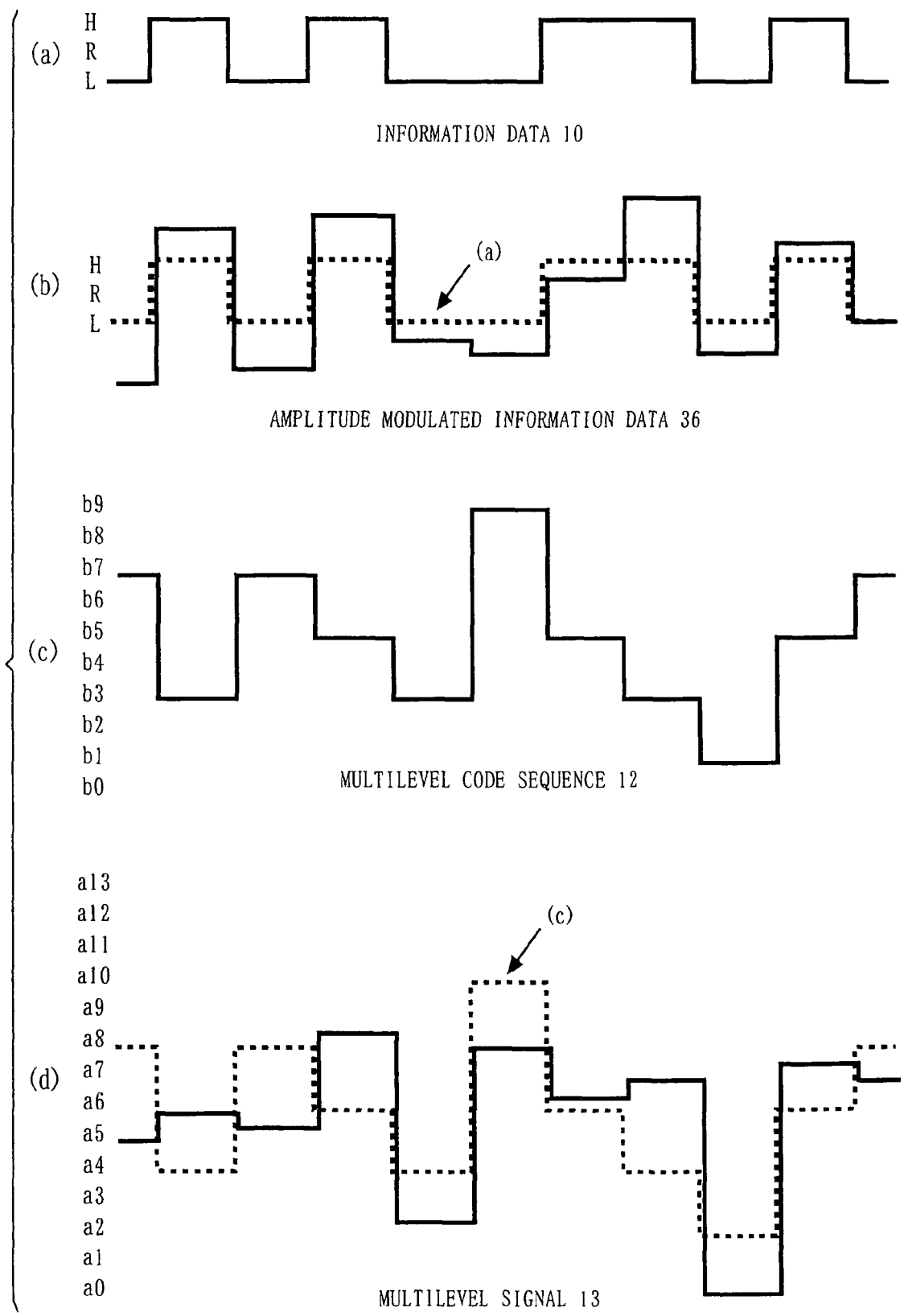
FIG. 41 is a schematic diagram describing signal waveforms of various parts of a data communication system according to a fifteenth embodiment of the present invention.

FIG. 41 is a schematic diagram describing signal waveforms of various parts of a data communication system according to a fifteenth embodiment of the present invention. FIG. 41(*a*) shows an example of the waveform of information data 10. FIG. 41(*b*) shows an example of the waveform of amplitude modulated information data 36 outputted from the amplitude modulating part 120b. Here, the dotted line in FIG. 41(*b*) indicates the waveform of the information data 10 shown in FIG. 41(*a*). FIG. 41(*c*) shows an example of the waveform of a multilevel code sequence 12 outputted from the first multilevel code generating part 111a. FIG. 41(*d*) shows an example of the waveform of a multilevel signal 13 outputted from the multilevel processing part 111b. Here, the dotted line in FIG. 41(*d*) indicates an example of the waveform of the multilevel signal 13 shown in FIG. 26(*c*). The operation of the data communication system according to the fifteenth embodiment is described below with reference to FIG. 41. Here, the configuration of the present embodiment is similar to that of the first embodiment (FIG. 1). Thus, blocks that perform the same operation as the first embodiment are designated by the same reference numerals, and their description is omitted.

In the data transmitting apparatus 14105, first key information 11 is inputted to the first amplitude control signal generating part 120a. On the basis of the first key information 11, the first amplitude control signal generating part 120a generates an amplitude control signal 35 that varies in the value substantially in a random number manner. The amplitude control signal 35 is inputted to the amplitude modulating part 120b. Further, the information data 10 (FIG. 41(*a*)) is inputted to the amplitude modulating part 120b. On the basis of the amplitude control signal 35, the amplitude modulating part 120b performs approximately random amplitude modulation on the information data 10 (FIG. 41(*a*)), and outputs the amplitude modulated information data 36 (FIG. 41(*b*)). Here, as shown in FIGS. 41(*a*) and 41(*b*), the amplitude modulating part 120b performs the amplitude modulation within a range in which the polarity is not changed with adopting as a reference level R the amplitude center level of the information data 10 of the original signal.

The amplitude modulated information data 36 (FIG. 41(*b*)) and the multilevel code sequence 12 (FIG. 41(*c*)) are inputted to the multilevel processing part 111b. With recognizing the levels of the multilevel code sequence 12 as bias levels to the reference level R of the amplitude information modulation data 36, the multilevel processing part 111b adds the multilevel code sequence 12 and the amplitude modulated information data 36, and generates the multilevel signal 13 (FIG. 41(*d*)).

In the data receiving apparatus 10201, the multilevel identifying part 212b receives the multilevel signal 15 from the demodulating part 211. With adopting as the threshold (reference level) the multilevel code sequence 17 (the same as FIG. 41(*c*)) generated on the basis of the second key information 16 which is the same as the first key information 11, the multilevel identifying part 212b performs identification (binary determination) of the multilevel signal 15. Here, as described above, the amplitude modulating part 120b does not change the polarity of the original signal (information data 10). Thus, when identification is performed with reference to the multilevel code sequence 17 which is equivalent to the multilevel code sequence 12, the multilevel identifying part 212b can correctly reproduce the information data 18.

Wiretapping operation for the modulated signal by a third person is described next. As described above, a third person is expected to decrypt the modulated signal by using a configuration similar to that of the data receiving apparatus 10201 or alternatively a data receiving apparatus of yet higher performance (a wiretapper data receiving apparatus). The wiretapper data receiving apparatus demodulates the modulated signal 14 and thereby reproduces the multilevel signal. However, the wiretapper data receiving apparatus does not share the key information with the data transmitting apparatus 14105, and hence cannot generate the multilevel code sequence from the key information like in the data receiving apparatus 10201. Thus, the wiretapper data receiving apparatus cannot perform binary determination of the multilevel signal on the basis of the multilevel code sequence.

Wiretapping operation adoptable in such a case is a method that identification is performed simultaneously on the entire levels of the multilevel signal (referred to as a "brute force attack" in general). That is, the wiretapper data receiving apparatus prepares thresholds between all signal points that the multilevel signal can take, then performs simultaneous determination of the multilevel signal, and analyzes the determination result so as to try to extract correct key information or information data. For example, the wiretapper data receiving apparatus adopts as the thresholds the levels c0/c1/c2/c3/c4/c5/c6 of the multilevel code sequence 12 shown in FIG. 2, and performs multilevel determination of the multilevel signal so as to try to extract correct key information or information data.

Figure 42:
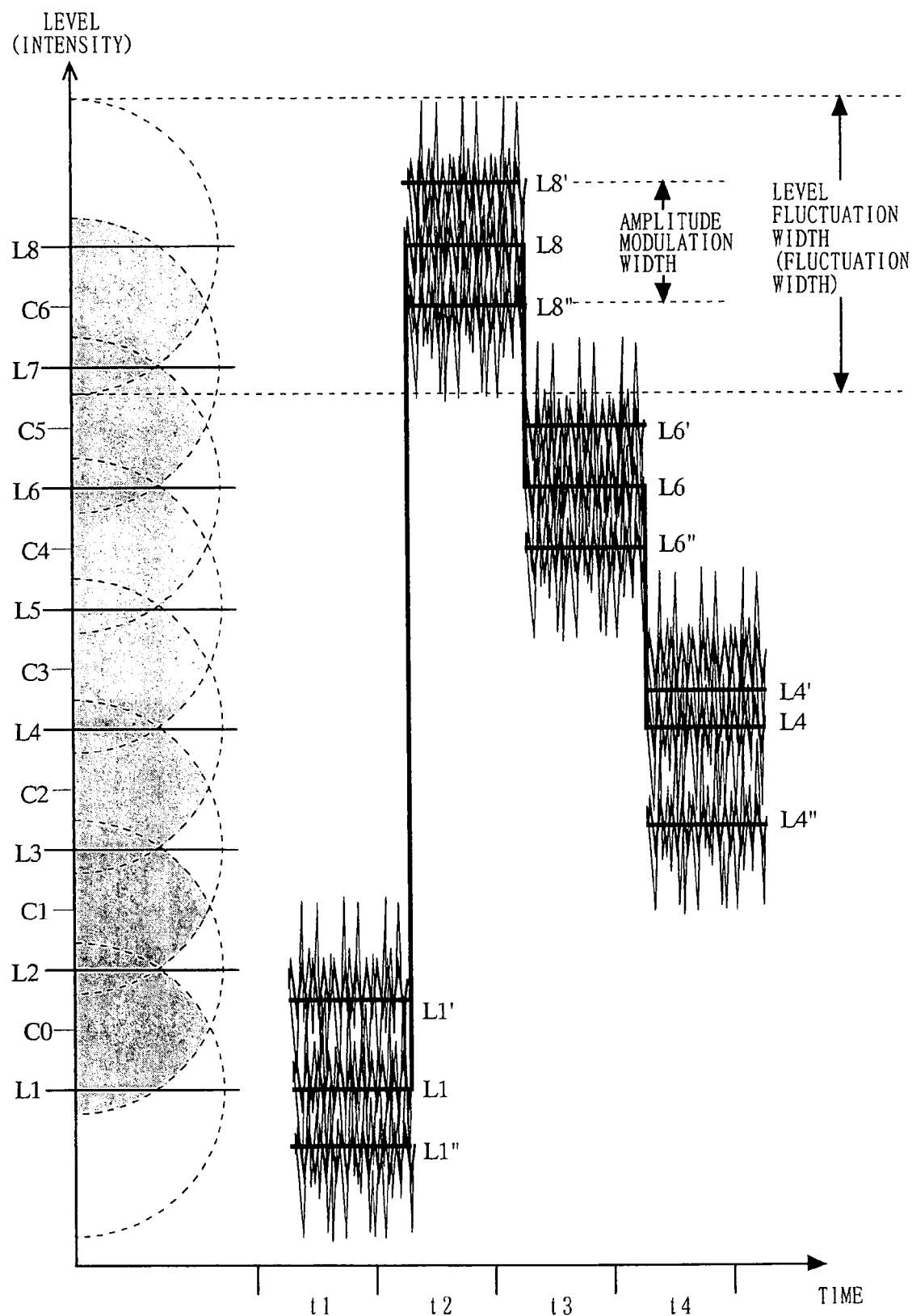
FIG. 42 is a schematic diagram describing transmission signal quality of a data communication system according to a fifteenth embodiment of the present invention.

Nevertheless, as described above, in the actual transmission system, noise occurs owing to various factors. Then, this noise is superimposed on the modulated signal, so that the levels of the multilevel signal vary in time and instantaneously as shown in FIG. 4. In addition, in the present embodiment, approximately random amplitude modulation is performed on the multilevel signal on the basis of the first key information 11 (i.e., the amplitude control signal 35). FIG. 42 is a schematic diagram describing the transmission signal quality of the data communication system according to the eighth embodiment of the present invention. As shown in FIG. 42, the level fluctuation width (fluctuation amount) of the multilevel signal received by the data receiving apparatus 10201 and the wiretapper data receiving apparatus is yet larger than in the first embodiment.

The SN ratio of the to-be-determined signal (multilevel signal) to be determined by the wiretapper data receiving apparatus is determined by the ratio between the step width and the fluctuation amount of the multilevel signal. Thus, the SN ratio further decreases by the amplitude modulation effect performed on the basis of the amplitude control signal 35. That is, the data communication system of the present embodiment can induce a large number of identification errors in the brute force attack using all thresholds by a third person, and thereby cause difficulty in the wiretapping. In particular, when the level fluctuation width by the amplitude modulation is set up similar to or greater than the step width of the multilevel signal, the data communication system can bring the multilevel determination by the third person to be practically impossible. This achieves ideal wiretapping prevention and ensures absolute security in the data communication.

Figure 43:
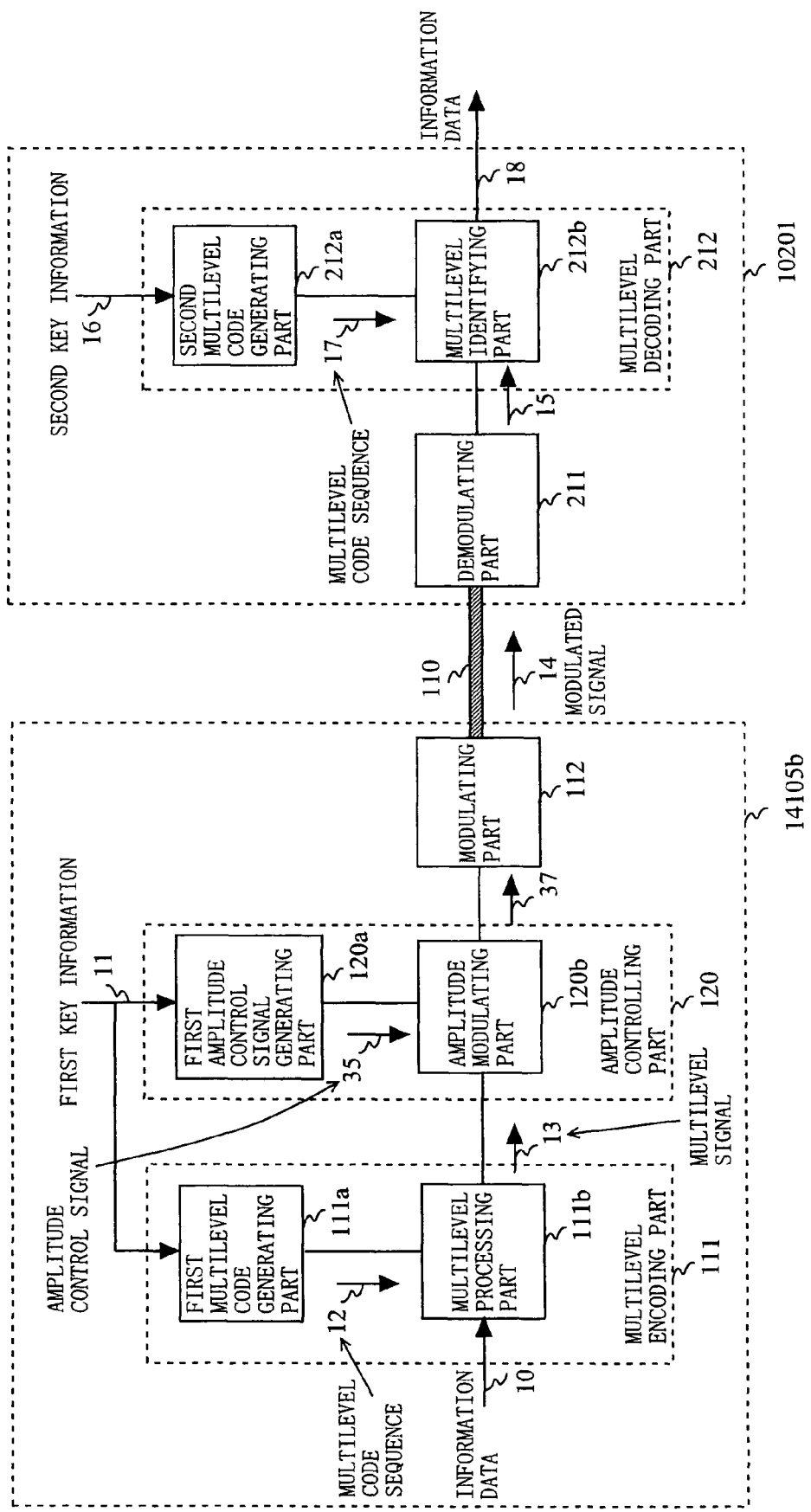
FIG. 43 is a block diagram showing a second exemplary configuration of a data communication system according to a fifteenth embodiment of the present invention.

Here, the amplitude controlling part 120 may be inserted and connected at any position different from that in FIG. 40, as long as level fluctuation can be caused in the multilevel signal 15 determined in the wiretapper data receiving apparatus so that the SN ratio can be controlled. For example, as shown in FIG. 43, the data communication system may have a configuration that the amplitude controlling part 120 is inserted between the multilevel encoding part 111 and the modulating part 112 so as to impart predetermined level fluctuation to the multilevel signal 13.

Further, for example, as shown in FIG. 44, the data communication system may have a configuration that the amplitude controlling part 120 is connected to the subsequent stage of the modulating part 112 so as to impart level fluctuation to the modulated signal 14. In this case, the amplitude modulating part 120*b* performs amplitude modulation or intensity modulation on the modulated signal 14 in accordance with the kind of the signal transmitted via the transmission path 110. In each configuration, the data communication system according to the fifteenth embodiment can control into an arbitrary value the SN ratio of the to-be-determined signal (multilevel signal) at the time of multilevel identification.

Figure 45:
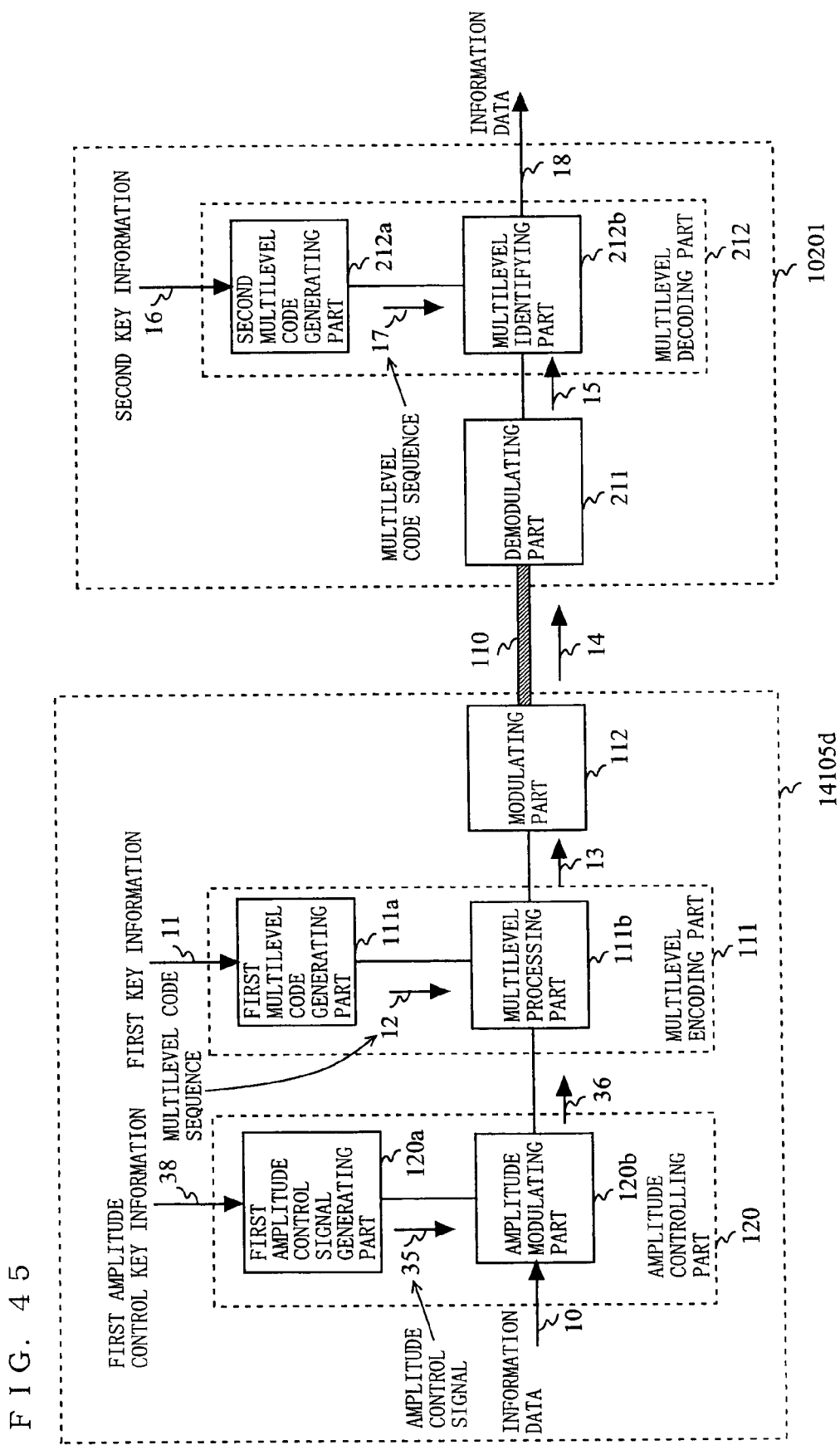
FIG. 45 is a block diagram showing a fourth exemplary configuration of a data communication system according to a fifteenth embodiment of the present invention.

Further, in FIG. 40, the first amplitude control signal generating part 120*a* generates the amplitude control signal 35 on the basis of the first key information 11 inputted to the first multilevel code generating part 111*a*. However, as shown in FIG. 45, the amplitude control signal 35 may be generated on the basis of predetermined first amplitude control key information 38 different from the first key information 11. By virtue of this, correlation is suppressed between the level change of the multilevel code sequence 12 and the amplitude modulation operation by the amplitude modulating part 120*b*, so that the level change in the multilevel signal 13 is randomized further. Thus, more ideal identification errors can be induced in the multilevel determination operation by the wiretapper data receiving apparatus.

Figure 46:
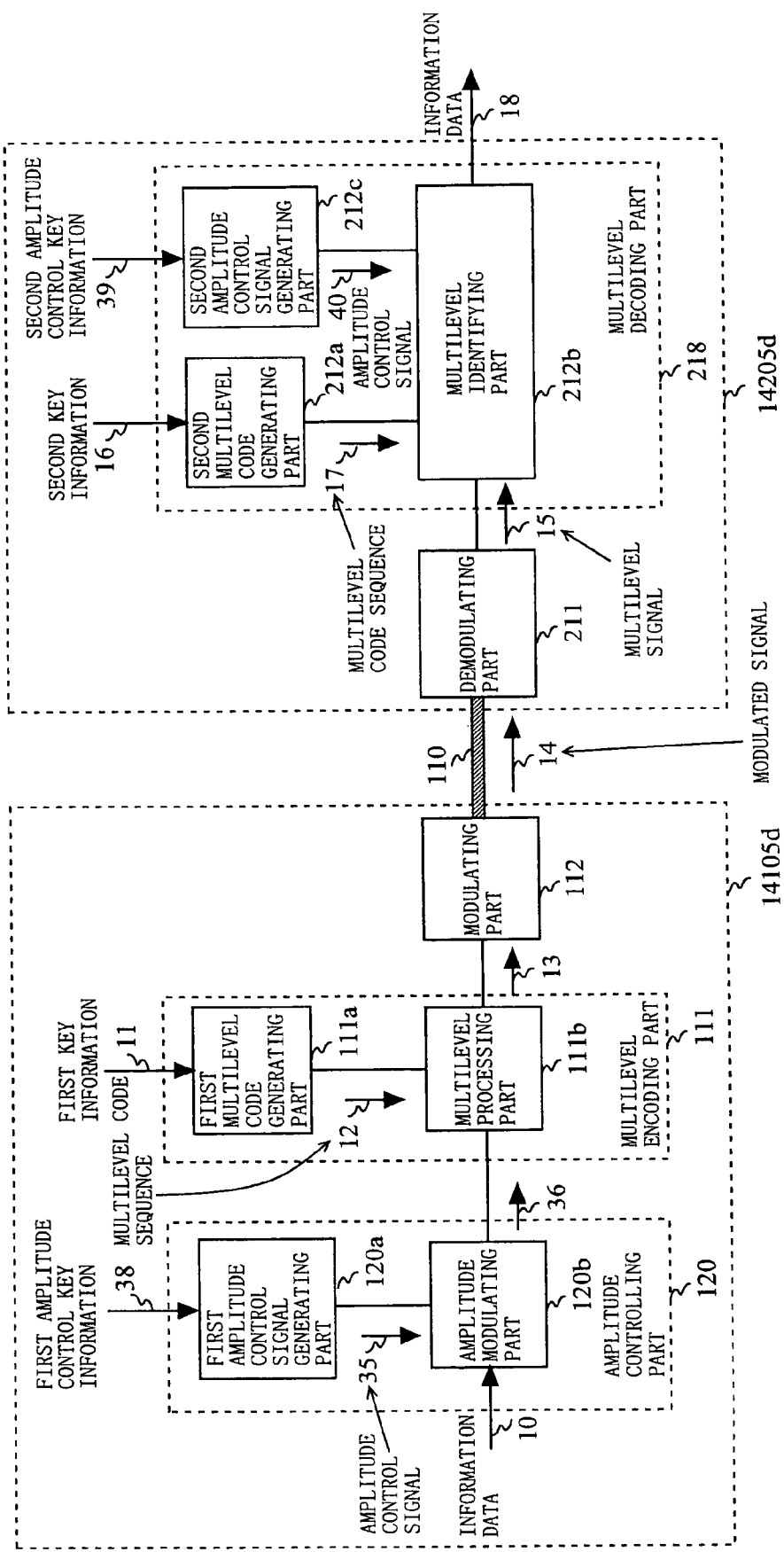
FIG. 46 is a block diagram showing a fifth exemplary configuration of a data communication system according to a fifteenth embodiment of the present invention.

Here, in practice, the amplitude modulation operation by the amplitude modulating part 120*b* can degrade the SN ratio of the to-be-determined signal identified (binary determination) in the data receiving apparatus 10201 of the authenticated receiving person, in some cases. In order that such influence of the amplitude modulation operation should be suppressed, the configuration of the data receiving apparatus 10201 may be changed. For example, as shown in FIG. 46, the data receiving apparatus 14205*d* may have a configuration that the multilevel decoding part 218 includes a second amplitude control signal generating part 212*c* in addition to the second multilevel code generating part 212*a* and the multilevel identifying part 212*b*. That is, the second amplitude control signal generating part 212*c* shares in advance the second amplitude control key information 39 which is the same as the first amplitude control key information 38, and generates an amplitude control signal 40 corresponding to amplitude control signal 35 on the basis of the second amplitude control key information 39. The multilevel identifying part 212*b* adopts as the threshold the multilevel code sequence 17 outputted from the second multilevel code generating part 212*a*, and monitors the instant level or the SN ratio of the multilevel signal 15 on the basis of the amplitude control signal 40, so that optimal identification (binary determination) of the multilevel signal 15 is performed and the information data 18 is reproduce.

As described above, according to the present embodiment, when the information data to be transmitted is encoded as a multilevel signal, the level fluctuation (fluctuation amount) in the multilevel signal is controlled arbitrarily. As such, a security-improved data transmitting apparatus can be provided that intentionally imparts critical degradation to the received signal quality at the time of wiretapping by a third person, and causes yet further difficulty in decryption and decoding of the multilevel signal by the third person.

Sixteenth Embodiment

Figure 47A:
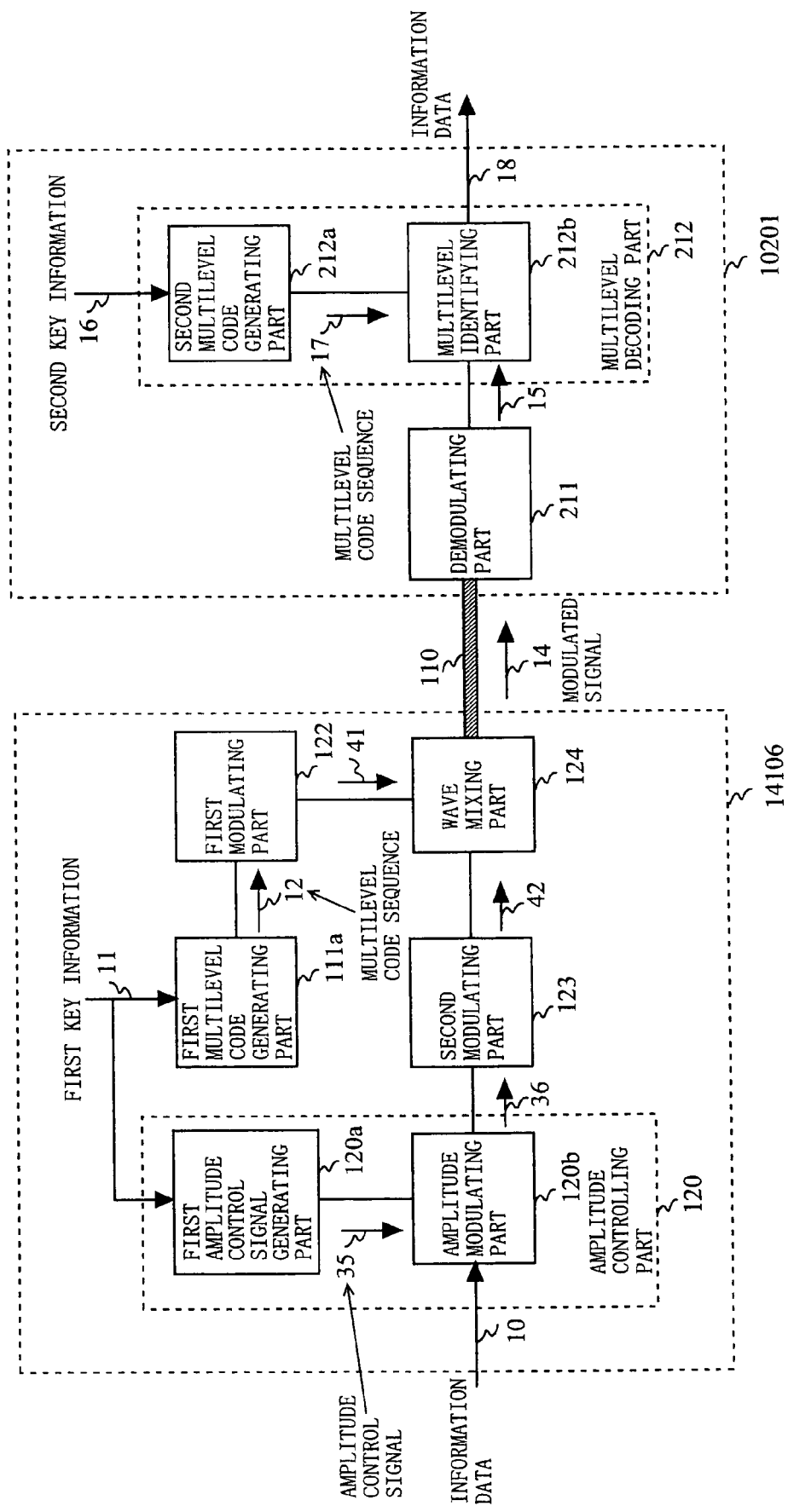
FIG. 47A is a block diagram showing an exemplary configuration of a data communication system according to a sixteenth embodiment of the present invention.

FIG. 47A is a block diagram showing an exemplary configuration of a data communication system according to a sixteenth embodiment of the present invention. The data communication system according to the present embodiment realizes that the conversion processing into the modulated signal 14 performed by the multilevel processing part 111*b* and the modulating part 112 (see FIG. 40) on the basis of the multilevel code sequence 12 and the amplitude modulated information data 36 in the fifteenth embodiment is implemented by another configuration. In FIG. 47A, the data communication system according to the sixteenth embodiment has a configuration that a data transmitting apparatus 14106 is connected to a data receiving apparatus 10201 via a transmission path 110. The data transmitting apparatus 14106 comprises a first multilevel code generating part 111*a*, an amplitude controlling part 120, a first modulating part 122, a second modulating part 123 and a wave mixing part 124. The amplitude controlling part 120 includes a first amplitude control signal generating part 120a and an amplitude modulating part 120b.

The configuration of the present embodiment is similar to that of the fifteenth embodiment (FIG. 40). Thus, blocks that perform the same operation as the fifteenth embodiment are designated by the same reference numerals, and their description is omitted. In FIG. 47A, the first modulating part 122 adopts as the source data the multilevel code sequence 12 outputted from the first multilevel code generating part 111a, and converts it into a predetermined modulation form so as to output a first modulated signal 41. The second modulating part 123 adopts as the source data the amplitude modulated information data 36 outputted from the amplitude modulating part 120b, and converts it into a predetermined modulation form so as to output a second modulated signal 42. The first modulated signal 41 and the second modulated signal 42 are inputted to the wave mixing part 124. The wave mixing part 124 combines the first modulated signal 41 and the second modulated signal 42 in the amplitude or in the intensity, and transmits it to the transmission path 110. That is, in the data communication system according to the sixteenth embodiment, the conversion processing into the modulated signal 14 on the basis of the multilevel code sequence 12 and the amplitude modulated information data 36 performed by the multilevel processing part 111b and the modulating part 112 in FIG. 40 is implemented at the modulated signal level by the first modulating part 122, the second modulating part 123 and the wave mixing part 124. This realizes a circuit configuration of high flexibility.

Figure 47B:
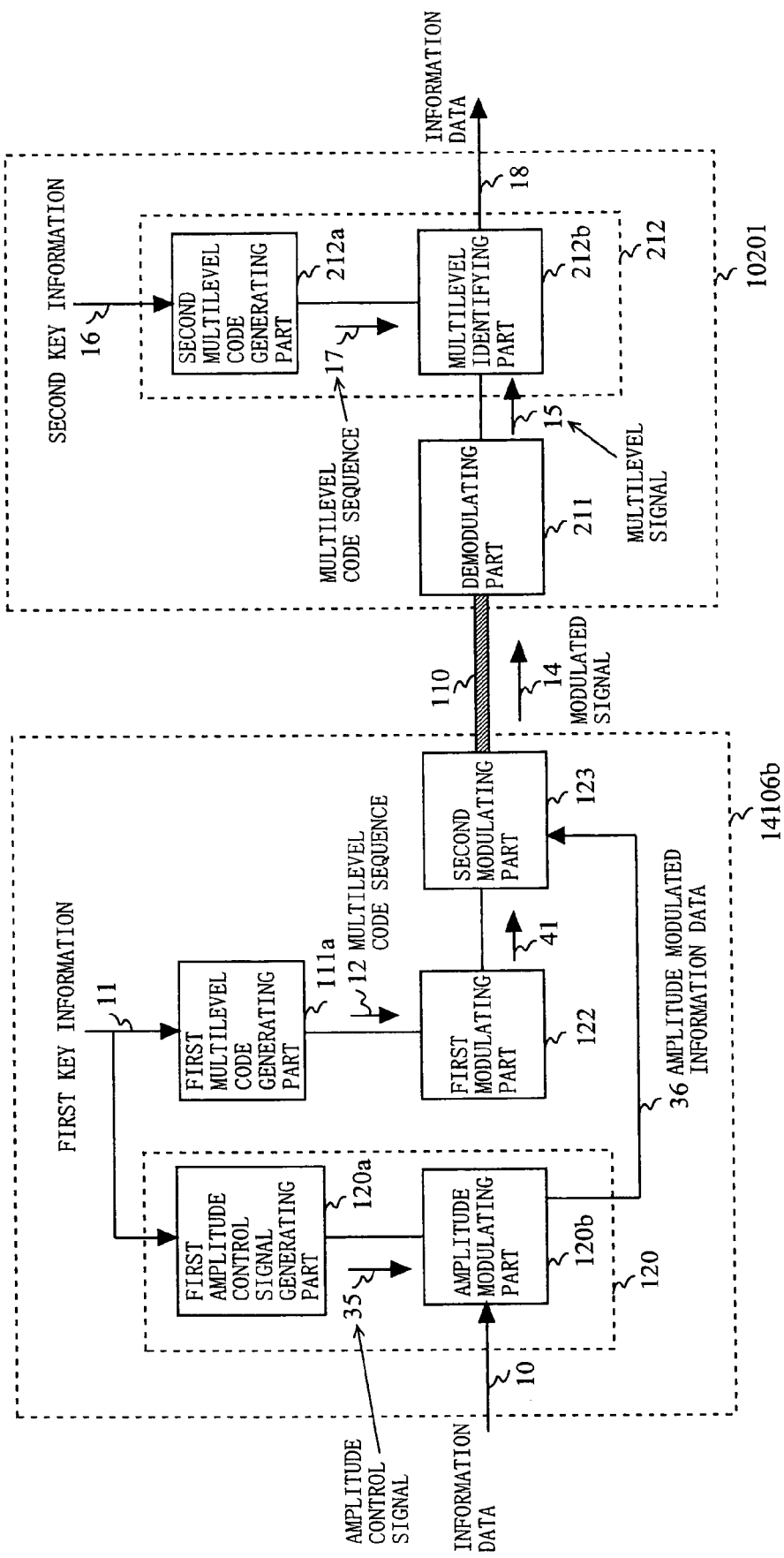
FIG. 47B is a block diagram showing another exemplary configuration of a data communication system according to a sixteenth embodiment of the present invention.

Here, the data communication system (FIG. 47A) according to the sixteenth embodiment has a configuration that the first modulating part 122 and the second modulating part 123 are installed in parallel so that the first modulated signal 41 and the second modulated signal 42 are wave-mixed. However, another configuration may be employed. FIG. 47B is a block diagram showing another exemplary configuration of a data communication system according to the sixteenth embodiment of the present invention. As shown in FIG. 47B, the data communication system according to the present embodiment may have a configuration that the first modulating part 122 and the second modulating part 123 are connected in series so that the same carrier is modulated by the first modulating part 122 and the second modulating part 123. This is a configuration that the carrier is modulated with the multilevel code sequence 12 by the first modulating part 122 so that the first modulated signal 41 is outputted, and that the first modulated signal 41 is modulated with the amplitude modulated information data 36 by the second modulating part 123. That is, the data communication system of this configuration realizes that the conversion processing into the modulated signal 14 performed by the multilevel processing part 111b and the modulating part 112 on the basis of the multilevel code sequence 12 and the amplitude modulated information data 36 in FIG. 40 is implemented at the modulated signal level by the first modulating part 122 and the second modulating part 123.

The data transmitting apparatus 14106 of FIG. 47A performs addition processing between the first modulated signal 41 and the second modulated signal 42 in the wave mixing part 124. In contrast, the data transmitting apparatus 14106b of FIG. 47B performs accumulation processing in the first modulating part 122 and the second modulating part 123. Thus, in comparison with the data transmitting apparatus 14106 of FIG. 47A, the data transmitting apparatus 14106b of FIG. 47B has a slight difference in the signal waveform of the generated modulated signal 14, but achieves almost the same effect in the point that the level owned by the amplitude modulated information data 36 is superimposed on the basis of the levels of the multilevel code sequence 12.

Figure 48A:
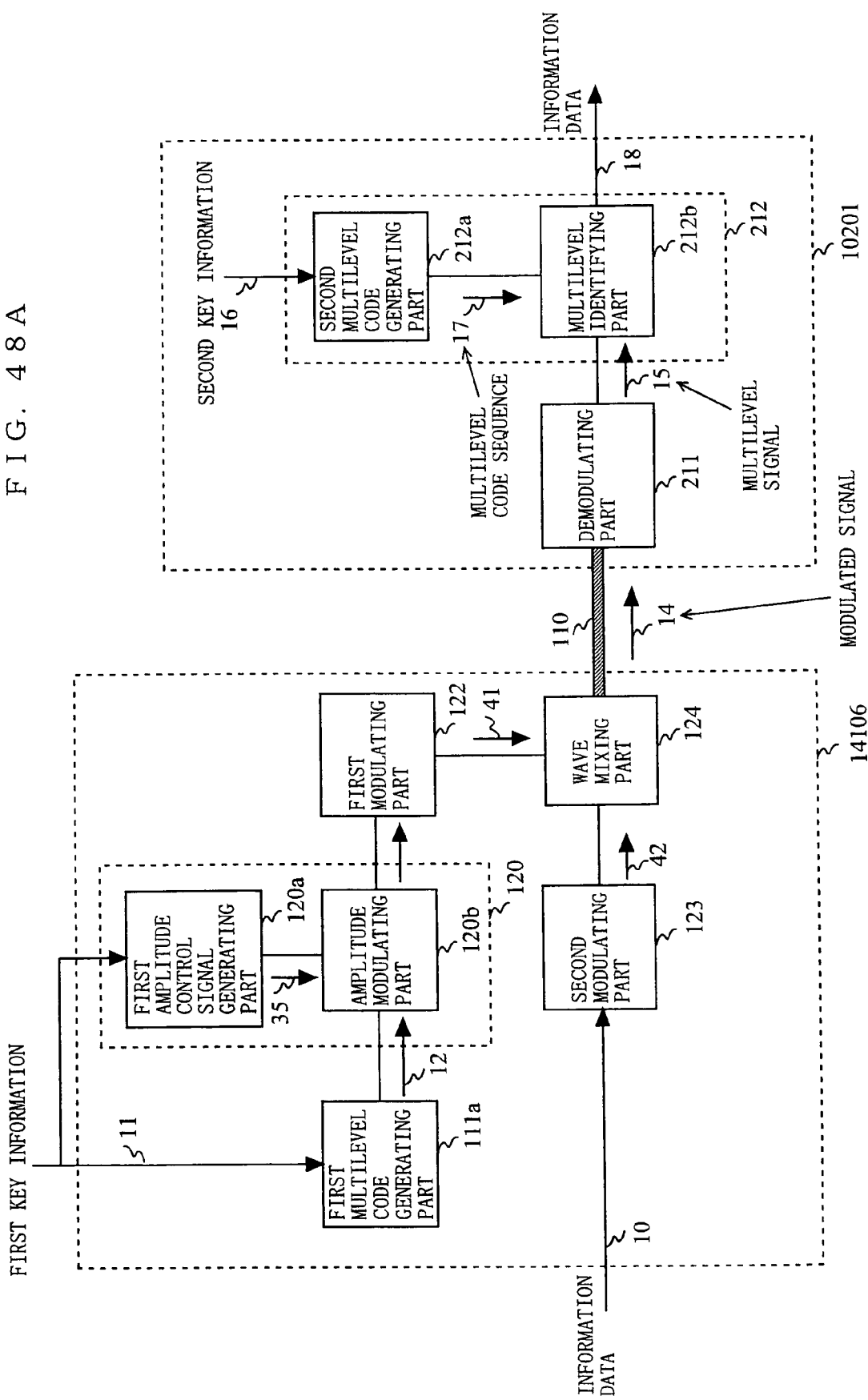
FIG. 48A is a block diagram showing another exemplary configuration of a data communication system according to a sixteenth embodiment of the present invention.
Figure 48B:
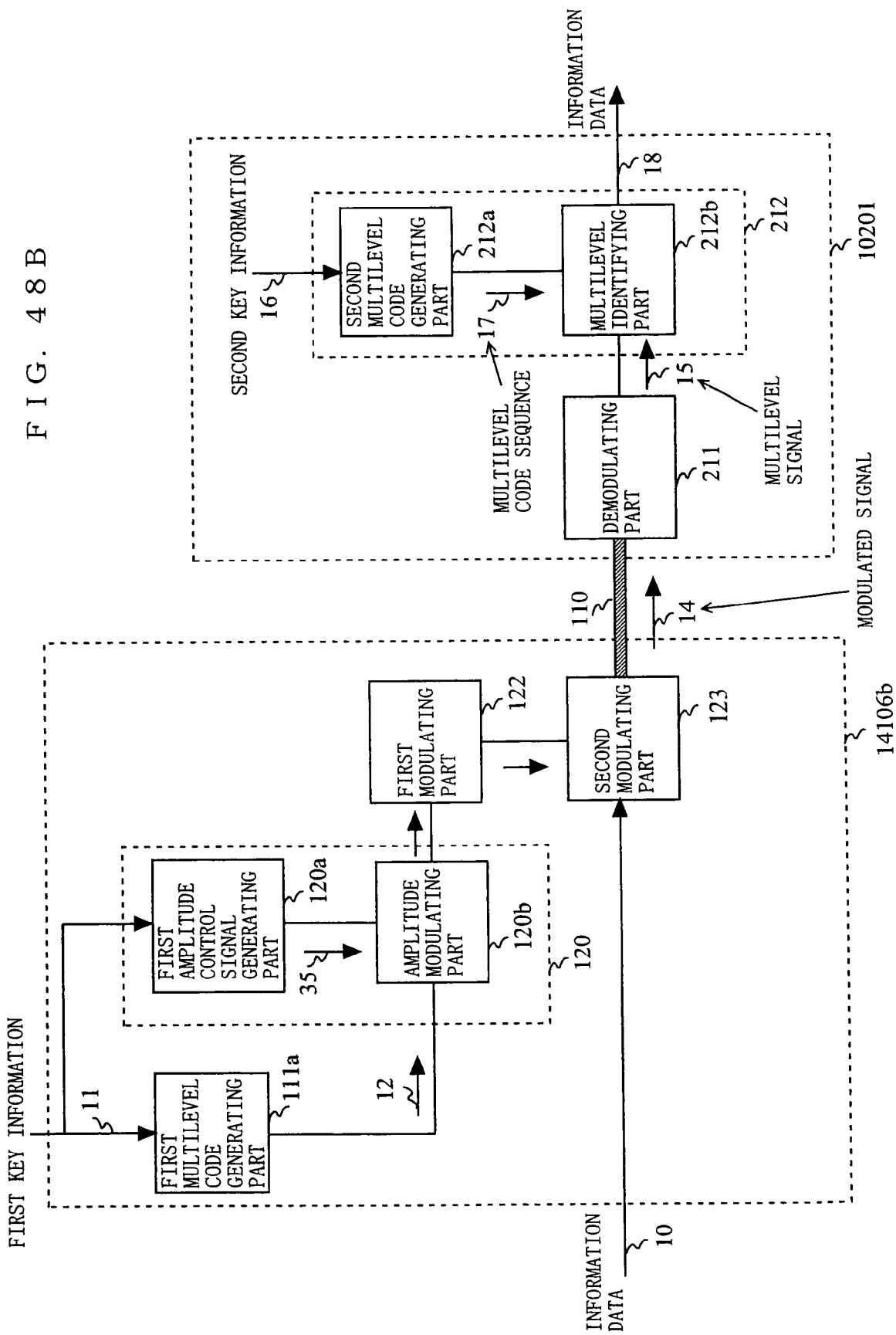
FIG. 48B is a block diagram showing another exemplary configuration of a data communication system according to a sixteenth embodiment of the present invention.

Further, in the data communication system according to the sixteenth embodiment, similarly to the fifteenth embodiment, the amplitude controlling part 120 may be inserted/connected at a position different from that of FIG. 32A or 33B, as long as level fluctuation can be caused in the multilevel signal 15 determined by the wiretapper data receiving apparatus so that the SN ratio of the multilevel signal obtained can be controlled. For example, in FIGS. 47A and 47B, the data communication system according to the sixteenth embodiment may have a configuration that the amplitude controlling part 120 is inserted to the preceding stage of the first modulating part 122 so as to impart predetermined level fluctuation to the multilevel code sequence 12 (see FIGS. 48A and 48B). Further, the data communication system according to the sixteenth embodiment may have a configuration that it is connected to the subsequent stage of the first modulating part 122 or the second modulating part 123 or to the subsequent stage of the wave mixing part 124 so that level fluctuation is imparted to the first modulated signal 41 or the second modulated signal 42 or to their combined signal. In each configuration, the data communication system according to the sixteenth embodiment can control into an arbitrary value the SN ratio of the to-be-determined signal (multilevel signal) at the time of multilevel identification.

Further, in the data communication system according to the sixteenth embodiment, similarly to FIG. 45, the first amplitude control signal generating part 120a may generate the amplitude control signal 35 on the basis of predetermined first amplitude control key information 38 different from the first key information 11. By virtue of this, in the data communication system according to the sixteenth embodiment, correlation is suppressed between the level change of the multilevel code sequence 12 and the amplitude modulation operation by the amplitude modulating part 120b, so that the level change in the multilevel signal 15 is randomized further. Thus, more ideal identification errors can be induced in the multilevel determination operation by the wiretapper data receiving apparatus.

As described above, according to the present embodiment, when the information data to be transmitted is encoded as a multilevel signal, the fluctuation level (amount of fluctuation) of the multilevel signal is controlled arbitrarily while separate modulating parts are provided for the information data and the multilevel code sequence. Thus, a security-improved data communication system can be provided in which a more flexible configuration can impart critical degradation to the received signal quality at the time of wiretapping by a third person so that yet further difficulty is caused in decryption and decoding of the multilevel signal by a third person.

Seventeenth Embodiment

Figure 49:
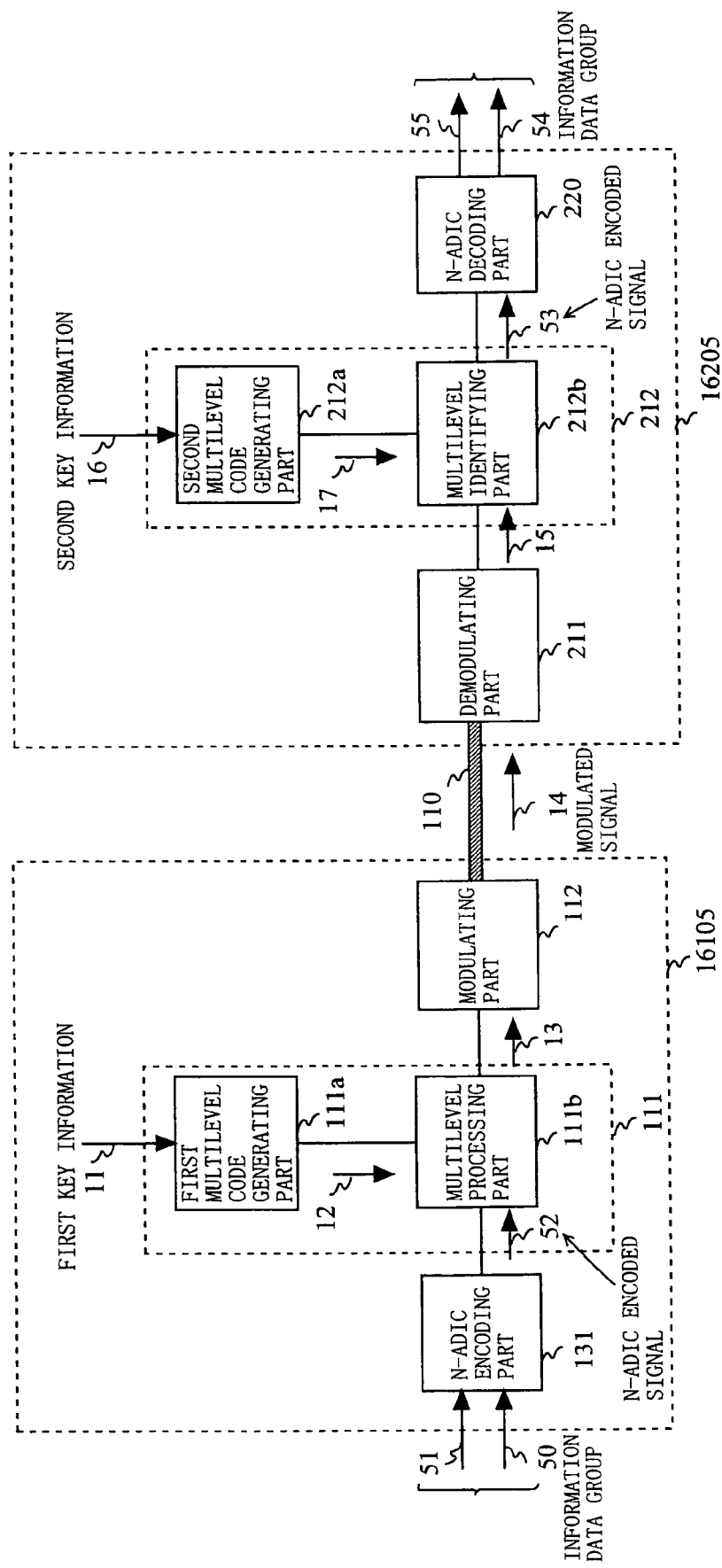
FIG. 49 is a block diagram showing a configuration of a data communication system according to a seventeenth embodiment of the present invention.

FIG. 49 is a block diagram showing a configuration of a data communication system according to a seventeenth embodiment of the present invention. In FIG. 49, the data communication system according to the seventeenth embodiment is different from the data communication system (FIG. 1) according to the first embodiment in the point that the data transmitting apparatus 16105 further comprises an N-adic encoding part 131 and that the data receiving apparatus 16205 further comprises an N-adic decoding part 220.

The data communication system according to the seventeenth embodiment is described below with focusing attention on the N-adic encoding part 131 and the N-adic decoding part 220. Here, the configuration of the present embodiment is similar to that of the first embodiment (FIG. 1). Thus, blocks that perform the same operation as the first embodiment are designated by the same reference numerals, and their description is omitted.

Figure 50:
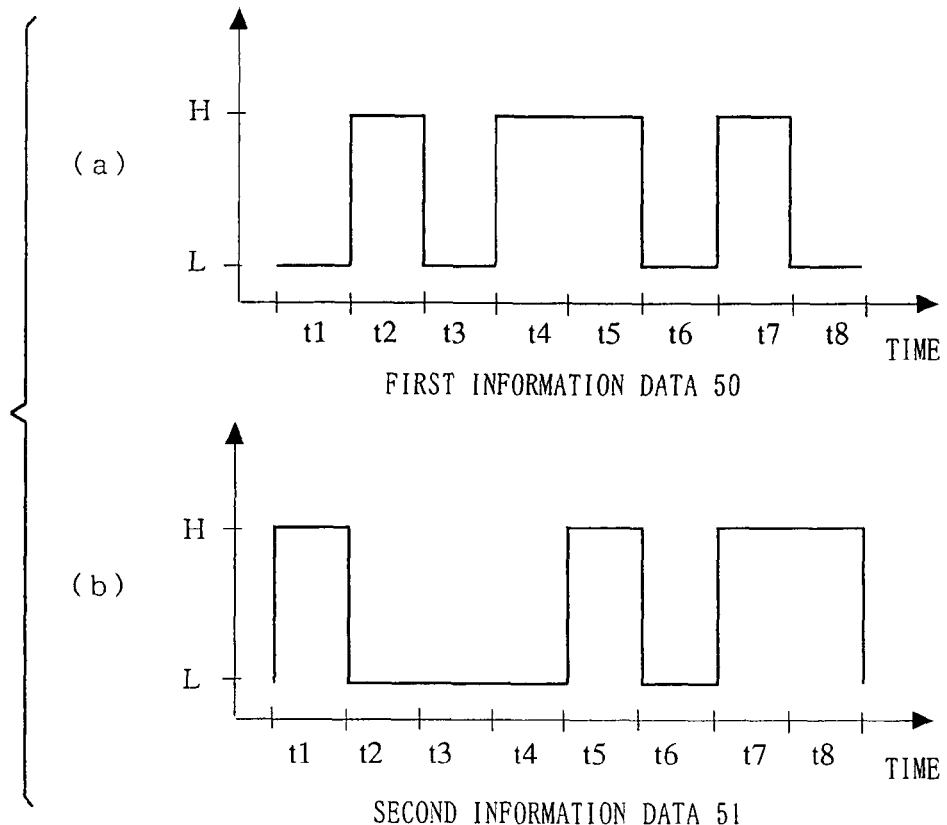
FIG. 50 is a diagram showing an exemplary waveform of an information data group inputted to an N-adic encoding part 131.

In the data transmitting apparatus 16105, an information data group composed of a plurality of information data is inputted to the N-adic encoding part 131. Here, as the information data group, first information data 50 and second information data 51 are inputted. FIG. 50 is a diagram showing an exemplary waveform of an information data group inputted to an N-adic encoding part 131. FIG. 50(a) shows the first information data 50 inputted to the N-adic encoding part 131. FIG. 50(b) shows the second information data 51 inputted to the N-adic encoding part 131.

Figure 51:
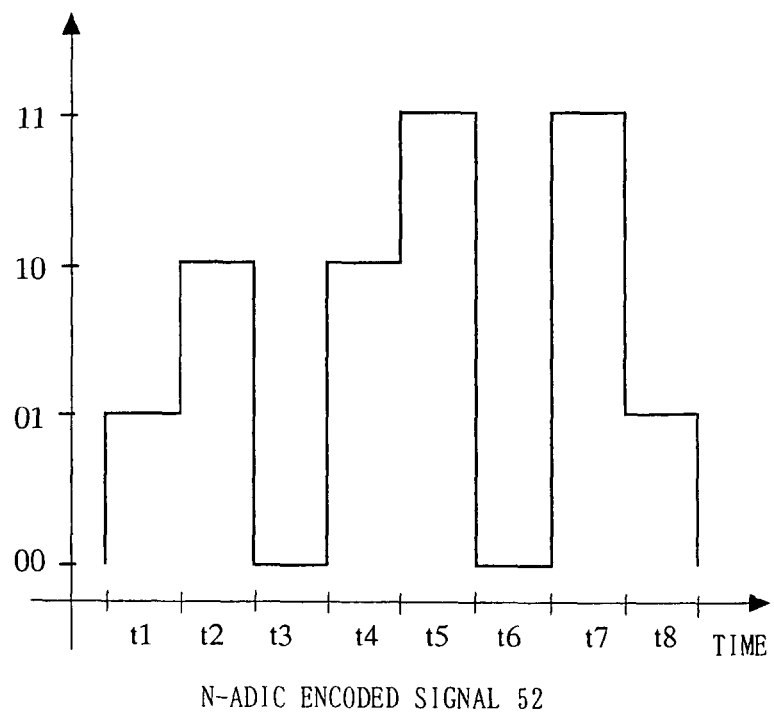
FIG. 51 is a diagram showing an exemplary waveform of an N-adic encoded signal 52 outputted from an N-adic encoding part 131.

The N-adic encoding part 131 encodes the first information data 50 and the second information data 51 into an N-adic number (N=4 in this example), and outputs it as an N-adic encoded signal 52 having predetermined multi valued levels. Here, N is an arbitrary natural number. Thus, the N-adic encoding part 131 can increase by a factor of $\log_2 N$ the information amount transmittable per one time slot. FIG. 51 is a diagram showing an exemplary waveform of an N-adic encoded signal 52 outputted from an N-adic encoding part 131. Referring to FIG. 51, for example, the N-adic encoding part 131 assigns a multi valued level 00 when the combination of logic in the first information data 50 and the second information data 51 is {L,L}. Further, a multivalued level 01 is assigned in the case of {L,H}, a multi valued level 10 is assigned in the case of {H,L}, and a multi valued level 11 is assigned in the case of {H,H}. As such, an N-adic encoded signal 52 having four multi valued levels can be outputted. The N-adic encoded signal 52 outputted from the N-adic encoding part 131 and the multilevel code sequence 12 (see FIG. 2(b)) outputted from the first multilevel code generating part 111a are inputted to the multilevel processing part 111b.

Figure 52:
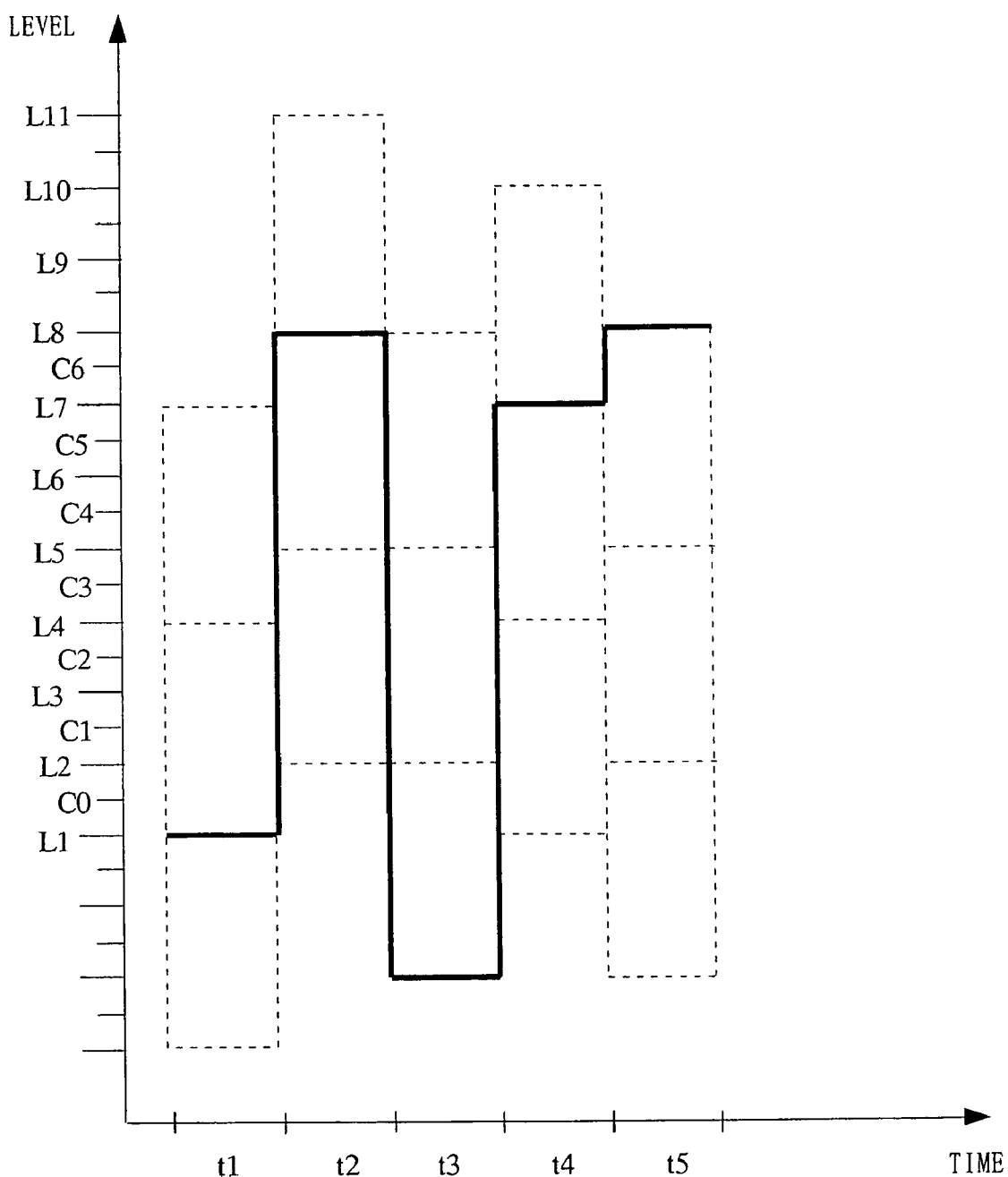
FIG. 52 is a diagram showing an exemplary waveform of a multilevel signal 13 outputted from a multilevel processing part 111*b*.

The multilevel processing part 111b combines the N-adic encoded signal 52 and the multilevel code sequence 12 in accordance with a predetermined procedure, and outputs the compound signal as a multilevel signal 13. For example, the multilevel processing part 111b adopts the level of the multilevel code sequence 12 as a bias level, and adds the N-adic encoded signal 52 so as to generate the multilevel signal 13. Alternatively, the multilevel processing part 111b may perform amplitude modulation on the multilevel code sequence 12 with the N-adic encoded signal 52 so as to generate the multilevel signal 13. FIG. 52 shows an exemplary waveform of a multilevel signal 13 outputted from the multilevel processing part 111b. In FIG. 52, the multi valued level of the multilevel signal 13 varies at four steps at a predetermined level interval (a three-level interval in this example). Here, the dotted line indicates a range within which the multi valued level of the multilevel signal 13 varies with reference to the bias level (multilevel code sequence 12)

The multilevel signal 13 outputted from the multilevel processing part 111b is inputted to the modulating part 112. The modulating part 112 modulates the multilevel signal 13 into a signal form appropriate for the transmission path 110, and transmits the modulated signal as a modulated signal 14 to the transmission path 110. For example, when the transmission path 110 is an optical transmission path, the modulating part 12 modulates the multilevel signal 13 into an optical signal.

Figure 53:
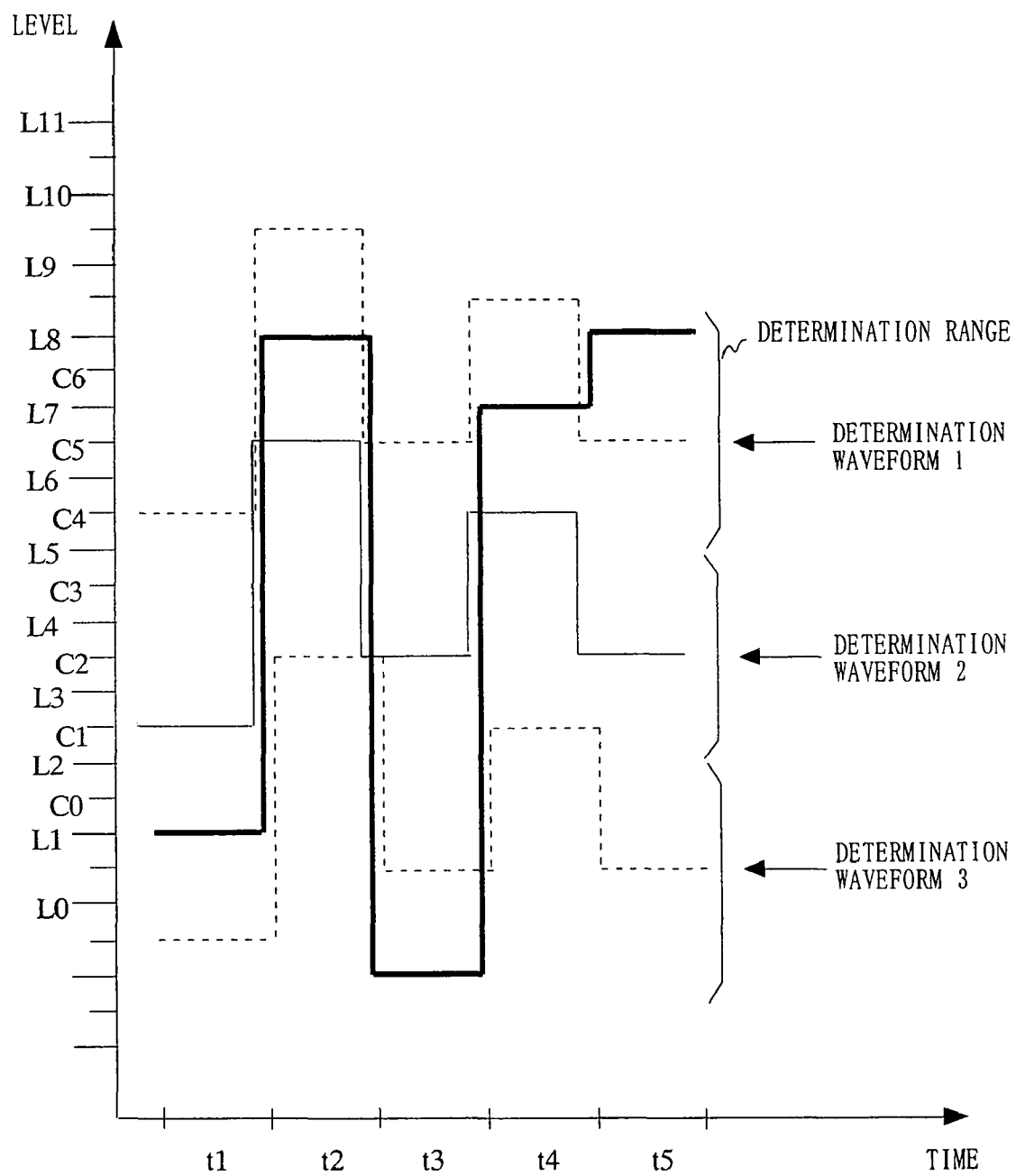
FIG. 53 is a diagram describing an example of identification operation for a multilevel signal 15 in a multilevel identifying part 212*b*.

In the data receiving apparatus 16205, the demodulating part 211 receives the modulated signal 14 via the transmission path 110. The demodulating part 211 demodulates the modulated signal 14 and outputs a multilevel signal 15. The multilevel signal 15 is inputted to the multilevel identifying part 212b. The multilevel identifying part 212b identifies the multilevel signal 15 by using the multilevel code sequence 17 outputted from the second multilevel code generating part 212a, and outputs an N-adic encoded signal 53. FIG. 53 is a diagram describing an example of identification operation for the multilevel signal 15 in the multilevel identifying part 212b. In FIG. 53, the thick solid line indicates the waveform of the multilevel signal 15. The thin solid line and the dotted line indicate the determination waveforms for identifying the multilevel signal 15. Here, the thin solid line (determination waveform 2) indicates the waveform of the multilevel code sequence 17.

Referring to FIG. 53, the multilevel identifying part 212b generates: a waveform (determination waveform 1) in which the multilevel code sequence 17 is shifted upward by a predetermined level interval with adopting the multilevel code sequence 17 (determination waveform 2) as the center; and a waveform (determination waveform 3) shifted downward by a predetermined level interval. Here, this predetermined level interval is defined in advance in relation to the multilevel processing part 111b in the data transmitting apparatus 16105, and is a three-level interval in this example. Then, the multilevel identifying part 212b identifies the multilevel signal 15 by using the determination waveforms 1 to 3.

In the time slot t1, the multilevel identifying part 212b compares the multilevel signal 15 with the determination waveform 1, and determines that the multilevel signal 15 is at Low level relative to the determination waveform 1. Further, the multilevel signal 15 is compared with the determination waveform 2, so that it is determined that the multilevel signal 15 is at Low level relative to the determination waveform 2. Further, the multilevel signal 15 is compared with the determination waveform 3, so that it is determined that the multilevel signal 15 is at High level relative to the determination waveform 3. That is, in the time slot t1, the multilevel identifying part 212b determines that the multilevel signal 15 is {Low, Low, High}. Similarly, the multilevel identifying part 212b determines that the multilevel signal 15 is {Low, High, High} in the time slot t2, and that the multilevel signal 15 is {Low, Low, Low} in the time slot t3. The operation in the time slot t4 and after is omitted but similar.

Then, the multilevel identifying part 212b establishes correspondence of the number of determined Lows and Highs to the multi valued level of the N-adic encoded signal, and thereby reproduces the N-adic encoded signal 52. For example, the multilevel identifying part 212b establishes correspondence of {Low, Low, Low} to the multi valued level 00, {Low, Low, High} to the multi valued level 01, {Low, High, High} to the multi valued level 10, and {High, High, High} to the multi valued level 11, so that the N-adic encoded signal 53 can be reproduced. The N-adic encoded signal 53 reproduced by the multilevel identifying part 212b is inputted to the N-adic decoding part 220.

The N-adic decoding part 220 decodes the N-adic encoded signal 52 and outputs it as an information data group. Specifically, the N-adic decoding part 220 performs inverse operation of that of the N-adic encoding part 131, and thereby outputs the first information data 54 and the second information data 55 from the N-adic encoded signal 52.

Figure 54:
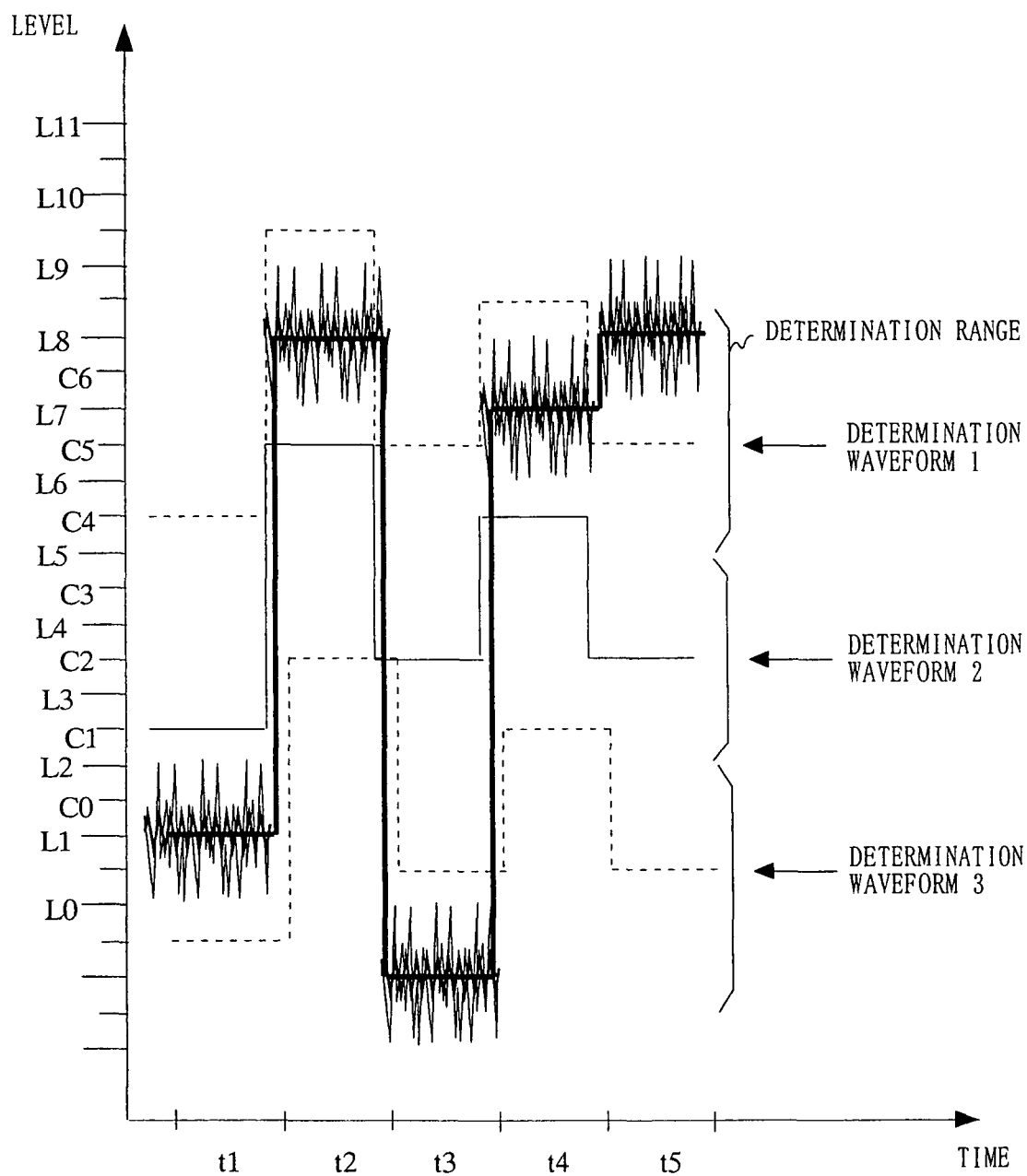
FIG. 54 is a diagram showing a waveform of a multilevel signal 15 onto which noise is superimposed.

Wiretapping operation for the modulated signal 14 by a third person is described next. Similarly to the case described in the first embodiment, a third person does not share the first key information 11 with the data transmitting apparatus 16105, and hence cannot reproduce the first information data 54 and the second information data 55 from the wiretapped modulated signal 14. Further, in the actual transmission system, noise occurs owing to various factors. Then, this noise is superimposed on the modulated signal 14. That is, noise is superimposed also on the multilevel signal 15 demodulated from the modulated signal 14. FIG. 54 is a diagram showing a waveform of a multilevel signal 15 onto which noise is superimposed. Referring to FIG. 54, similarly to the case described in the first embodiment, by virtue of the noise superimposed on the multilevel signal 15, the data communication system according to the seventeenth embodiment can induce identification errors in the brute force attack using all thresholds by the third person, and thereby cause further difficulty in the wiretapping.

As described above, according to the present embodiment, the N-adic encoding part 131 converts collectively the information data group into the N-adic encoded signal 52, while the N-adic decoding part 220 reproduces collectively the information data group from the N-adic encoded signal 53. Thus, in comparison with the data communication system according to the first embodiment, the data communication system according to the present embodiment can increase the information amount transmittable per one time slot. Further, the conversion of the information data group into the N-adic encoded signal 52 realizes data transmission of high concealment.

Eighteenth Embodiment

Figure 55:
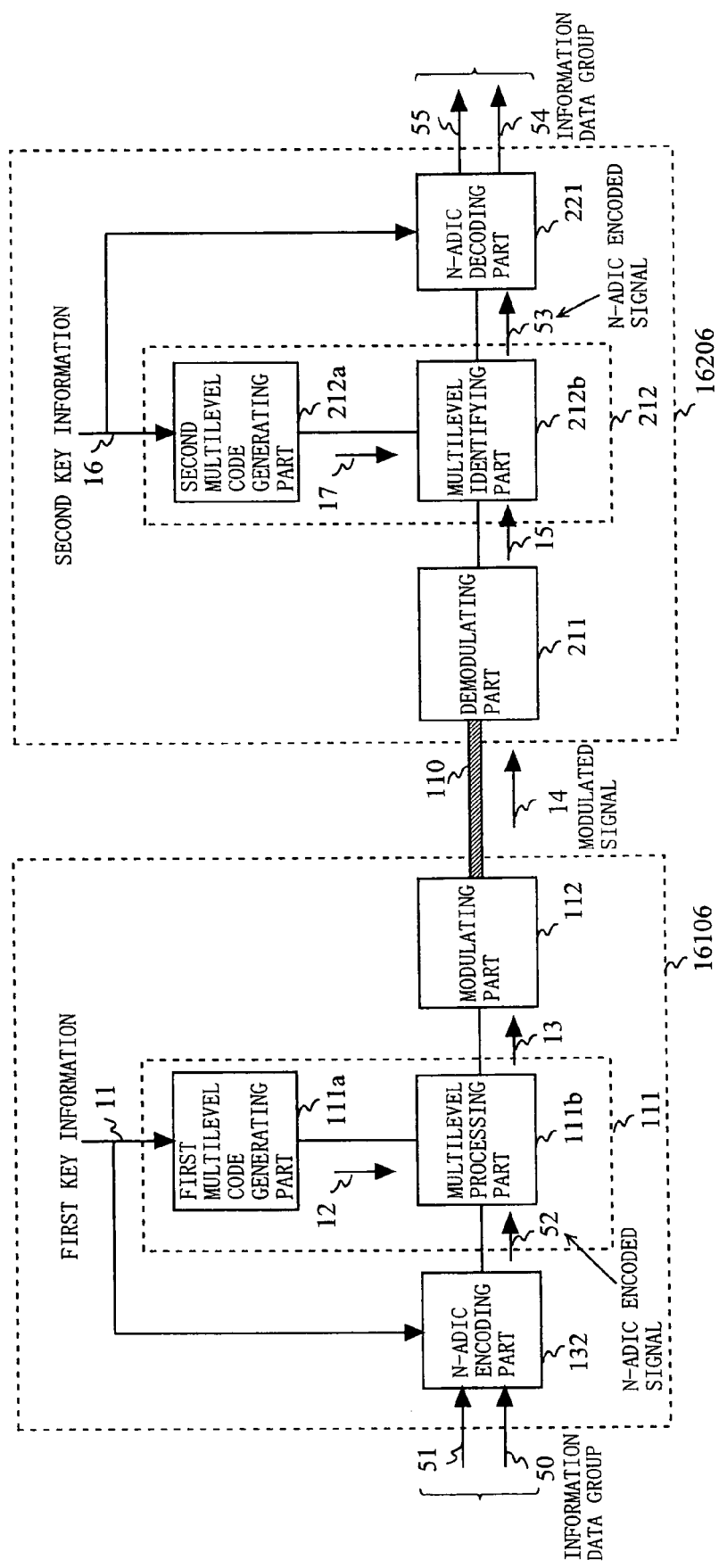
FIG. 55 is a block diagram showing an exemplary configuration of a data communication system according to an eighteenth embodiment of the present invention.
Figure 56:
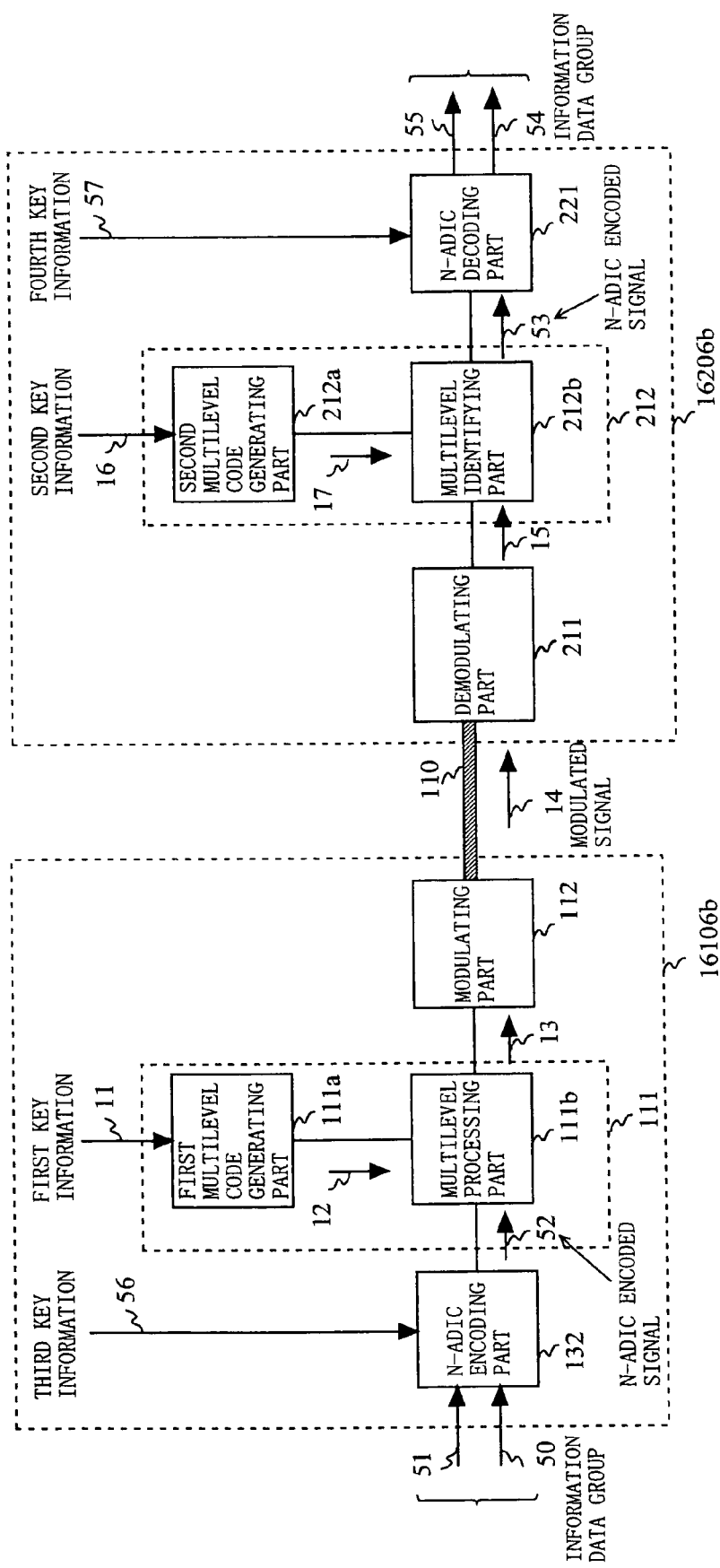
FIG. 56 is a block diagram showing another exemplary configuration of a data communication system according to an eighteenth embodiment of the present invention.

FIG. 55 is a block diagram showing an exemplary configuration of a data communication system according to an eighteenth embodiment of the present invention. In FIG. 55, in the data communication system according to the eighteenth embodiment, the operation of the N-adic encoding part 132 and the N-adic decoding part 221 is different from the seventeenth embodiment (FIG. 49). In the eighteenth embodiment, the N-adic encoding part 132 generates an N-adic encoded signal 52 from the information data group on the basis of the first key information 11. Further, the N-adic decoding part 221 generates an information data group from the N-adic encoded signal 53 on the basis of the second key information 16. The data communication system according to the eighteenth embodiment is described with focusing attention on the N-adic encoding part 132 and the N-adic decoding part 221. Here, the configuration of the present embodiment is similar to that of the seventeenth embodiment (FIG. 49). Thus, blocks that perform the same operation are designated by the same reference numerals, and their description is omitted.

In the data transmitting apparatus 16106, first key information 11 is inputted to the N-adic encoding part 132. The N-adic encoding part 132 generates an N-adic encoded signal 52 from the information data group on the basis of the first key information 11. For example, on the basis of the first key information 11, the N-adic encoding part 132 changes the correspondence relation between the combination of logic in the first information data 50 and the second information data 51 and the multi valued level of the N-adic encoded signal 52. The N-adic encoded signal 52 outputted from the N-adic encoding part 132 is inputted to the multilevel processing part 111*b*.

In the data receiving apparatus 16206, the N-adic encoded signal 53 outputted from the multilevel identifying part 212*b* is inputted to the N-adic decoding part 221. Further, the second key information 16 is inputted to the N-adic decoding part 221. On the basis of the second key information 16, the N-adic decoding part 221 outputs the information data group from the N-adic encoded signal 53. Specifically, the N-adic decoding part 221 performs inverse operation of that of the N-adic encoding part 132, and thereby outputs the first information data 54 and the second information data 55 from the N-adic encoded signal 53.

As described above, according to the present embodiment, on the basis of the first key information 11, the N-adic encoding part 132 generates an N-adic encoded signal 52 from the information data group, while on the basis of the second key information 16, the N-adic decoding part 221 reproduces the information data group from the N-adic encoded signal 53 by the inverse operation of that of the N-adic encoding part 132. Thus, in comparison with the data communication system according to the seventeenth embodiment, the data communication system according to the present embodiment realizes data communication in which wiretapping is more difficult.

Here, in the data communication system according to the eighteenth embodiment, the N-adic encoding part 132 may generate the N-adic encoded signal 52 from the information data group by using third key information 56 different from the first key information 11. Similarly, the N-adic decoding part 221 may reproduce the information data group from the N-adic encoded signal 53 by using fourth key information 57 different from the second key information 16 (see FIG. 41). Here, the third key information 56 and the fourth key information 57 are the same key information. By virtue of this, in the data communication system according to the present embodiment, the key information used in the multilevel processing part 111*b* can be separated from the key information used by the N-adic encoding part 132. This realizes data communication in which wiretapping is more difficult.

Nineteenth Embodiment

Figure 57:
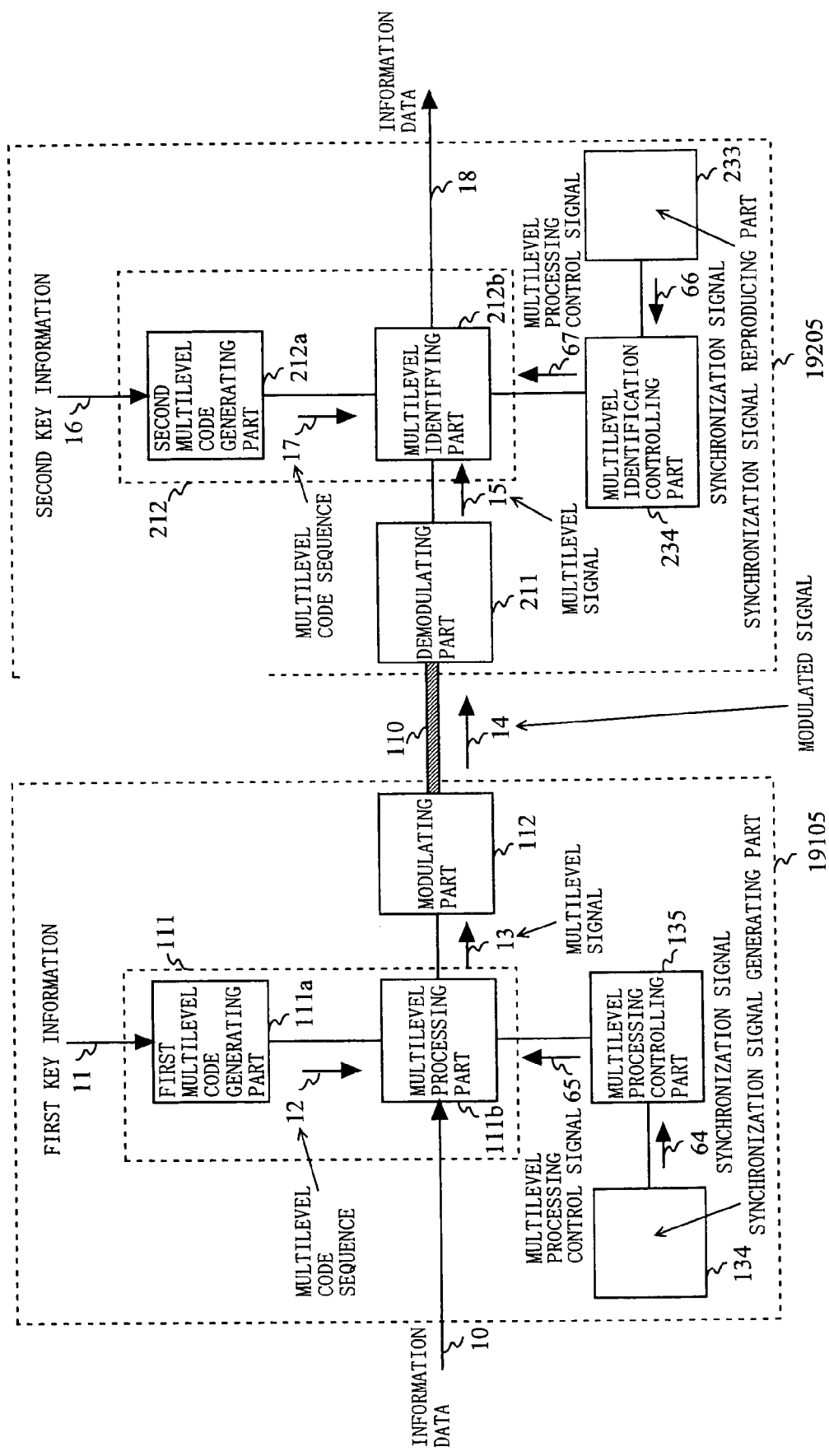
FIG. 57 is a block diagram showing a configuration of a data communication system according to a nineteenth embodiment of the present invention.

FIG. 57 is a block diagram showing a configuration of a data communication system according to a nineteenth embodiment of the present invention. In FIG. 57, the data communication system according to the nineteenth embodiment is different from the first embodiment (FIG. 1) in the point that the data transmitting apparatus 19105 further comprises a synchronization signal generating part 134 and a multilevel processing controlling part 135 and that the data receiving apparatus 19205 further comprises a synchronization signal reproducing part 233 and a multilevel identification controlling part 234.

Figure 58:
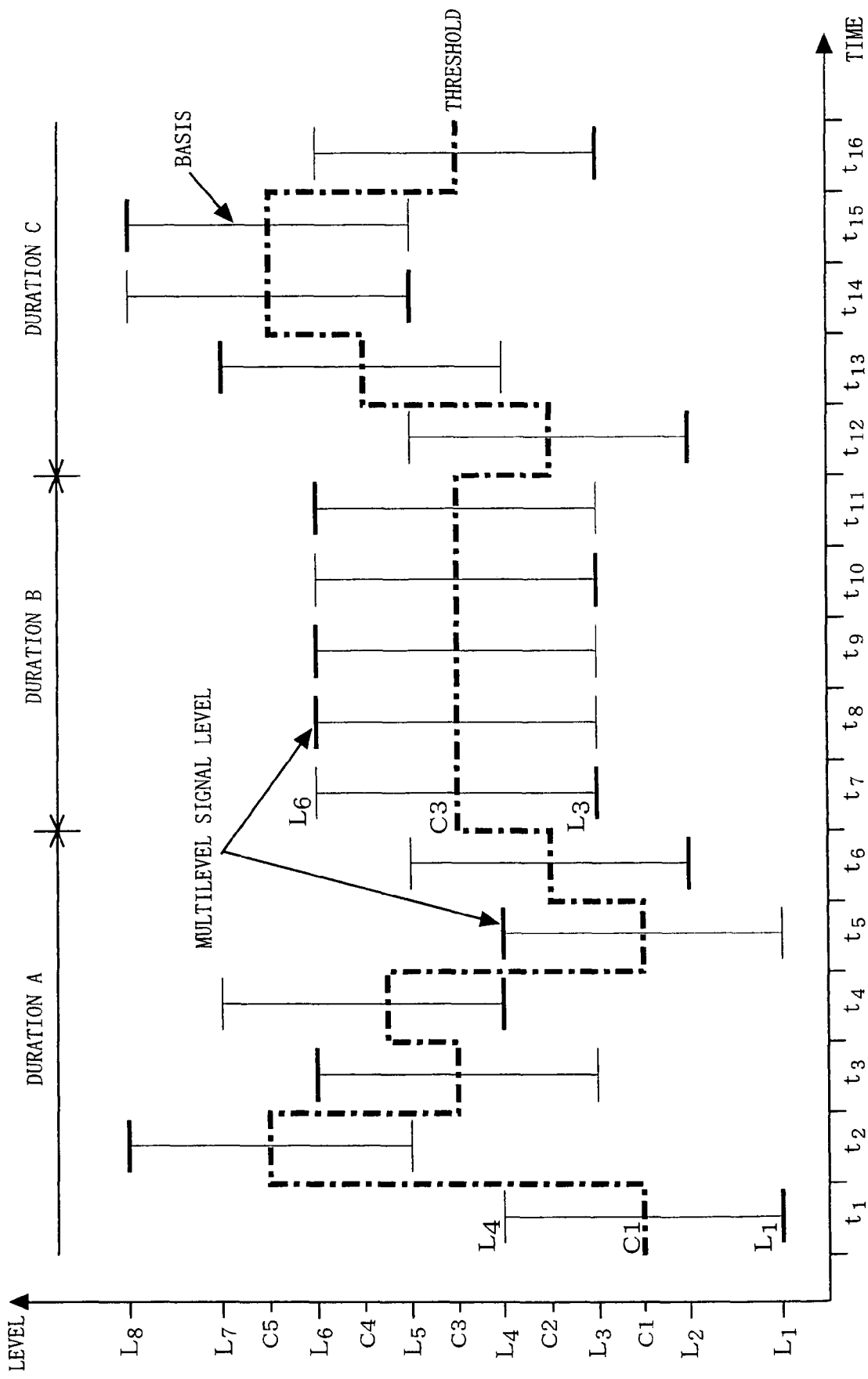
FIG. 58 is a schematic diagram describing a signal waveform outputted from a multilevel encoding part 111.

FIG. 58 is a schematic diagram describing a signal waveform outputted from the multilevel encoding part 111. The data communication system according to the nineteenth embodiment is described below with reference to FIGS. 57 and 58. Here, the configuration of the present embodiment is similar to that of the first embodiment (FIG. 1). Thus, blocks that perform the same operation are designated by the same reference numerals, and their description is omitted.

In FIG. 57, the synchronization signal generating part 134 generates a synchronization signal 64 of a predetermined period, and outputs it to the multilevel processing controlling part 135. The multilevel processing controlling part 135 generates a multilevel processing control signal 65 on the basis of the synchronization signal 64, and outputs it to the multilevel processing part 111*b*. The multilevel processing control signal 65 is a signal that specifies the level number (referred to as a multi valued number, hereinafter) of the multilevel signal 13 outputted from the multilevel processing part 111*b*. On the basis of the multilevel processing control signal 65 and the multilevel code sequence 12, the multilevel processing part 111*b* generates a multilevel signal from the information data 10, and outputs as the multilevel signal 13 a signal in which the multi valued number of the generated multilevel signal is switched. For example, as shown in FIG. 58, the multilevel processing part 111b outputs a multilevel signal having a multi valued number of "8" in the durations A and C, and outputs a signal having a multi valued number of "2" in the duration B. More specifically, in the durations A and C, the multilevel processing part 111b may combine the information data 10 and the multilevel code sequence 12 and output it. In the duration B, the information data 10 may be outputted intact.

The synchronization signal reproducing part 233 reproduces the synchronization signal 66 corresponding to the synchronization signal 64, and outputs it to the multilevel identification controlling part 234. The multilevel identification controlling part 234 generates a multilevel identification control signal 67 on the basis of the synchronization signal 66, and outputs it to the multilevel identifying part 212b. On the basis of the multilevel identification control signal 67, the multilevel identifying part 212b switches the threshold (multilevel code sequence 17) for the multilevel signal 15 outputted from the demodulating part 211, and performs identification so as to reproduce the information data 18. For example, as shown in FIG. 58, as for a multilevel signal having a multi valued number of value "8" in the durations A and C, the multilevel identifying part 212b identifies as the threshold the multilevel code sequence 17 in which the level varies sequentially, and performs identification on the binary signal on the basis of a predetermined fixed threshold in the duration B.

Here, in FIG. 58, the threshold (average level) for the binary signal in the duration B is set up equal to the average level (C3) of the multilevel signal in the durations A and C. However, the present invention is not limited to this. That is, any level may be employed. Further, in FIG. 58, the amplitude of the binary signal in the duration B is set up equal to the amplitude (information amplitude) of the information data 10. However, the present invention is not limited to this. Any amplitude may be employed as long as it is a magnitude that can be identified with a fixed threshold in the multilevel identifying part 212b. Further, in FIG. 58, the transfer rate of the multilevel signal is set to be the same in the durations A and C and in the duration B. However, the present invention is not limited to this. Different transfer rates may be employed. In particular, from the perspective of transmission efficiency, it is preferable that a higher transfer rate is employed when the multi valued number is smaller.

Further, in FIG. 58, the multilevel processing part 111b outputs the multilevel signal 13 in which a multilevel signal having a multi valued number of 8 and a binary signal are switched. However, the combination of the multi valued numbers of the multilevel signal 13 is limited to this. Any combination of the multi valued numbers may be employed. For example, the multilevel processing part 111b may switch and output a multilevel signal having a multi valued number of "8" and a multilevel signal having a multi valued number of "4". Further, in response to the values of the multi valued numbers, the data communication system shown in FIG. 57 may change the transfer rate for the information data 10 and 18, the multilevel code sequences 12 and 17 and the multilevel signals 13 and 15.

As described above, according to the present embodiment, information data to be transmitted is encoded as a multilevel signal. Then, critical degradation is imparted to the received signal quality at the time of wiretapping by a third person, so that a security communication channel solely for a particular receiving person is ensured. At the same time, the multi valued number is reduced appropriately, so that communication not requiring security is realized selectively. By virtue of this, a concealed communication service and a general communication service can be provided in a mixed manner by using the same modulating and demodulating system and transmission system. This provides an efficient communication system.

Twentieth Embodiment

Figure 59:
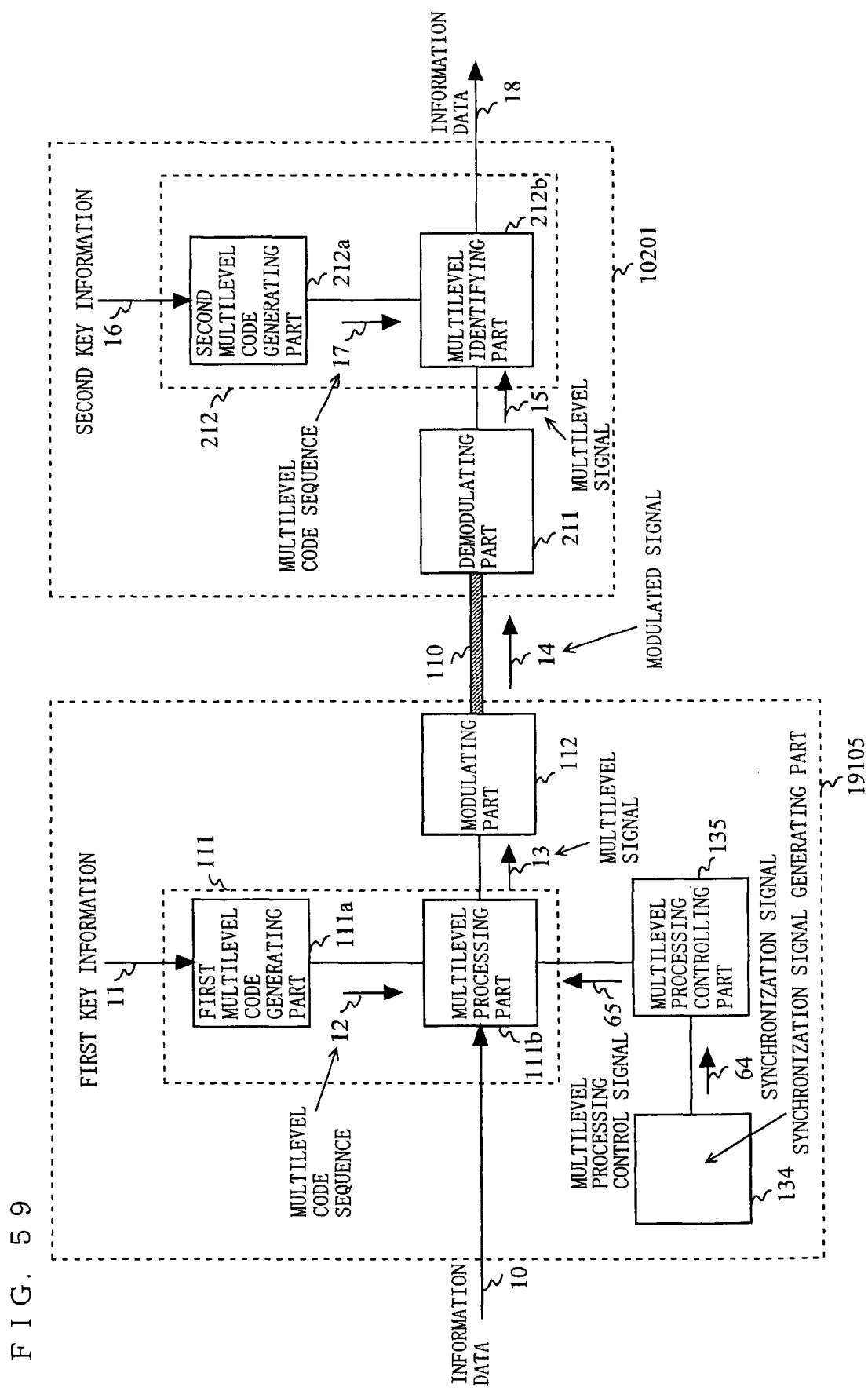
FIG. 59 is a block diagram showing a configuration of a data communication system according to a twentieth embodiment of the present invention.

FIG. 59 is a block diagram showing a configuration of a data communication system according to a twentieth embodiment of the present invention. In FIG. 59, the data communication system according to the twentieth embodiment is different from the data communication system (FIG. 57) according to the nineteenth embodiment in the point that the data receiving apparatus 10201 does not comprise the synchronization signal reproducing part 233 and the multilevel identification controlling part 234.

Figure 60:
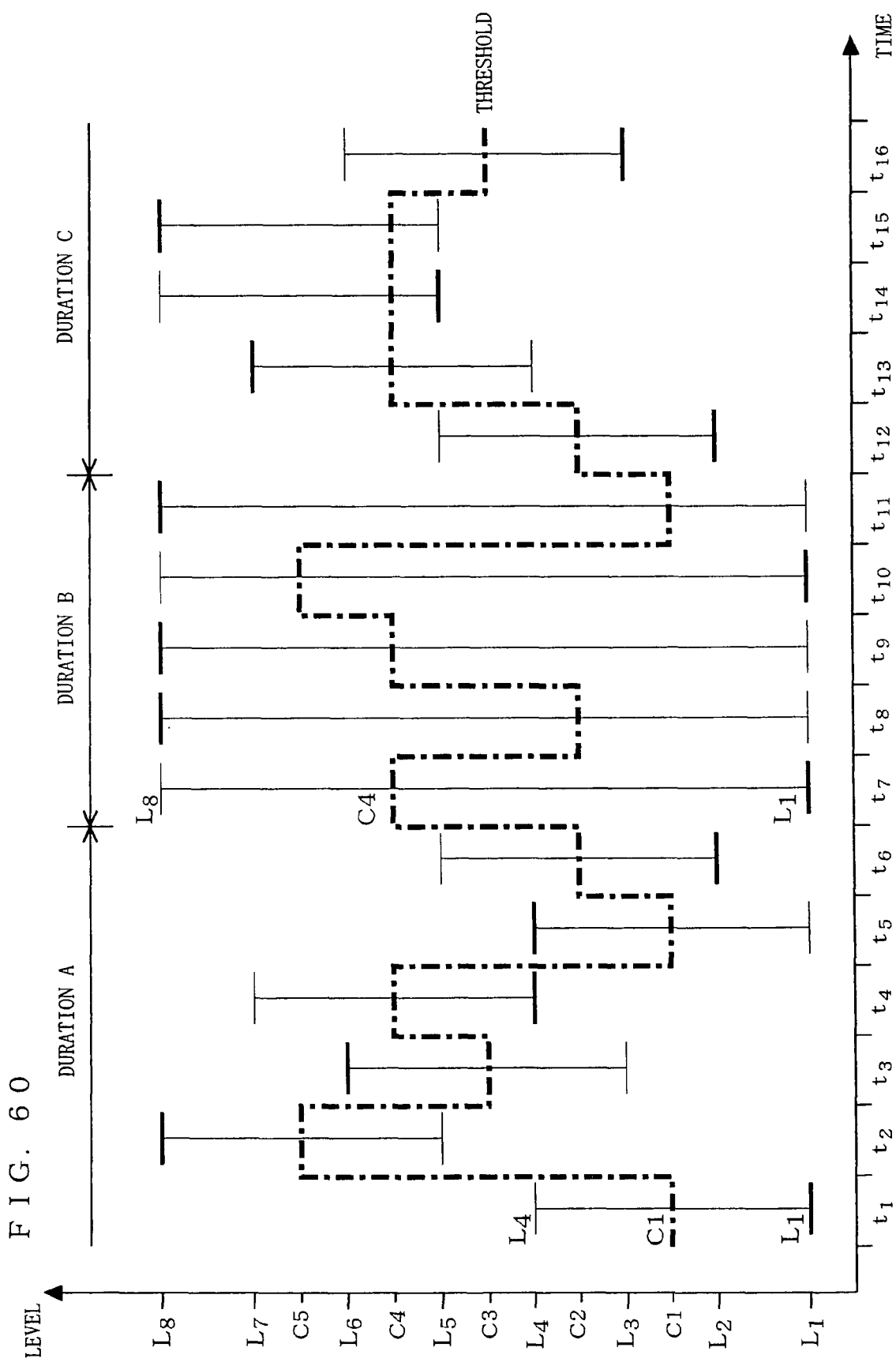
FIG. 60 is a schematic diagram describing a transmission signal waveform of a data communication system according to a twentieth embodiment of the present invention.

FIG. 60 is a schematic diagram describing a signal waveform outputted from the multilevel encoding part 111. The data communication system according to the twentieth embodiment is described below with reference to FIGS. 59 and 60. Here, the configuration of the present embodiment is similar to that of the nineteenth embodiment (FIG. 57). Thus, blocks that perform the same operation are designated by the same reference numerals, and their description is omitted.

In FIG. 59, on the basis of the multilevel processing control signal 65, the multilevel processing part 111b switches and outputs the multi valued number of the multilevel signal 13 which is the output signal, and sets up the multilevel signal amplitude to be larger when the multivalued number of the multilevel signal 13 is reduced. For example, as shown in FIG. 60, in a case that the multi valued number is "8" in the durations A and C, a multi valued number "2" is used and the amplitude is increased in the duration B. More specifically, the binary signal amplitude in the duration B is set up equal to or greater than the multilevel signal amplitude in the durations A and C, and then the signal is outputted.

The multilevel identifying part 212b identifies (binary determination) the multilevel signal 15 outputted from the demodulating part 211 with adopting the multilevel code sequence 17 as the threshold regardless of the multi valued number, and reproduces the information data 18. For example, as shown in FIG. 60, as for the multilevel signal having a total level number of "8" in the durations A and C, identification is performed with adopting as the threshold the multilevel code sequence 17 in which the level varies sequentially, while identification is performed on the binary signal on the basis of the multilevel code sequence 17 also in the duration B.

As described above, according to the present embodiment, information data to be transmitted is encoded as a multilevel signal, and critical degradation is imparted to the received signal quality at the time of wiretapping by a third person, so that a security communication channel is ensured solely for a particular receiving person. Further, the multi valued number is reduced appropriately while the amplitude is increased, so that simple threshold control is achieved at the time of multilevel signal receiving. This allows a simpler configuration to selectively realize communication not requiring security. By virtue of this, a concealed communication service and a general communication service can be provided in a mixed manner by using the same modulating and demodulating system and transmission system. This provides an efficient and economic communication system.

Twenty-First Embodiment

Figure 61:
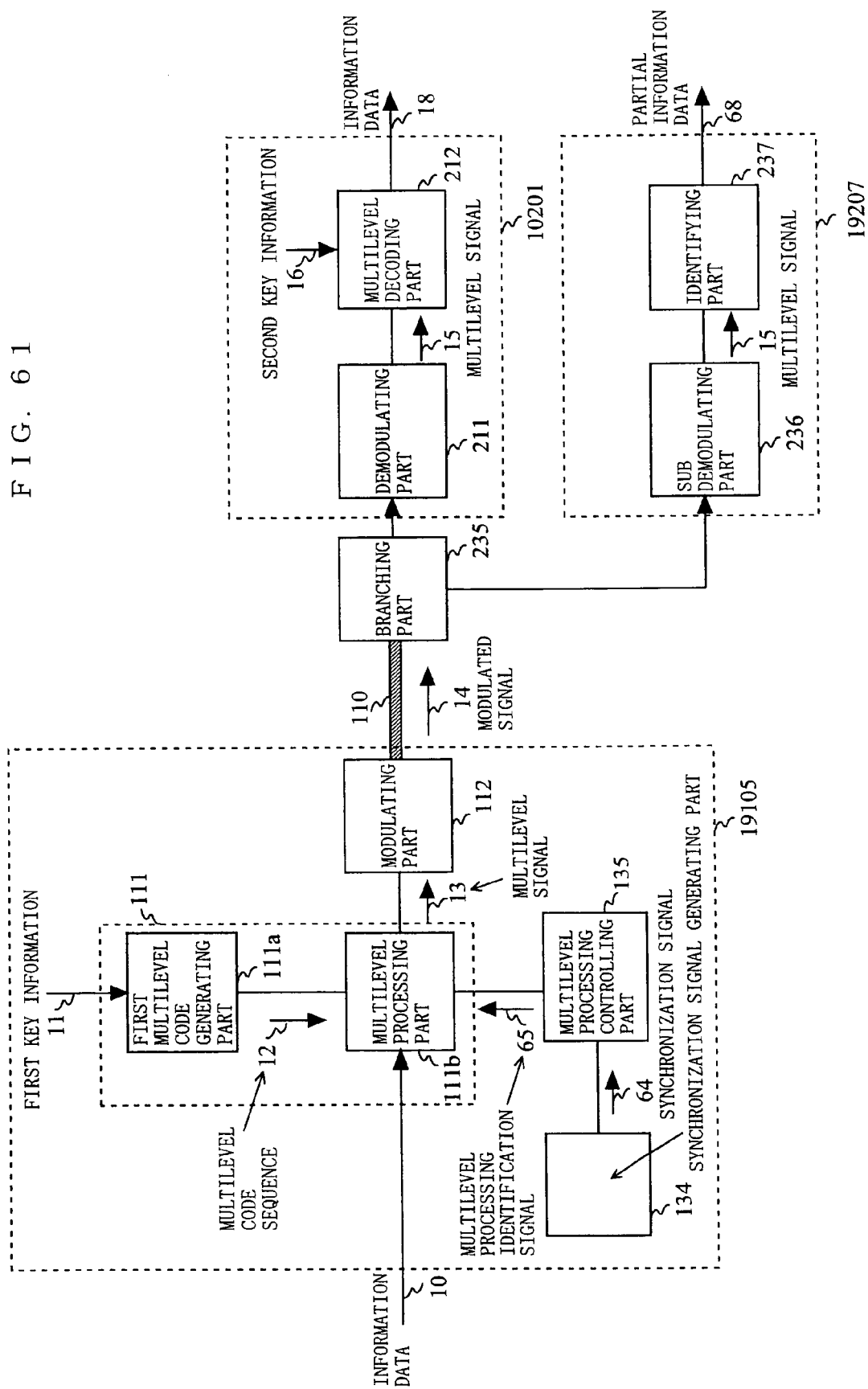
FIG. 61 is a block diagram showing a configuration of a data communication system according to a twenty-first embodiment of the present invention.

FIG. 61 is a block diagram showing a configuration of a data communication system according to a twenty-first embodiment of the present invention. In FIG. 61, the data communication system according to the twenty-first embodiment has a configuration that a data transmitting apparatus 19105, a data receiving apparatus 10201 and a sub data receiving apparatus 19207 are connected via a transmission path 110 and a branching part 235. In comparison with the twentieth embodiment (FIG. 59), the data communication system according to the twenty-first embodiment is different in the point that the branching part 235 and the sub data receiving apparatus 19207 are further provided. Here, although omitted in FIG. 61, the multilevel decoding part 212 includes a second multilevel code generating part 212a and a multilevel identifying part 212b. The data communication system according to the twenty-first embodiment is described below. Here, the configuration of the present embodiment is similar to that of the twentieth embodiment (FIG. 59). Thus, blocks that perform the same operation are designated by the same reference numerals, and their description is omitted.

In FIG. 61, the data transmitting apparatus 19105 transmits the modulated signal 14 modulated from the multilevel signal shown in FIG. 60. The branching part 235 branches the modulated signal 14 transmitted via the transmission path 110 into a plurality m (m is an integer greater than or equal to 2; m=2 in FIG. 61), and outputs them. The data receiving apparatus 10201 is provided in correspondence to n modulated signals (n is an integer smaller than m; n=1 in FIG. 61) among the m modulated signals outputted from the branching part 520. In the durations A and C, on the basis of the second key information 16 shared as the same key as the first key information 11, the data receiving apparatus 10201 demodulates and decodes the modulated signal, and reproduces the information data 18. Here, the data receiving apparatus 10201 may identify the binary signal in the duration B.

The sub data receiving apparatus 19207 is provided in correspondence to m−n modulated signals (m−n=2−1=1 in FIG. 61) among the m modulated signals outputted from the branching part 235. The sub demodulating part 236 demodulates the modulated signal and reproduces the multilevel signal 15. On the basis of a predetermined fixed threshold, the identifying part 237 identifies the multilevel signal 15 outputted from corresponding the demodulating part 236, and reproduces the information data (partial information data 68) solely in the duration B shown in FIG. 60.

Here, in the configuration of FIG. 61, the number of branches in the branching part 235 is m=2, while the data receiving apparatus 10201 is provided in correspondence to the n=1 modulated signal among them, and while the sub data receiving apparatus 19207 is provided in correspondence to the m−n=1 modulated signal. However, the present invention is not limited to this. That is, as long as m≧n, they may be set up arbitrarily. Then, data receiving apparatuses and sub data receiving apparatuses of corresponding numbers may be provided.

As described above, according to the present embodiment, information data to be transmitted is encoded as a multilevel signal. Then, critical degradation is imparted to the received signal quality at the time of wiretapping by a third person, so that a security communication channel solely for a particular receiving person is ensured. At the same time, the multi valued number is reduced appropriately, so that simultaneous transmission communication to many and unspecified receiving persons is realized selectively. By virtue of this, a concealed communication service and a communication service such as simultaneous transmission communication and broadcasting can be provided in a mixed manner by using the same modulating and demodulating system and transmission system. This provides an efficient communication system.

Twenty-Second Embodiment

Figure 62:
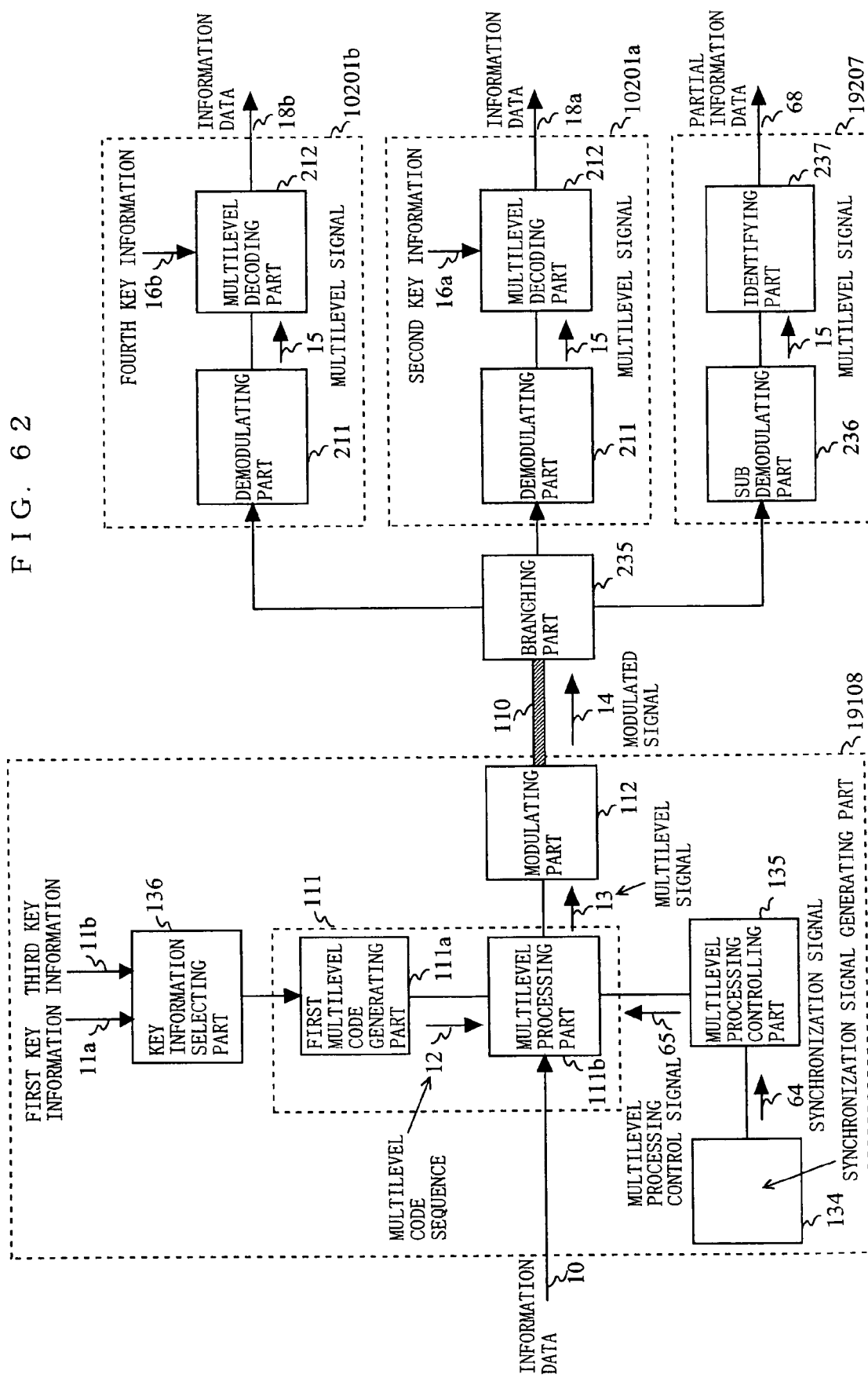
FIG. 62 is a block diagram showing a configuration of a data communication system according to a twenty-second embodiment of the present invention.

FIG. 62 is a block diagram showing a configuration of a data communication system according to a twenty-second embodiment of the present invention. In FIG. 62, the data communication system according to the twenty-second embodiment has a configuration that a data transmitting apparatus 19108, a plurality of data receiving apparatuses 10201a to 10201b and a sub data receiving apparatus 19207 are connected via a transmission path 110 and a branching part 235. In comparison with the twenty-first embodiment (FIG. 61), the data transmitting apparatus 19108 further comprises a key information selecting part 136. Here, although omitted in FIG. 62, the multilevel decoding part 212 includes a second multilevel code generating part 212a and a multilevel identifying part 212b. The data communication system according to the twenty-second embodiment is described below. Here, the configuration of the present embodiment is similar to that of the twenty-first embodiment (FIG. 61). Thus, blocks that perform the same operation are designated by the same reference numerals, and their description is omitted.

In FIG. 62, the key information selecting part 136 selects any one from plural n pieces of predetermined key information defined in advance (n=2 in FIG. 62; the first key information 11a and the third key information 11b). On the basis of the selected key information, the multilevel encoding part 111 generates the multilevel signal 13 as shown in FIG. 60. Data receiving apparatuses of n (10201a and 10201b) are provided in correspondence to the n modulated signals among the m modulated signals (m=3 in FIG. 62) branch-outputted from the branching part 235. On the basis of the second key information 16a and the fourth key information 16b individually shared respectively as the same key as the first key information 11a and the third key information 11b, the data receiving apparatuses demodulate and decode the modulated signal, and reproduces the corresponding information data (18a and 18b).

Specifically, in FIG. 60, when the data transmitting apparatus 19108 generates a multilevel signal 13 by using the first key information 11a in the duration A, the data receiving apparatus 10201a demodulates the modulated signal inputted in the duration A, and reproduces the information data 18a by using the second key information 16a. Further, when the data transmitting apparatus 19108 generates a multilevel signal 13 by using the third key information 11b in the duration C, the data receiving apparatus 10201b demodulates the modulated signal inputted in the duration C, and reproduces the information data 18b by using the fourth key information 16b. Here, the data receiving apparatuses 10201a and 10201b may demodulate the modulated signal inputted in the duration B so as to reproduce the partial information data 58.

The sub data receiving apparatus 19207 is provided in correspondence to m−n modulated signals (m−n=3−2=1 in FIG. 62) among the m modulated signals outputted from the branching part 235, then demodulates the modulated signal, then identifies on the basis of a predetermined fixed threshold, and reproduces the information data (partial information data 58) solely in the duration B shown in FIG. 60.

Here, in the configuration of FIG. 62, the number of branches in the branching part 235 is m=3, while the data receiving apparatus 10201 is provided in correspondence to the n=2 modulated signals among them, and while the sub data receiving apparatus 19207 is provided in correspondence to the m−n=1 modulated signal. However, the present invention is not limited to this. That is, as long as m≧n, they may be set up arbitrarily. Then, data receiving apparatuses and sub data receiving apparatuses of corresponding numbers may be provided.

As described above, according to the present embodiment, information data to be transmitted is encoded as a multilevel signal, and critical degradation is imparted to the received signal quality at the time of wiretapping by a third person. Further, plural pieces of key information are prepared and switched in the use, so that security communication channels solely for a plurality of particular receiving persons are ensured individually. Further, the multi valued number is reduced appropriately, so that simultaneous transmission communication to many and unspecified receiving persons is realized selectively. By virtue of this, a concealed communication service and a communication service such as simultaneous transmission communication and broadcasting can be provided in a mixed manner by using the same modulating and demodulating system and transmission system. This provides an efficient communication system.

Figure 63:
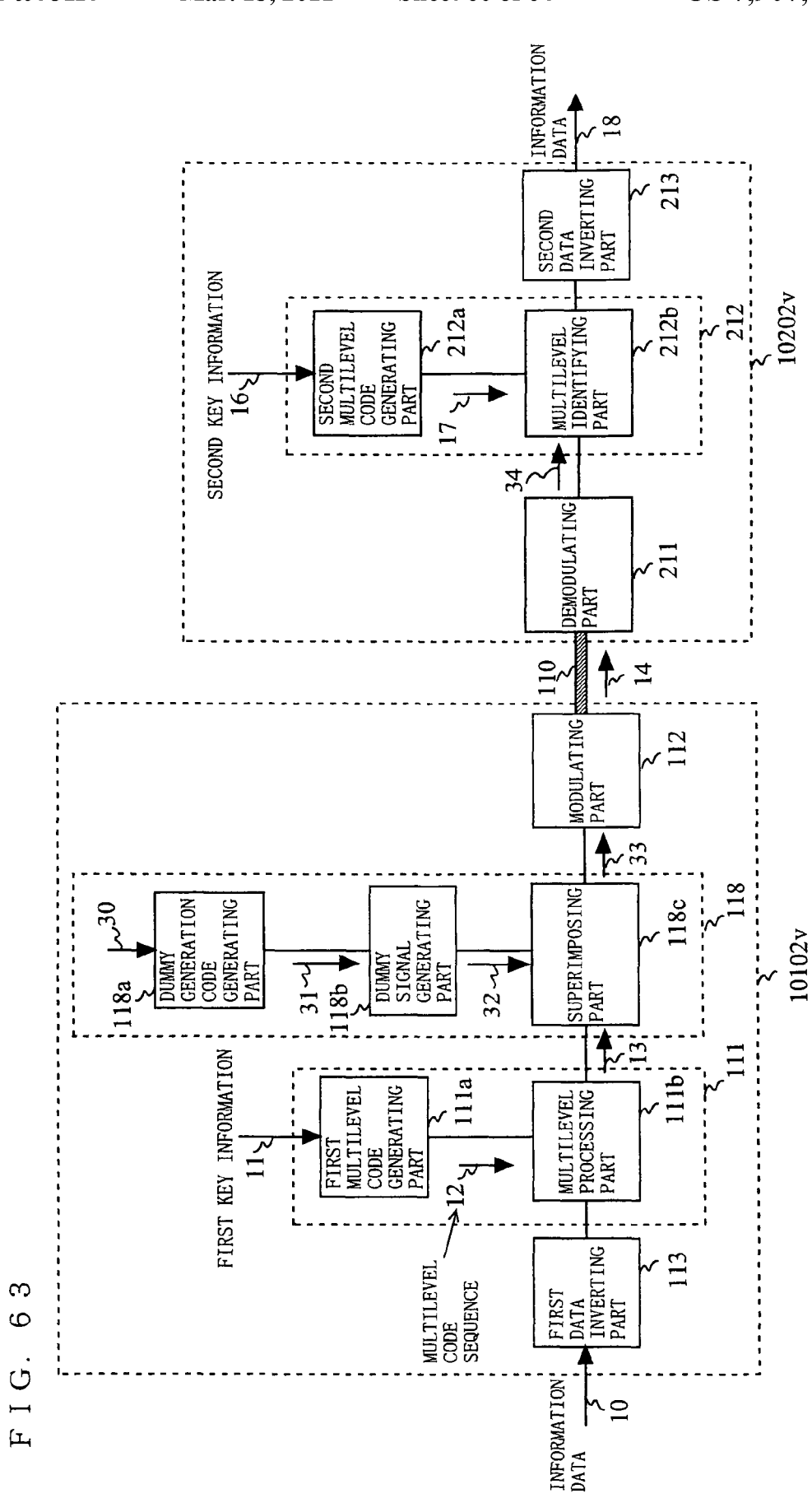
FIG. 63 is a block diagram showing an example of a configuration of a data communication system in which features of embodiments of the present invention are combined.
Figure 64A:
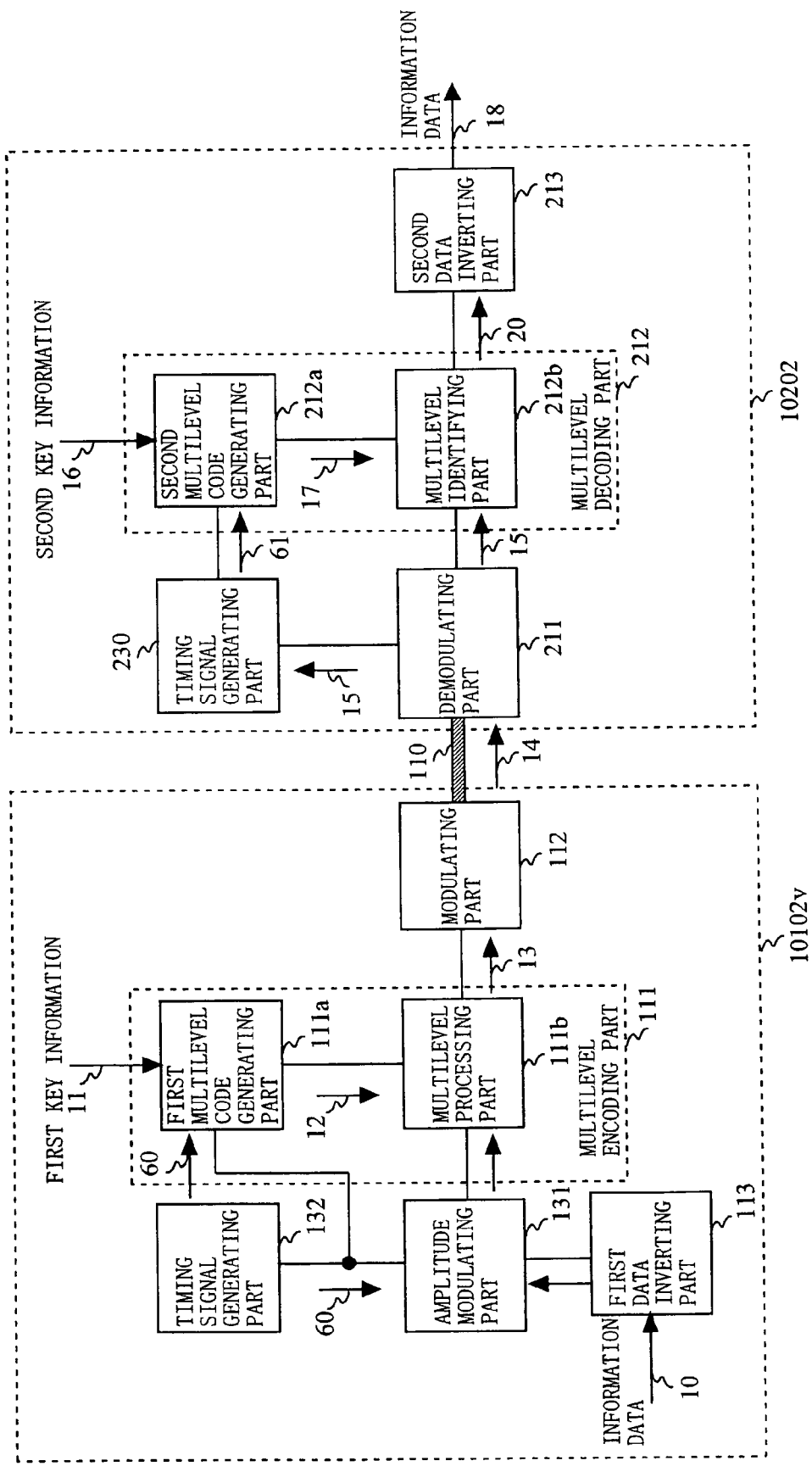
FIG. 64A is a block diagram showing an example of a configuration of a data communication system in which features of embodiments of the present invention are combined.
Figure 64B:
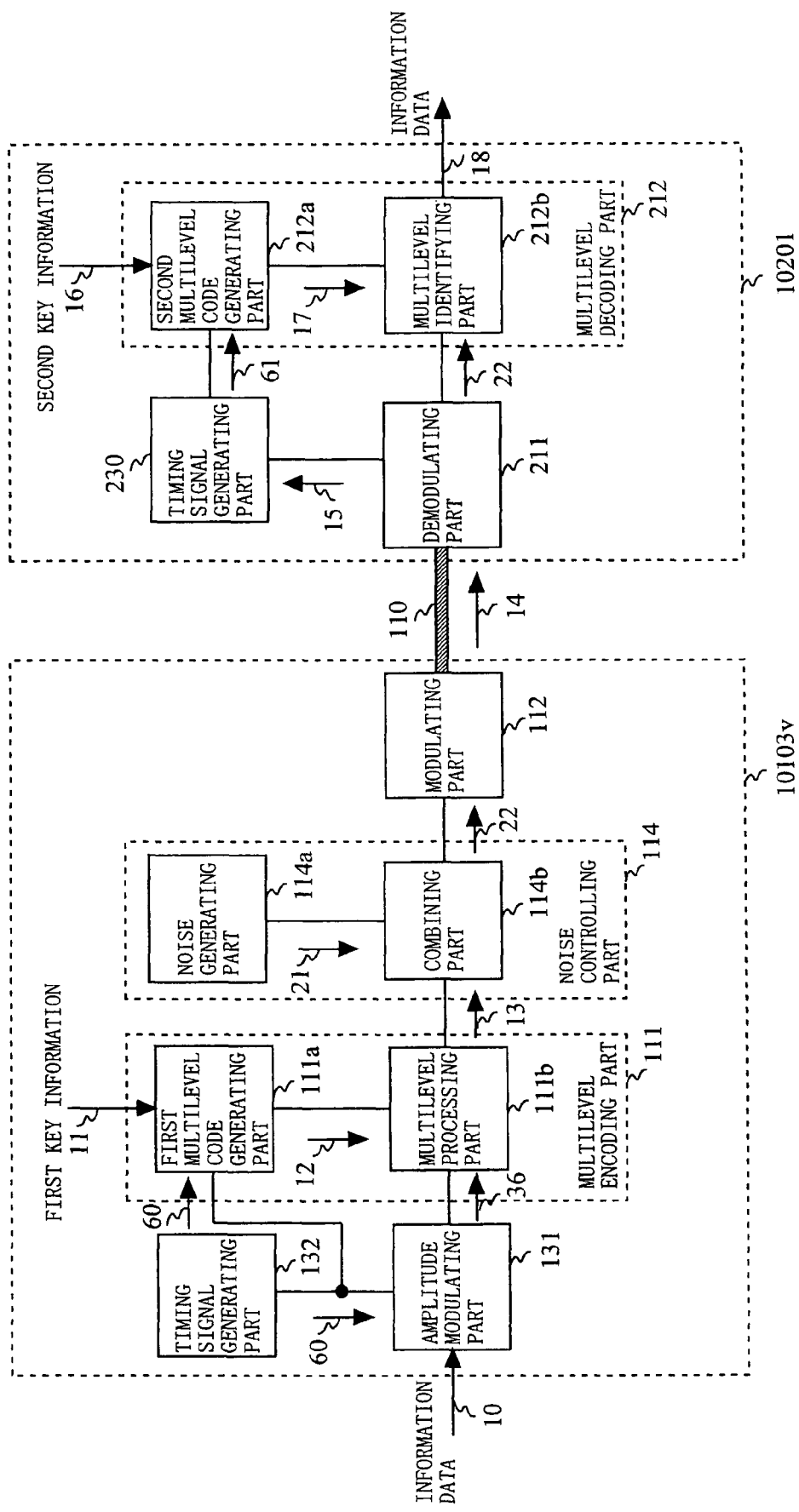
FIG. 64B is a block diagram showing an example of a configuration of a data communication system in which features of embodiments of the present invention are combined.
Figure 65:
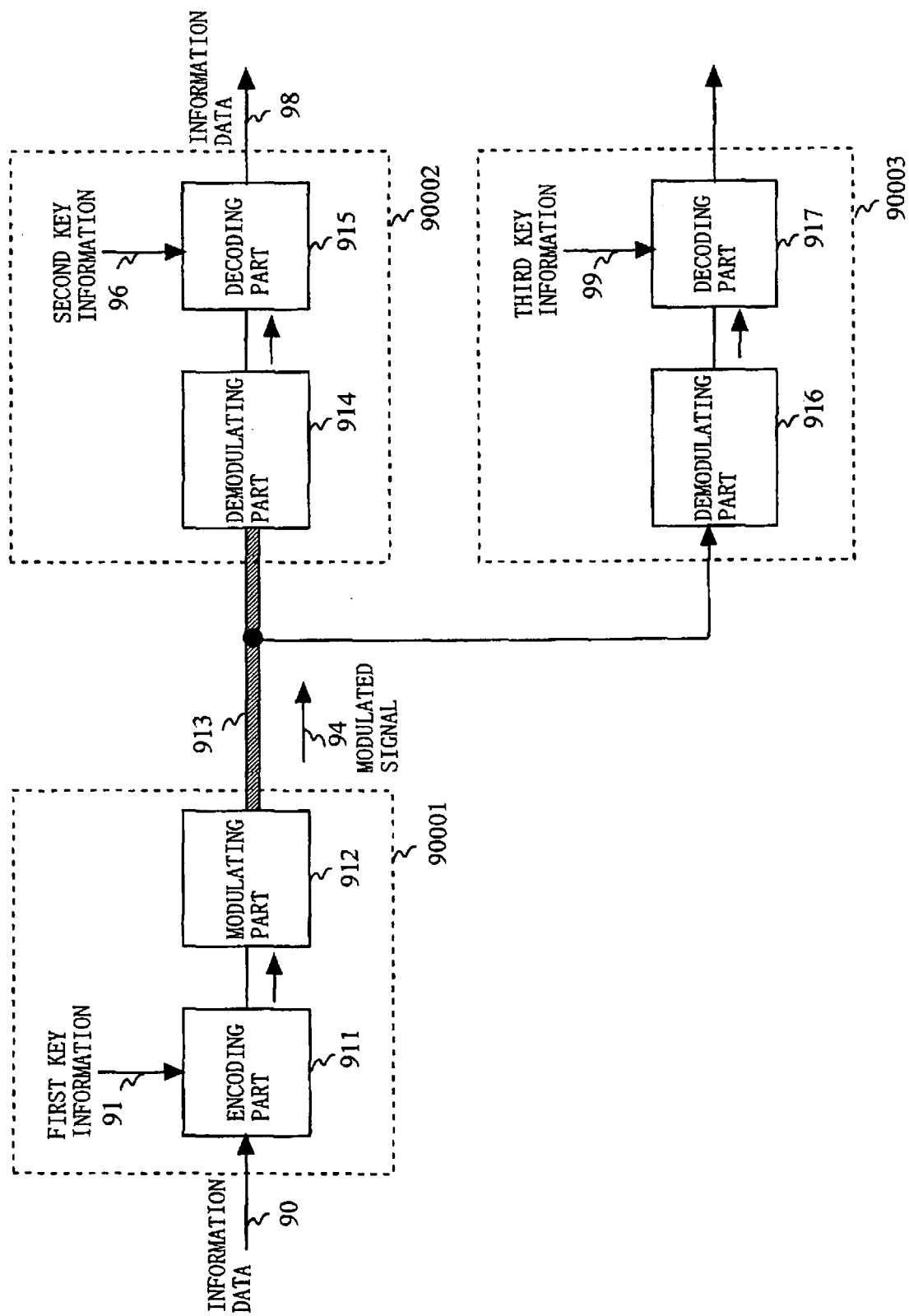
FIG. 65 is a block diagram showing a configuration of a conventional data communication system.

Here, the data communication system according to the second to the twenty-second embodiments described above may have a configuration that the features of the embodiments are combined with each other. For example, the data communication system according to the second to the fourth embodiments and the sixth to the twenty-second embodiments may have the features of the fifth embodiment (see, for example, FIG. 63). For example, the data communication system according to the second to the twelfth embodiments and the fourteenth to the twenty-second embodiments may have the features of the thirteenth embodiment (see, for example, FIGS. 64A to 64C).

Further, the above-mentioned processing performed individually by the data transmitting apparatus, the data receiving apparatus and the data communication system according to the first to the twenty-second embodiments may be recognized as a data transmission method, a data receiving method and a data communication method that provide a series of procedure.

Further, the data communication method, the data receiving method and the data communication method described above are realized when predetermined program data that is stored in a storage device (such as a ROM, a RAM and a hard disk) and that can implement the above-mentioned procedure is interpreted and executed by a CPU. In this case, the program data may be introduced into the storage device via a storage medium, or may be executed directly from the storage medium. Here, the storage medium indicates a semiconductor memory (such as a ROM, a RAM and a flash memory), a magnetic disk memory (such as a flexible disk and a hard disk), an optical disk memory (such as a CR-ROM, a DVD and a BD), a memory card or the like. Further, the concept of the storage medium includes a communication media such as a telephone line and a carrying path.

INDUSTRIAL APPLICABILITY

The data communication system according to the present invention is useful as a security and concealed communication system in which wiretapping and interception are avoided.

The invention claimed is:

1. A data transmitting method for performing encrypted communication, comprising:
a multilevel code sequence generating step of generating, from predetermined key information, a multilevel code sequence that varies in a signal level substantially in a random number manner, the multilevel code sequence being generated using a processor of a data transmitting apparatus; and
a modulated signal generation step of selecting, from among a predetermined plurality of modulated states, and based on (i) information data and (ii) the generated multilevel code sequence, a modulated state corresponding to a combination of signal levels of the information data and signal levels of the generated multilevel code sequence, and then generating a modulated signal of a predetermined modulation form and including a predetermined dummy signal.

2. The data transmitting method according to claim 1, wherein the modulated signal generation step includes:
a multilevel processing step of combining the information data with the generated multilevel code sequence in accordance with predetermined processing, and generating, in accordance with the combination of the signal levels of the information data and the signal levels of the generated multilevel code sequence, a multilevel signal which varies in a signal level substantially in a random number manner; and
a modulation step of generating, based on the generated multilevel signal, the modulated signal of the predetermined modulation form, and
wherein one of the multilevel processing step and the modulation step includes a step of superimposing the predetermined dummy signal.

3. The data transmitting method according to claim 2, wherein the predetermined dummy signal is a predetermined interfering signal which controls a signal-to-noise ratio of the generated modulated signal.

4. The data transmitting method according to claim 3, wherein an amplitude of the predetermined interfering signal is (i) greater than a distance between adjoining signal points of the generated multilevel signal, and (ii) smaller than an amplitude of the information data.

5. The data transmitting method according to claim 3, wherein an amplitude of the predetermined interfering signal varies continuously in a predetermined duration.

6. The data transmitting method according to claim 3, further comprising a step of selecting, from among a set of a plurality of interfering signals having amplitudes that vary in different patterns, and based on a predetermined means the predetermined interfering signal at a predetermined duration.

7. The data transmitting method according to claim 3, further comprising a step of selecting, from among a set of a plurality of interfering signals having amplitudes that vary in different patterns, and based on a predetermined random number sequence, the predetermined interfering signal at a predetermined duration.

8. The data transmitting method according to claim 7, wherein the predetermined random number sequence is a natural random number sequence.

9. The data transmitting method according to claim 3, wherein the predetermined interfering signal is an interfering light which controls, in a lightwave range, the signal-to-noise ratio of the generated modulated signal.

10. The data transmitting method according to claim 2, wherein the predetermined dummy signal is a timing signal, which is in synchronization with the generated modulated signal, and is generated at a predetermined time interval.

11. The data transmitting method according to claim 10, wherein the timing signal has a signal generation period and an intermittent period in the predetermined time interval, and wherein a signal-to-noise ratio in the signal generation period is greater than a signal-to-noise ratio in the intermittent period.

12. The data transmitting method according to claim 10, wherein an amplitude of the timing signal is greater than a maximum amplitude of the generated multilevel signal.

13. The data transmitting method according to claim 10, wherein an amplitude of the timing signal has a fixed ratio relationship with a maximum amplitude of the generated multilevel signal.

14. The data transmitting method according to claim 10, wherein the modulated signal is generated by multiplexing the generated multilevel signal and the timing signal by means of any one of time division, space division, frequency division, and code division.

15. The data transmitting method according to claim 2, further comprising an amplitude control step of increasing/decreasing an amplitude or intensity of the generated modulated signal based on a predetermined amplitude control signal.

16. The data transmitting method according to claim 2, further comprising an N-adic encoding step of encoding the information data into an arbitrary-adic number in accordance with predetermined processing.

17. The data transmitting method according to claim 2, further comprising a multi-valued number setting step of setting, at a predetermined duration, a multi-valued number of the generated multilevel signal to any one of a plurality of multi-valued numbers defined in advance.

18. The data transmitting method according to claim 1, wherein the modulated signal generating step:
   includes a first modulation step of generating, based on the information data, a first modulated signal of a predetermined modulation of the predetermined modulation form;
   includes a second modulation step of generating, based on the generated multilevel code sequence, a second modulated signal of the predetermined modulated form; and
   combines, in accordance with predetermined processing, the generated first modulated signal and the generated second modulated signal, and generates, in accordance with a combination of signal levels of the generated first modulated signal and the generated second modulated signal, the modulated signal having a modulation form varying substantially in a random number manner, and
   wherein one of the first modulation step and the second modulation step includes the a step of superimposing the predetermined dummy signal.

19. A data receiving method for performing encrypted communication, comprising:
   a multilevel code sequence generating step of generating, from predetermined key information, a multilevel code sequence that varies in a signal level substantially in a random number manner, the multilevel code sequence being generated using a processor of a data receiving apparatus; and
   an information data reproducing step of (i) demodulating a modulated signal of a predetermined modulation form having a multilevel modulated state and including a predetermined dummy signal, (ii) discriminating, in accordance with the generated multilevel code sequence, a signal obtained by demodulating the modulated signal, and then (iii) reproducing the information data.

20. The data receiving method according to claim 19, wherein the predetermined dummy signal is a predetermined interfering signal which controls a signal-to-noise ratio of the modulated signal, and
   wherein the data receiving method comprises a dummy signal canceling step of generating a dummy canceling signal and canceling the predetermined dummy signal.

21. The data receiving method according to claim 19, wherein the predetermined dummy signal is a timing signal, which is in synchronization with the modulated signal, and is generated at a predetermined time interval,
   wherein the data receiving method further comprises a timing signal extraction step of extracting the timing signal from one of the modulated signal and a demodulated signal, and
   wherein the multilevel code sequence generating step generates the multilevel code sequence in synchronization with the extracted timing signal.

22. The data receiving method according to claim 19, further comprising a multi-valued number setting step of changing a threshold for discriminating a multilevel signal, based on a multi-valued number of a multilevel signal inputted in a predetermined duration.

23. A data transmitting apparatus for performing encrypted communication, comprising:
   a multilevel encoding part for receiving predetermined key information and information data, and generating a multilevel signal that varies in a signal level substantially in a random number manner;
   a modulating part for generating a modulated signal of a predetermined modulation form based on the generated multilevel signal; and
   a dummy signal combining part for combining a predetermined dummy signal with any one of the information data, the generated multilevel signal and the generated modulated signal, and
   wherein the multilevel encoding part includes:
     a multilevel code generating part for generating, from the predetermined key information, a multilevel code sequence that varies in a signal level substantially in a random number manner; and
     a multilevel processing part for combining the generated multilevel code sequence with the information data in accordance with predetermined processing, and generating the multilevel signal having a level corresponding to a combination of signal levels of the information data and signal levels of the generated multilevel code sequence.

24. The data transmitting apparatus according to claim 23, wherein the predetermined dummy signal varies continuously in amplitude within a duration of one time slot of the generated multilevel signal.

25. The data transmitting apparatus according to claim 23, wherein the dummy signal combining part holds a plurality of signals having different amplitude change patterns, and combines the generated multilevel signal with any one of the plurality of signals, as the predetermined dummy signal, at each time slot of the generated multilevel signal.

26. The data transmitting apparatus according to claim 23, wherein an amplitude of the predetermined dummy signal is (i) larger than any one difference of differences between an arbitrary level of the generated multilevel signal and a level adjacent to the arbitrary level, and (ii) smaller than an amplitude of the information data.

27. The data transmitting apparatus according to claim 23, wherein the dummy signal combining part includes:
- a dummy signal generating part for generating the predetermined dummy signal; and
- a combining part for combining the predetermined dummy signal with the generated multilevel signal.

28. The data transmitting apparatus according to claim 27, wherein the dummy signal combining part further includes a dummy generation code generating part for outputting a dummy generation code serving as a random number based on a predetermined initial value, and
wherein the dummy signal generating part holds a plurality of signals having different amplitude change patterns, and outputs any one of the plurality of signals, as the predetermined dummy signal, based on the dummy generation code at each time slot of the generated multilevel signal.

29. The data transmitting apparatus according to claim 28, wherein the dummy generation code is a natural random number sequence.

30. The data transmitting apparatus according to claim 23, wherein the dummy signal combining part is connected between the multilevel processing part and the modulating part, and combines the generated multilevel signal with a dummy signal that causes difficulty in level determination of the generated multilevel signal by a third person.

31. The data transmitting apparatus according to claim 23, wherein the dummy signal combining part is a noise controlling part that (i) is connected to a preceding stage of the multilevel encoding part, and (ii) outputs, to the multilevel encoding part, noise combined information data in which predetermined noise is combined with the information data.

32. The data transmitting apparatus according to claim 23, wherein the dummy signal combining part is a noise controlling part that (i) is connected between the multilevel code generating part and the multilevel processing part, and (ii) outputs, to the multilevel processing part, a noise combined multilevel code sequence in which predetermined noise is combined with the generated multilevel code sequence.

33. The data transmitting apparatus according to claim 23, wherein the dummy signal combining part is a noise controlling part that (i) is connected to a subsequent stage of the modulating part, and (ii) generates a noise combined modulated signal in which predetermined noise is combined with the generated modulated signal.

34. A data transmitting apparatus for performing encrypted communication, comprising:
- a multilevel encoding part for receiving predetermined key information and information data, and generating a multilevel signal that varies in a signal level substantially in a random number manner; and
- a modulating part for generating a modulated signal of a predetermined modulation form based on the generated multilevel signal,
wherein the multilevel encoding part includes:
  - a multilevel code generating part for generating, from the predetermined key information, a multilevel code sequence that varies in a signal level substantially in a random number manner; and
  - a multilevel processing part for combining the generated multilevel code sequence with the information data in accordance with predetermined processing, and generating the multilevel signal having a level corresponding to a combination of signal levels of the information data and signal levels of the generated multilevel code sequence, and wherein, when generating the modulated signal of the predetermined modulation form, the modulating part imparts a predetermined noise component to the modulated signal based on the generated multilevel signal.

35. The data transmitting apparatus according to claim 34, wherein the modulating part includes a light source and is a light modulating part for modulating the generated multilevel signal into a light modulated signal.

36. The data transmitting apparatus according to claim 35, wherein the light source is a semiconductor laser.

37. The data transmitting apparatus according to claim 35, further comprising an optical noise controlling section for controlling a signal-power-to-noise ratio of the light modulated signal.

38. The data transmitting apparatus according to claim 37, wherein the optical noise controlling section includes:
- an optical noise generating part for generating a predetermined optical noise signal; and
- a light combining part for combining the predetermined optical noise signal with the light modulated signal output from the light modulating part.

39. The data transmitting apparatus according to claim 37, wherein the optical noise controlling section is an optical fiber amplifier.

40. The data transmitting apparatus according to claim 37, wherein the optical noise controlling section is an optical interference part that (i) divides the light modulated signal into a plurality of light modulated signals, and (ii) causes the plurality of light modulated signals to interfere mutually.

41. The data transmitting apparatus according to claim 37, wherein the optical noise controlling section is an optical multi-reflecting part that (i) has a plurality of reflection points, and (ii) causes multi-reflection in the light modulated signal.

42. The data transmitting apparatus according to claim 37, wherein the optical noise controlling section injects a part of the light modulated signal into the light modulating part.

43. The data transmitting apparatus according to claim 42, wherein the optical noise controlling section reflects and injects a part of the light modulated signal into the light modulating part.

44. The data transmitting apparatus according to claim 37, wherein the optical noise controlling section injects a predetermined optical signal into the light modulating part.

45. The data transmitting apparatus according to claim 44, wherein the optical noise controlling section includes:
- a noise generating part for generating a predetermined noise signal; and
- an injection light generating part for converting the predetermined noise signal into an optical noise signal and injecting the optical noise signal into the light modulating part.

46. The data transmitting apparatus according to claim 37, wherein the light modulated signal output from the light modulating part is multimode light composed of light of a plurality of wavelengths, and
wherein the optical noise controlling section changes a relative amplitude relation or a phase relation of light of each of the plurality of wavelengths of the multimode light, so as to generate noise in the light modulated signal.

47. The data transmitting apparatus according to claim 37, wherein the light modulated signal output from the light modulating part is multimode light composed of light of a plurality of wavelengths, and
wherein the optical noise controlling section removes light of at least one particular wavelength of the plurality of wavelengths from the multimode light, so as to generate noise in the light modulated signal.

48. The data transmitting apparatus according to claim 23, wherein the dummy signal combining part is a synchronizing part connected between the multilevel processing part and the modulating part, and
wherein the synchronizing part includes:
a signal synchronizing part for multiplexing an input synchronization signal onto the generated multilevel signal and generating a synchronized multilevel signal;
a noise synchronizing part for generating noise such that a signal-to-noise ratio of the input synchronization signal becomes higher than a signal-to-noise ratio of the generated multilevel signal, and outputting the generated noise as a synchronized noise signal; and
a noise combining part for combining the synchronized multilevel signal with the synchronized noise signal.

49. The data transmitting apparatus according to claim 48, wherein a maximum amplitude of the input synchronization signal is larger than a maximum amplitude of the generated multilevel signal.

50. The data transmitting apparatus according to claim 49, wherein a ratio between the maximum amplitude of the input synchronization signal and the maximum amplitude of the generated multilevel signal is constant.

51. The data transmitting apparatus according to claim 23, further comprising:
a timing signal generating part for generating a timing signal of a predetermined period; and
an amplitude modulating part for performing amplitude modulation or level fluctuation according to the timing signal on any one of the information data, the generated multilevel code sequence and the generated multilevel signal,
wherein the multilevel code generating part generates the multilevel code sequence in synchronization with the timing signal.

52. The data transmitting apparatus according to claim 51, wherein the amplitude modulating part imparts, based on the timing signal and to a signal on which the amplitude modulation or the level fluctuation is performed, the amplitude modulation or the level fluctuation greater than an amplitude of the signal.

53. The data transmitting apparatus according to claim 51, wherein at least one of the information data, the generated multilevel code sequence, the generated multilevel signal, and the generated modulated signal is at a fixed level in a predetermined duration.

54. The data transmitting apparatus according to claim 51, wherein the timing signal is a clock in synchronization with one of the information data, the generated multilevel code sequence, and the generated multilevel signal.

55. The data transmitting apparatus according to claim 51, wherein the amplitude modulating part is connected to a preceding stage of the multilevel encoding part and imparts the amplitude modulation or the level fluctuation to the information data based the timing signal, so as to output the imparted information data to the multilevel encoding part.

56. The data transmitting apparatus according to claim 51, wherein the amplitude modulating part is inserted between the multilevel code generating part and the multilevel processing part and imparts the amplitude modulation or the level fluctuation to the generated multilevel code sequence based on the timing signal, so as to output the imparted multilevel code sequence to the multilevel processing part.

57. The data transmitting apparatus according to claim 51, wherein the amplitude modulating part is inserted between the multilevel encoding part and the modulating part and imparts the amplitude modulation or the level fluctuation to the generated multilevel signal based on the timing signal, so as to output the imparted multilevel signal to the modulating part.

58. The data transmitting apparatus according to claim 51, wherein the amplitude modulating part is connected to a subsequent stage of the modulating part and performs the amplitude modulation of a predetermined form on the generated modulated signal based on the timing signal.

59. A data transmitting apparatus for performing encrypted communication, comprising:
a multilevel code generating part for generating, from predetermined key information, a multilevel code sequence that varies in a value substantially in a random number manner;
a first modulating part for generating a first modulated signal of a predetermined modulation form based on the generated multilevel code sequence;
a second modulating part for receiving information data and generating a second modulated signal of a predetermined modulation form;
a dummy signal combining part for combining a predetermined dummy signal with any one of the information data, the generated first modulated signal, and the generated second modulated signal; and
a wave mixing part for wave-mixing the generated first modulated signal and the generated second modulated signal.

60. A data transmitting apparatus for performing encrypted communication, comprising:
a multilevel code generating part for generating, from predetermined key information, a multilevel code sequence that varies in a signal level substantially in a random number manner;
a first modulating part for generating a first modulated signal of a predetermined modulation form based on the generated multilevel code sequence;
a second modulating part for receiving information data and modulating the generated first modulated signal with the information data, so as to generate a second modulated signal of a predetermined modulation form; and
a dummy signal combining part for combining a predetermined dummy signal with any one of the information data, the generated first modulated signal, and the generated second modulated signal.

61. The data transmitting apparatus according to claim 23, further comprising an N-adic encoding part that (i) is connected to a preceding stage of the multilevel encoding part, and (ii) encodes an information data group consisting of a plurality of information data into an arbitrary-adic number in accordance with predetermined processing, so as to output the encoded arbitrary-adic number as an N-adic encoded signal to the multilevel encoding part.

62. The data transmitting apparatus according to claim 23, wherein, at a predetermined duration, the multilevel encoding part generates the multilevel signal of a multi-valued number of any one of a plurality of multi-valued numbers defined in advance.

63. A data receiving apparatus for performing encrypted communication, comprising:
a demodulating part for demodulating a modulated signal of a predetermined modulation form and outputting the demodulated signal as a multilevel signal; and a multilevel decoding part for receiving predetermined key information and the multilevel signal and outputting information data, wherein the multilevel decoding part includes:
a multilevel code generating part for generating, from the predetermined key information, a multilevel code sequence that varies in a signal level substantially in a random number manner; and a multilevel discriminating part for discriminating the multilevel signal based on the generated multilevel code sequence and outputting the information data, wherein the multilevel signal contains a synchronization signal component for establishing synchronization and a multilevel signal component obtained by encrypting the information data with the predetermined key information, wherein a maximum amplitude of the synchronization signal component is a value larger than a maximum amplitude of the multilevel signal component, wherein the multilevel decoding part further includes:
an amplitude controlling part for controlling a maximum amplitude of the multilevel signal into a predetermined value based on an amplitude detection value indicating an amplitude of the multilevel signal, and outputting the amplitude of the multilevel signal;

a detecting part for detecting the amplitude of the multilevel signal output from the amplitude controlling part and outputting the detected amplitude as the amplitude detection value to the amplitude controlling part; and a synchronization extracting part that (i) discriminates, based on a threshold, the multilevel signal output from the amplitude controlling part, and (ii) determines as the synchronization signal component a signal having an amplitude larger than the threshold, so as to extract the synchronization signal component as a synchronization signal, and wherein the multilevel code generating part generates the multilevel code sequence based on the synchronization signal.

64. A data receiving apparatus for performing encrypted communication, comprising:
a demodulating part for demodulating a modulated signal of a predetermined modulation form and outputting the demodulated signal as a multilevel signal; and a multilevel decoding part for receiving predetermined key information and the multilevel signal and outputting information data, wherein the multilevel decoding part includes:
a multilevel code generating part for generating, from the predetermined key information, a multilevel code sequence that varies in a signal level substantially in a random number manner; and a multilevel discriminating part for discriminating the multilevel signal based on the generated multilevel code sequence and outputting the information data, wherein the multilevel signal contains a synchronization signal component for establishing synchronization and a multilevel signal component obtained by encrypting the information data with the predetermined key information, wherein a maximum amplitude of the synchronization signal component is a value larger than a maximum amplitude of the multilevel signal component, wherein the multilevel decoding part further includes:
a detecting part for detecting an amplitude of the multilevel signal and outputting the detected amplitude as an amplitude detection value;

a synchronization extracting part that (i) sets a threshold based on the amplitude detection value, and (ii) determines, as the synchronization signal component, a signal component having an amplitude larger than the threshold, so as to extract the synchronization signal component as a synchronization signal; and an amplitude controlling part for controlling a maximum amplitude of the multilevel code sequence based on the amplitude detection value, and wherein the multilevel code generating part generates the multilevel code sequence based on the synchronization signal.

65. The data receiving apparatus according to claim 63, wherein the detecting part adopts the maximum amplitude of the multilevel signal as the amplitude detection value.

66. The data receiving apparatus according to claim 63, wherein the detecting part adopts an average of the amplitude of the multilevel signal as the amplitude detection value.

67. The data receiving apparatus according to claim 66, wherein the synchronization extracting part holds, in advance, a ratio between the maximum amplitude of the synchronization signal component and the maximum amplitude of the multilevel signal component, and determines the threshold using the amplitude detection value and the ratio.

68. The data receiving apparatus according to claim 63, further comprising a timing signal reproducing part for receiving the multilevel signal output from the demodulating part and reproducing a timing signal,
wherein the multilevel code generating part outputs the multilevel code sequence in synchronization with the timing signal.

69. The data receiving apparatus according to claim 63, further comprising:
a branching part that branches the modulated signal and outputs one of the branched portions of the modulated signal to the demodulating part and branch-outputs remaining portions of the branched portions of the modulated signal;

a second demodulating part for demodulating and outputting the remaining portions of the branched portions of the modulated signal output from the branching part; and a timing signal reproducing part for reproducing a timing signal from an electric signal output from the second demodulating part, wherein the multilevel code generating part outputs the multilevel code sequence in synchronization with the timing signal.

70. The data receiving apparatus according to claim 63,
wherein the multilevel decoding part further includes an amplitude control signal generating part for generating, from predetermined amplitude control key information, an amplitude control signal that varies in a value substantially in a random number manner, and
wherein the multilevel discriminating part discriminates the multilevel signal based on the multilevel code sequence and the amplitude control signal and outputs the information data.

71. The data receiving apparatus according to claim 63, wherein the multilevel discriminating part changes the threshold for discriminating the multilevel signal based on a multi-valued number of the multilevel signal inputted in a predetermined duration.

72. A data communication system in which a data transmitting apparatus and a data receiving apparatus perform encrypted communication,
wherein the data transmitting apparatus comprises:
a multilevel encoding part for receiving predetermined first key information and information data, and generating a first multilevel signal that varies in a signal level substantially in a random number manner;
a modulating part for generating a modulated signal of a predetermined modulation form based on the generated first multilevel signal; and
a dummy signal combining part for combining a predetermined dummy signal with any one of the information data, the generated first multilevel signal and the generated modulated signal,
wherein the multilevel encoding part includes:
a first multilevel code generating part for generating, from the predetermined first key information, a first multilevel code sequence that varies in a signal level substantially in a random number manner; and
a multilevel processing part for combining the generated first multilevel code sequence with the information data in accordance with predetermined processing, and converting the combined first multilevel code sequence and the information data into the first multilevel signal having a level corresponding to a combination of signal levels of the information data and signal levels of the generated first multilevel code sequence,
wherein the data receiving apparatus comprises:
a demodulating part for demodulating the generated modulated signal of the predetermined modulation form and outputting the demodulated signal as a second multilevel signal; and
a multilevel decoding part for receiving predetermined second key information and the second multilevel signal and outputting the information data, and
wherein the multilevel decoding part includes:
a second multilevel code generating part for generating, from the predetermined second key information, a second multilevel code sequence that varies in a signal level substantially in a random number manner; and
a multilevel discriminating part for discriminating the second multilevel signal based on the generated second multilevel code sequence and outputting the information data.

73. A data communication system in which a data transmitting apparatus and a data receiving apparatus perform encrypted communication,
wherein the data transmitting apparatus comprises:
a multilevel encoding part for receiving predetermined key information and information data, and generating a multilevel signal that varies in a signal level substantially in a random number manner; and
a modulating part for generating a modulated signal of a predetermined modulation form based on the generated multilevel signal,
wherein the multilevel encoding part includes:
a multilevel code generating part for generating, from the predetermined key information, a multilevel code sequence that varies in a signal level substantially in a random number manner; and
a multilevel processing part for combining the generated multilevel code sequence with the information data in accordance with predetermined processing, and generating the multilevel signal having a level corresponding to a combination of signal levels of the information data and signal levels of the generated multilevel code sequence, and
wherein, when generating the modulated signal of the predetermined modulation form, the modulating part imparts a predetermined noise component to the generated modulated signal based on the generated multilevel signal.

74. The data receiving apparatus according to claim 64, wherein the detecting part adopts the maximum amplitude of the multilevel signal as the amplitude detection value.

75. The data receiving apparatus according to claim 64, wherein the detecting part adopts an average of the amplitude of the multilevel signal as the amplitude detection value.

* * * * *